United States Patent
Mistry et al.

(10) Patent No.: US 12,030,629 B2
(45) Date of Patent: Jul. 9, 2024

(54) CELLULAR COMMUNICATION DEVICES AND METHODS

(71) Applicant: TELEDYNE FLIR DETECTION, INC., Stillwater, OK (US)

(72) Inventors: Samir S. Mistry, Billerica, MA (US); Sam Johnson, Arvada, CO (US); Philip N. LaFountain, South Hamilton, MA (US); Perry Stoll, Brookline, MA (US); Jason Jeffords, Bedford, NH (US); Kenneth D. Sebesta, Winchester, KY (US)

(73) Assignee: TELEDYNE FLIR DETECTION, INC., Stillwater, OK (US)

( * ) Notice: Subject to any disclaimer, the term of this patent is extended or adjusted under 35 U.S.C. 154(b) by 1373 days.

(21) Appl. No.: 16/349,146

(22) PCT Filed: Nov. 10, 2017

(86) PCT No.: PCT/US2017/061195
§ 371 (c)(1),
(2) Date: May 10, 2019

(87) PCT Pub. No.: WO2018/089859
PCT Pub. Date: May 17, 2018

(65) Prior Publication Data
US 2020/0189731 A1 Jun. 18, 2020

Related U.S. Application Data

(63) Continuation-in-part of application No. PCT/US2017/024152, filed on Mar. 24, 2017.
(Continued)

(51) Int. Cl.
*B64C 39/02* (2023.01)
*B64F 3/02* (2006.01)
*H04B 7/185* (2006.01)

(52) U.S. Cl.
CPC .......... *B64C 39/022* (2013.01); *B64C 39/024* (2013.01); *B64F 3/02* (2013.01); *H04B 7/18504* (2013.01)

(58) Field of Classification Search
None
See application file for complete search history.

(56) References Cited

U.S. PATENT DOCUMENTS

| 7,149,611 B2 | 12/2006 | Beck et al. |
| 7,631,834 B1 | 12/2009 | Johnson et al. |

(Continued)

FOREIGN PATENT DOCUMENTS

| CN | 103332296 | 10/2013 |
| CN | 105223958 | 1/2016 |

(Continued)

OTHER PUBLICATIONS

Alexander et al., "Project APPA", Jun. 10, 2016, XP055467746, retrieved from the Internet: <https://us.tdk-lambda.com/media/291964/final-report.pdf>, [retrieved on Dec. 6, 2019], 46 pages.

(Continued)

*Primary Examiner* — Amelia Vorce
(74) *Attorney, Agent, or Firm* — Haynes and Boone, LLP

(57) ABSTRACT

The present invention relates to systems and methods for powering and controlling flight of an unmanned aerial vehicle. The unmanned aerial vehicles can be used in a networked cellular communication system. A tether management system can be used to facilitate both mobile and static tethered operation to provide power and/or voice and data communication.

20 Claims, 102 Drawing Sheets

Related U.S. Application Data

(60) Provisional application No. 62/564,175, filed on Sep. 27, 2017, provisional application No. 62/463,536, filed on Feb. 24, 2017, provisional application No. 62/420,548, filed on Nov. 10, 2016, provisional application No. 62/321,292, filed on Apr. 12, 2016, provisional application No. 62/315,873, filed on Mar. 31, 2016, provisional application No. 62/312,887, filed on Mar. 24, 2016.

(56) References Cited

U.S. PATENT DOCUMENTS

| | | |
|---|---|---|
| 8,385,066 B2 | 2/2013 | Chang et al. |
| 8,594,862 B2 | 11/2013 | Callou et al. |
| 9,016,617 B2 | 4/2015 | Wang et al. |
| 9,216,818 B1 | 12/2015 | Wang |
| 9,277,130 B2 | 3/2016 | Wang et al. |
| 9,284,049 B1 | 3/2016 | Wang et al. |
| 9,446,858 B2 | 9/2016 | Hess |
| 9,511,878 B1 | 9/2016 | McDermott et al. |
| 9,592,744 B2 | 3/2017 | Zhao |
| 9,592,911 B2 | 3/2017 | Liu et al. |
| 9,609,288 B1 | 3/2017 | Richman et al. |
| 9,725,169 B2 | 8/2017 | Lemus Martin et al. |
| 9,764,838 B2 | 9/2017 | Priest |
| 9,776,200 B2 | 10/2017 | Busby et al. |
| 9,859,972 B2 | 1/2018 | Jalali |
| 9,902,495 B2 | 2/2018 | Phan et al. |
| 9,919,797 B2 | 3/2018 | Chan et al. |
| 9,988,140 B2 | 6/2018 | Priest |
| 10,011,352 B1 | 7/2018 | Dahlstrom |
| 2003/0164794 A1 | 9/2003 | Haynes et al. |
| 2006/0232928 A1 | 10/2006 | Vinson et al. |
| 2009/0190653 A1 | 7/2009 | Seo et al. |
| 2010/0295303 A1 | 11/2010 | Lind et al. |
| 2011/0128704 A1 | 6/2011 | Chang et al. |
| 2011/0255571 A1 | 10/2011 | Caffrey et al. |
| 2012/0071076 A1 | 3/2012 | Wei et al. |
| 2012/0136488 A1 | 5/2012 | Tan et al. |
| 2013/0233964 A1 | 9/2013 | Woodworth et al. |
| 2014/0045368 A1 | 2/2014 | Gambardella et al. |
| 2014/0111147 A1 | 4/2014 | Soar |
| 2014/0118924 A1 | 5/2014 | Magarelli |
| 2014/0263852 A1 | 9/2014 | Walker et al. |
| 2014/0284531 A1 | 9/2014 | Hoyt et al. |
| 2014/0341584 A1 | 11/2014 | Hopewell et al. |
| 2014/0346283 A1* | 11/2014 | Salyer ................. B64C 37/00 903/903 |
| 2015/0041598 A1 | 2/2015 | Nugent et al. |
| 2015/0056908 A1 | 2/2015 | Chapel et al. |
| 2015/0172110 A1 | 6/2015 | Edwards et al. |
| 2015/0191259 A1 | 7/2015 | Giovanni et al. |
| 2015/0355107 A1 | 12/2015 | Paulson |
| 2016/0059963 A1 | 3/2016 | Burgess et al. |
| 2016/0073271 A1 | 3/2016 | Schultz et al. |
| 2016/0083115 A1* | 3/2016 | Hess ................. G05D 1/0866 701/3 |
| 2016/0185456 A1* | 6/2016 | Ducharme ........ H02M 3/33523 244/39 |
| 2016/0291136 A1 | 10/2016 | Lindskog et al. |
| 2016/0309346 A1* | 10/2016 | Priest ................. B64C 39/024 |
| 2016/0363659 A1 | 12/2016 | Mindell et al. |
| 2017/0144754 A1* | 5/2017 | Limvorapun .......... B60L 53/54 |
| 2017/0158338 A1 | 6/2017 | Sweeny et al. |
| 2017/0291704 A1* | 10/2017 | Alegria ................. B64D 47/08 |
| 2018/0004207 A1* | 1/2018 | Michini ............... G05D 1/0088 |
| 2018/0050798 A1 | 2/2018 | Kapuria |
| 2018/0059660 A1* | 3/2018 | Heatzig ................. B64C 39/024 |
| 2018/0095464 A1* | 4/2018 | Takayama ............. B64C 39/024 |
| 2018/0118374 A1* | 5/2018 | Lombardini .......... B64C 39/022 |
| 2018/0155022 A1* | 6/2018 | Hess ..................... B64C 39/022 |
| 2018/0191439 A1* | 7/2018 | Morser ............. H04B 10/2575 |
| 2018/0204469 A1* | 7/2018 | Moster .................. G01C 11/02 |
| 2018/0245365 A1 | 8/2018 | Wankewycz |
| 2018/0251216 A1* | 9/2018 | Whitaker .............. B64C 39/022 |
| 2018/0257776 A1* | 9/2018 | Phan ..................... B64D 33/10 |
| 2020/0008059 A1* | 1/2020 | Fox ....................... H04W 12/06 |
| 2021/0092604 A1* | 3/2021 | Fox ....................... B64C 39/024 |
| 2021/0225174 A1* | 7/2021 | Poscher ............... G08G 5/0069 |
| 2021/0282224 A1* | 9/2021 | Kanitkar ............... H04W 84/18 |

FOREIGN PATENT DOCUMENTS

| | | |
|---|---|---|
| CN | 105667834 | 6/2016 |
| CN | 105752337 | 7/2016 |
| CN | 105932737 | 9/2016 |
| CN | 107196696 | 9/2017 |
| CN | 206807060 | 12/2017 |
| CN | 107651212 | 2/2018 |
| CN | 207173951 | 4/2018 |
| CN | 108268079 | 7/2018 |
| EP | 2228301 A2 | 9/2010 |
| KR | 101816803 | 1/2018 |
| KR | 20180031622 | 3/2018 |
| RU | 2441809 | 2/2012 |
| RU | 154874 | 9/2015 |
| RU | 169165 | 3/2017 |
| WO | WO 2002/061971 | 8/2002 |
| WO | WO 2007/078422 | 7/2007 |
| WO | WO 2007/103644 | 9/2007 |
| WO | WO 2007/141795 | 12/2007 |
| WO | WO 2011/032051 | 3/2011 |
| WO | WO 2013/150442 | 10/2013 |
| WO | WO 2018/034578 | 2/2015 |
| WO | WO 2015/102700 | 7/2015 |
| WO | WO 2016/115155 | 7/2015 |
| WO | WO 2015/138217 | 9/2015 |
| WO | WO 2015/147715 | 10/2015 |
| WO | WO 2015/170078 | 11/2015 |
| WO | WO 2015/175379 | 11/2015 |
| WO | WO 2017/117608 | 7/2017 |

OTHER PUBLICATIONS

Elistair, A Comparison of Persistent Aerial Surveillance Solutions, (htlps://elistair.com/a-comparison-of-persistent-aerial-surveillance-solutions/) Dated Jun. 27, 2016. p. 1 of 1.

Elistair Report Summary, Periodic Reporting for period 1—Elistair (Bringing unlimited autonomy to Civilian Drones : Pulse, an Intelligent Tethered Power Supply.) Report Period May 1, 2015-Oct. 31, 2015, dated Jul. 5, 2016, pp. 1-3.

Tognon, Marco et al., "Control of Motion and Internal Stresses for a Chain of Two Underactuated Aerial Robots," 2015 European Control Conference (ECC), EUCA, Jul. 15, 2015, pp. 1620-1625.

* cited by examiner

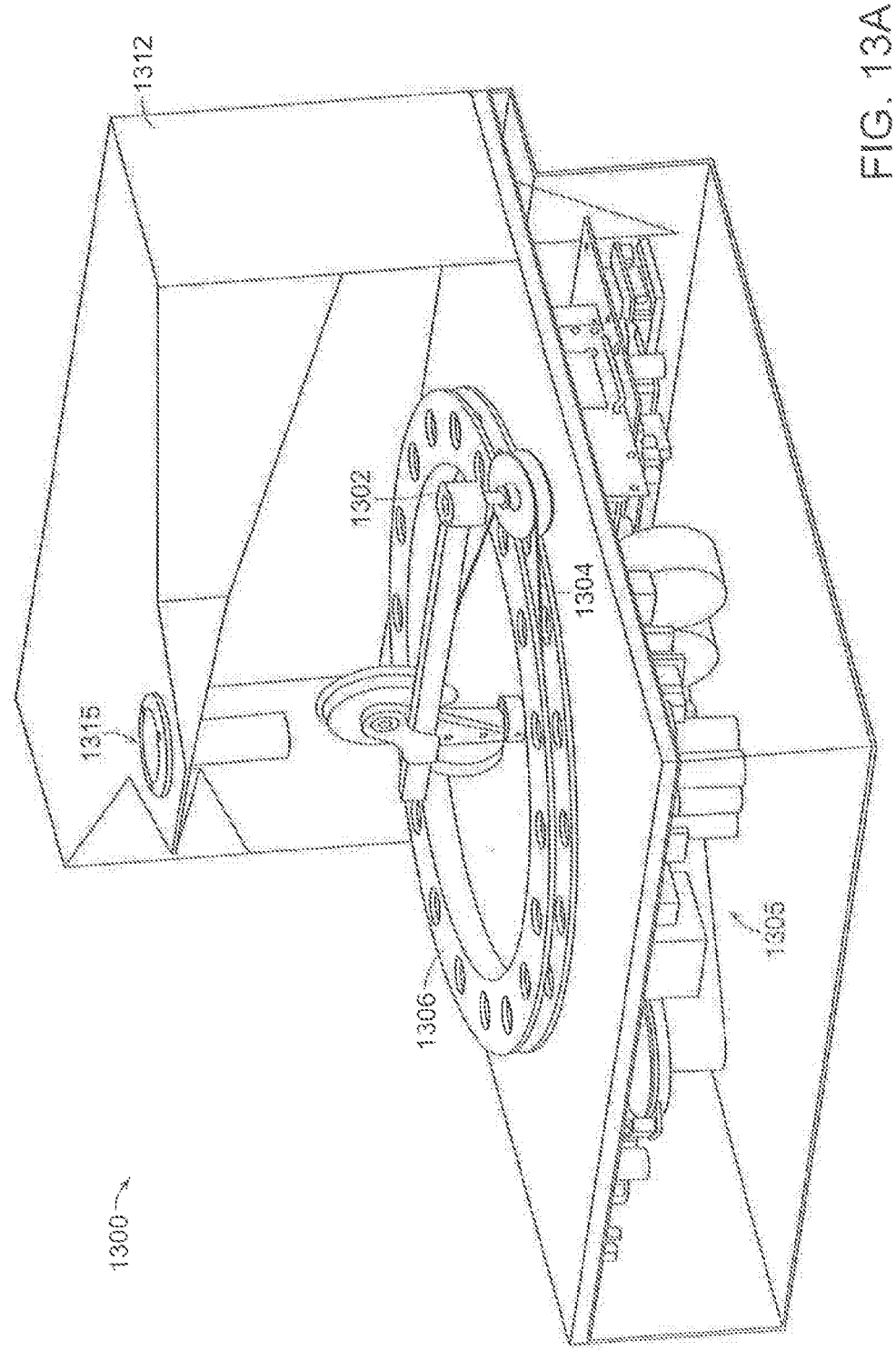

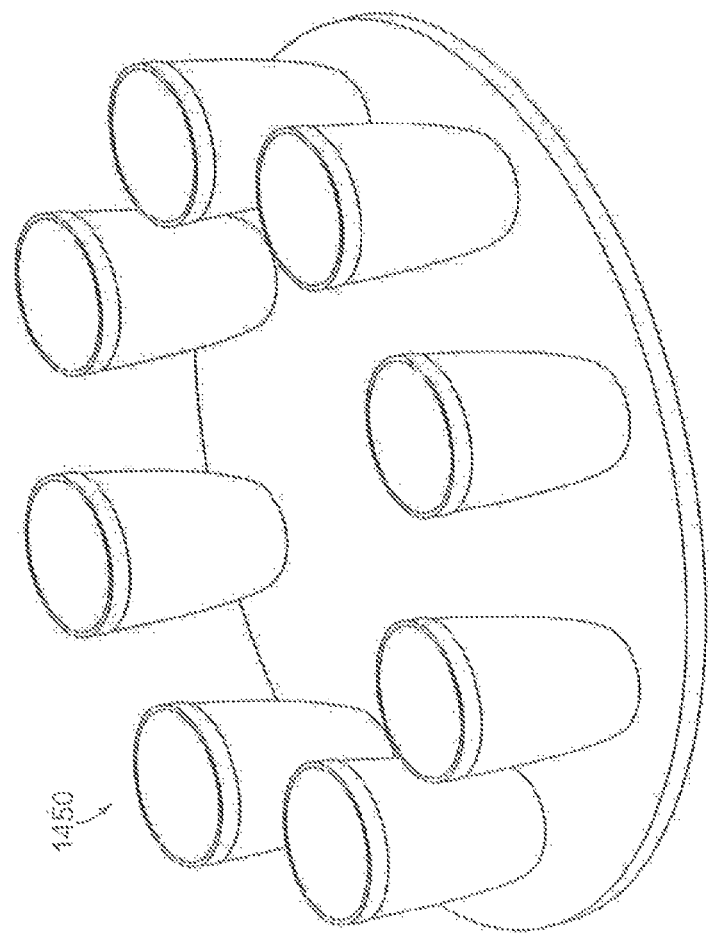

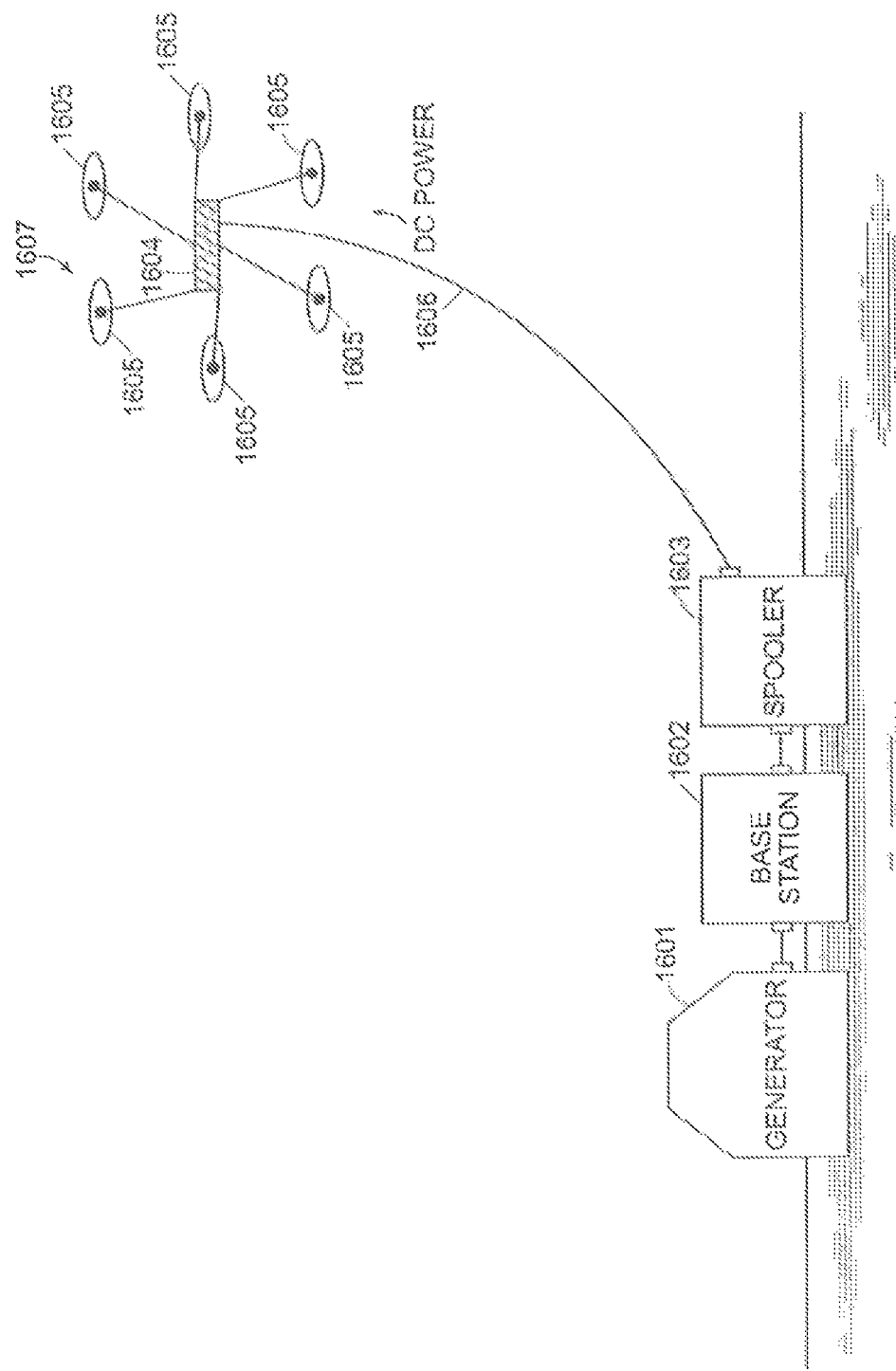

FIG. 21

| | User Plane | C&M Plane | | | SYNC |
|---|---|---|---|---|---|
| Layer 2 | IQ Data | Vendor Specific | Ethernet | HDLC | L1 Inband Protocol |
| | TDM / Circuit Emulation (CE) | | | | |
| Layer 1 | Electrical | Optical | | | Wireless |

CELLULAR COMMUNICATION DEVICES AND METHODS

RELATED APPLICATIONS

This application claims priority to Application PCT/US2017/061195 filed on Nov. 10, 2017 which claims the benefit of U.S. Provisional Application 62/564,175 filed on Sep. 27, 2017. Application PCT/US2017/061195 is a Box VI priority Application of PCT/US2017/024152 filed on Mar. 24, 2017. Application PCT/US2017/024152 claims the benefit of U.S. Provisional Application 62/463,536 filed on Feb. 24, 2017. Application PCT/US2017/024152 claims the benefit of U.S. Provisional Application 62/420,548 filed on Nov. 10, 2016. Application PCT/US2017/024152 claims the benefit of U.S. Provisional Application 62/321,292 filed on Apr. 12, 2016. Application PCT/US2017/024152 claims the benefit of U.S. Provisional Application 62/315,873 filed on Mar. 31, 2016. Application PCT/US2017/024152 claims the benefit of U.S. Provisional Application 62/312,887 filed on Mar. 24, 2016. Application PCT/US2017/061195 claims the benefit of U.S. Provisional Application 62/463,536 filed on Feb. 24, 2017. Application PCT/US2017/061195 claims the benefit of U.S. Provisional Application 62/420,548 filed on Nov. 10, 2016. The entire contents of these applications are incorporated herein by reference in their entirety.

BACKGROUND

Unmanned aerial vehicles (UAVs) such as aerial drones may be utilized in a variety of settings. For example, UAVs may be employed to perform reconnaissance and observation tasks through the use of onboard sensors. These sensors may include a variety of imaging devices that may be used to acquire data regarding objects and/or locations of interest. Depending upon the type of drone and the mission, the acquired data may then be transmitted to a ground station, either in real-time, at mission end or, on occasion, on a delayed basis while in operation such as while still in transit returning from a mission area.

Many UAVs are designed to fly or hover during their reconnaissance or observation missions while powered by an onboard battery which is required to supply power for both propulsion, onboard sensors and other electronics. The battery life therefore provides a maximum mission length for the UAV. Other UAVs have been configured to be powered via a microfilament deployed from a ground location during their operation thereby extending mission length while restricting the mission flight area in most cases based on the length of the filament.

A continuing needs, exists however, for improvements in the design of unmanned aerial vehicles for a variety of applications.

SUMMARY

The present invention relates to systems and operational methods for unmanned aerial vehicles (UAVs). Embodiments can include controlled operation of tethered aerial vehicles with which power, control and communication signals are transmitted to the aerial vehicle. The control station and aerial vehicle include power management systems and control circuits to control takeoff, flight operation and landing of the vehicle. One or more data processors located with the control station, on the aerial vehicle or connected by a communications network are configured to execute instructions to operate the system. The one or more UAVs can operate for radio transmission and reception of cellular communication or as an internet portal.

In one embodiment, a UAV may draw power from either remote sources (via tether), from on-board batteries, or from both, as required by operator command or by autonomous control. This ability allows, among other features, a ground-powered or water based aerial vehicle to have a power source for safe, controlled landings upon interruption of a tethered power source.

Systems and methods of preferred embodiments comprise a tether management system having high deployment and retrieval rate. A static assembly can be used on which the tether can be positioned for deployment and retrieval. A moveable actuator contacts the tether to separate the tether from the static assembly during deployment or retrieval in response to commands from a control system that responds to both manual and stored instructions to coordinate tether management with UAV flight control functions. The UAV can employ an inertial navigation on the vehicle to provide autonomous flight control functions. A GPS sensor on the vehicle can update the vehicle position and is used for navigation. Preferred embodiments employ devices and methods to update location data of the aerial vehicle in the event a GPS signal is not detected by aerial vehicle for a preset period of time. Thus, redundant position identification systems are used for a variety of operating environments.

A preferred embodiment uses radar data from an external radar system to provide updated position data to the vehicle. A further embodiment uses an optical system to determine aerial vehicle position. Such a system can utilize light emitters or emitter arrays a control station, on the aerial vehicle or mounted on a tether connected to the vehicle. Light detectors can measure distance and location within a field of view such as by LIDAR or other known techniques.

The management of a tether (e.g., for power, communication, and/or physical attachment) connected to an Unmanned Aerial Vehicle (UAV) requires special considerations in order to minimize tangling, decrease the risk of breakage, and minimize UAV power consumption. There are a number of different physical attributes of the tether that can be managed, with tension management being an important attribute. In particular a specific tension may need to be maintained at times (e.g., during flight) with the exception of launching and landing. Keeping optimal tension on the tether during flight prevents it from excessive bowing under wind load and reduces the risk of contacting the ground or other obstacles, while also preventing the tension from being too great for the UAV to lift. The optimal magnitude of the tension may be dependent on other factors during the flight, such as altitude and air speed (combination of wind and ground speed).

Further, there are many methods of winding a tether. In some examples, a spool is mounted on an arbor, with the spool being rotated by a motor. Because the spool rotates and in doing so, introduces relative motion between the moving spool and the chassis, a slip ring is used internal to the arbor to pass power and/or communication signals. This rotating connection prevents the wires from twisting as the arbor and spool are rotated.

Some spooler approaches include a force sensor which measures the tension in the tether, and a motor driven pinch roller which feeds tether in or out as needed to maintain a proper amount of tension. Such approaches may include a spring arm on the output which includes an angle sensor that in turn, provides additional information to the control algorithm.

From the pinch roller, the tether travels over a pulley mounted on an arm which is free to rotate about the opposite end. An angle sensor is able to detect the position of the arm. This position is used to calculate the velocity of the spindle motor, which controls the rotation of the spool. This mechanism is sometimes referred to as the "dancer". Certain embodiments do not require a dancer or pinch roller system as set forth in greater detail herein.

As the air vehicle ascends, the tension sensor detects an increase in tension, and commands the pinch rollers to feed out tether to reduce the tension in the tether. This causes the dancer to lift, which in turn causes the spool motor to feed out the tether. As the UAV descends, the tension sensor sees the tension drop, and commands the pinch rollers to pull in the tether until the desired tension is met. This causes the dancer to fall, which in turn, causes the spindle motor to retract the tether. Because the spool is a relatively small diameter and contains a relatively long length of tether, a level winding traverse is used to manage the wind pattern on the spool.

Such approaches can include a drive motor; a toothed belt; a spindle assembly (including bearing, shafts, mercury slip ring, connectors); a spool; a traverse winding assembly (including a stepper motor; limit switches; linear bearing system, pinch rollers, a tension sensor, and custom pulleys); a load cell force meter; and the dancer assembly including springs, one or more encoders, and pulleys.

Aspects described herein decrease the number of working parts needed for tether management, reduce the risk of mechanical failure, and reduce manufacturing complexity and cost. Aspects may enable addition of fiber-optic cable to the tether, which can be damaged by the small bend radius used in of prior spooler designs.

In the described aspects, the spool is stationary, and a motor wraps the tether around the spool. This eliminates the need for a slip ring to manage line twist. Because the spool is much larger than before, the traverse is no longer needed to manage the pattern of winding. Also because the spool is much larger, the need to actively cool the tether on the spool is reduced. Embodiments of the spool can include any structure that enables rapid deployment and retrieval within a confined space.

In a general aspect, a spooling apparatus includes a chassis, a spool retainer configured to fixably retain a spool on the chassis, the spool having a central axis and being configured to have a tether wound thereon and a winding mechanism. The winding mechanism includes a motor mounted to the chassis, the motor being coupled to a driving element coaxially aligned with a central axis of the spool, a spring coupled to the driving element of the motor, and a winding arm coupled to the driving element via the spring. Rotation of the motor causes rotation of the driving element, the spring, and the winding arm to deploy the tether from the spool. The spooling apparatus also includes a controller for controlling the winding mechanism to maintain tension on the deployed spool at a desired tension.

The spooling apparatus may include the spool with the tether wound thereon. The spool may be rotatably fixed or otherwise statically attached relative to the chassis or system housing. The controller may be configured to infer an actual tension on the tether according to a deflection of the spring. The winding mechanism may include a first encoder mounted on the driving element for measuring a first angular position of the driving element relative to the chassis and a second encoder mounted on the winding arm for measuring a second angular position of the winding arm relative to the chassis. The deflection of the spring may be determined as a difference between the first angular position and the second angular position.

A distal end of the winding arm may include a first pulley for receiving tether from the spool. The spooling apparatus may include a second pulley disposed substantially in the center of the spool, the second pulley being configured to receive tether from the first pulley and to deploy or re-spool the received tether. The spooling apparatus may include a ring bearing coupling the spring to the winding arm.

Preferred embodiments include the power source, communications and tether management in a single hand-carried portable housing. The portable housing can also include an integrated launch and landing platform that can be mounted on a vehicle. Such a control station housing can comprise a hand carried system having a weight of less than 28 kg (or about 60 lbs.), and preferably less than 25 kg, and more preferably less than 22 kg. For mobile operations using ground vehicles it is preferred to have the ability to dispense and retrieve the tether to accommodate higher rates of travel. The aerial vehicle can also detach from the tether while tracking the vehicle from which it was launched and then automatically land the vehicle while it moves.

A further embodiment provides a thermal management system for the base station portable housing. As the operating voltage of the control electronics in the portable housing can cause heating of the system and adversely affect the transmission of power and communication to the aerial vehicle with the tether, the system is cooled by fluid (air) flow within the housing. A thermal barrier or heat sink can also be used to vent heat away from the temperature sensitive system components. A metal plate can be used to mount the tether retainer, such as a spool, on one side and the control electronics can be mounted on a second side.

Some "free-flying" aerial vehicles are powered by a battery and communicate wirelessly with one or more ground-based stations. As noted above "tethered" aerial vehicles are powered by a lightweight filament extending between the aerial vehicle and a ground station with communication between the ground station and the aerial vehicle occurring over the filament.

Some users have multiple needs with some of their needs best implemented using free-flying aerial vehicles and others have their needs best addressed by tethered aerial vehicles. Due to practical limitations (e.g., budgetary restrictions) users generally cannot have both types of aerial vehicles. Thus, there is a need for an adaptable aerial vehicle system that can fly both under remote power with a tether and as a free-flyer, under battery power.

In a general aspect, a modular aerial vehicle system allows for simple, modular switching between a number of different configurations, including a free-flying, battery powered configuration and a tethered configuration.

In some aspects, an aerial vehicle having a plurality of rotors, wherein each rotor is tilted to have a different thrust vector than the remaining plurality of rotors, includes a receptacle or "module bay" in its fuselage for receiving modules for configuring the aerial vehicle. One example of a module that can be received by the module bay is a battery power configuration module for configuring the aerial vehicle into a battery operated mode. In some examples, the battery power configuration module includes a battery (e.g., a lithium ion battery) and circuitry associated with battery power management. In some examples, the battery power configuration module includes terminals that correspond to terminals located in the module bay such that, when the battery power configuration module is inserted into the module bay, the terminals of the battery power configuration module are in contact with the terminals in the module bay (e.g., for power transfer).

Another example of a module that can be received in the module bay is a tethered configuration module. The tethered configuration module includes or is attachable to a lightweight tether for connection to a control or ground station, data linkage connectors which enable use of the tether as both the power conduit, and conveyance mechanism for command and control communications and telemetry return, for vehicles equipped to enable hardwired interface with their ground-based operator. In some examples, the tethered configuration module supplies power information to the user via established vehicle health monitoring strategies, such that continuous feed of power from the ground is properly reported, and any battery life-related behaviors (like land on low power) are precluded.

In some examples, the tether is spooled (e.g., deployed from and/or re-wound) in a body of the tethered configuration module. In other examples, spooling of the tether occurs at a ground station, on a water raft or a ground vehicle. In other applications, the tether can be static to provide power to a cellular tower radio transmission system, including power amplifiers and remote radio heads, and can optionally include backhaul of cellular voice and data to a cell tower base station.

In some examples, the tethered configuration module includes terminals that correspond to terminals located in the module bay such that, when the tethered configuration module is inserted into the module bay, the terminals of the tethered configuration module are in contact with the terminals in the module bay (e.g., for power transfer, command and control information transfer, sensor information transfer, etc.).

In some examples, a multi-use module is a hybrid tethered configuration module and battery power configuration module (i.e., a module including both tether hardware and a battery). When in use as a free flying vehicle, the tether is disconnected from the multi-use module (leaving the tether management hardware intact), and a battery unit installed in the multi-use module. When being used in a tethered configuration, the battery unit is removed from the multi-use module, and the tether is attached. In some examples, the multi-use module is used with both the battery unit installed and the tether attached. In such examples, circuitry for intelligently switching between battery power and tether-based power is included in the multi-use module.

In some examples, the aerial vehicle includes minimal or no power conversion, telemetry, vehicle command and control, sensor, or communications circuitry. That is, the aerial vehicle includes only a fuselage, including spars with thrust generators disposed at their ends and terminals for connecting the thrust generators to an electronics module in the module bay. The electronics module may include a computing circuitry (e.g., a processor, memory) and/or discrete circuitry for power conversion, telemetry, vehicle command and control, and communications. The electronics module can be swapped in and out of one or more aerial vehicles.

In some examples, different modules can include different sensor suites to adapt the aerial vehicle to its mission. Thus, different camera systems can be used depending upon whether a tether is used or not.

In general, all of the modules that can be received by the module bay, including the tethered configuration module, the battery power module, and the electronics module have the same form factor, and fit without additional modification, into the module bay of the aerial vehicle.

In some examples, modules can be designed to retrofit pre-existing aerial vehicles. For example, a tethered configuration module may be configured to fit into a bay or attach to standard attachment points of a pre-existing aerial vehicle and to provide tethered power to the aerial vehicle. In some examples, such a tethered configuration module includes an RF transponder for receiving command and control information from a ground station via the tether and transmitting RF command and control information to the pre-existing aerial vehicle. The tethered configuration module may also include power conversion and conditioning circuitry for converting and conditioning the power received over the tether into a form that is usable by the aerial vehicle.

In some examples, the modular aerial vehicle system includes a ground station including one or more of a generator for generating power, a base station for conversion of the power from the generator for transmission over the tether and for communicating over the tether, and a spooler for managing an amount of deployed tether.

In some examples, one or more elements of the control station is attached to a moving vehicle such as a commercial vehicle, construction equipment, military equipment and vehicles, boats and personal vehicles. Power can be provided by a mobile generator or vehicle mounted battery.

Switching between battery powered operation and tethered operation is a simple modular switching operation. System flexibility is increased. Functionality and data capture capabilities are increased. Both the advantages of tethered systems (e.g., persistent, secure communications, flight duration unconstrained by on-board battery energy capacity) and free flying systems (e.g., wide range of motion, unconstrained by tether length) are achieved in a single system.

In an embodiment, the UAV may be equipped with one or more antennas and function as a mobile cell tower. The UAV includes receiver and transmission electronics to support a cellular communication network in which handheld mobile communication devices such as cell phones, tablets or other internet enabled wireless communication devices can be used with the UAV to connect to the cellular network. An optical transceiver on the UAV provides for transmission and reception of voice, data and streaming video using optical fiber(s) in the tether.

BRIEF DESCRIPTION OF THE DRAWINGS

The accompanying drawings, which are incorporated in, and constitute a part of this specification, illustrate one or more embodiments of the invention and, together with the description, help to explain the invention. In the drawings:

FIG. 16 illustrates a generator used to provide power to a base station and tether management system;

FIG. 19C is an exemplary control system for a UAV operating as a cell tower;

FIG. 21 depicts the use of exemplary operation modes that may be employed by an embodiment;

DETAILED DESCRIPTION

Embodiments provide a Persistent Aerial Reconnaissance and Communication (PARC) System that offer extended flight time for a UAV or other aerial vehicle through the use of microfilament, a pair of threadlike wires that may transmit over a kilowatt of power to the UAV while also enabling transmission of bi-directional data and high-definition video. The PARC system may be rapidly deployed as a low-maintenance unmanned aerial vehicle that allows cameras, radios or other payloads to remain in operation for long durations. The PARC system is designed to be intuitively simple to launch/land and the small logistics footprint may make the system appropriate for austere environments. The PARC system may require minimal training for operations and maintenance. The system is designed for quick and simplified deployment to minimize operator management while maximizing capability provided in terms of communications extension, force protection, persistent stare, and tactical intelligence.

Figure 1:
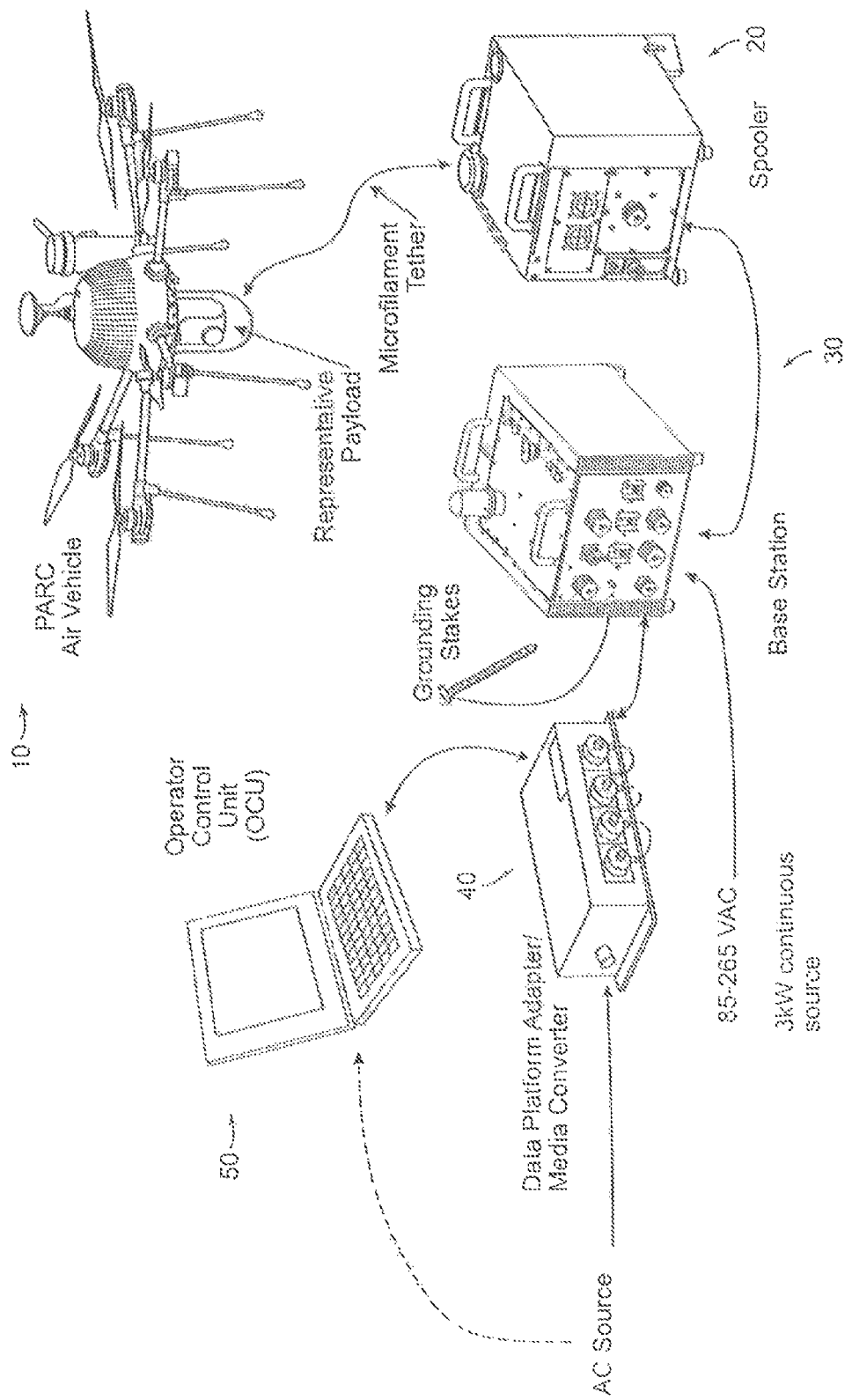
FIG. 1 depicts an exemplary PARC system in an embodiment.

FIG. 1 depicts an exemplary PARC system in an embodiment. The system includes an aerial vehicle 10 equipped with a payload 11, a spooler 20, and a base station 30. The system also includes a data platform adapter/media converter (DPA/MC) 40 that is coupled to an operator control unit (OCU) 50. Aerial vehicle 10 may be an unmanned aerial vehicle (UAV) or other flight capable robot. The payload 11 may be a camera, radar or another type of surveillance, communication or other sensor required by an end user of the PARC system. The spooler 20 is a ground based component that includes a spool assembly that houses the tether spool assembly, a cylindrical hub that holds a pre-wound amount of micro-filament tether to be attached to the aerial vehicle 10. For example, in one embodiment, the spool assembly may hold 167.6 meters (550 feet) of micro-filament tether. In one embodiment, the micro-filament tether may be Kevlar-jacketed twisted copper pair with insulation that provides both a power link and a communication link between the spooler 20 and the aerial vehicle 10. The base station 30 is connected to the spooler 20. The base station 30 includes an assembly that houses an AC power input and high voltage conversion electronics in an environmentally sealed enclosure. The base station 30 also includes a high voltage output port to supply high voltage to the spooler 20 which delivers the high voltage via the microfilament to the aerial vehicle 10. A data platform adapter/media converter (DPA/MC) 40 may serve the function of connecting an operator control unit (OCU) 50 to the base station while also providing electrical shock hazard isolation. The DPA/MC 40 may include an optical port to connect to the base station via a fiber optic cable and may also include an Ethernet port to connect to the OCU 50. The OCU 50 may be a ruggedized laptop or other computing device equipped with and able to execute the OCU application described further herein enabling control of the aerial vehicle 10. Further details regarding the operation of tethered and untethered vehicles can be found in U.S. Pat. Nos. 7,510,142 and 7,631,834 the entire contents of these patents being incorporated herein by reference.

Figure 2:
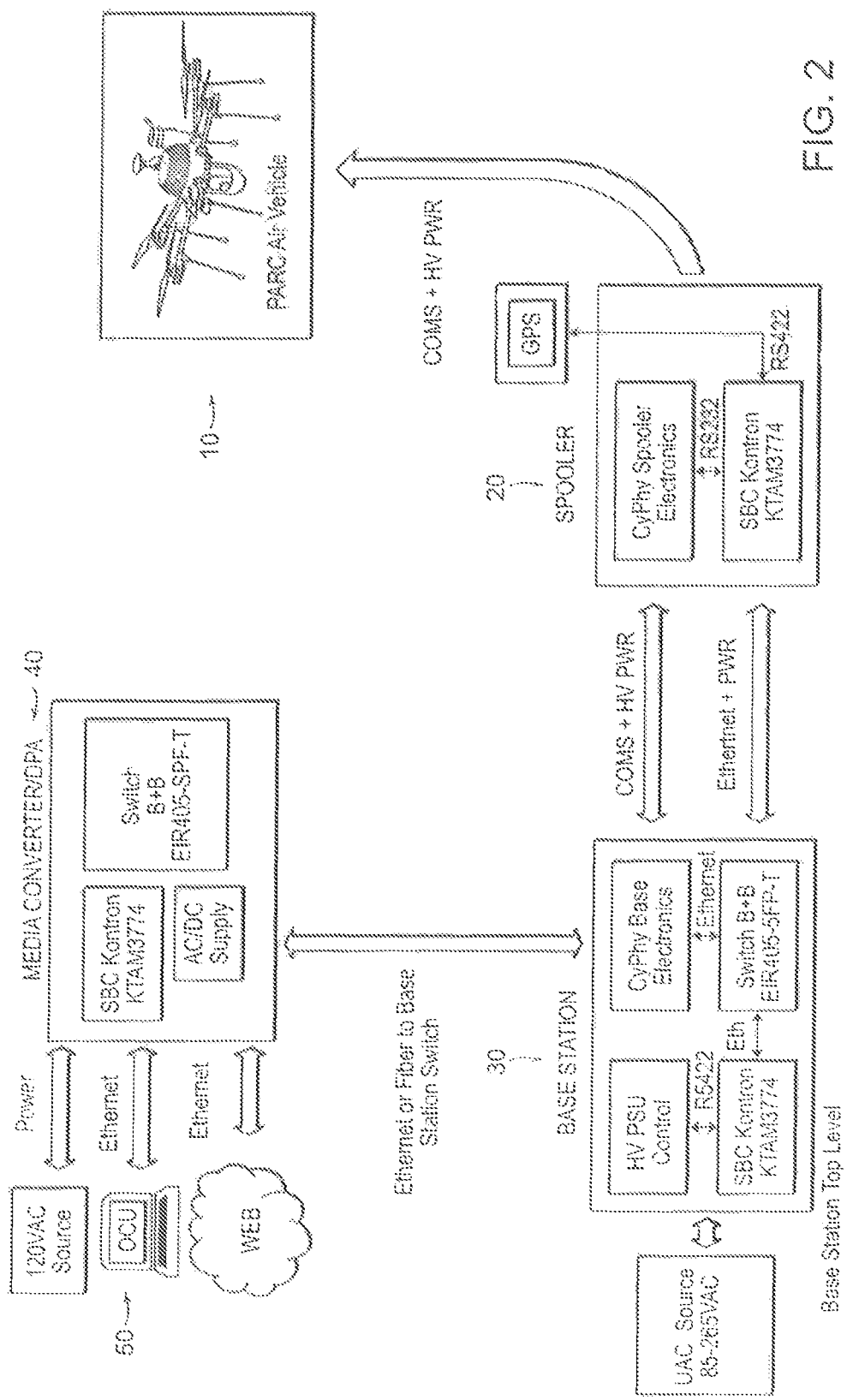
FIG. 2 depicts communication and power connections in an exemplary PARC system in an embodiment.

FIG. 2 provides an alternate view of an exemplary PARC system depicting communication and power connections in an embodiment. Base station 30 converts power to HV power and provides HV power to the spooler 20. The base station 30 also provides a communication link over Ethernet and low voltage power to the spooler 20. The spooler 20 provides the HV power over the microfilament tether to the aerial vehicle 10 for use for energy intensive operations such as radar sensing and propulsion during flight operations. As noted above, the microfilament may also provide a communication pathway used to communicate with the aerial vehicle 10 by the operator of the OCU 50. The DPA/MC 40 may communicate with the base station 30 over an optic fiber and communicate with the OCU 50 over an Ethernet connection.

Figure 3A:
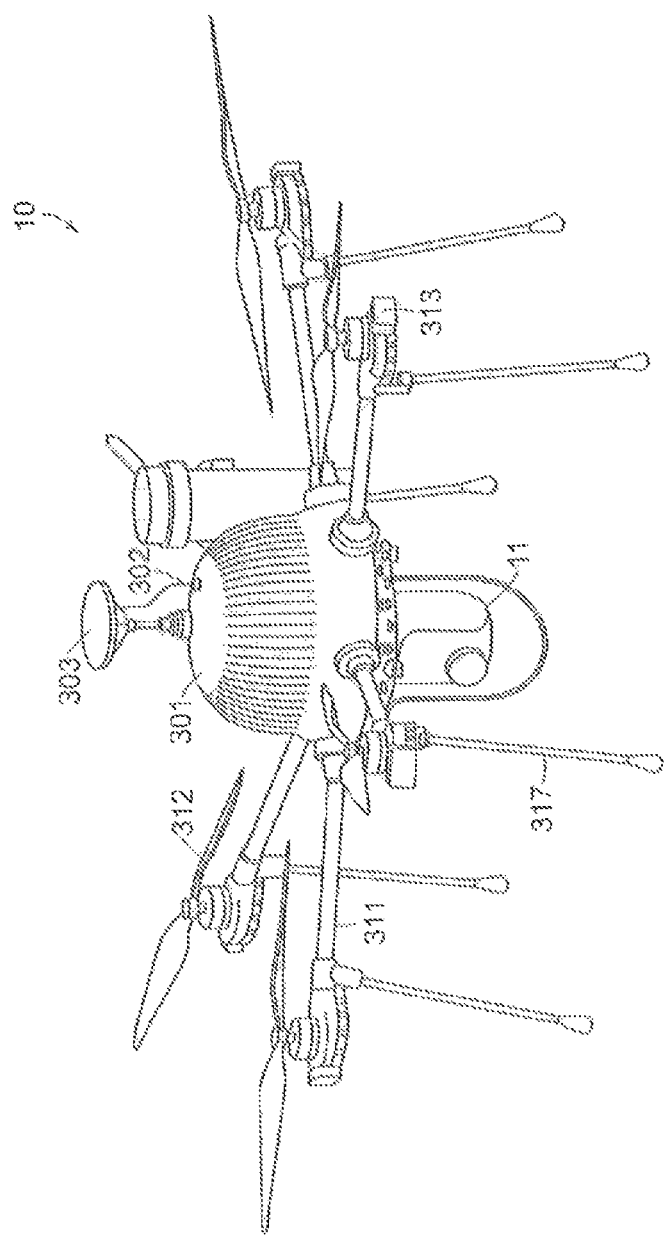
FIGS. 3A-3C depict views of an exemplary aerial vehicle in an embodiment.
Figure 3B:
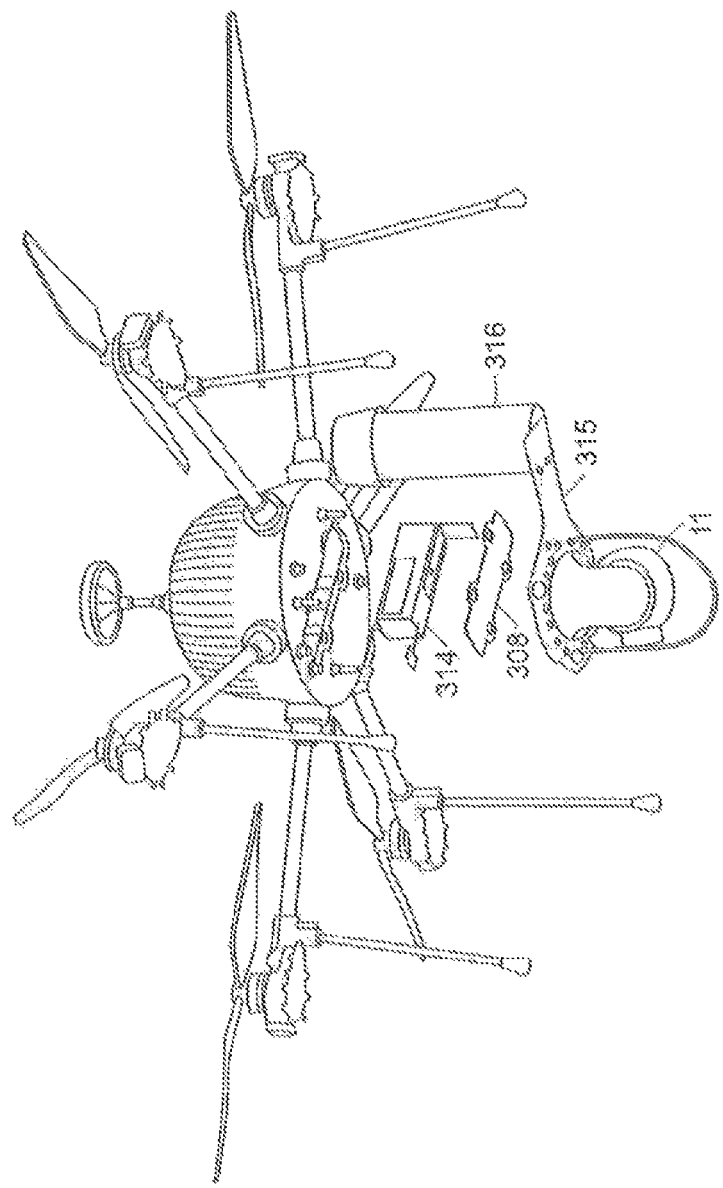
Figure 3C:
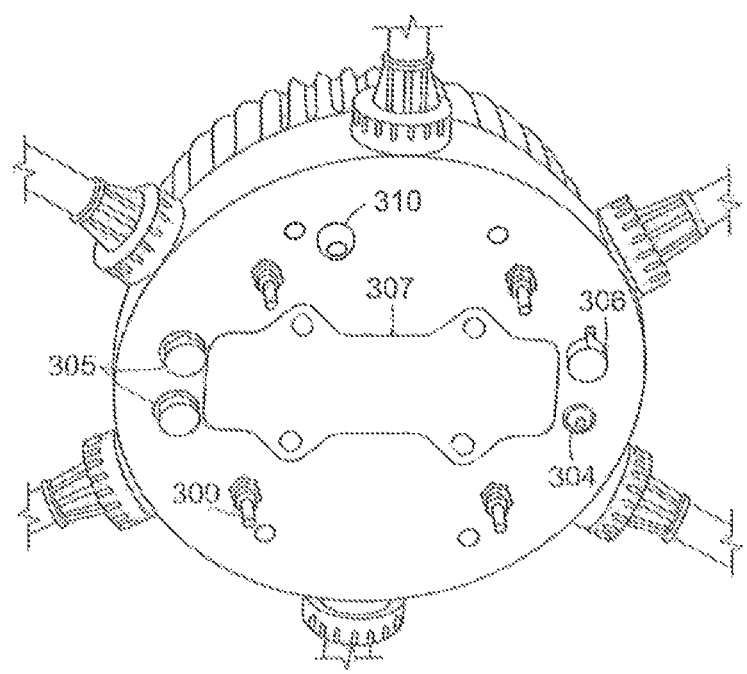

In one embodiment, the aerial vehicle 10 may include a number of components and features such as those illustrated in FIGS. 3A-3C. For example, the aerial vehicle 10 may include an aerial vehicle body assembly 301, a payload 11, a GPS/Sensor connector 302 and a GPS/Sensor tower 303. The aerial vehicle body assembly 301 may house a tether interface, system electronics, and a flight control system in an environmentally sealed enclosure. The GPS/Sensor connector 302 may provide a connector interface to the GPS/Sensor tower 303 The GPS/Sensor tower 303 may house, without limitation, a GPS sensor, a pressure sensor, and a digital compass. The GPS/Sensor tower 303 may also include a quick release interface between the GPS tower 303 and aerial vehicle 10.

The aerial vehicle 10 also includes, in one embodiment, six strut assemblies 311 and an associated six propeller assemblies 312 The strut assemblies 311 may house the motor, motor electronics and interfaces with the aerial vehicle electronics in an environmentally sealed enclosure. The strut assemblies 311 may include an integral positive locking retention collar/nut. The propeller assemblies 312 may be formed as a carbon-fiber rotor that provides lift. The propeller assemblies 312 may include propellers configured to turn clockwise and other propellers configured to turn counterclockwise. The associated strut assemblies 311 may be designed to work only with a specific propeller direction. An LED assembly 313 may incorporate visible and near IR LEDs in each strut for visibility. The aerial vehicle 10 may also include a landing gear leg assembly 317 composed of carbon fiber tubes that attach to each strut assembly 311 In one embodiment the carbon fiber tubes may attach via snap on interface and/or be secured by retention clips.

Additional components may also be included in the aerial vehicle 10. For example, as shown in FIG. 3B, in one embodiment, the aerial vehicle 10 may include one or more batteries in a battery pack assembly 314 For example, the battery pack assembly 314 may include one LiPo battery pack that provides power to the aerial vehicle 10 during a pre-launch set-up process and that may serve as auxiliary (reserve) power enabling the aerial vehicle to land in the event of power loss/interruption in the power being supplied via the micro-filament. The battery pack assembly 314 may include an integral power leads/connector and battery charger leads/connector. A second battery pack on the aerial vehicle may serve as a spare battery pack.

The aerial vehicle 10 may also optionally include, in one embodiment, a parachute recovery system canister 316 and a parachute payload port 310. The parachute recovery system canister 316 is configured as an optional catastrophic failure mitigation device that is installed on a parachute-specific payload interface plate. The parachute recovery system canister 316 may contain a pre-packed parachute and may be attached by four quick-release mounting points to the payload plate. One canister may be provided with the optional parachute system. Under certain circumstances involving a sudden loss of high voltage power during operation, the aerial vehicle 10 may be configured to automatically deploy the parachute from the parachute recovery system canister 316 if the aerial vehicle 10 is operating above a pre-specified height threshold. For example, in one embodiment, the pre-specified height threshold may only deploy the parachute if the loss of power occurs while the aerial vehicle 10 is above an altitude of 31 meters/102 feet. It will be appreciated that other pre-specified height thresholds may also be designated in other embodiments. The parachute payload port 310 may provide a connector interface for a parachute canister cable/plug. In another embodiment, the aerial vehicle 10 may include one or more additional parachute canisters that provide additional protection in the case of catastrophic failure.

Additional components for the aerial vehicle 10 may include a payload interface assembly 315 that provides a secure mechanical mount for attaching payloads to the aerial vehicle body and for providing a strain relief attachment point for the microfilament connector/tether on a "U" shaped hoop. The aerial vehicle 10 may also include an on/off switch 304 that turns power to the aerial vehicle body on/off and activates a battery balancing function.

As shown in FIG. 3C, the aerial vehicle 10 may include a battery compartment 307 that provides an enclosure for installation and retention of the battery pack assembly and a battery lid assembly 308 that provides an environmental seal for the battery compartment. The system may include power management features such as those described in more detail below and in U.S. application 62/315,873 filed on Mar. 31, 2016, the entire contents of which is incorporated herein by reference in its entirety In one embodiment a micro-filament receptacle 306 is provided on the aerial vehicle 10 that serves as a connector interface for the microfilament spool housed in the spooler 20.

In an embodiment, a payload 11 may be secured to the aerial vehicle 10 by means of payload interface mounting studs 309 that provide a rigid mounting interface for the payload. As noted previously, the payload 11 may be an imaging device, radar or other sensor used to acquire data. The aerial vehicle 10 may include one or more payload ports 305 that provide power, such as 12 VDC power to the payload 11 as well as Ethernet based communication.

Figure 4A:
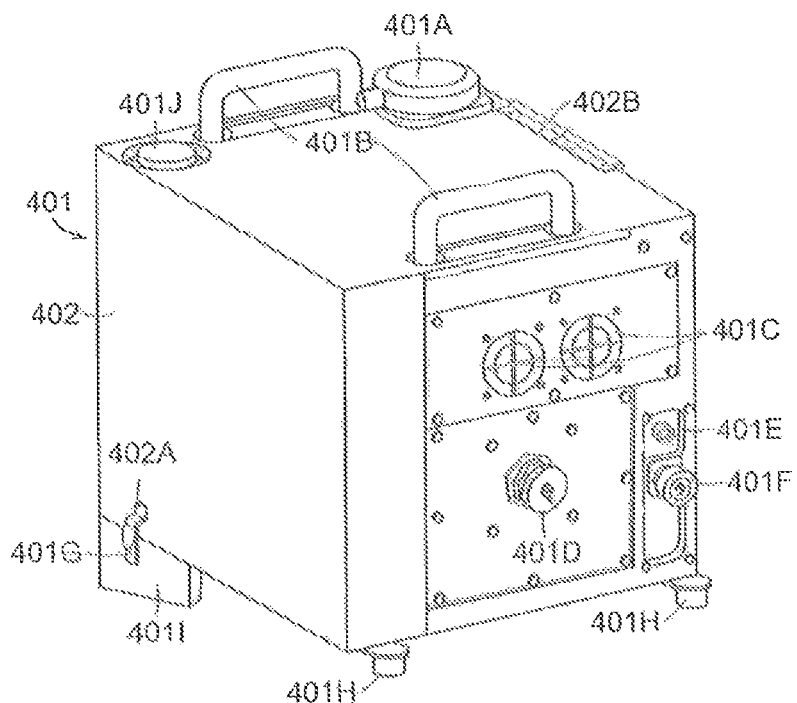
FIGS. 4A-4D depict views of an exemplary spooler in an embodiment.
Figure 4B:
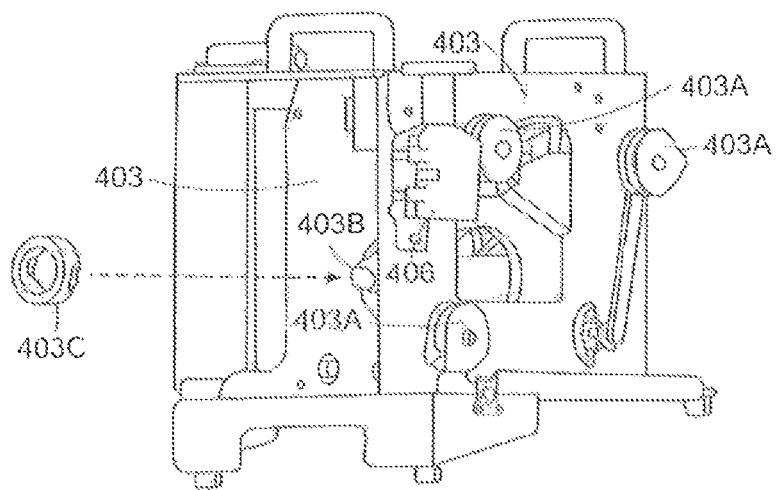
Figure 4C:
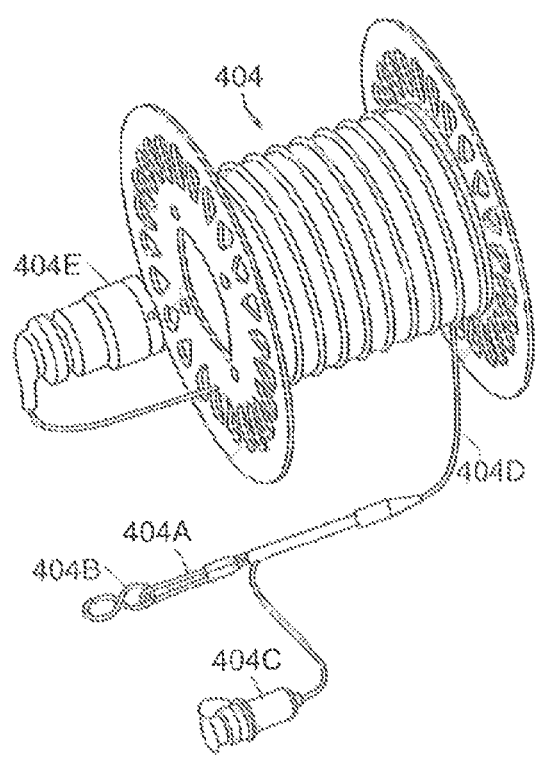

In one embodiment, the spooler 20 may include a number of components and features such as those illustrated in FIGS. 4A-4C. A spooler enclosure assembly 401 may house the tether spool assembly, a tether tensioning/winding mechanism and control electronics in an environmentally sealed enclosure. High voltage power and communications connection ports, and a tether retract button may be located in a rear panel. A GPS assembly 401A may provide, without limitation, ground based GPS, pressure, and a digital compass sensor reference between the aerial vehicle 10 and the spooler 20. Carrying handles 401B may provide ergonomic hand grips for lifting or carrying the spooler 20 and cooling fans 401C may provide cooling and directed airflow for the spool assembly 403. The spooler 20 may also include a high voltage input port 401D that receives high voltage input (via the base station to spooler cable assembly) for distribution to the spool assembly 403 and aerial vehicle 10. A spool retract button 401E may be configured to respond to a momentary press by retracting the tether upon completion of mission. A continuous press or hold of the retract button may retract the tether. An I/O (Data/Power) port 401F may receive power (low voltage) and communication (via the base station to spooler cable assembly) for distribution to the spooler 20 and aerial vehicle 10. A cover/lid latch 401G may provide a tool-less latch that secures the spooler cover/lid assembly 402 to the spooler enclosure assembly 401. Rubber feet may provide a rubber foot/bumper that keeps the spooler from sitting directly on the ground and help to dissipate static charge.

A micro-filament intake horn 401J may be provided that is configured to provide large debris rejection and a non-abrasive, fluted circular opening for the tether during operation. A spooler cover/lid assembly 402 may cover the tether spool assembly and tether tensioning/winding mechanism during operation. The cover/lid may be opened during spool assembly installation and during cleaning/maintenance. A latch tab 402A may interface with the latch to secure the spooler cover/lid assembly 402 to the spooler enclosure assembly 401. A cover/lid hinge may allow the cover/lid assembly to open/close in a controlled manner.

The spool assembly 403 may house the microfilament intake 401J, as well as tensioning and level winding electromechanical components. The spool assembly 403 may provide a mounting interface for the spool assembly and guide rollers for secure routing of the microfilament. In one embodiment, the micro-filament intake/winding assembly 401J may incorporate guide rollers (x4), pigtail (x1), level winding rollers (x2), retention clip (x1), and tensioning dancer (x1) for management of the microfilament during flight operations and post mission retraction. In an embodiment, a high voltage output connector 403B may provide a military standard (MIL-SPEC) bayonet style connector interface to the spool connector/plug. In one embodiment, a spool lock ring that is a tool-less, quarter-turn locking ring may secure the spool assembly to a spool drive shaft. As noted above, a spool assembly 403 provides a cylindrical hub that holds the pre-wound length of tether. The assembly may include a strain relief clip assembly and a connector plug for attachment to the payload interface plate assembly and a tether port on the aerial vehicle. In one embodiment, a strain relief 404A may be rated for 50 lbs of load and may attach to the payload interface plate assembly titanium hoop. A strain relief clip 404B may attach the strain relief to the payload interface plate assembly titanium hoop. In an embodiment, an aerial vehicle connector/plug 404C may be provided as a quarter-turn bayonet style connector that mates to the tether port on the aerial vehicle 10 and a micro-filament tether 404D as previously discussed may be provided in the form of a Kevlar-jacketed twisted pair copper with insulation so as to provide both a power and communication link between the spooler 20 and the aerial vehicle 10. A spool connector/plug 404E may be provided as a quarter-turn MIL-SPEC bayonet style connector that mates to the high voltage connector in the spool assembly compartment.

Additionally, the spooler 20 may include a base station to spooler cable assembly 405 that may supply high voltage to the PARC spooler 20 and aerial vehicle 10. The base station to spooler cable assembly 405 may supply power (low voltage to the spooler 20) and communication to the spooler 20 and aerial vehicle 10. The cable assembly may contain MIL-rated circular connectors. A brush box assembly 406 may be provided to clean the tether as it passes through and to dissipate any accumulated static charge.

Figure 4D:
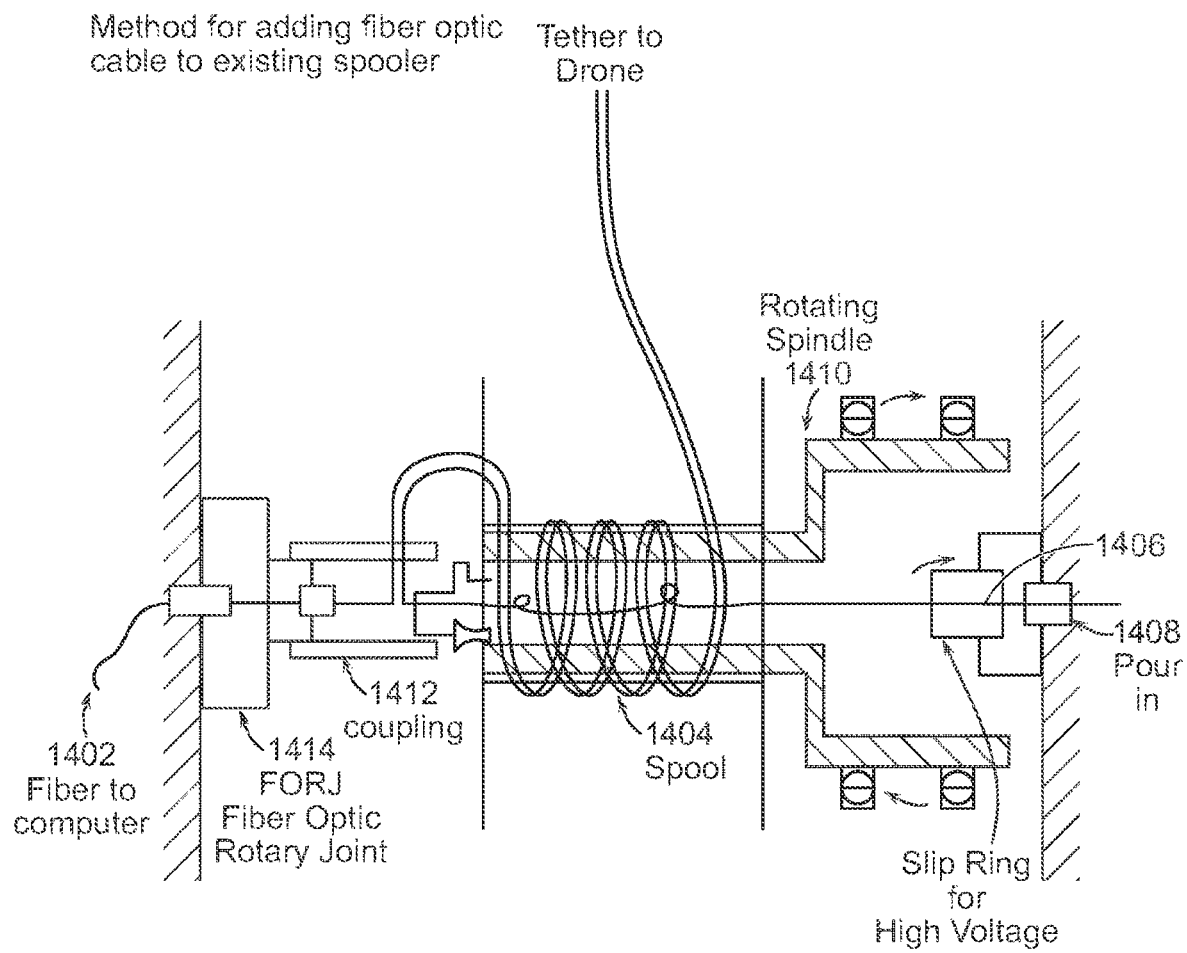

FIG. 4D is an illustration for adding an optical fiber cable 1402 to an tether deployment device 1404. A filament 1406 providing power extends through a slip ring 1408 and a rotating spindle 1410 into a coupling 1412 attached to a side of the spool 1404. In an exemplary embodiment, the filament 1406 is composed of copper. The fiber optic cable 1402 is inserted through a fiber optic rotary joint (FORJ) 1414 into the opposite side of the coupling 1412. In an exemplary embodiment, the fiber optic cable 1402 is approximately 800 microns in diameter but can have a diameter in a range of 500-2000 microns depending on application requirements. The coupling 1412 serves to connect the filament(s) 1406 and fiber optic cable 1402 into a twisted pair within an external jacket. The external jacket includes a Kevlar layer located inside the external jacket but outside the twisted pair. The external jacket (including the Kevlar layer, the fiber optic cable and the copper filament) serves as a tether providing data communications and power to an UAV. The tether extends from the coupling, wrapping around a spool, and connecting to the UAV.

In some embodiments, the fiber optic cable 1402 is an OFS Micro-Links Avionics fiber optic cable compatible with connectors and/or termini designed for tight jacket construction cables (e.g. ST, Tight Jacket LC, Tight Jacket SC, MIL-29504 pin and socket, Tight Jacket ARINC 801).

Figure 5A:
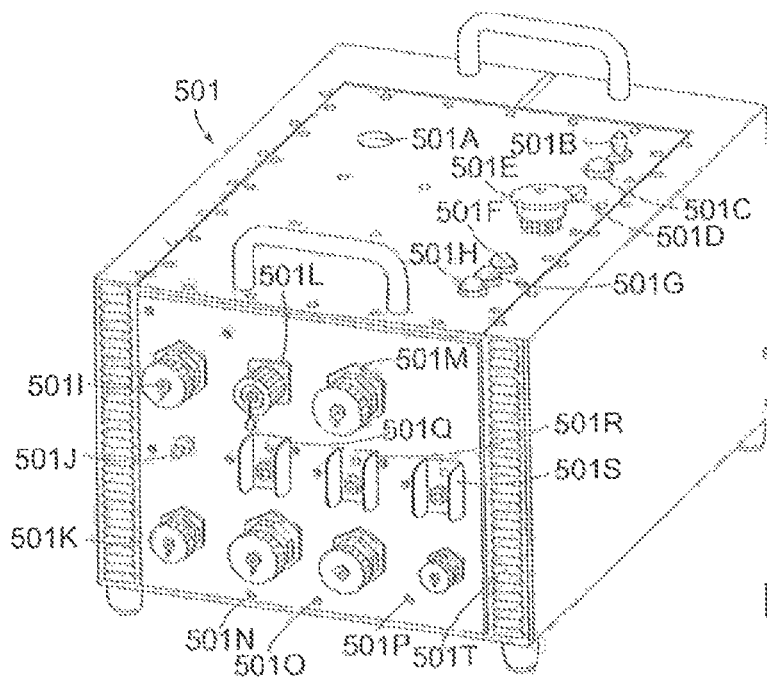
FIGS. 5A-5B depicts an exemplary base station in an embodiment.
Figure 5B:
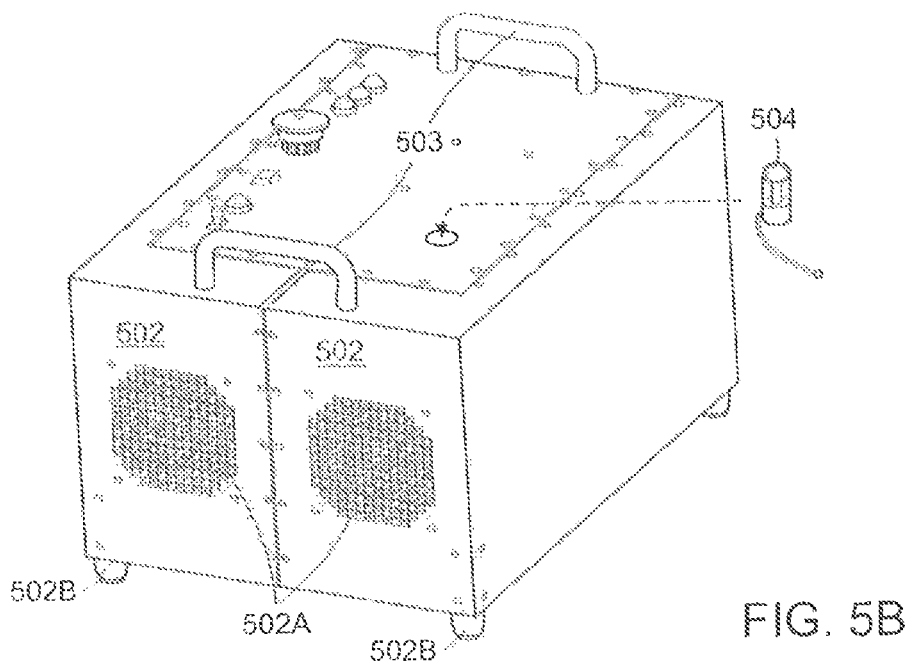

In one embodiment, the base station 30 may include a number of components and features such as those illustrated in FIGS. 5A-5B. For example, the base station 30 may include a base station enclosure assembly 501. The base station enclosure assembly 501 may house an AC power input and high voltage conversion electronics in an environmentally sealed enclosure. Power and communications connection ports, and AC input switches may be located in the rear panel. High voltage enable/disable controls and status indicators may be located in the top panel. A magnetic mount 501A may be used by the base station 30 to provide a magnetic feature for securing an optional beacon assembly to the base station 30. A beacon I/O port 501B may provide a connector interface to the optional high voltage beacon assembly. In one embodiment, a rubber sealing cap may be provided for the port when the beacon is not present The base station 30 may be equipped with an HV primer indicator LED 501C and an HV primer button 501D. The HV primer indicator LED 501C may be a colored LED such as a red LED that indicates that high voltage is primed. The HV primer button 501D may be provided to enable/disable the high voltage output from the base station 30 to the spooler 20 and aerial vehicle 10. As a non-limiting example, the HV primer button 501D may be configured so that a user pressing the button for >4 seconds enables or disables OCU control of the high voltage (it will be appreciated that the button should not be used during flight operation of the aerial vehicle 10). An emergency ESTOP switch 501E may be provided that will immediately terminate power to the PARC System if depressed (pressed down) during operation. This button may also serve an arming function (i.e., it enables activation of the HV primer button) during the start-up sequence. In one embodiment, if the ESTOP switch is depressed upon initial power up of base station 30, the base station will not power up. The ESTOP switch 501D may be provided in different forms including as a two position red mushroom shaped button.

A number of LED indicators may be provided in the base station 30 such as a High Voltage good indicator LED 501F, an AC good indicator LED 501G and a fault indicator LED 501H. The High Voltage good indicator LED may indicate the status of high voltage output (e.g. if not illuminated the high voltage is not activated). The AC good indicator LED may indicate the status of primary and/or secondary AC input from a grid/generator source (e.g.: if the LED is not illuminated, AC input is not activated). The fault indicator LED may indicate a system power fault condition (e.g.: if the LED is illuminated, high voltage is automatically disabled).

The base station 30 may also include a number of ports, terminals and switches. These may include an HV output port 501I, a GND lug/terminal 501J a spooler interface port 501K, an Ethernet I/O port 501L an Optical Ethernet I/O port 501M a primary AC input port 501N a secondary AC input port 501O an aux ac out output port 501P a primary AC switch 501Q A secondary AC switch 501R and an Aux AC out switch 501S The HV output port may supply high voltage (via the base station 30) to the spooler cable assembly to the spooler 20 and aerial vehicle 10. The GND lug/terminal may provide an attachment point for system electrical grounding. The spooler interface port may supply power (low voltage to the spooler 20) and communication (via the base station 30 to the spooler cable assembly) to the spooler 20 and aerial vehicle 10. The Ethernet I/O port may provide a connector interface to the OCU 50 or router/switch and may be used for debug or lab operations. The Ethernet I/O port may include MIL-rated connector plugs attached via lanyard. The base station 30 may also include an Optical Ethernet I/O port that provides a connector interface to Ethernet-fiber converter and fiber optic spool. This port may be used for connection during normal operation. Optical Ethernet I/O port may include MIL-rated connector plugs attached via lanyard. The primary AC input port that provides a connector interface to a primary AC input source. The primary AC input port may include rated connector plugs attached via lanyard. The secondary AC input port may provide a connector interface to a secondary AC input source. The secondary AC input port may include rated connector plugs attached via lanyard. The aux AC out output port may provide a connector interface to power peripheral device (i.e., OCU). This port may include MIL rated connector plugs attached via lanyard. It should be noted that voltage available from AUX AC may be the same as voltage on the Primary AC/Secondary AC. A primary AC switch may be provided as a two position toggle switch that turns AC input on and off. The secondary AC switch may also be provided that turns AC input on and off. Similarly the Aux AC out switch may be provided in the base station 30 as a two position toggle switch that turns aux AC output on and off.

The base station 30 may also include heat sinks and/or fins 501T and cooling fans 502A. The heat sinks and fins may provide passive cooling of internal electronics and the cooling fans may provide cooling and directed airflow for the internal electronics.

An exemplary base station 30 may also include a side plate assembly 502 to house the cooling fans and heat sink fins that are integral to the base station enclosure, rubber feet that keep the base station 30 from sitting directly on the ground (in one exemplary configuration each side plate may have two feet) and carrying handles providing ergonomic hand grips for lifting or carrying the base station 30. For example, one handle may be attached to the base station enclosure and one handle may be attached to the side plate assembly.

The base station 30 may include a high voltage beacon assembly 504 configured to provide a visual Indication (e.g.: flashing light) that is illuminated when high voltage is activated. The beacon usage is optional and may be used at the discretion of the operator depending on light discipline considerations. The beacon may incorporate a cable/plug that interfaces with a beacon port on the base station enclosure. The beacon may be retained on the base station enclosure via an integral magnet.

In one embodiment, the base station 30 may be configured to utilize a number of different types of cables including but not limited to a primary AC input cable 505, a secondary AC input cable 506, an Ethernet cable 507 and an auxiliary AC output cable 508 As non-limiting examples, the primary AC input cable may be a 3 meter (10 feet) sealed, shielded cable with an MIL-rated circular connector that interfaces with a grid or generator power source. The secondary AC input cable may be a 3 meter (10 feet) sealed, shielded cable with a MIL-rated circular connector. The secondary AC input cable is optional and interfaces with a grid or generator power source. The connector termination may be customer-specific. The Ethernet cable is an optional 3 meter (10 feet) Ethernet cable with RJ-45. The Ethernet cable provides a connection from a base station Ethernet port to an Ethernet port on a peripheral device (e.g: OCU or router/switch). An optional auxiliary AC output cable may be utilized which is a 3 meter (10 feet) sealed, shielded cable with a MIL-rated circular connector. This cable may be used to provide power to a peripheral device (e.g., OCU).

Figure 6:
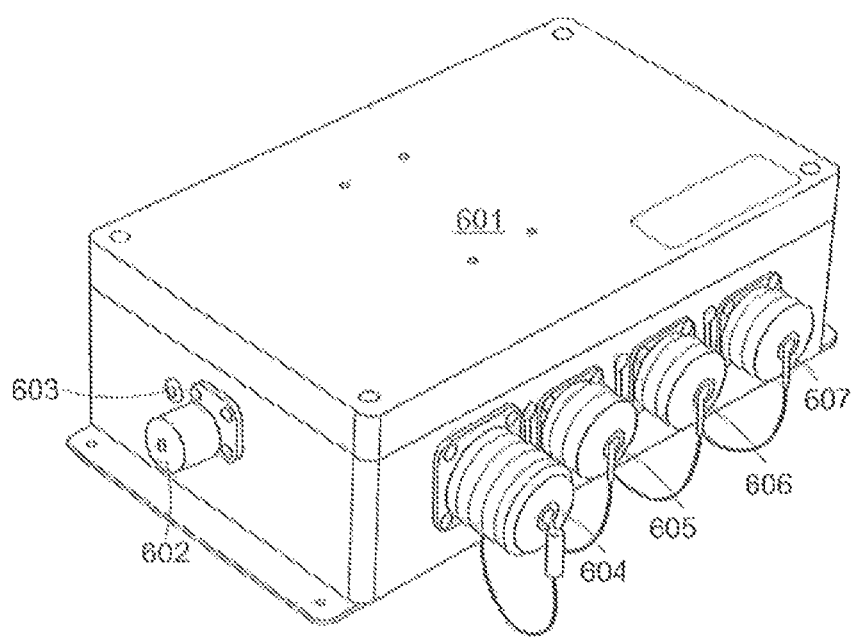
FIG. 6 depicts an exemplary DPA/MC in an embodiment.

The DPA/MC 40 may include a number of components and features such as those illustrated in FIG. 6. For example, the DPA/MC 40 may include a DPA/MC enclosure assembly 601 that houses electrical and optical components in an environmentally sealed enclosure. The DPA/MC 40 may also include an A/C power input 602 that includes power cable connects to an A/C source and a power indicator 603 such as an LED that is illuminated when A/C power is supplied. The DPA/MC 40 may further include an optical port 604 to connect the DPA/MC 40 to the base station with a fiber optic cable. A first OCU port 605 may be utilized by the DPA/MC 40 to connect the DPA/MC to the OCU via an RJ-45 standard connector. A second OCU port 606 may include an optional RJ-45 connection to control the payload on the aerial vehicle 10. Additionally, the DPA/MC may include a data platform (WAN) port 607 used to optionally connect the DPA/MC 40 to a DHCP external network via an RJ-45 connection. An Ethernet cable may be provided to connect the DPA to the OCU 50. In one embodiment, the Ethernet cable is 3 meters long (10 feet).

When present, the DPA/MC 40 provides electrical protection between an operator using the operator control unit (OCU) and the Base Station. The Media Converter converts the fiber optic signal to copper Ethernet for the OCU. The fiber optic connection provides electrical isolation between the Base Station and the OCU. In an alternate embodiment, the OCU is directly connected to the base station and in such an embodiment, the electrical protection provided by the DPA/MC 40 is absent.

The OCU 50 may be a ruggedized laptop or other computing device configured to execute an OCU application providing primary flight controls and status/warning indications required for the PARC system operation. PARC control functions can include but are not limited to; START/STOP (propellers), LAUNCH vehicle, LAND vehicle, YAW vehicle, and CMD ALT (change vehicle altitude), enable/disable vehicle LEDs, and enable/disable high voltage.

An exemplary PARC system may be packaged and transported in three (3) reusable transit/storage cases. Transit cases may include customized foam inserts to protect equipment during typical transport methods. Each transit case may be equipped with integrated wheels to allow for easy movement in flat terrain. In one embodiment, transit cases may serve as work benches for assembly of the aerial vehicle 10.

Figure 7:
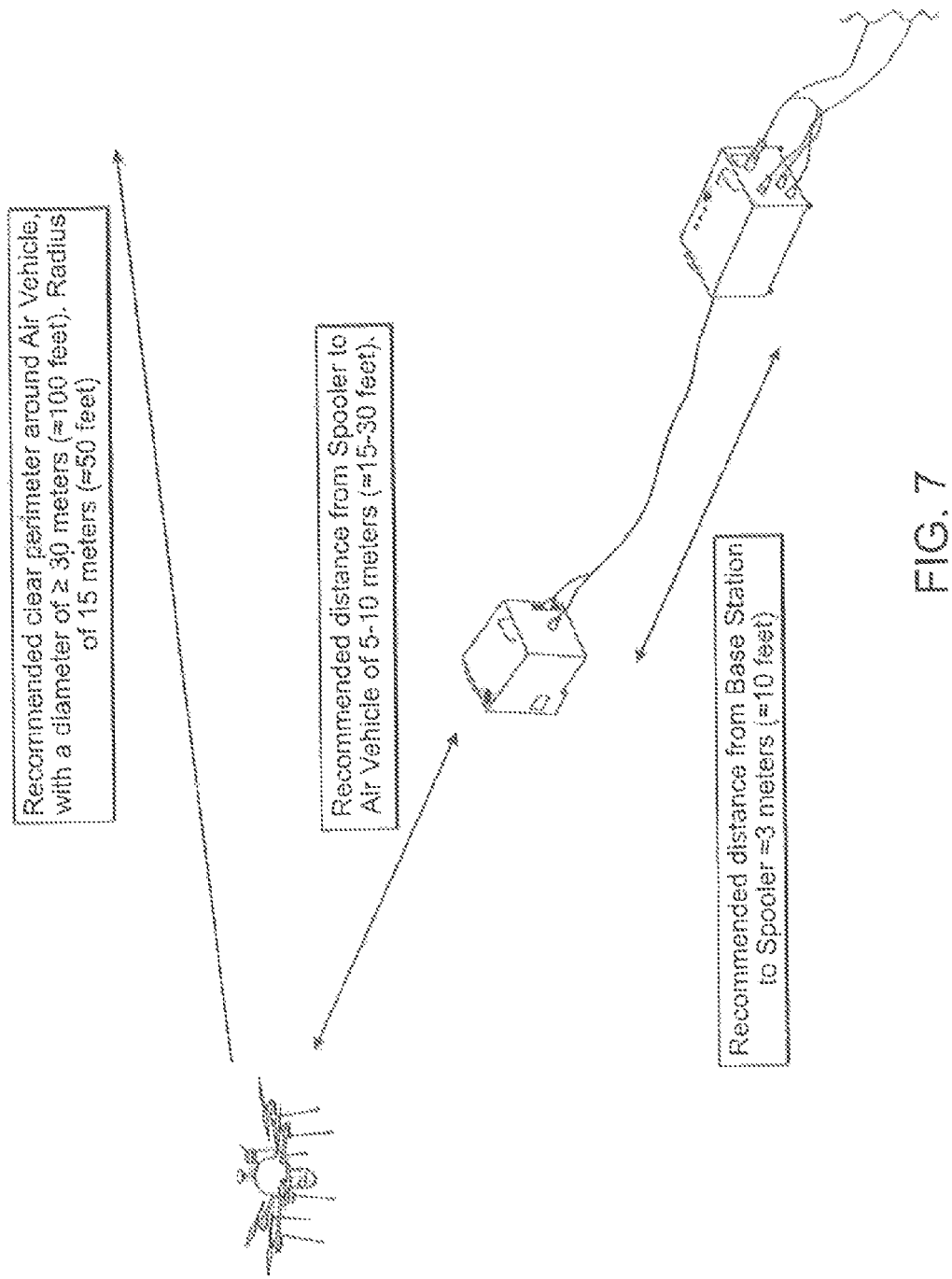
FIG. 7 depicts an exemplary operating environment suitable for practicing an embodiment.
Figure 8:
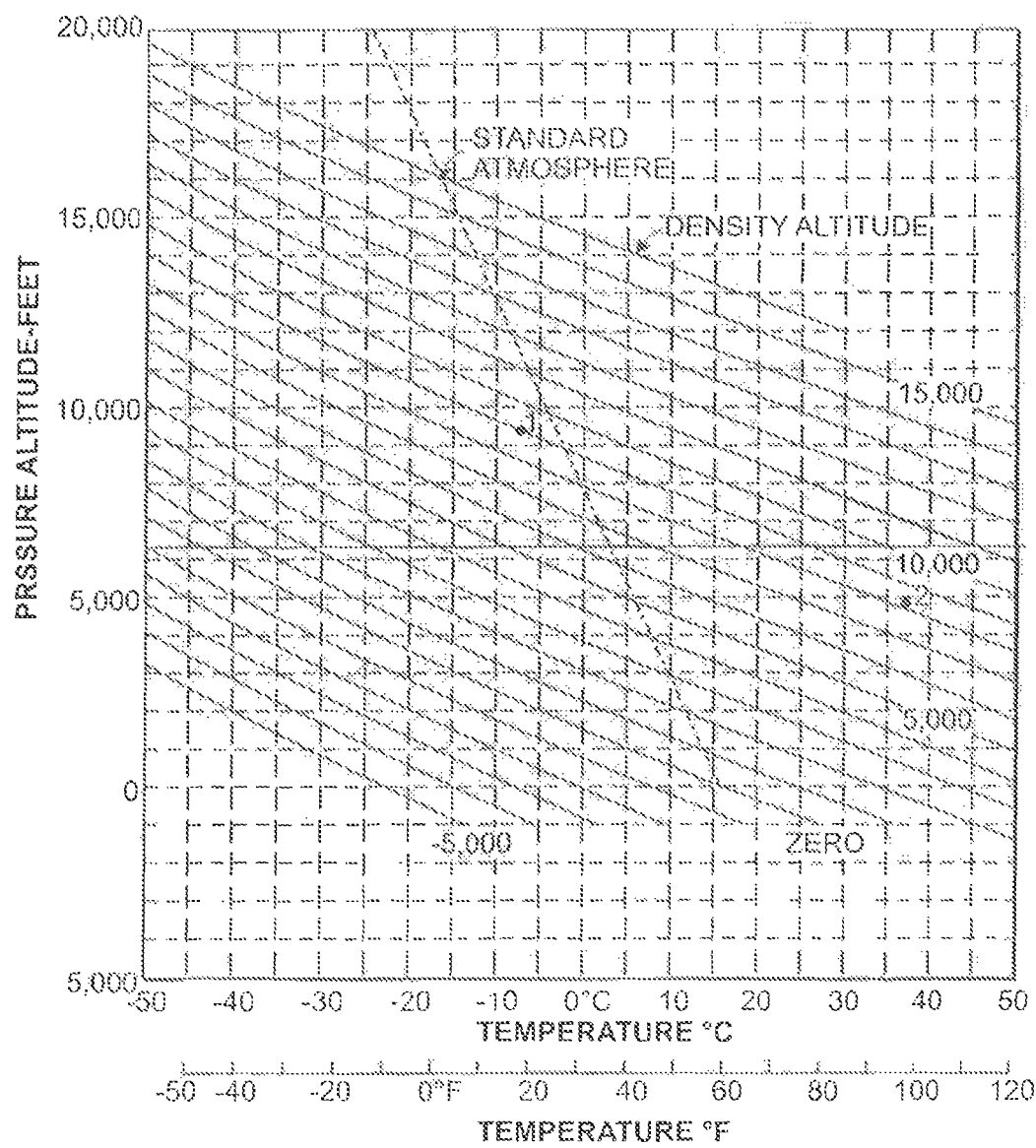
FIGS. 8-11B depict exemplary charts used to determine AGL flight restrictions.

FIG. 7 depicts an exemplary operating environment suitable for practicing an embodiment. More specifically, prior to operation, an operator of the PARC system may locate the base station approximately 3 meters from the spooler 20 while the spooler may be located 5-10 meters from the aerial vehicle 10 before launch. The operator may also wish to clear around the aerial vehicle to a diameter of 100 feet and a radius of 50 feet.

Prior to the aerial vehicle 10 being deployed in the PARC system, the operator should first determine a safe operating altitude above ground level for a given aerial vehicle configuration and the specific atmospheric conditions then present. In one embodiment the operator may first estimate a density altitude (DA) at the intended mission location. As explained further with reference to FIGS. 8-11, the operator may follow the following exemplary sequence.

1. Determine the elevation above sea level at the mission location (from terrain, military map references, etc.).
2. Determine the maximum current/forecast air temperature expected during the mission, and the predicted wind velocities (from local weather station, forecast, etc.).
3. Check for special flight conditions or aviation authority notifications affecting the intended flight area (Notice to Airmen (NOTAM bulletins and other sources) about potential hazards or obstacles by consulting:
4. Look up (estimate) the density altitude from the chart presented in FIG. 8.
5. Consult the charts of FIGS. 9 and 10 for guidance on Above Ground Level (AGL) flight envelope restrictions for the PARC System with and without the parachute recovery system installed.

It should be appreciated that the flight envelope is defined not only by density altitude but also by wind and temperature. At density altitudes above 8000 feet flight is allowed by the chart with the parachute only if payload is equal or less to 2 lbs (~910 g) and air temperature is at or below 40° C. Without the parachute a heavier payload of up to 3.6 lbs (~1650 g) can be flown according to the charts as long as wind speeds are at below 10 knots (11.5 mph) and air temperature is at or below 40° C.

Figure 11A:
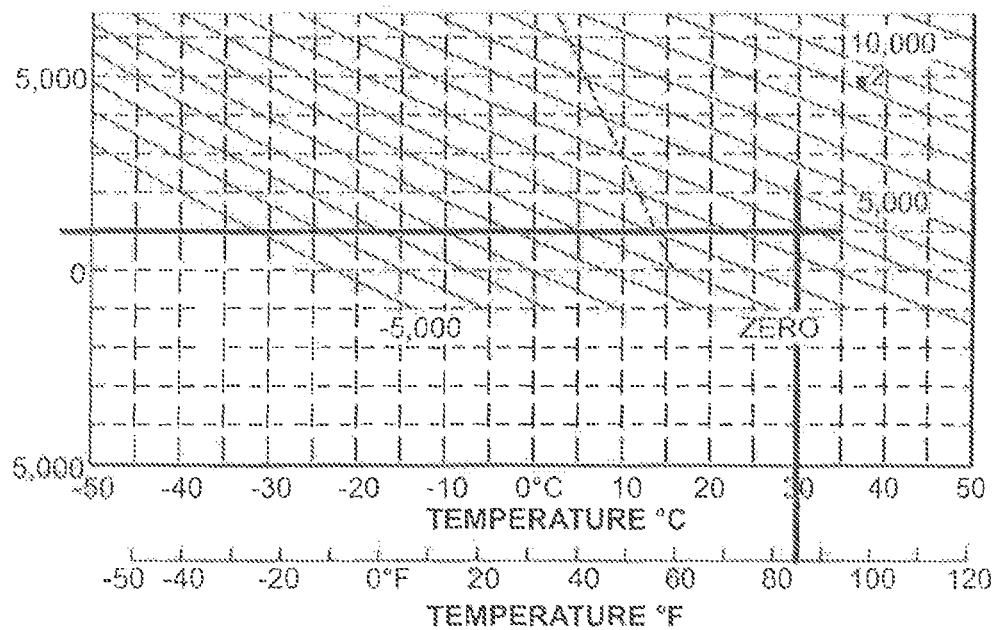
Figure 11B:
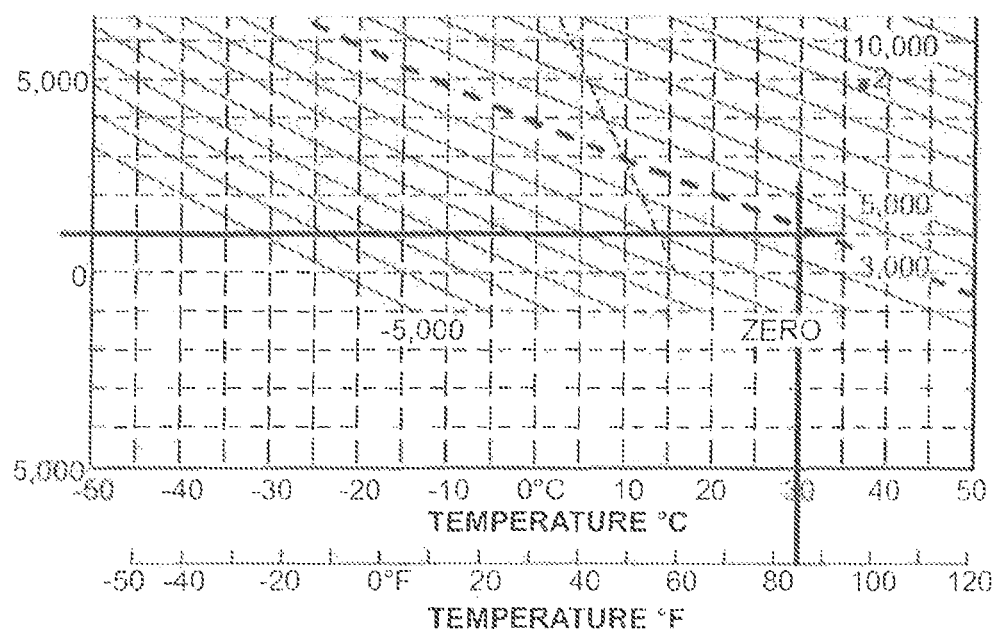

A further example of this preflight atmospheric determination process is now discussed with reference to FIG. 11. As an explanatory example, for a flight site with an elevation of 1,000 feet, anticipating a maximum temperature of 85° F. (about 29° C.), the operator locates the temperature point on the bottom axis of FIG. 8, and follow it up to the horizontal line representing 1,000 feet in FIG. 11. The operator then uses the sloping lines to identify the corresponding pressure (aka density) altitude. The result for this test instance is 3,000 feet, and is shown in the lower half of FIG. 11. Once the result of 3,000 feet DA is determined, that entry is located on the appropriate flight envelope chart. In this example, using the chart for 3.6 lb payload with no parachute installed as shown on FIG. 9, flight is permissible from 15 m up to the 120 m limit. It will be appreciated that the analysis may also be programmatically performed by the OCU 50 and a result presented to the operator following the operator providing initial input parameters. It should also be appreciated that wind conditions for takeoff and landing should also be accounted for when determining mission commencement. In one embodiment, an aerial vehicle 10 in the PARC system can operate in in continuous winds of up to 25 knots (29 mph). However, in one embodiment, takeoff and landing should not be performed under sustained or gusty surface winds that exceed 15 knots (17.2 mph). It will be appreciated that the exact limitations for operation depend on the particular configuration of the aerial vehicle 10. It should also be appreciated that wind shear is typically present and that as the aerial vehicle 10 increases its AGL, altitude wind speeds will be gradually increasing.

An exemplary Power up sequence for the Base station 30, spooler 20 and OCU 50 is described below:

1. The OCU 50, base station 30, spooler 20, AC power source (grid/generator), and any ground electrodes are properly configured/connected and positioned.
2. The base station 30, spooler 20, and aerial vehicle 10 are correctly situated/oriented for flight operation as determined in the site preparation instructions.
3. The base station "ESTOP" button is set to the "up" (power enabled) position, prior to setting any of the AC toggle switches to the "ON" position. The base station 30 will spin up the fans and immediately shut off if the ESTOP button is set to the "down" (power disabled) position.
4. The base station 30 and spooler 20 are powered up by pulling the "PRIMARY AC" toggle switch up to the "ON" position. If the "SECONDARY AC" input is also being used, set the toggle switch to the "ON" position.
5. Set or verify that the "AUX AC" toggle switch is set to the "OFF" position.
6. Perform "ESTOP" test procedure to ensure that it is operating properly. Depress button and confirm that the system has powered down. If successful re-set the "ESTOP" button and power the system back up (step 4, above). If the "ESTOP" test fails, the aerial vehicle 10 should not be launched.
7. Boot up the OCU 50 by pressing the power-on button. Upon power-up, the OCU 50 will automatically connect to an appropriate user account and the operator will be provided an opportunity to launch the OCU application providing flight and other controls for the PARC system.

An exemplary power up sequence for the aerial vehicle 10 is described below:

1. After the OCU power-up sequence has completed, the tension on the microfilament is reduced thus allowing the microfilament to be pulled out freely. Carefully extend the microfilament out to the aerial vehicle by grasping the strain relief clip and pulling the microfilament out to the aerial vehicle location with approximately 1 meter (3 feet) of slack.
2. Connect the spool strain relief clip to the bottom of the U-shaped hoop on the payload interface plate.
3. Ensure that the spool strain relief clip is properly secured to the hoop.
4. Connect the microfilament connector plug to the aerial vehicle power port by aligning the plug keying feature with the aerial vehicle connector port, pushing up to engage the plug, and rotating the plug collar quarter-turn to lock.
5. Power up the aerial vehicle by toggling the "ON/OFF" switch for >3 seconds away from the center position.
6. Clear the area in the immediate vicinity of the aerial vehicle and return to the base station 30, spooler 20 and OCU 50 set-up location.
7. Return to the OCU. The OCU application has been sensing and awaiting aerial vehicle initiation, once it recognizes the aerial vehicle It will load the user interface.
8. Once the interface is available and HV is primed, enable high voltage by pressing the enable HV' button on the screen's bottom menu bar. Now the aerial vehicle is being powered via the microfilament. To close the console window press the console button.

9. To disable high voltage, use the 'disable HV' button on the interface. It only appears if power is active.

An exemplary launch sequence for the aerial vehicle 10 is described below:

1. Start rotors by pressing the start rotors button in the lower left of the screen in the UI provide by the OCU application.

2. The "Start Rotors" button annotation will change to "Starting Rotors" and a progress bar will appear underneath it. Wait for the motors to start.

3. Continue the pre-launch process, by hitting "GO" button on the UI to take off, or select the red X to abort the takeoff.

4. The flight commences, and the OCU screen updates. On the OCU application interface the flight state switches to "Flying" and the actual altitude will be reported in the altitude display. An action button may change to "LAND" and yaw controls become available. The interface may also display a flight time clock indicative of time-in-air. A map may be displayed in a corner of the interface and a GPS position may also be displayed.

The OCU 50 executes an OCU application providing flight controls to an operator. The flight controls include, but are not limited to, yaw controls, LED controls, altitude adjustment, and landing controls. The yaw controls may be needed if a landing leg is interfering with the field of view of the camera or if motors are overly stressed when the aerial vehicle 10 is flying at high AGL altitudes under continuous wind conditions. In the latter scenario, the aerial vehicle 10 may be yawed every hour (e.g.: yawed 30 degrees) so that load is shared between the struts. In one embodiment, the yaw controls are presented on the interface so that the operator looks at the controls with the same perspective as looking at the aerial vehicle 10 from behind. The LED controls may be located on the ends of the Aerial Vehicle's struts and can be activated and dimmed as needed. The LEDs may be visible LEDs (i.e. to the naked eye) or infrared LEDs including near infrared LEDs. The LEDs may be manipulated via the interface provided via the OCU application. Similarly, the aerial vehicle 10 may have its altitude adjusted during flight by way of a control on the OCU interface such as a slider or other UI mechanism. The OCU application may also provide a land button or similar UI component that when clicked sends a command to land to the aerial vehicle 10. In one embodiment, pressing a provided "resume" button on the UI provided by the OCU application during the landing may cause the landing to abort and the aerial vehicle 10 to return to its station.

In one embodiment, to address the event of an extreme emergency during flight in which a precipitous, rapid descent is required, a "force landing" button or similar UI component may be provided via the OCU application interface. To force a crash landing by increasing the descent rate to up to 10 meters (33 feet) per second, an operator may press the force landing button to bring the craft down very quickly. This forced landing button may also be used to terminate propeller action in the event of a very gentle landing, in which the aerial vehicle's autonomous systems did not detect the landing event, and the rotors continue to spin even after the aerial vehicle 10 is on the ground.

The OCU 50 allows an operator to access payload controls via a joystick/gamepad or similar device communicating with the OCU application. For example, for camera payload, the controls may include zoom, pan and tilt, and focus controls without limitation. In one embodiment, the zoom controls may allow an operator to use the trigger buttons on a joystick, use a zoom slider on the OCU application interface, select an up or down button on a zoom display on the OCU application, or use +− buttons on a keyboard for the OCU to zoom in and out. A zoom magnification value may be provided on the OCU application UI. In an embodiment, the pan and tilt controls may allow a user to use joystick buttons to pan and tilt, use pan and tilt buttons on the OCU application UI or use arrow buttons on a keyboard for the OCU. A field of view indicator value may be provided on the OCU application UI.

In an embodiment the OCU application UI may allow a camera selection by the operator of the PARC system. For example, the controls may allow an optical or thermal camera to be selected. If a thermal camera is selected, an additional button indicating flat field correction (FFC) may appear beneath the camera selection buttons and the field of view indicator may update to correspond to the thermal camera's field of view. FFC may improve the contrast when using the thermal camera.

In one embodiment, the PARC system also provides advanced controls via the OCU application UI to control payload operations. As a non-limiting example, the UI may provide controls for autofocus, focus infinity, an IR cut filter, a defog control and aperture controls. Autofocus places the camera in autofocus mode, this frees the operator from manually verifying and adjusting focus during use. In one embodiment, this control can also be invoked by the "Y" yellow button on the joystick controller. Focus infinity sets the camera for an infinite target. This is primarily used to examine items of interest very far away, when autofocus cannot establish a lock. In one embodiment, this can be invoked by the "B" red button on the joystick controller. An IR Cut Filter enables and disables the filter, and can improve the low light sensitivity of the camera. A defog setting can be set to auto or to low/medium/high, and can improve contrast when observing targets through obscuring fog, smoke, or haze. Aperture controls set the camera's aperture, adjusting this optimizes performance under various lighting conditions. Additional controls such as "scene lock" which provide a stable view of an area under observation and "object track" which allow the camera to track and follow an object may be provided via the OCU application UI, the joystick and/or a combination thereof.

OCU application controls (visible in the UI) may include, without limitation, buttons, sliders, or pull-down menus that may be accessed using the computer keyboard, touchscreen (if equipped), or mouse.

A multi-node radar UAV network can be used in conjunction with preferred devices and methods for using UAVs as described generally herein.

Figure 12A:
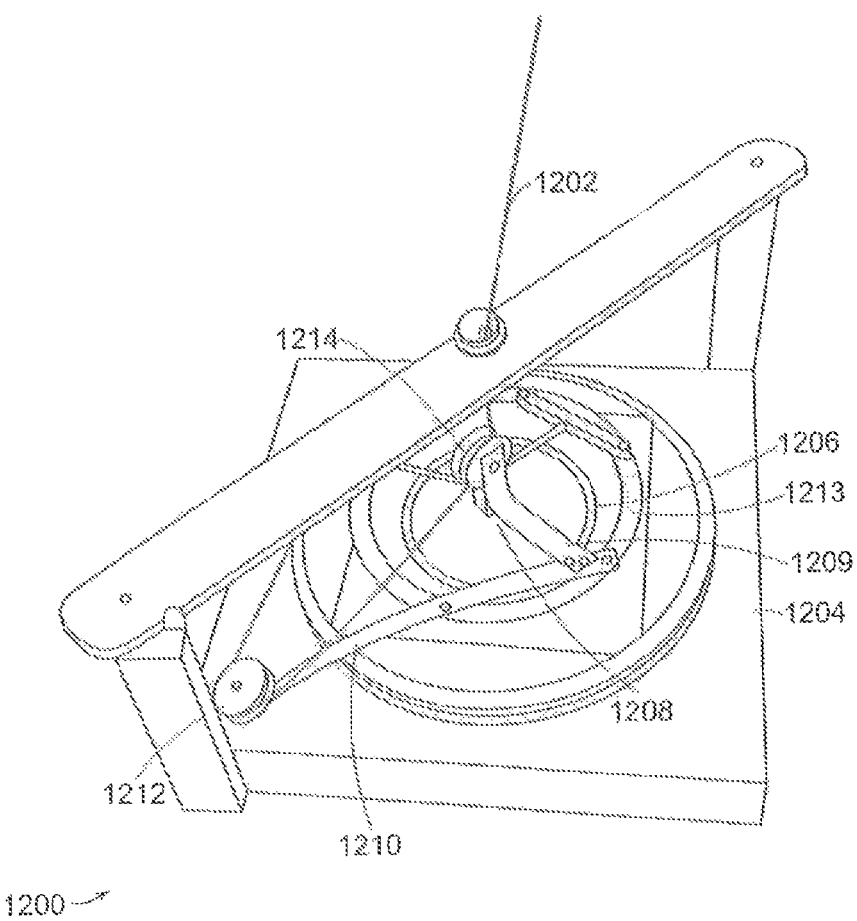
FIGS. 12A-12G illustrates a spooling apparatus is configured to deploy and (optionally) re-spool tether for an unmanned aerial vehicle (UAV) such that a tension on the tether is maintained at a substantially constant, desired tension value.
Figure 12B:
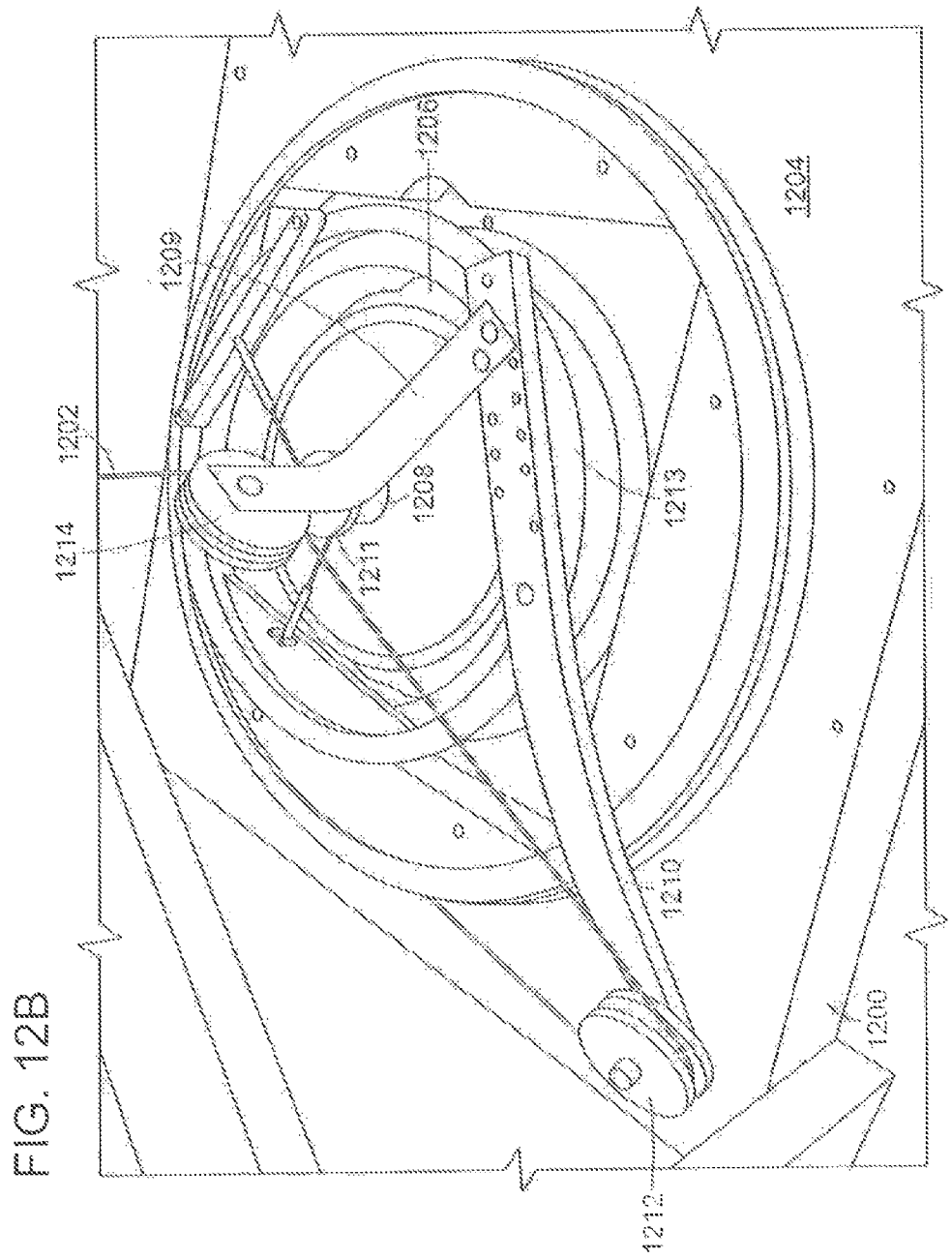
Figure 12C:
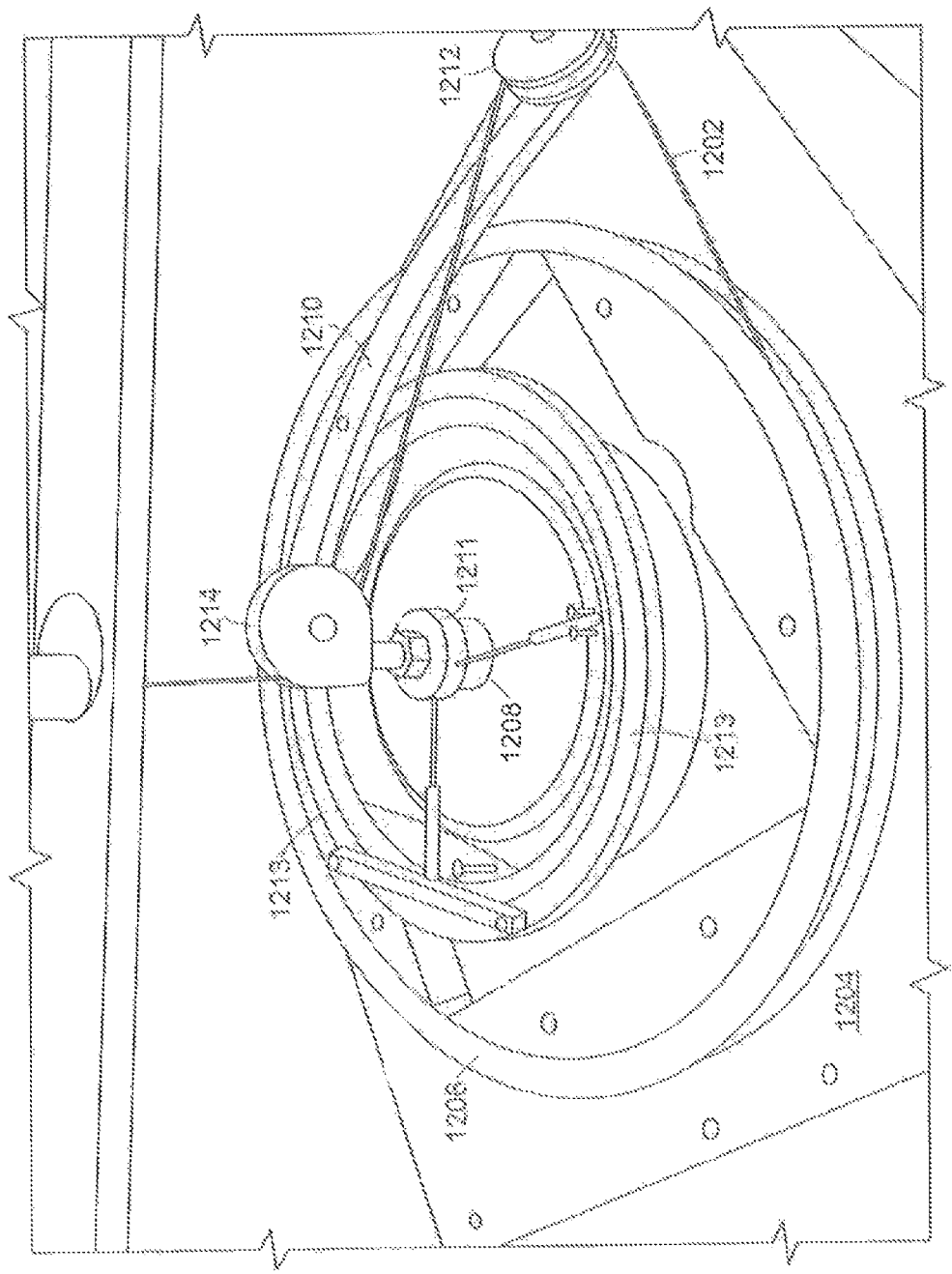
Figure 12D:
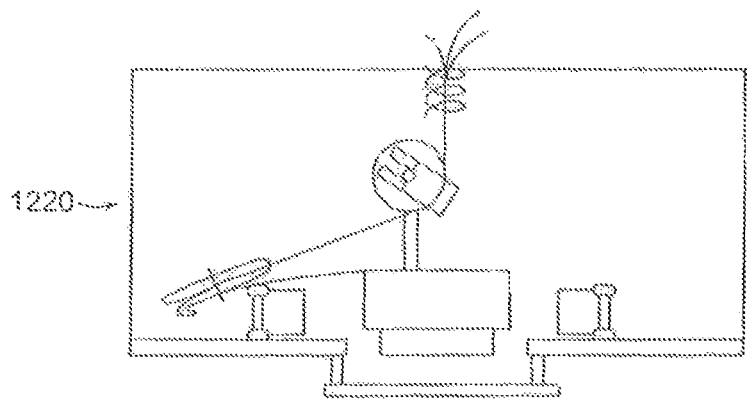

Referring to FIGS. 12A-12C, a spooling apparatus 1200 is configured to deploy and (optionally) re-spool tether 1202 for an unmanned aerial vehicle (UAV) such that a tension on the tether 1202 is maintained at a substantially constant, desired tension value. The spooling apparatus includes a chassis 1204 with a spool 1206 attached thereto. In general, the spool 1206 is attached to the chassis 1204 in such a way that it is unable to rotate relative to the chassis 1204 (although it should be understood that in some alternative embodiments, the spool 1206 may be able to rotate as well). A motor 1208 is disposed in the center of the spool 1206. The driven portion of the motor 1208 is attached to a spring 1211 which is in turn attached to a ring bearing 1213. In some embodiments, the motor 1208 is an "outrunner" where the shaft is held stationary and the housing rotates around it.

An arm 1210 is attached to the ring bearing 1213 such that the arm 1210 is coupled to the drive portion of the motor 1208 via the ring bearing 1213 and the spring 1211. A pulley 1212 is disposed at the end of the arm 1210 and is configured to receive tether 1202 from the spool 1206. Another pulley 1214 is disposed at the center of the spool 1206 and is configured to receive tether 1202 from the pulley 1212.

In some examples, the spool 1206 has larger diameter than in previous approaches, and is fixed into the chassis 1204 of the spooler. It is mounted horizontally, but could be mounted in different orientations. The motor 1208 is mounted co-axially and internal to the spool 1206. The motor 1208 is separated from output shaft by gear(s), belt(s), etc.

The pulley 1212 at the end of the arm 1210 is positioned to direct the tether 1202 from the spool 1206 to the center axis of the motor 1208, where is goes around the second pulley 1214 and continues on the motor axis away from the motor 1208.

As the motor 1208 turns, the tether 1202 is wrapped around the spool 1206. At equilibrium, the torque in the motor 1208 is proportional to the tension in the tether 1202. A motor controller is programmed such that the motor 1208 outputs a specific torque under all circumstances. However, in a dynamic situation, where the UAV is accelerating up or down, the tension deviates due to the angular acceleration of the motor assembly. As the UAV accelerates downward, the tension drops and as the UAV accelerates upward, the tension increases.

In some examples, a buffer (e.g., the spring 1211) is added by decoupling the rotating arm 1210 from the motor 1208 and allowing the arm 1210 to pivot on the ring bearing concentric to the motor shaft. The spring 1211 connects the arm 1210 to the motor 1208 such that when a torque is applied to the motor 1208, and is resisted by the arm 1210, the force is transmitted through the spring 1211 and it deflects. Based on the stiffness of the spring 1211 and the configuration of the bearing, the movement could deflect a small amount, or up to many rotations. In some examples, the bearing deflects close to one revolution. This feature achieves an effect analogous to that of the dancer in the previous design. As the UAV is accelerated up or down, the buffer is able to take up or pay out a length of tether 1202 in order to isolate the high inertia of the motor 1208 from the tether 1202.

In some examples, the tension on the tether 1202 can be inferred based on a measurement of the deflection in the spring 1211. Tension determination on the dancer in previous designs was a simple matter of measuring the deflection on the arm 1210 with an encoder, potentiometer, or other sensor. In some examples, to measure the deflection of the spring 1211, two encoders are be used. The first encoder is connected to the drive motor 1208, and reports the angular position of the motor 1208 with respect to the fixed chassis 1204. The second encoder is mounted on the rotating arm 1210 assembly, and is able to measure the angular position of the rotating arm 1210 with respect to the fixed chassis 1204. Subtracting one encoder value from the other returns the angular position of the rotating arm 1210 with respect to the motor 1208, thus providing the deflection of the spring 1211 and the tension in the tether 1202.

This design meets all tension management requirements and does so using a very simple layout, requiring a minimum of components. Further, in some examples, this design enables addition of fiber-optic cable to the tether 1202, which can be damaged by the small bend radius inherent in previous spoolers. The elimination of the high voltage slip ring provides an environmental advantages because mercury is a toxic substance and its use and disposal are governed by US Federal and international regulations.

In at least some examples, operation is controlled by a processor executing stored software included with the spooler apparatus. The software can be stored on a non-transitory machine readable medium and including machine language or higher level language instructions that are processed.

Figure 12E:
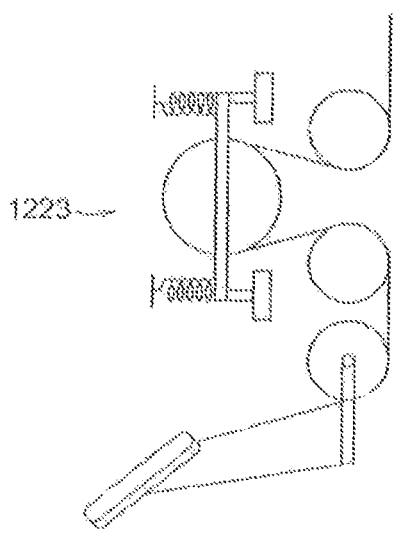
Figure 12F:
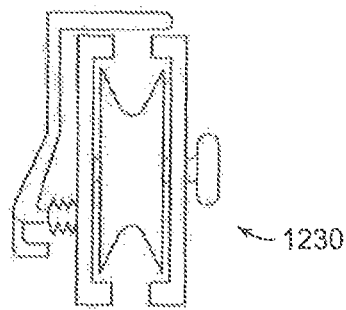

FIGS. 12D-12G—illustrates additional embodiment features including a rotating pulley (FIG. 12F) at 1220 that winds or unwinds the tether around static elements such as a disc or spaced apart posts that serve to retain the tether one device. FIG. 12E has an optional dancer or pinch roller assembly 1223 that can be used to control the load on the tether retention system. Alternatively, as described hereafter, the dancer and pinch roller features are not utilized in embodiments where the retaining element or spool is spring mounted.

Figure 12G:
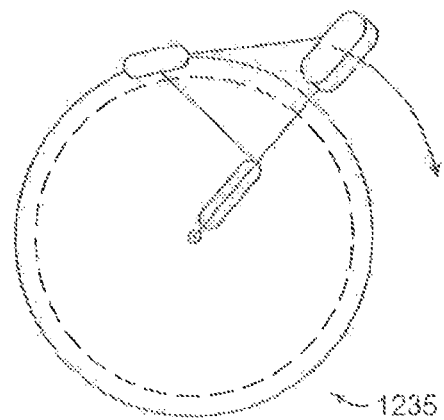

Pulley elements 1230 can be used to pivot with the tether axis to facilitate movement through the exit aperture in the housing that can be centered above the tether retaining disc 1235 seen in FIG. 12G.

It is to be understood that the foregoing description is intended to illustrate and not to limit the scope of the invention, which is defined by the scope of the appended claims. Other embodiments are within the scope of the following claims.

FIGS. 13A-13G illustrates a high-performance (HiPer) spooler 1300 configured to deploy and re-spool tether for an unmanned aerial vehicle (UAV) such that a tension on the tether is maintained at a substantially constant, desired tension value. FIGS. 13A-13G describes an refined version of FIG. 12 that is higher performance than the spooler described in FIG. 12.

FIG. 13A-13D illustrates external components of the HiPer spooler 1300. The HiPer spooler 1300 uses a central motorized arm 1302 to wrap a tether 1304 around a large diameter, low profile (flat) spool 1306 as the primary means of managing the tether 1304 during flight operations. As a motor turns, the arm 1302 wraps the tether 1304 around the spool 1306. The HiPer spooler 1300 is designed to an increased tether force and speed capability, enabling faster spooling and an ability to operate on bumpy roads and maritime environments. The HiPer spooler 1300 further eliminates a need for a high voltage slip ring, which improves reliability and reduces cost.

The spool 1306 may vary in size depending on the embodiment. A larger spool 1306 has less twisting per length and runs at a lower speed. In addition, the cross-section of the tether 1304 on the spool 1306 is smaller, leading to better cooling and better wrapping. In an exemplary embodiment, the HiPer spooler 1300 is 24×24×12 inches. Thus, the spooler housing is preferably less than 120,000 $cm^3$ in volume. Thus, it is desirable to utilize an upper rate of deployment and retrieval in a range of 3 to 8 m/s and preferably of 4 to 6 m/s.

One aspect of this design is that the tether 1304 twists one time per revolution of the spooler arm 1302. When the spool 1306 is initially wound, the twist will be applied to the tether 1304. As the spooler 1300 pays out and the AV ascends, the tether 1304 will go to its natural untwisted state. During a landing, the twist will be absorbed back into the spool 1306. Methods to mitigate the effects of twisting include adding a stiffening jacket over the top ~5 meters of tether 1304 and using an angled roller at the entrance of the spooler to help induce a twist as the tether 1304 is taken up.

In an exemplary embodiment for the HiPer spooler 1300, the maximum tension overload is 4 lbs., the nominal operating minimum is 1 lb., the nominal operating maximum is 3 lbs., the tension set-point tolerance is +/−0.2, the brake tension is 8 lbs., the maximum acceleration is 9.8 m/s^2, and the maximum velocity of retraction is 5 m/s.

In some embodiments, the HiPer spooler 1300 and the base station 1308 are combined to form a single unit or enclosure, also known as a ground unit. The HiPer spooler 1300 is designed to integrate with the base station 1308. At least some components 1305 of the base station 1308 are attached to the base plate 1310 on an opposite side of the spool 1306. The base station 1308 provides high voltage power to the air vehicle converted from an AC source. Along with DC power, the base station 1308 provides a means to send and receive data from the air vehicle to the operator and interface to the spooler assembly. In additional embodiments, all heat generation components of the power electronics have heat sinks mounted directly to the underside of the base plate 1310. Additional fan-sinks may be used to internally move heat from the air onto the base plate 1310. The base station 1308 is attached to a base plate 1310.

An upper cover 1312 includes a moveable door 1314. The tether passes through a hole 1315 in the upper cover 1312. One of more wire bulkheads are able to pass through the base plate 1310 to a UI/connector board 1316 on the upper cover 1312. Thus, the UI controls 1316 are on the top surface and the connectors may be mounted on the side panel 1318, near the top.

In some embodiments, the upper cover 1312 serves as a landing platform integrated onto the top of the ground station 300 to facilitate takeoff and landing. In some embodiments, the landing platform could be in the form of a ring, with a rubber or foam or brush edge to cushion and stabilize the drone on landing. The landing platform may be adjustable in height. The landing platform may also utilize precision landing technology, such as using Real Time Kinematic (RTK) GPS, Ultra High Band (UHB) radio beacons, Infra red beacons IR beacons, and/or tether tracking.

When matching the performance improvements of the HiPer spooler 1300 versus the spooler described in FIG. 12, the spooler is limited to a tether payout and retraction speed of 2.45 meters per second. The HiPer spooler 1300 generally has to payout speeds of 2.8 m/s and retraction speeds of 3.3 m/s. However, this is not the limit of the capability. The HiPer spooler 1300 preferably has a speed limit in a range of 4-8 m/s, and at least 7.75 meters per second.

Figure 13B:
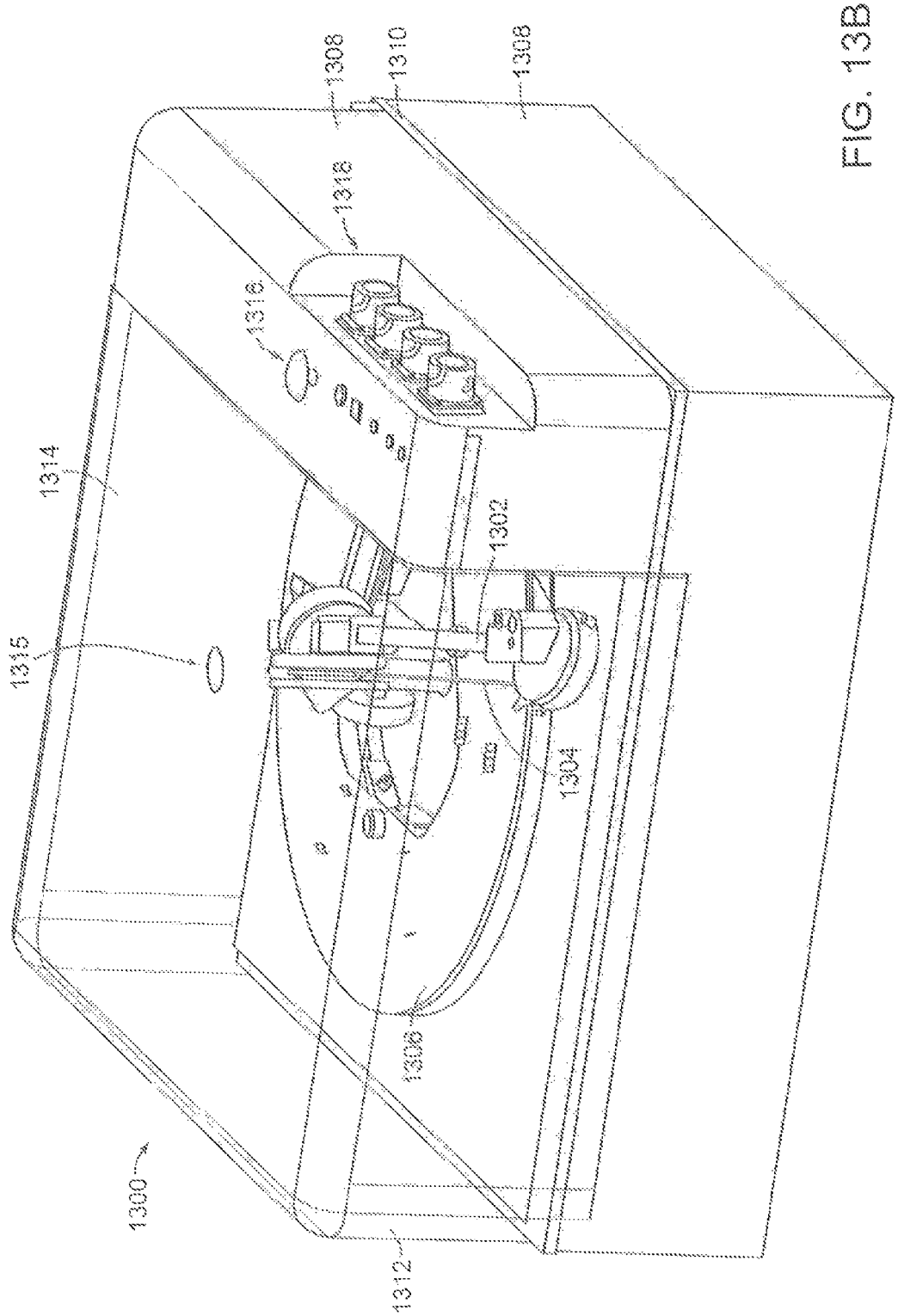
FIGS. 13A-13U illustrates a high-performance (HiPer) spooler apparatus and a modular tether system for a UAV.
Figure 13C:
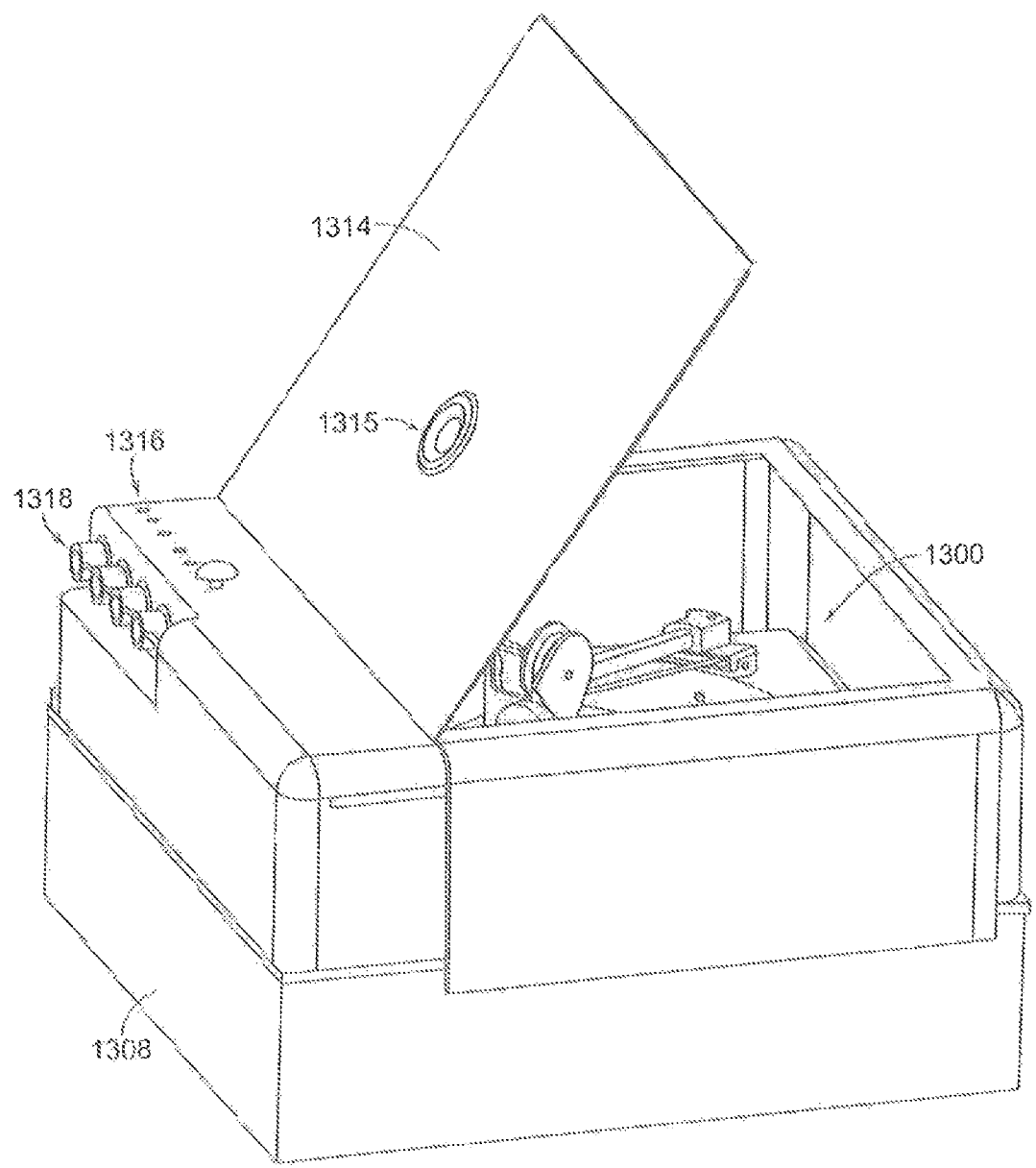
Figure 13D:
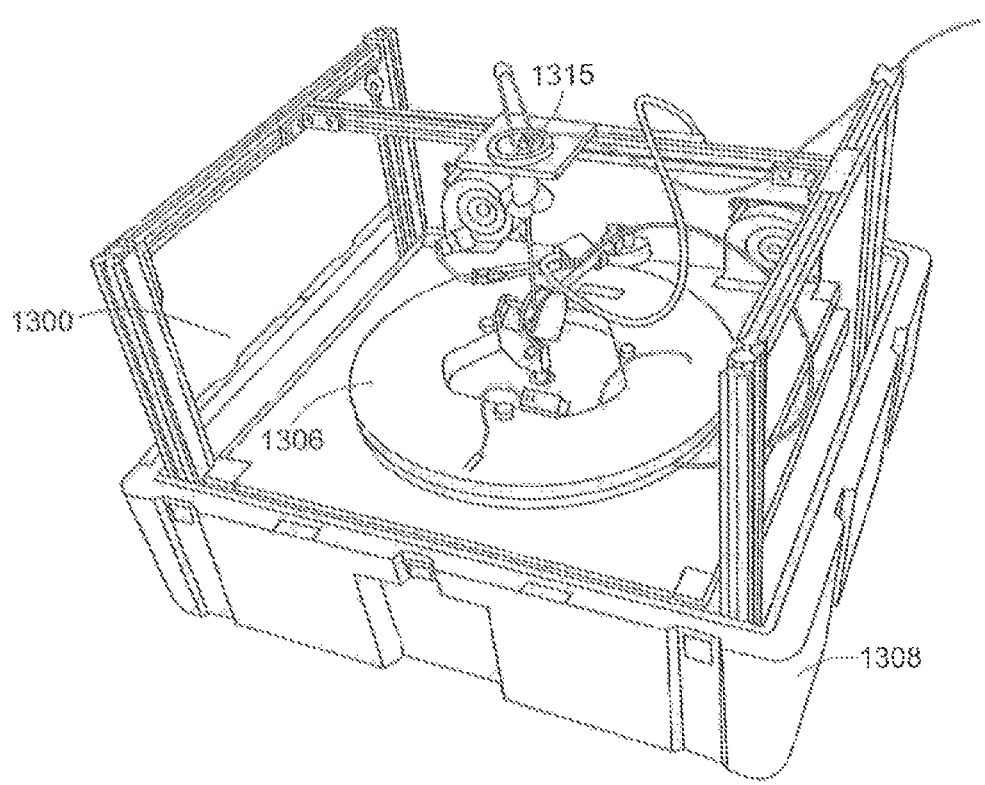

FIG. 13D represents the ground station being placed in a shipping container is a way that allows the ground station to be operated while remaining in the shipping case.

Figure 13E:
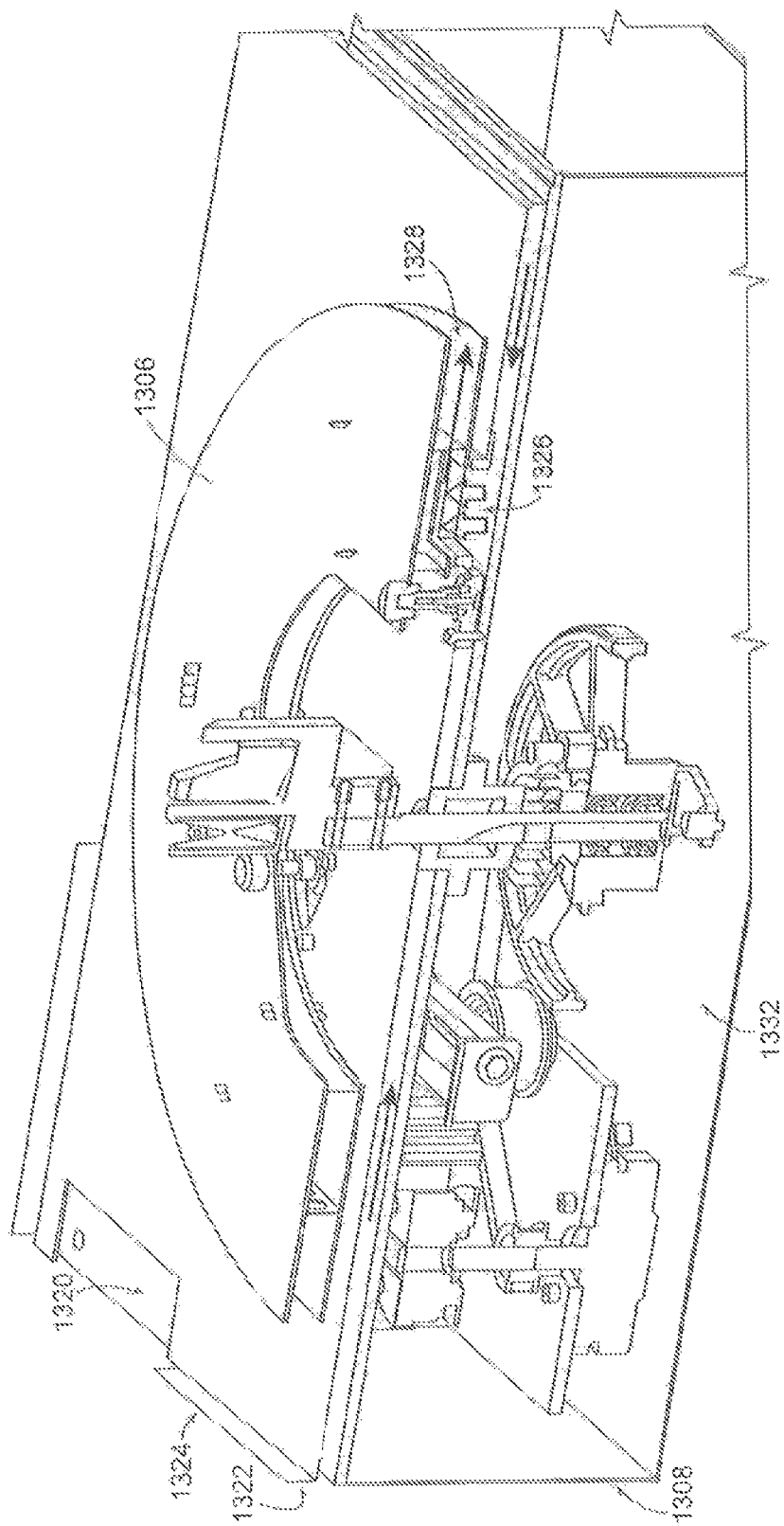

FIG. 13E illustrates a cooling system for the HiPer spooler 1300. In one embodiment, the spool 1306 is connected to top of the base plate 1310 by thick, double-sided foam pads. HiPer spooler 1300 includes a fan inlet 1320 in the base plate 1310 for taking in air. Blowers direct air into a space or a gap 1322 in the base plate 1310. Air travels through the gap 1322 and up through the ports 1326 into the spool plenum 1328, and out through the wrapped filament. The air flows outward radially when the inner plenum is pressurized.

The cooling system is used to cool the filament/tether 1304 on the spool 1306, but also moves ambient air across the base plate 1310. This moving air can remove heat added to the base plate 1310 from power electronics below. FIG. 13E further illustrates a volume of space under the base plate 1310 suitable for mounting electronics. The electronics 1310 previously housed in the base station 1308 could be mounted in this space, in a way such that a conductive path could be maintained between the heat generating components and the base plate 1310. This allows effective cooling of these components, provided that there is sufficient air flow from the blowers above.

In experimental tests, continuous current was passed through filament and two blowers powered, and filament was allowed to reach steady-state temperature. Thermocouples were positioned at various places around the spool. In every case, one thermocouple was placed close to the perforated inner wall, another in the middle (radially) of the filament layers, and a third under a few layers of filament towards the outer edge of the filament stack.

Initial findings after several tests suggest that maximum filament temperature did not rise more than ~77° C., 53° C. above ambient. The lowest temperature corresponds to the thermocouple closest to the perforated inner wall, while the highest temperature occurs in the thermocouple near the outer edge of the filament stack. Despite the outer thermocouple having a more direct path for heat exit into ambient air, the heated air from the inside of the filament stack tends to warm the outer region, so the highest temperatures are seen towards the outer wall of the filament.

At 1.7 A continuous current, the temperature rise appears to be within maximum allowable parameters; tests were also performed at 1.3 A and 1.5 A continuous current to get a sense of temperature rise during more "normal" power utilization. The PARC flies in 60° C. ambient temperature, including solar loading and with heat ingress into the spool from the electronics below the aluminum baseplate. Therefore, filament temperature rise above ambient should not exceed 60° C. At 1.3 A current, observed temperature increases fall below a 65° C. max. Further, the air vehicle is likely to be airborne by the time these steady-state maximums are observed, leading to less filament on the spool and decreased temperature maximums. Based on the experiments, the cooling appeared to be adequate in the flat spool design as shown in the HiPer spooler 1300.

Figure 13F:
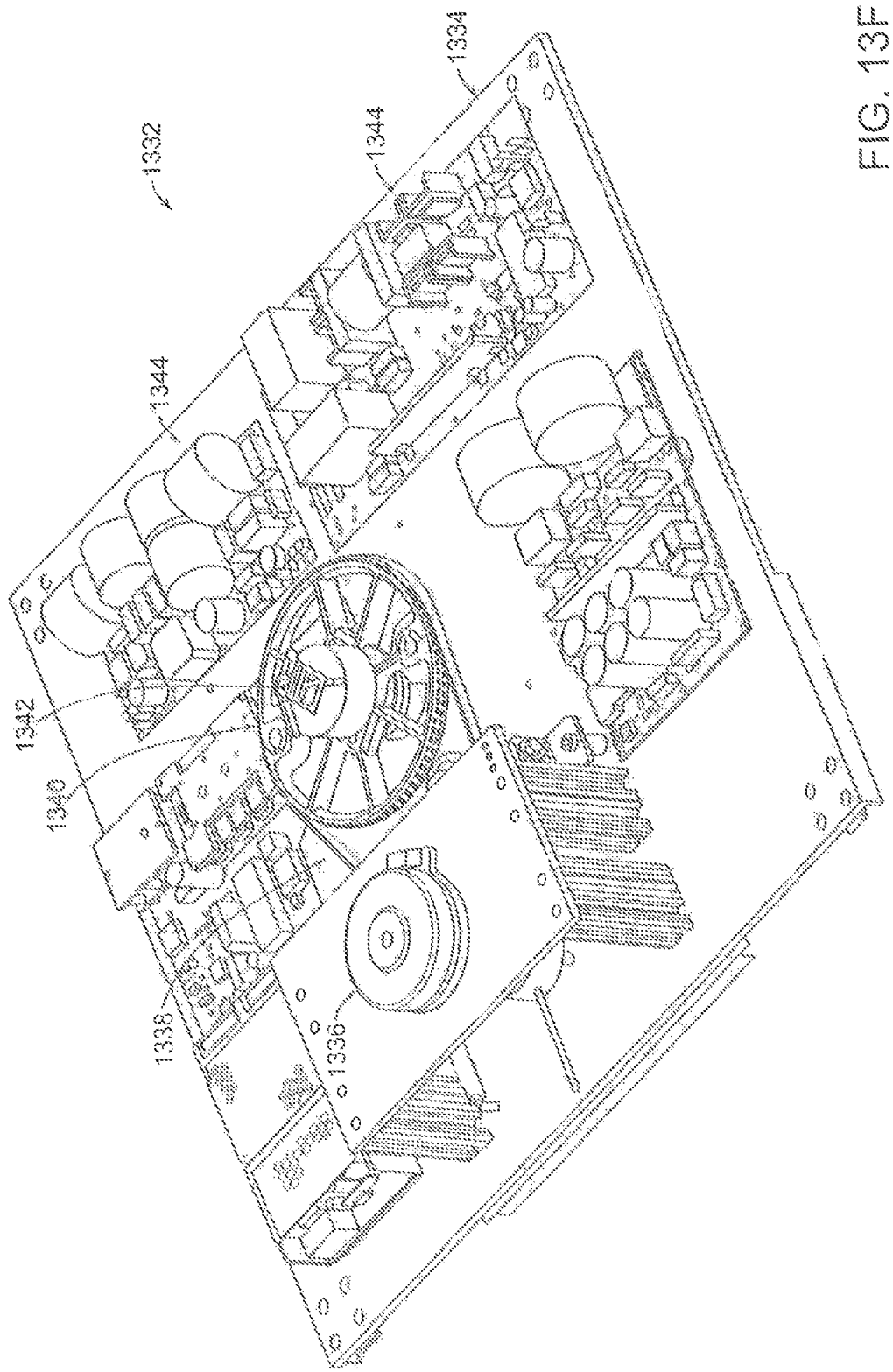

FIG. 13F shows an example of electronic boards 1344 attached to the underside of the base plate 1310, as well as the drive system of the spooler (motor 1336, belt 1338, sprocket 1340 and encoder 13423). As the base station 1306 into the spooler 1300, the electronic boards 1344 are attached to the base plate 1310 in a way to heat sink the power dissipating components to the base plate 1310, and that the base plate 1310 is cooled by a fan from above.

Figure 13G:
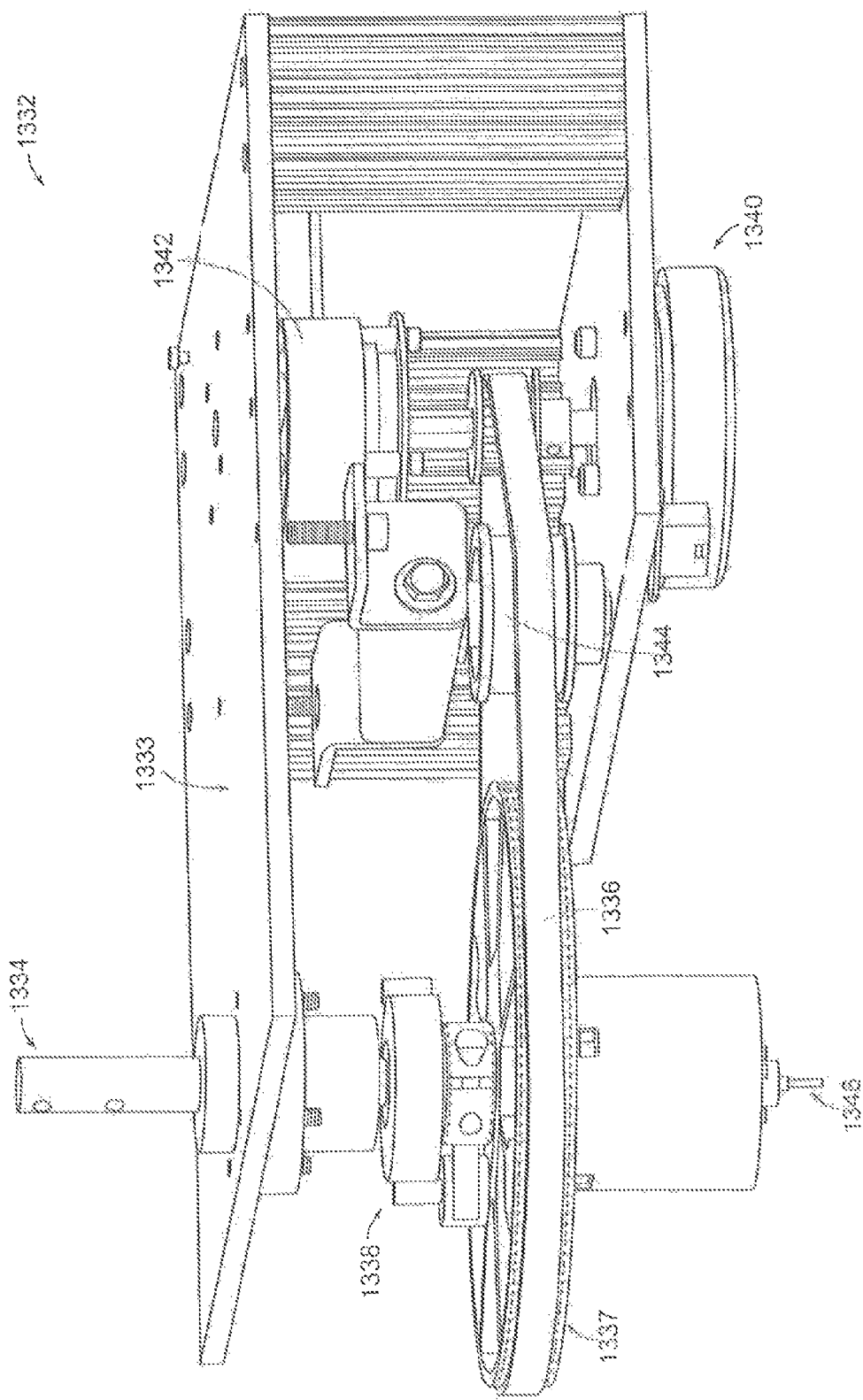
Figure 13H:
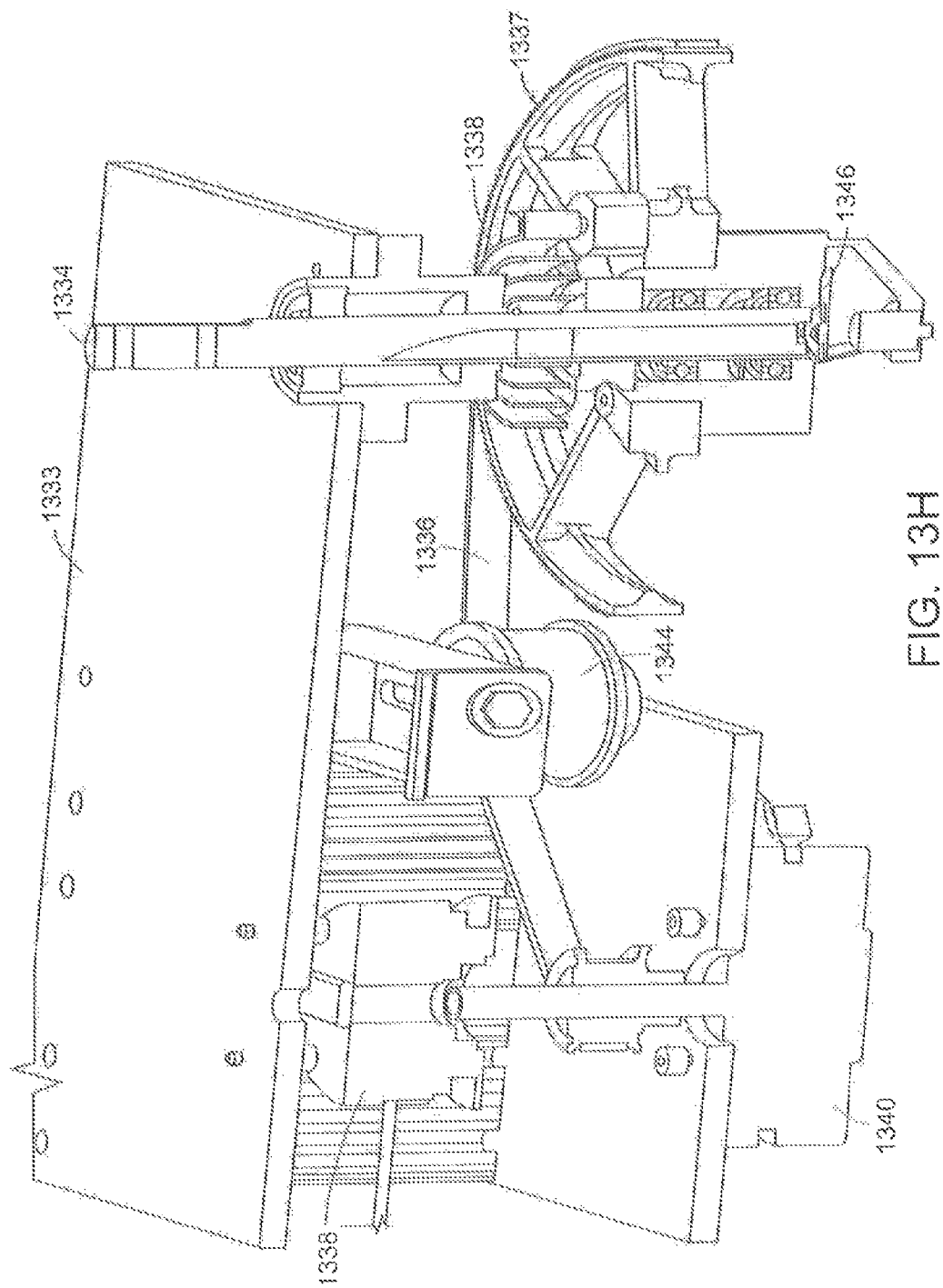
Figure 13I:
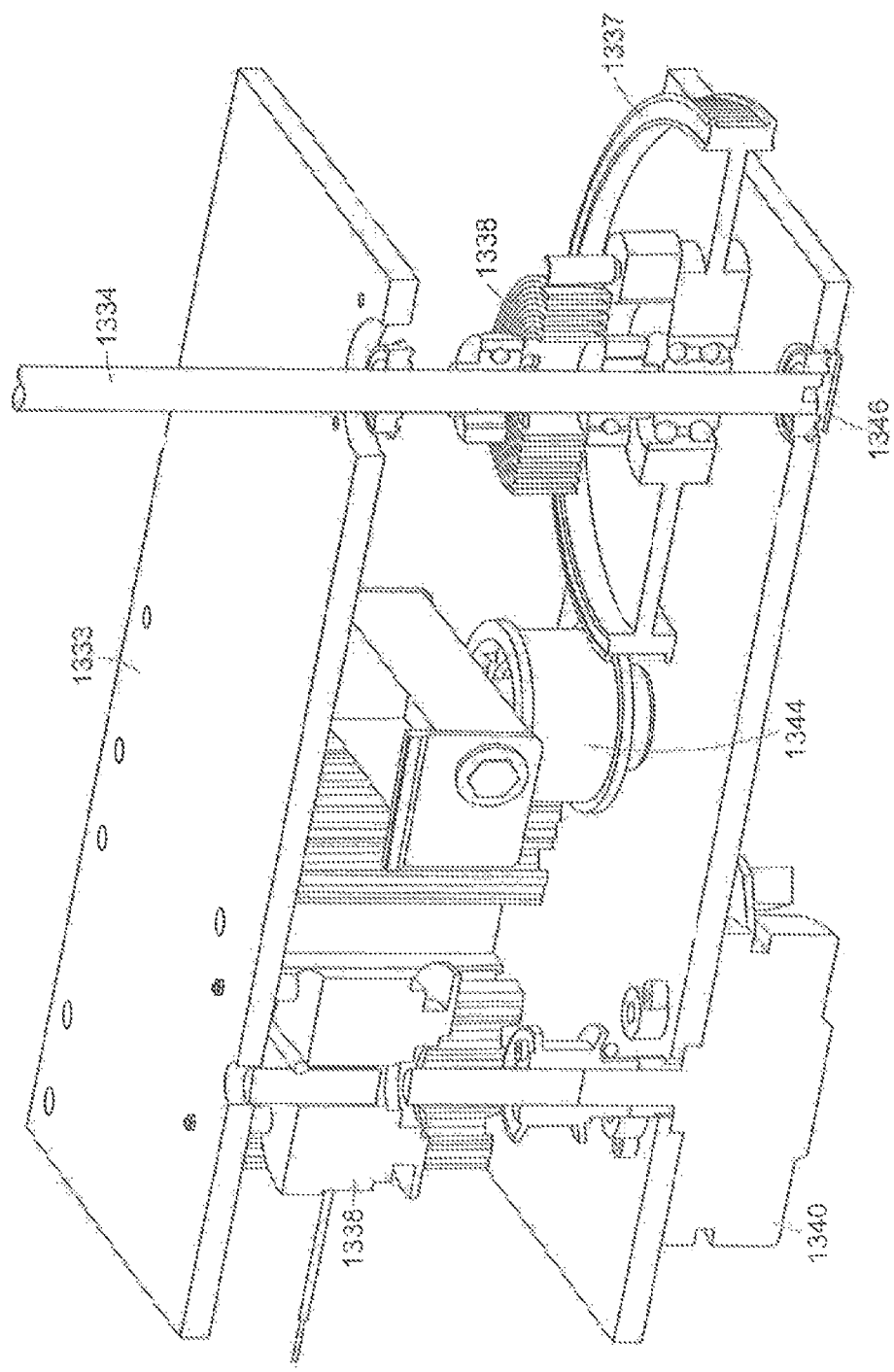

FIG. 13G-13I illustrates a tether control system for the HiPer spooler 1300. The layout of the system is that there is the arm 1302 attached to the main spindle 1334. On the main spindle 1334, a timing belt pulley 404 is mounted on its own bearings and coupled to the spindle 1334 shaft with a spiral torsion spring 1338. All of the torque transmitted through the pulley 404 and to the shaft travels through the spring 1338. Spiral torsion springs do not have contact between the coils (unlike helical torsion springs) and have a more consistent torque profile. In some examples, the tension on the tether 1304 can be inferred based on a measurement of the deflection in the spring 1338.

A motor 1340 drives the pulley 402 with a timing belt, which in turns moves the arm 1302. As the motor turns, the tether 1304 is wrapped around the spool 1306. At equilibrium, the torque in the motor is proportional to the tension in the tether. The motor 1340 has an encoder for its own control (referred herein as a motor controller). The motor controller is programmed such that the motor outputs a specific torque under all circumstances. However, in a dynamic situation, where the UAV is accelerating up or down, the tension deviates due to the angular acceleration of the motor assembly. As the UAV accelerates downward, the tension drops and as the UAV accelerates upward, the tension increases.

As shown in FIG. 13H, second encoder 1346 is mounted in unit with the timing belt pulley and measures the angle between the pulley 404 and the spindle 1334 shaft (or the deflection of the spring 1338). As the spring constant is known, this angle equates to the actual torque transmitted through the spring 1338. Because the encoder 1346 is rotating with the pulley 404, a slip ring 1347 is required to connect the encoder to a processor.

As shown in FIG. 13I, in an alternate control method, the slip ring could be eliminated by using an encoder on the end of the spindle 1334 shaft, measuring the position of the shaft relative to ground. To determine the deflection of the spring 1338, the motor position is subtracted from the spindle 1334 position.

In an exemplary embodiment, the drive train requirements are continuous torque at 3 lbs. tension, 0.45 nm; Peak motor torque, 0.6 nm; peak motor speed @ 5 M/s tether speed, 1813 RPM; motor encoder, incremental quadrature, 1600 cpr (Maxon MILE Encoder 411964); and MotoVoltage 36v. The timing belt tensioning mechanism is of fixed displacement type.

A brake 1342 has been added to the system to prevent the arm 1302 from rotating when power is off. The primary purpose of this is to prevent the tether 1304 from unwinding and tangling in transport. Secondarily, the brake 1342 can be engaged in an emergency condition in the event that the AV is in a runaway condition. In such a case, the required tension is the total thrust, minus the AV weight. In some embodiments, the brake is on the output shaft to prevent vibrating of the rotating arm during shipment.

A hand release is used whenever the arm needs to be moved with power off, for example, during loading/unloading the spool 1306, removing slack for transport, or setting up the HiPer spooler 1300. The hand release will be momentary, with a spring return. Because the brake 1342 cannot be left in the unlocked position, a switch is not necessary. Alternatively, a switch could be used to indicate to the control unit that the brake 1342 has been disengaged.

Figure 30:
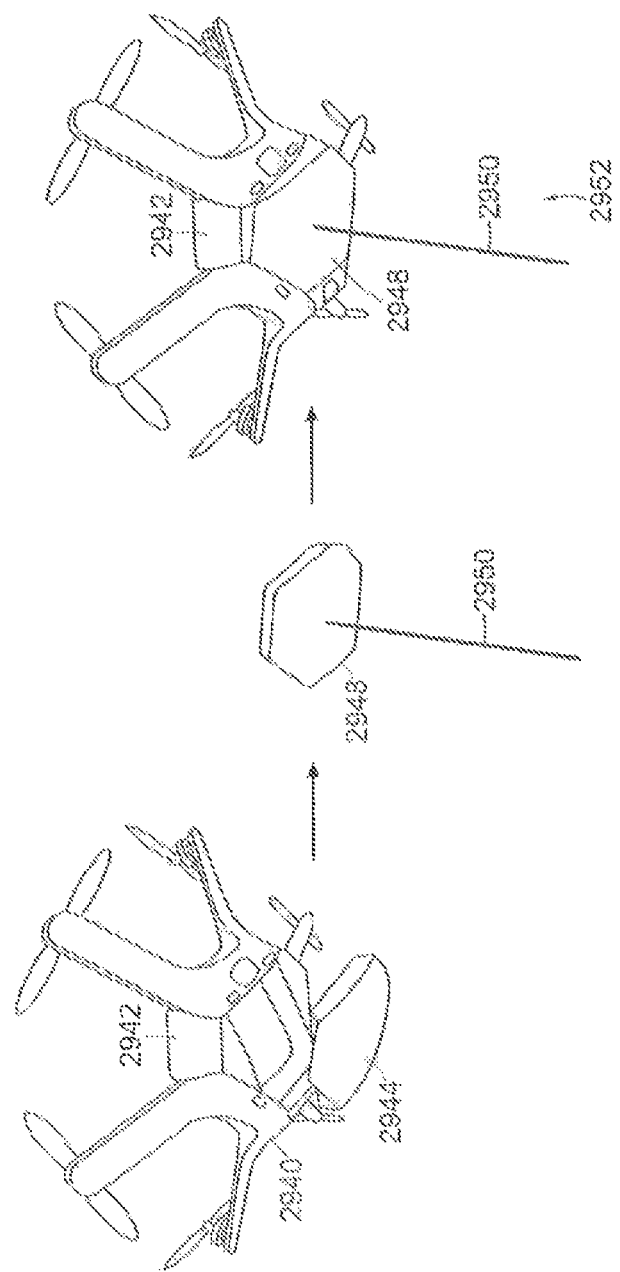
FIG. 30 illustrates a modular assembly including a module for tethered operation.

In at least some examples, operation of the HiPer spooler 1300 is controlled by a processor executing stored software included with the spooler apparatus, as described in FIG. 30. The software can be stored on a non-transitory machine readable medium and including machine language or higher level language instructions that are processed.

Figure 13J:
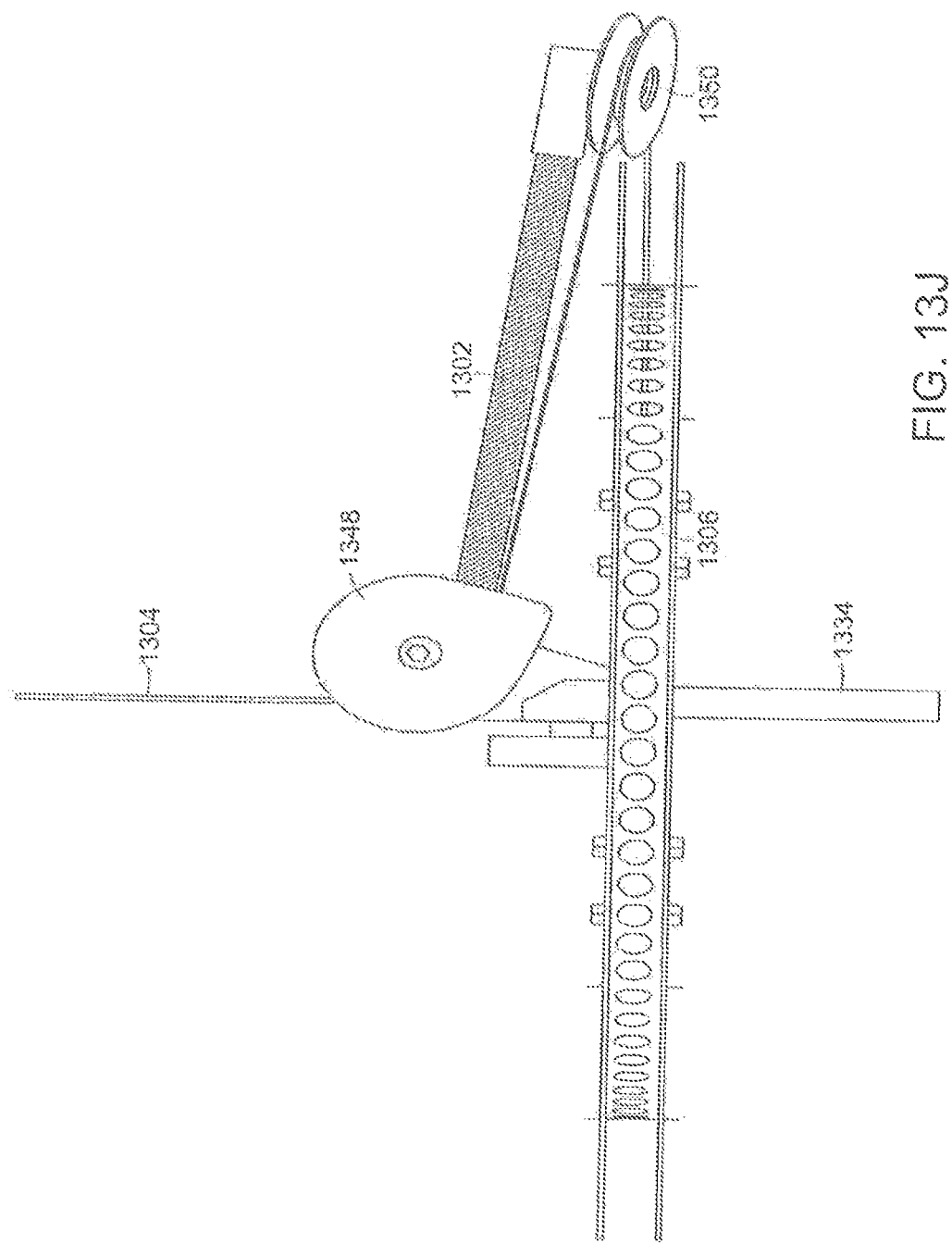

FIG. 13J illustrates a horizontal view of the spooler arm 1302 and spool 1306, including the tether (or filament) 1304, spindle 1334, an inner pulley 1348, and an outer pulley 1350. The outer pulley 1350 is disposed at the end of the arm 1302 and is configured to receive tether 1304 from the spool 1306. The inner pulley 1348 is disposed at the center of the spool 1306 and is configured to receive tether 1304 from the outer pulley 1350.

In one embodiment, outside diameter of spool 1306 is 18 in. (457.20 mm), and large diameter of current pulley is 60 mm. Therefore, length of the arm 1302 to center-of-rotation of the outer pulley 110 is approximately 258.60 mm. In the above configuration, the center of rotation in the center of the outer pulley 110 is 263 mm from the center of rotation of the vertical shaft. The angle of the arm 1302 is −7° and the angle of the tether 104 is −10°.

The spindle arm 1302, with outer pulley, is able to pivot upward about a point near the spindle axis in order to provide clearance to the installation or removal of a spool 1306 of microfilament tether. In an exemplary embodiment, spindle arm 1302 is attached to the spindle shaft. Three ball-spring plungers in this design are inserted in the piece 32 mm from the arm center-of-rotation, offset 120°. A hard stop is built into the main support piece to lock the arm 1302 into a −7° pitch, and the arm 1302 can be rotated clockwise by 60° position. In both positions, the arm 1302 position is held in place with 3 detents on the surface of the main support. In one embodiment, the width of the arm is 0.75 in square with a ¹⁄₁₆ in wall thickness.

Figure 13K:
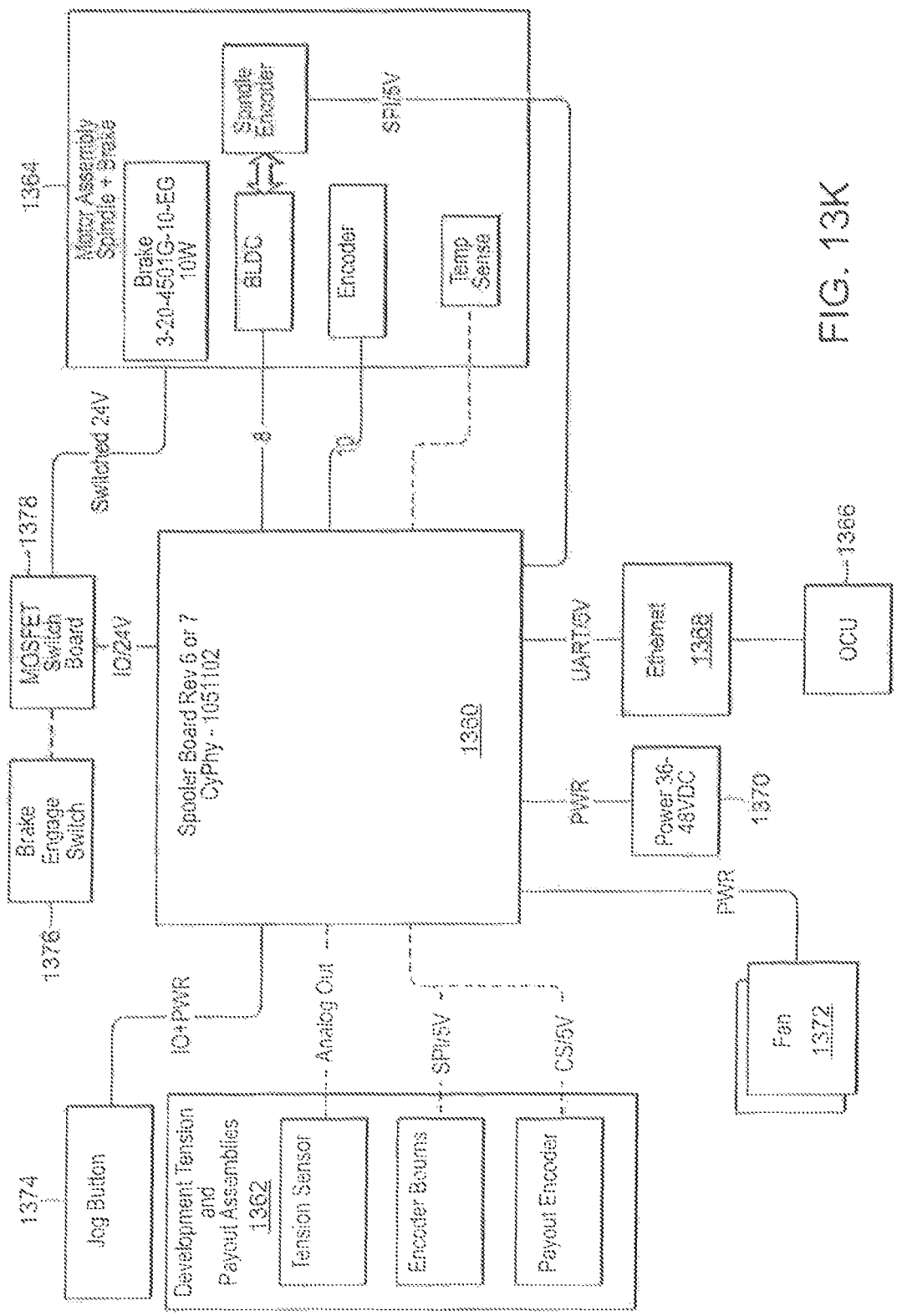

FIG. 13K illustrates a system block diagram for controlling a spooler system. The system includes a microcontroller 1360. In an exemplary embodiment, the microcontroller 1360 is a PIC32MX795F512L-801/PT microcontroller. The microcontroller 1360 is in communication with development tension and payout assemblies 1362. The development tension and payout assemblies 1362 include a tension sensor, an encoder, and a payout encoder. In an exemplary embodiment, the tension sensor is a Honigmann RFS 150 sensor. In an exemplary embodiment, the encoder is an IMS22 A50-B28-LS6 Bourns encoder. These sensors are for development only to facilitate testing and are not intended to be included in any product. These would be high resolution sensors used to qualify the accuracy of other measuring techniques, such as how well the spring deflection method works to determine tension and the number of wraps to determine the amount of tether paid out.

The microcontroller 1360 is further in communication with a motor assembly 1364. In an exemplary embodiment, the motor assembly 1364 includes a Maxon 411967, a spindle and a brake. The motor assembly 1364 further includes a BLDC motor in communication with a spindle encoder, and temperature sensor. In an exemplary embodiment, the brake is a 3-20-4501G-10-EG, the BLDC motor is a Maxon 323772, the spindle encoder is a AS5040, and the encoder is a Maxon 411964.

The microcontroller 1360 is further in communication with (a) an operator control unit (OCU) 1366 via an ethernet 1368 (such as an I-Temp Beagle Bone BB-BBLK-000-ITEMP 710), (b) a power source 1370, (c) a fan 1372, and (d) a jog button 1374 that, when pressed, retracts the filament. In an exemplary embodiment, the power source 1370 is preferably 36-48 VDC. In an exemplary embodiment, the fan 1372 is 12V BFB1212VH-TA50 17.6 W.

The microcontroller 1360 is further in communication with a brake engage switch 1376 via a MODFET switch board 1378.

Figure 13L:
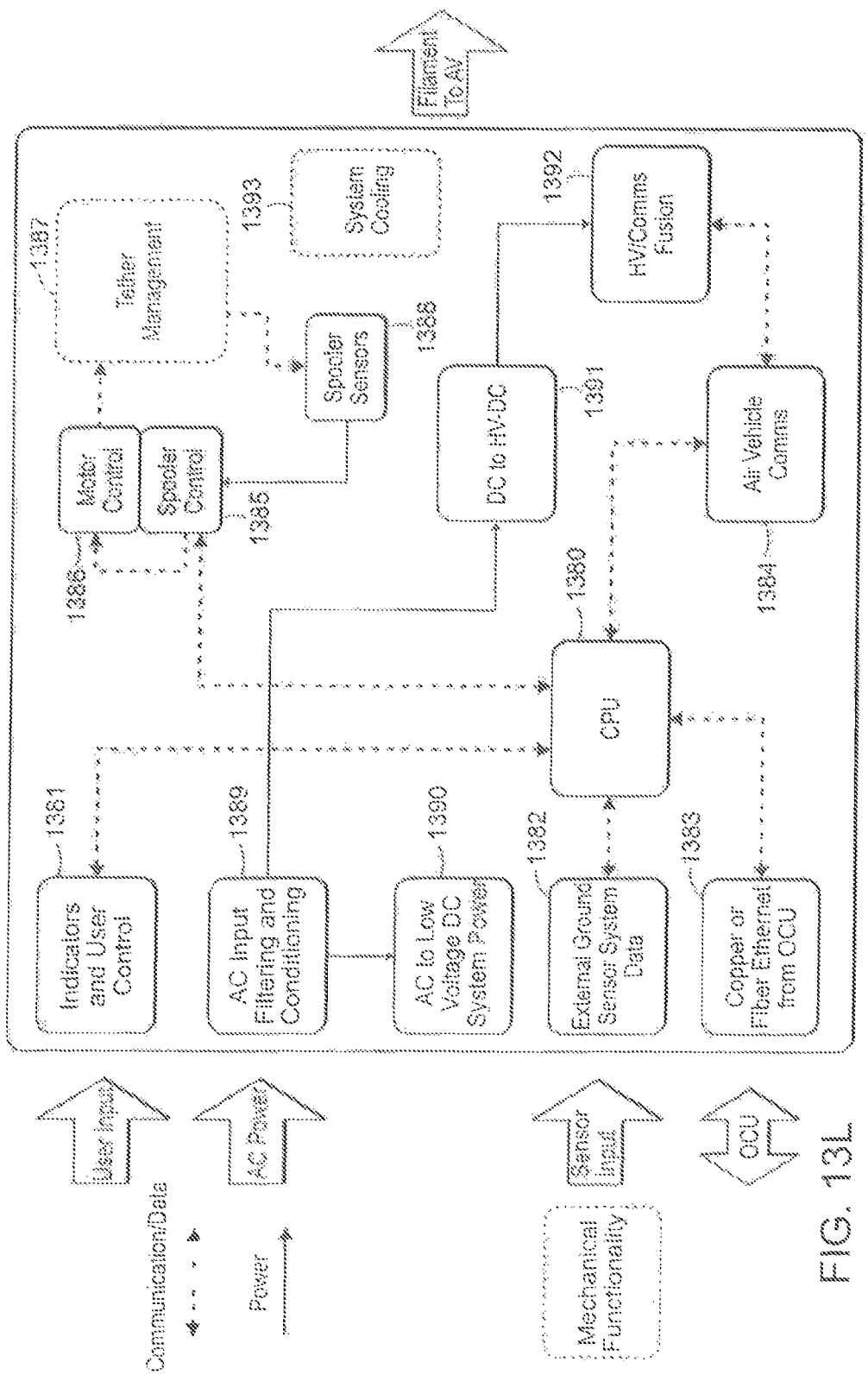

FIG. 13L illustrates a control system for a ground station, such as ground station 300, that combines the functions of a base station and a spooler into one component. The ground station will provide control and spooling of the filament, as well as house the HV power and communication to the air vehicle. The OCU connects to the ground station via fiber or Ethernet. In some embodiments, the DPA functionality is wrapped into the ground station, while the Media Converter functionality will remain at the operator's location.

The control system includes a central processing unit (CPU) 1380 in communication with an indicators and user control component 1381. The indicators and user control component 1381 transmits user UAV control instructions to the CPU 1380 and receives indicators (e.g., AC power on, fault indicators, HV on, etc.) from the CPU 1380.

The CPU 1380 is in further communication with an external ground sensor system 1382. The external ground sensor system 1382 transmits data from sensors located on the ground, including on a mobile vehicle (e.g., car or boat) to the CPU 1380. The data may be used by the system for precision takeoff and/or landing. For example, the data may indicate a location and an angle of a landing platform.

The CPU 1380 is in further communication with an OCU 1383 via a copper or fiber Ethernet. The OCU 1383 transmits commands to the CPU 1380 and receives data from the CPU 1380.

The CPU 1380 is in further communication with an air vehicle communications component 1384. For example, the air vehicle communications component 1384 may transmit video and/or sensor data to the CPU 1380. In an exemplary embodiment, the communications is performed through a microfilament. The air vehicle communications component 1384 communicates with a HV/communications fusion 1392.

The CPU 1380 is in further communication with a spooler control component 1385. The spooler control component 1385 controls the spooling, unspooling, and tether tension of the tether based on a movement (e.g., ascending, descending, etc.) of the UAV and tether tension. The spooler control component 1385 communicates with a motor control component 1386 that controls a motor for rotating a spooler arm to spool and unspool the tether (tether management 1387). The spooler control component 1385 may control the tension of the tether by instructing the motor control component 1386 to turn the motor. Spooler sensors 1388 receive data based on the tether management 1387 and transmits the data to the spooler control component 1385 for further spooler control.

An AC input filtering and condition component 1389 transmits power to an AC to low voltage DC system power 1390 and DC to HV-DC 1391. The DC to HV-DC 1391 transmits power to the HV/Communications fusion component 1392.

A preferred embodiment of the invention relates to systems and methods of operating a radar device mounted on one or more UAVs to monitor an airspace for static objects on the ground, other moving objects and/or airborne vehicles. A tethered UAV system in which power is supplied to the UAV using the tether has particular advantages for UAV mounted radar system operation. This enables persistent operation of the radar system during flight of the UAV for days or weeks of operation which is not possible for battery powered autonomous UAVs.

A plurality of UAVs, each with a radar system mounted thereon, can perform coordinated monitoring of a three dimensional airspace, for example. Such a multi-node UAV radar system can be operated by a single integrated control system, or control can be distributed among two or more control systems in communication with each other. Ranges, velocity classification, and identification information generated by each UAV mounted radar assembly can be partially processed on board each UAV by a processor mounted thereon. The raw or processed data generated by the UAV radar assembly can be transmitted to a ground based processing system using the tether or by wireless transmission.

Figure 13M:
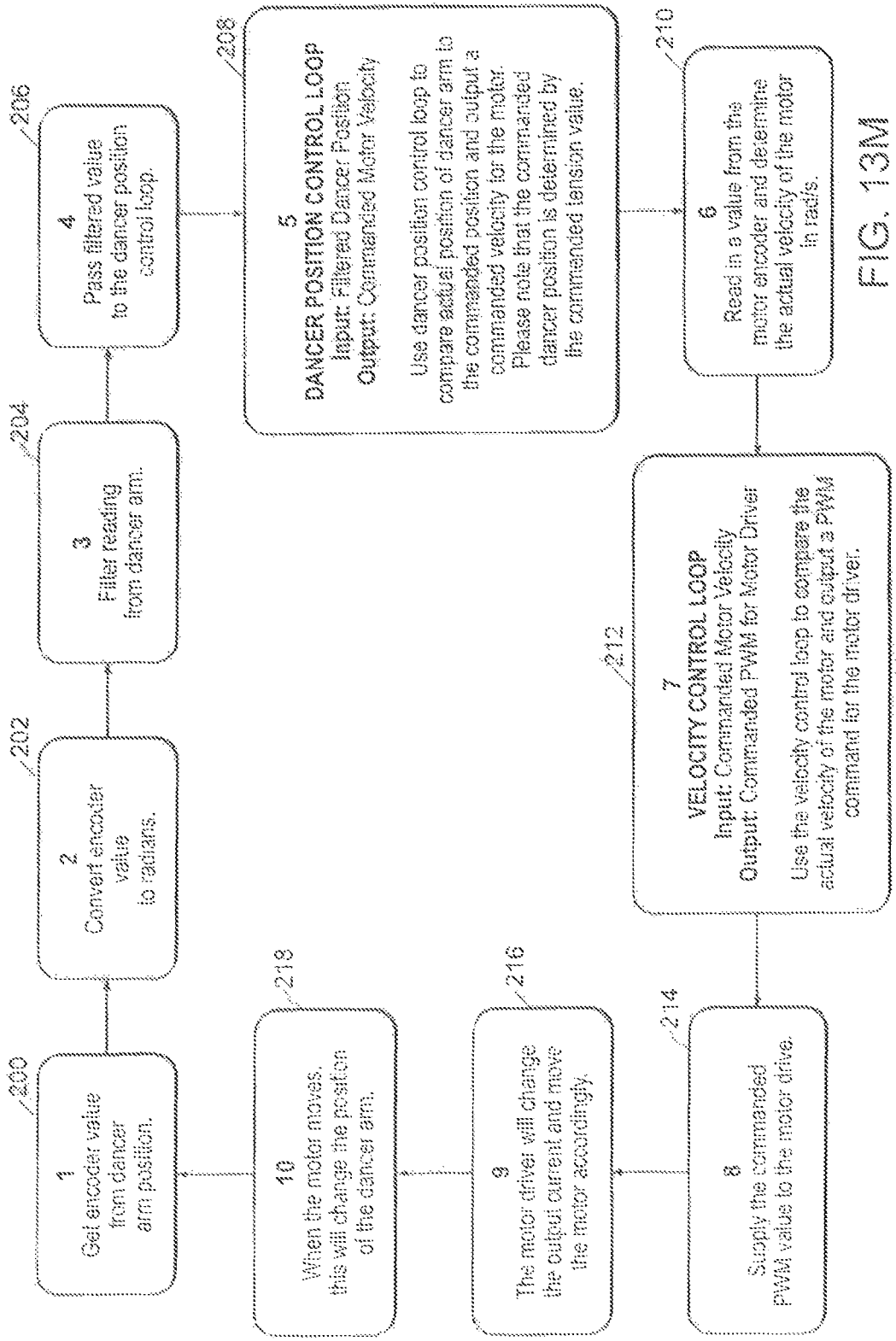

FIG. 13M illustrates a tether control feedback loop to control a position of a moveable arm that deploys tether from a tether retainer during flight of a UAV, in accordance with an exemplary embodiment. The tether mechanism includes a tether controller and a microcontroller, such as a Renesas R7. Steps 200-218 illustrate the control feedback loop operations that are performed using the microcontroller.

At step 200, an encoder value is obtained from a position of the moveable arm (also known as a dancer arm) that deploys the tether. At step 202, the encoder value is converted to radians. At step 204, readings from the moveable arm are filtered. At step 206, a filtered arm position value is passed to an arm position control loop.

At step 208, the arm position control loop receives the filtered arm position as input. The microcontroller uses the arm position control loop to compare an actual position of the moveable arm to a commanded position. The commanded arm position is determined by a commanded tension value. The arm position control loop outputs a commanded velocity for the motor.

At step 210, a value from the motor encoder is obtained and an actual velocity of the motor in rad/s is determined. At step 212, a velocity control loop receives the commanded motor velocity as input. The microcontroller uses the velocity control loop to compare the actual velocity of the motor to the commanded velocity, and outputs a commanded pulse width modulation (PWM) command for the motor driver.

At step 214, the commanded PWM value is supplied to the motor drive. At step 216, the motor drive changes the output current and moves the motor accordingly. At step 218, the motor moves, changing the position of the moveable arm.

FIGS. 13N-13Q illustrate tension control for a tether mechanism, in accordance with exemplary embodiments. The tension control is used to keep the tether under correct tension during takeoff, landing, and flight of the UAV.

Figure 13N:
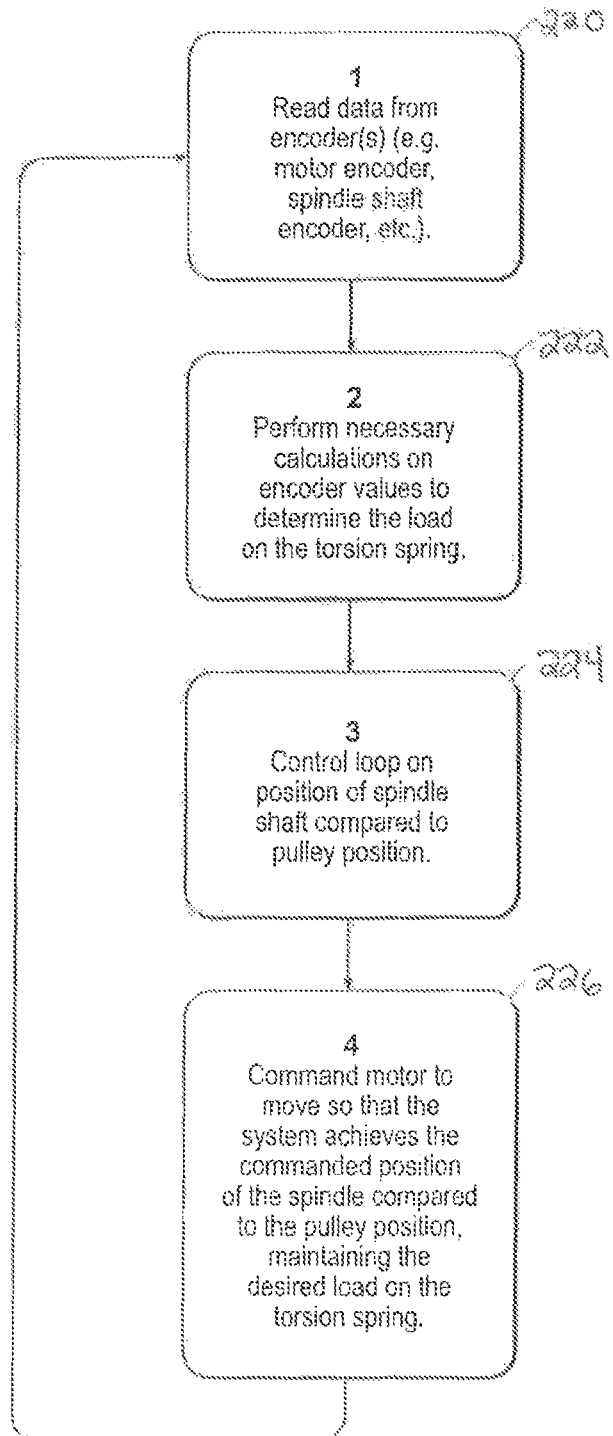
Figure 130:
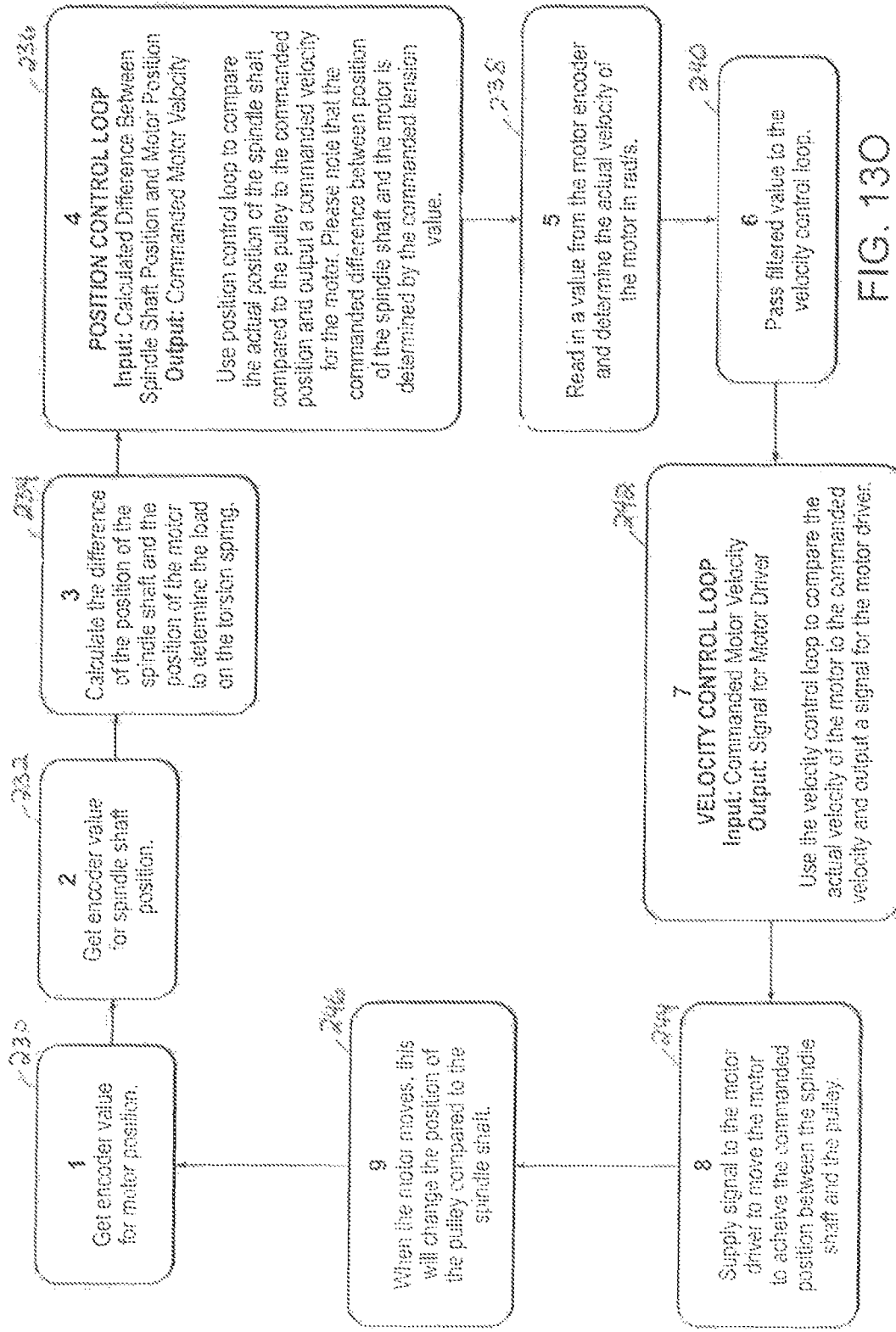

FIG. 13N illustrates a high level flowchart for tension control for the tether mechanism, in accordance with an exemplary embodiment. Steps 220-226 are performed on the microcontroller. At step 220, data and values from encoder(s) (e.g. motor encoder, spindle shaft encoder, etc.) are obtained. At step 222, necessary calculations are performed on the encoder values to determine a load on the torsion spring. At step 224, a control loop compares a position of a spindle shaft to a pulley position. At step 226, commands are transmitted to the motor to move such that a commanded position of the spindle compared to the pulley position is achieved, maintaining the desired load on the torsion spring.

FIG. 13O illustrates a differential encoder approach for tension control for the spooler, in accordance with exemplary embodiments. Steps 230-246 are performed on the microcontroller. At step 230, an encoder value for a motor position is received. At step 232, an encoder value for a spindle shaft position is received. At step 234, a difference between the position of the spindle shaft and the position of the motor is calculated to determine the load on the torsion spring.

At step 236, a position control loop receives the calculated difference between the spindle shaft position and the motor position. The microcontroller uses the position control loop to compare the actual position of the spindle shaft compared to the pulley position, and output a commanded velocity for the motor. The commanded difference between the position of the spindle shaft and the motor is determined by the commanded tension value.

At step 238, a value from the motor encoder is received and an actual velocity of the motor in rad/s is determined. At step 240, a filtered value is passed to the velocity control loop. At step 242, the velocity control loop receives the commanded motor velocity as input. The microcontroller uses the velocity control loop to compare the actual velocity of the motor to the commanded velocity and output a signal for a driver for the motor.

Figure 13P:
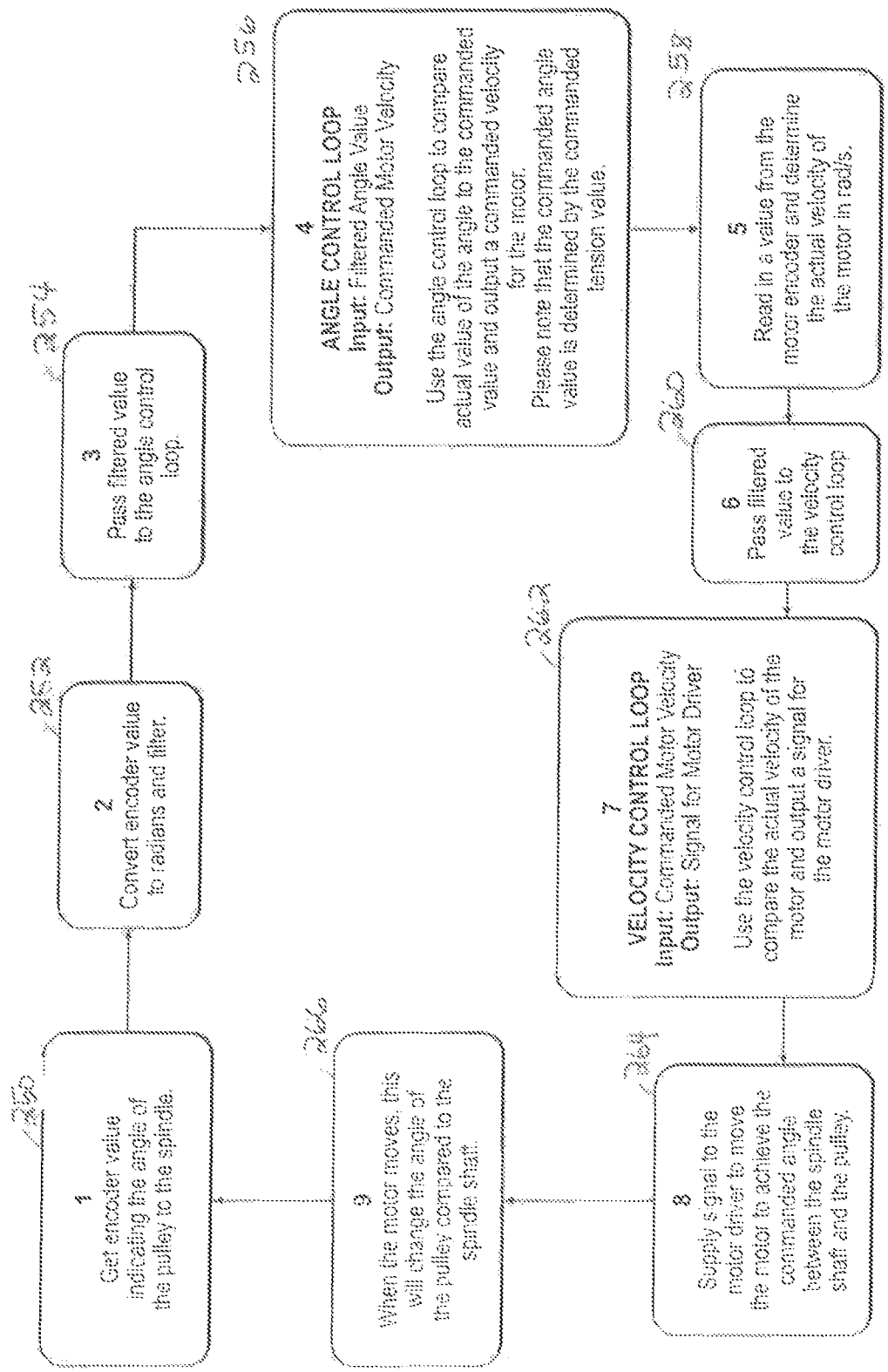

At step 244, the signal is supplied to the motor driver to move the motor to achieve the commanded position between the spindle shaft and the pulley. At step 246, the motor moves, changing a position of the pulley compared to the spindle shaft FIG. 13P illustrates a tension control feedback loop for the spooler, in accordance with exemplary embodiments. Steps 250-266 are performed on the microcontroller. At step 250, an encoder value is obtained indicating an angle of the pulley to the spindle. At step 252, the encoder value is converted to radians and the angle value filtered. At step 254, the filtered angle value is transmitted to an angle control loop.

At step 256, the angle control loop receives the filtered angle value as input. The microcontroller uses the angle control loop to compare an actual value of the angle to the commanded angle value, and outputs a commanded velocity for the motor. The commanded angle value is determined by the commanded tension value.

At step 258, a value from the motor encoder is obtained and an actual velocity of the motor in rad/s is determined. At step 260, the filtered value is transmitted to the velocity control loop. At step 262, the velocity control loop receives the commanded motor velocity as input. The microcontroller uses the velocity control loop to compare the actual velocity of the motor to the commanded motor velocity, and outputs a signal for the motor driver.

At step 264, the signal is supplied to the motor driver to move the motor to achieve the commanded angle between the spindle shaft and the pulley. At step 266, the motor moves, changing an angle of the pulley compared to the spindle shaft.

Figure 13Q:
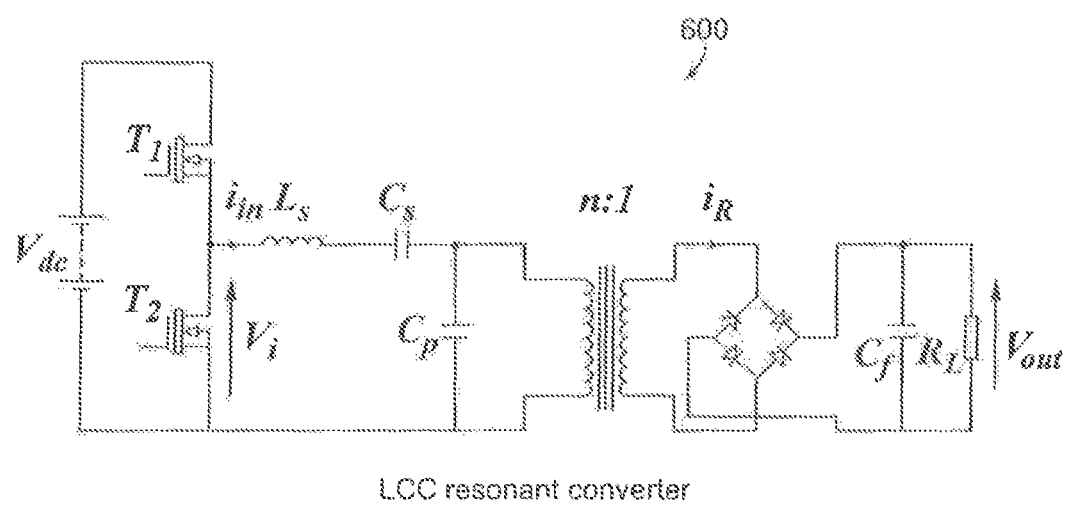

FIG. 13Q illustrates a high voltage and low voltage board 600. In an exemplary embodiment, the board 600 converts 390 volts of direct current (VDC) from the power factor controller (PFC) and electromagnetic interference (EMI) board to 1070 VDC 48 VDC, 24 VDC, 5 VDC, and other voltage rails that may be needed. The DC-DC topology chosen is line commutated converter (LCC). This is a zero voltage switching (ZVS) resonant converter topology. The resonant converter topologies offer many benefits, particularly increased efficiency, which affects compact design, component size, heat generation etc.

FIGS. 13R-13U illustrate heat control mechanisms located within a portable housing for the tether system.

Figure 13R:
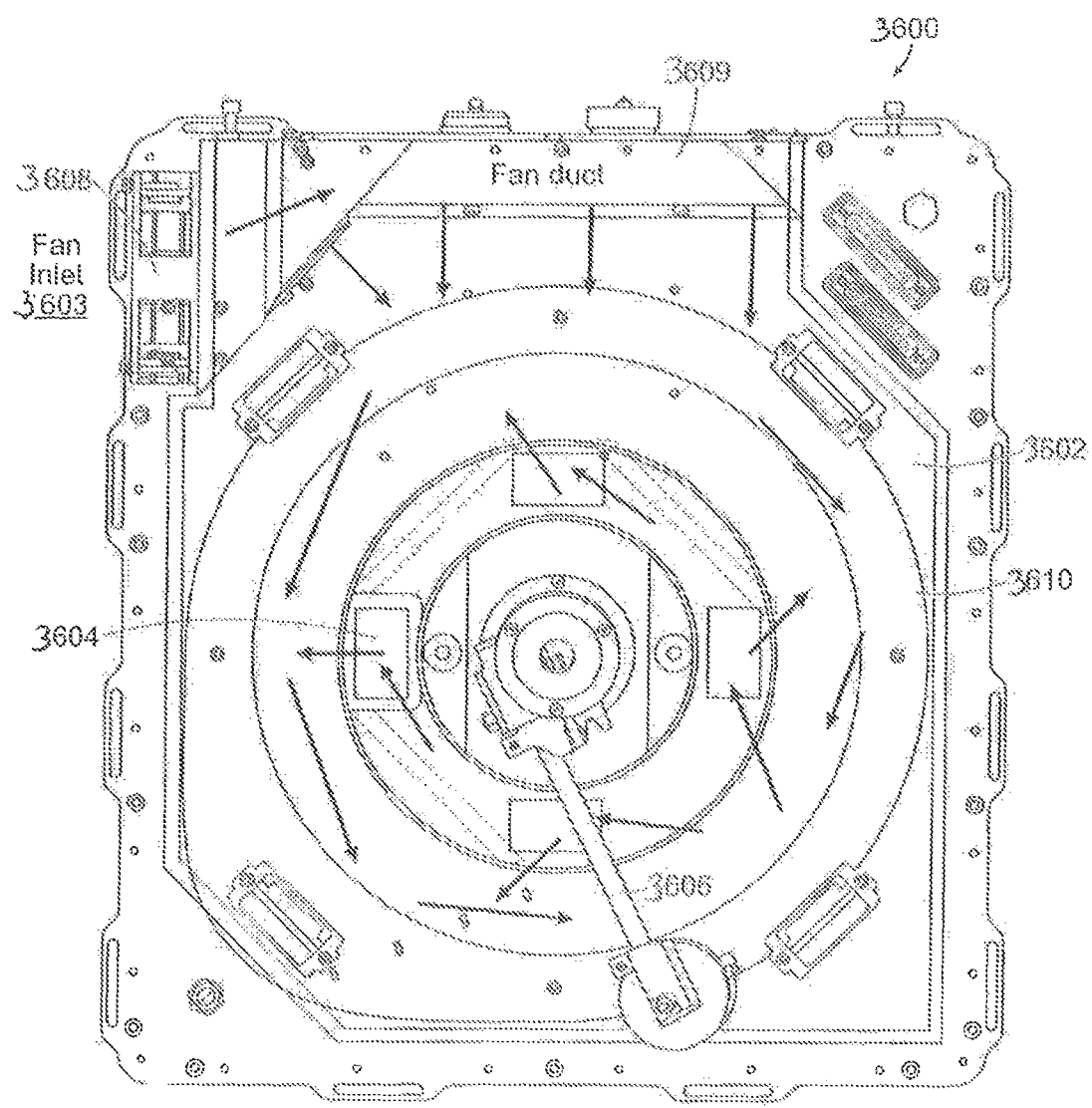

FIG. 13R illustrates a ducting layout 3600 for a tether deployment system within a portable housing, according to an exemplary embodiment. The portable housing includes a thermally conductive plate 3602 (also known as a cold plate), one or more air inlets 3603 from which to receive air into the portable housing, and one or more air vents 3604 from which to expel air from the plenum into the spool. A moveable arm 3606 and a fan 3608 are mounted on a first side of the thermally conductive plate 3602. In an example embodiment, a base controller is mounted on a second side of the thermally conductive plate 3602. The plate 3602 acts as a heat sink.

In an exemplary embodiment, air flows from the fan 3608 and fan duct 3609 into and across an air plenum 3610, directed by baffle walls to cover a maximum amount of surface of the plate 3602. The air exits the plenum 3610 though the one or more air vents 3604 (four rectangular holes) and into the spool plenum before traveling radially out, cooling the tether.

Figure 13S:
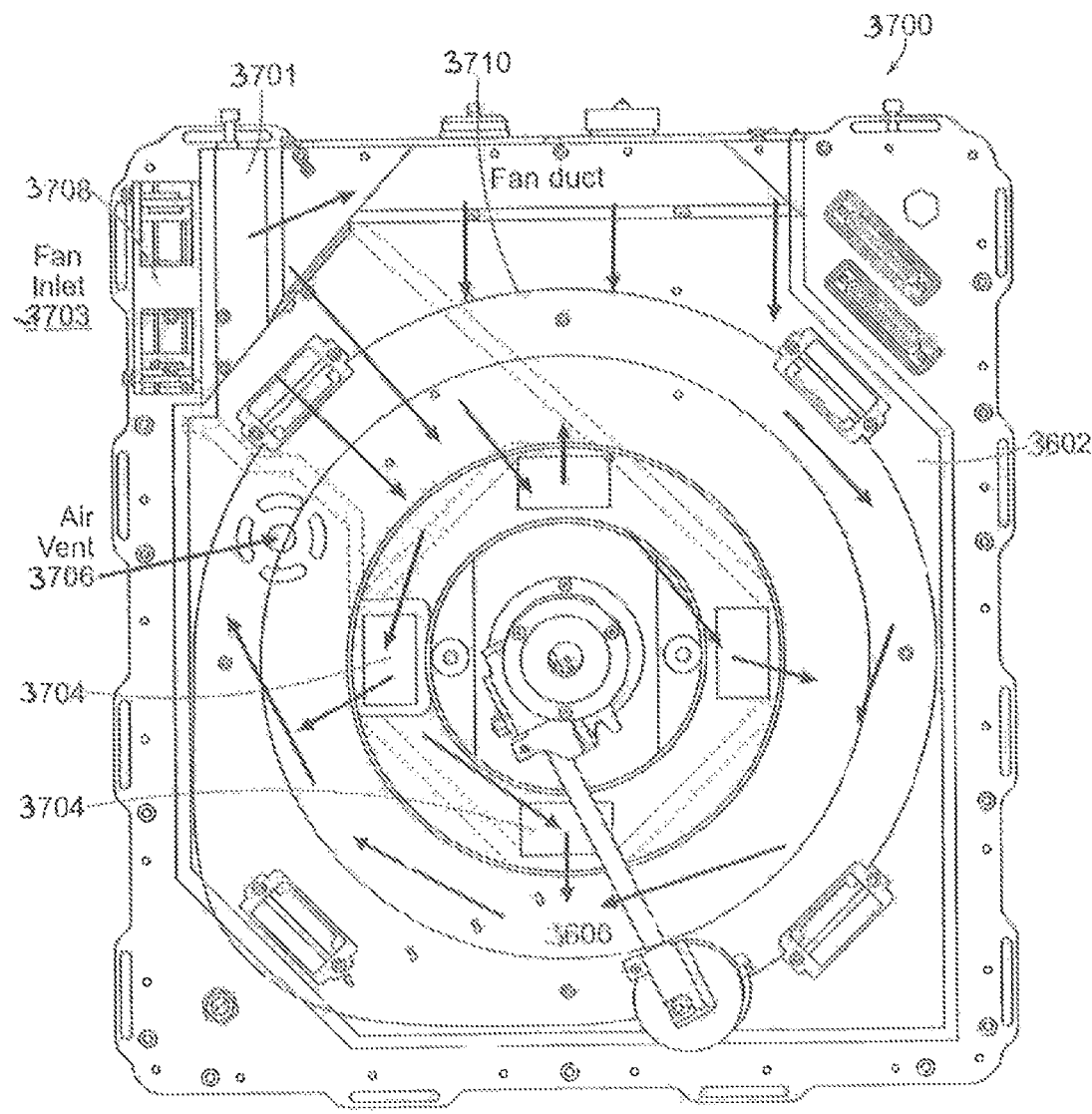

FIG. 13S illustrates a bifurcated ducting layout 3700 for a spooler within a portable housing, according to an exemplary embodiment. The bifurcated ducting layout 3700 includes a fan 3708 and is configured to deliver a bifurcated air flow to provide forced convection within the portable housing. The portable housing includes one or more air inlets 3703 from which to receive air into the portable housing and one or more air vents 3704 (four rectangular holes) from which to expel air from the portable housing.

The air path from the duct is bifurcated into a first path and a second path. The first path travels radially out to the one or more air vents 3704 into the spool plenum and exit radially from the spool, cooling the tether. The second path runs around the surface of the base plate and exits through a vent hole 3706. The advantage of this layout is that the airflow in the second path will not be impinged by the impedance of the tether when it is wrapped tightly on the spool.

In one embodiment, a portion of the bifurcated air flow is directed to the base controller affixed to the second side of the thermally conductive plate.

In some embodiments, the bifurcated ducting layout 3700 further includes a temperature sensor within the portable housing to monitor air temperature, and a servo configured to control the bifurcated air flow by adjusting the relative portions of a first portion and a second portion of the bifurcated air flow based on a monitored air temperature.

Figure 13T:
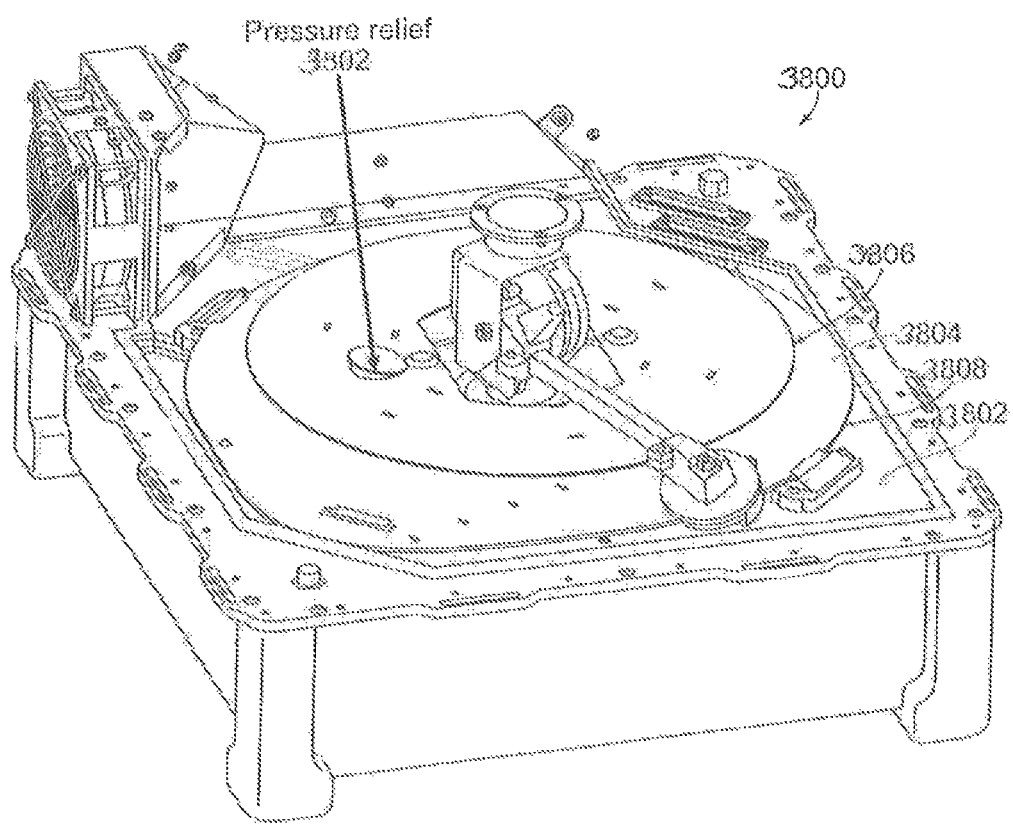
Figure 13U:
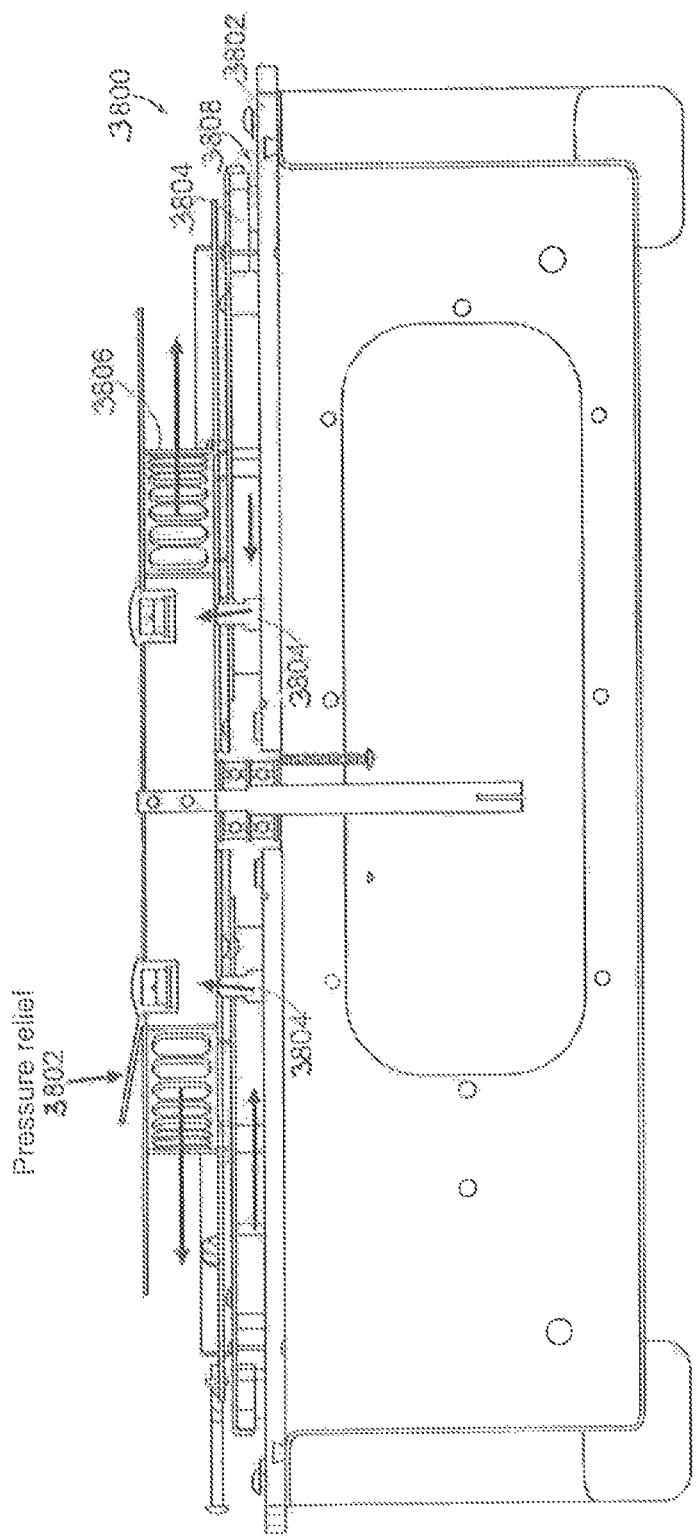

FIGS. 13T-13U illustrates a pressure relief ducting layout 3800 for a tether deployment system within a portable housing, according to an exemplary embodiment. Similar to ducting shown in FIG. 13S, the cooling fluid (such as air) travels in series over a thermally conductive plate 3802 into a spool plenum 3808 before entering one or more air vents 3704 and traveling radially out through the spool 3806, cooling the tether. The spool plenum 3808 is located between the thermally conductive plate 3802 and a cover plate 3804. In an event that the impedance of the tether wrapped tightly on the spool it too great and reduces the flow rate, the pressure will rise in the system. When this occurs, some air will bleed off through a pressure relief valve 3802. This will result in additional airflow in all parts of the ducting layout 3800. The pressure in the spool plenum 3808 is sufficient to result in adequate cooling of the tether.

In some embodiments, the ducting layout 3600, 3700, 3800 is servo-controlled, and includes an actuator that controls airflow to different areas of the spooler that need increased cooling. In additional embodiments, a humidity sensor is disposed within the portable housing and is communicatively coupled to a heat control mechanism within the portable housing.

In some embodiments, the tether includes exterior ridges configured so as to provide additional openings for air flow when the tether is wound around the tether retainer. The tether retainer is configured to accept an additional element wound around the tether retainer in addition to the tether so as to provide additional openings for air flow when the tether is wound around the tether retainer.

Figure 14A:
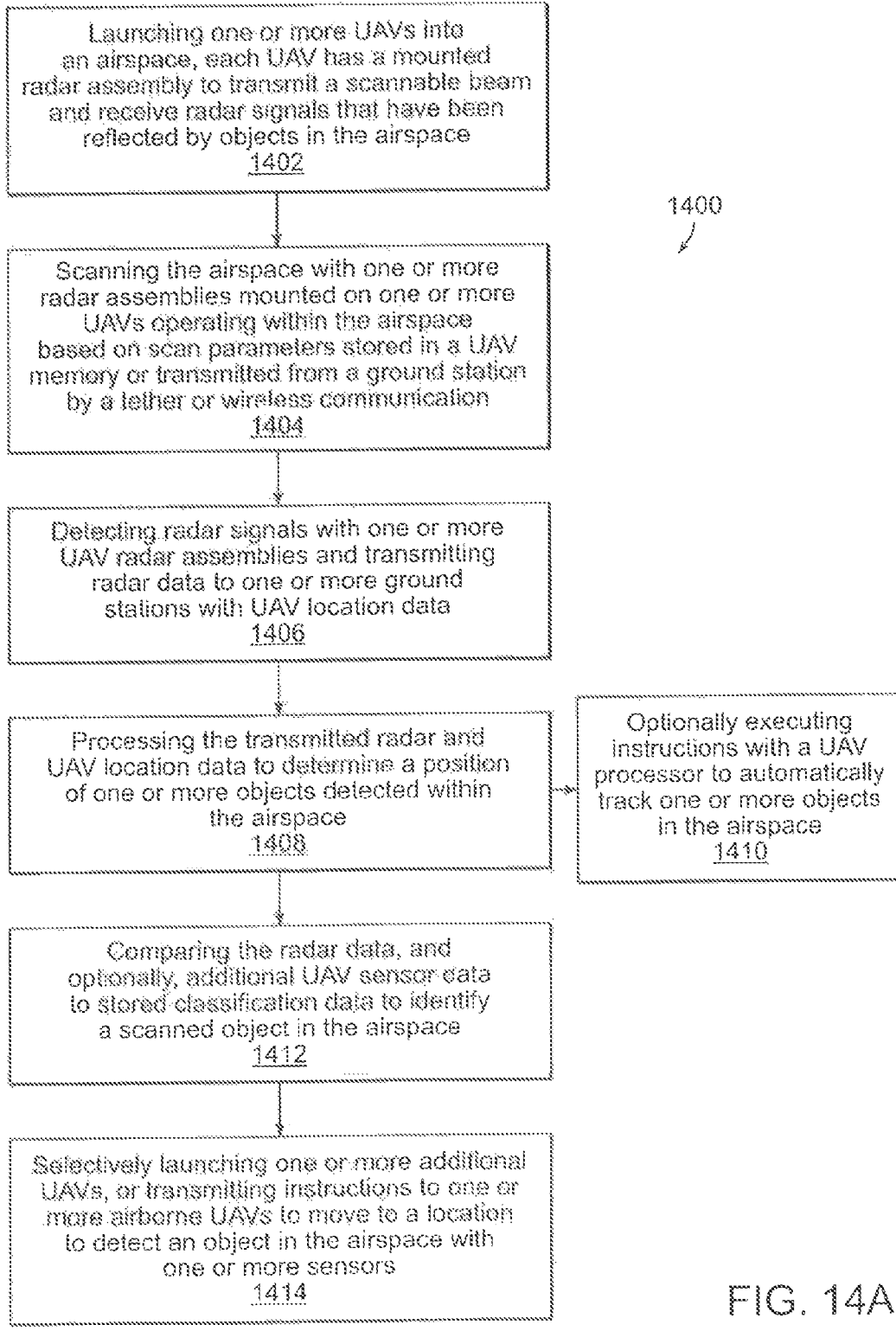
FIG. 14A illustrates an exemplary process sequence for operating networked UAV systems in an embodiment.

The system can be used, for example, to provide data used to avoid or prevent collisions between aircraft including airplanes, helicopters and UAVs operating within the airspace or to detect, track, classify potential UAVs. The UAVs operating within the radar network can be programmed to adjust their positions or trajectories to avoid collisions with other aircraft or objects such as buildings located within their operational airspace. Such a method 1400 is illustrated in FIG. 14A in which a radar assembly mounted on one or more UAVs is used to identify and track objects. The UAVs can include high lumen LEDs for communication between network nodes. The LED emitters can be configured to transmit controlled light patterns for low bandwidth data communication between UAVs. Thus, UAV nodes that are disconnected from the network, for example, can send real-time DTC data to and from other network nodes.

The plurality of UAVs can be positioned in a specified stationary pattern or grid. The pattern can be any desired three dimensional pattern such as where the UAVs are positioned equidistant from each other in a plane at a specified altitude above the ground. Alternatively, one or more UAVs can be undergoing a specified movement relative to each other, or the ground, or other airborne objects being scanned by the radar system. The UAVs can also be positioned based on the ground topography under the array of UAV radar nodes, or positioned relative to structures such as buildings located underneath the array. The buildings can have a height that extends up to or above one or more UAVs in the array. The UAVs can operate under independent control and can change position within the radius defined by the maximum tether length from a fixed ground station. The tethered UAV can also be launched from a moving vehicle as described in U.S. Pat. No. 9,290,269, the entire contents of which is incorporated herein by reference. This enables one or more UAVs as described herein to be moved to cover a different scanning region while remaining tethered.

A further preferred method of operating one or more UAVs involves operating one or more UAV radar nodes in autonomous mode, that is, without a tether. This can occur, for example, by detaching a tether from a previously launched UAV or by launching a tetherless UAV to enable imaging and tracking of a moving object. A UAV launched to approach or track another object such as an aircraft can employ a sensor that receives reflected radar signals from an object and can automatically move towards the object. The UAVs described herein can be mounted with acoustic or RF sensors that can identify the objects such as other UAVs having known signature emissions. For example, a sensor that can sense RF emissions in the range of 433 MHz to 6 GHz can be used to identify other UAVs within a 1-2 km range.

Figure 14B:
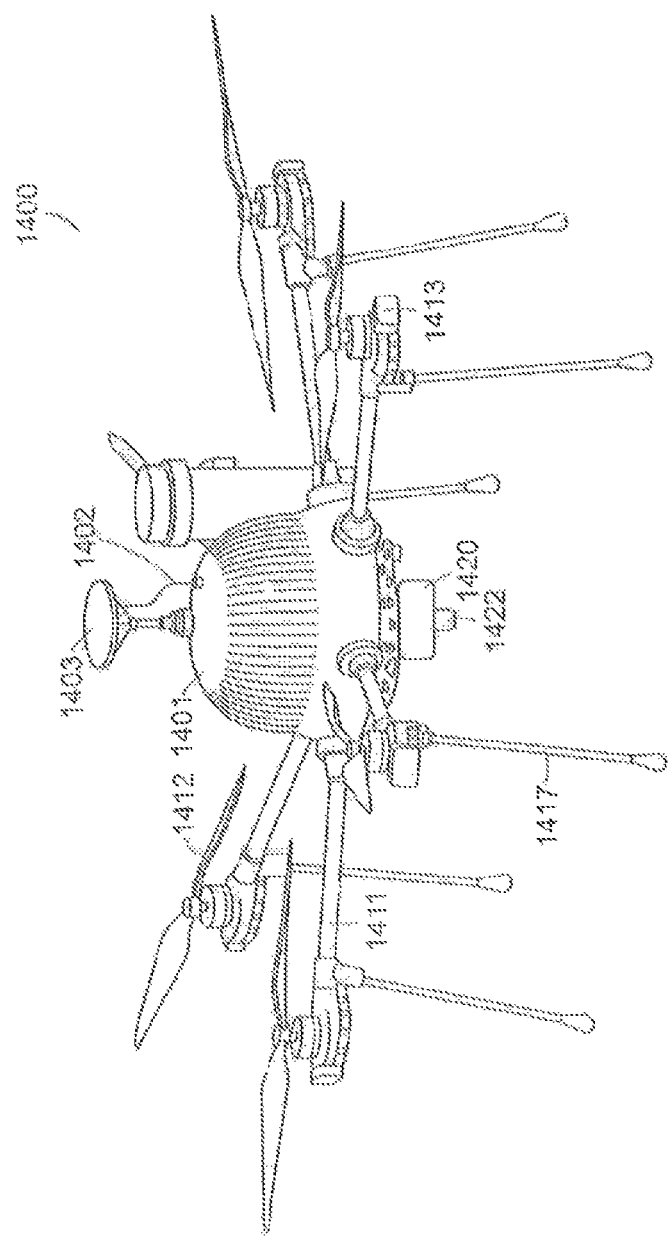
FIGS. 14B-14T illustrates additional embodiments for UAV operation.

The UAVs can employ different scanning methods based on their position within the array. Each UAV can, for example, be instructed to scan a given field of view by rotating in a full circular scanning pattern, or through a given angular range. A beamsteering circuit device can be mounted on the UAV that can be programmed to perform scanning of a number of selectable scan areas or volumes at selectable resolution and signal amplitude. This enables the use of one or more UAVs within the array to focus on a particular region in which one or more objects are being actively tracked. Each UAV can use the flight control system to rotate and/or translate the UAV in space to scan a particular field of view, or use a gimbal mounted radar emitter to control beam direction, or can also use electronic scanning alone or in combination with one or more of these scanning modes to control beam direction. An aerial vehicle including a mounted radar assembly 1420 and a camera 1422 can be configured on a gimbal along the central axis of the vehicle as shown in FIG. 14B.

A critical aspect for operation of a UAV launched radar assembly is relative and absolute geographic location of the UAV. Unlike traditional ground based radar systems, where the position of each radar station is fixed, UAV based radar assemblies can alter position, including during each scan interval. This change in position can be continuous or periodic for example. The global positioning system (GPS) coordinates of the UAV are frequently updated and transmitted with the acquired radar data so that system users can accurately identify the location and velocity of identified objects at each scan interval. Thus, each UAV has a GPS device mounted thereon to establish the UAVs position. Each UAV can also have one or more motion sensors that can be used to provide estimated position data that is periodically updated if current GPS coordinates are not available. One or more onboard optical sensors or imaging devices can also be used to transmit data that can be used for identifying UAV position. Additionally, other ground or UAV based radar assemblies can also determine a UAV's position when a GPS signal is being denied to the UAV either intentionally by malicious actors or for benign reasons such as, but not limited to, geography, buildings and weather.

In one embodiment in which a GPS signal is denied to the UAV, for example, such as may occur when the UAV is navigating indoors, among tall buildings in a city environment, or when the UAV otherwise loses its ability to acquire a GPS signal, the GPS signal may be replaced by location data indicating the UAV's position that is based on radar. For example, in an embodiment, the location data may be provided by a base station equipped with radar that is able to identify the UAV in its radar field. The location of the UAV can be calculated by the control station based on the radar data in combination with the control station's knowledge of its own position. The calculated position based on the radar may be communicated to the UAV for use in place of the missing GPS location data. In another embodiment, the base station may not be equipped with its own radar but may be receiving radar data from a separate radar device that is able to track the UAV. The UAV's position may again be calculated using the radar data and the position of the radar device and provided to the UAV for use in place of the missing GPS data.

It should be appreciated that other techniques may also be used to substitute radar-based location data for missing GPS data that do not rely on ground-based radar. For example, in one embodiment, the UAV may be equipped with radar and may acquire other UAVs and/or the base station with which it is in communication in its radar acquisition field. In such a case, the UAV may receive GPS or otherwise-derived locations from the other UAVs or the base station and use that information in combination with the radar data to determine its own position. In another embodiment, the UAV may provide its radar data of other objects with known locations to the base station which may calculate the UAV's position and return the calculated position data to the UAV. It will be appreciated that radar data acquired by the UAV of other known positions can also be used by the UAV in combination with the known position locations to provide substitute location data for the UAV when a GPS signal has been denied during UAV operation.

Figure 14C:
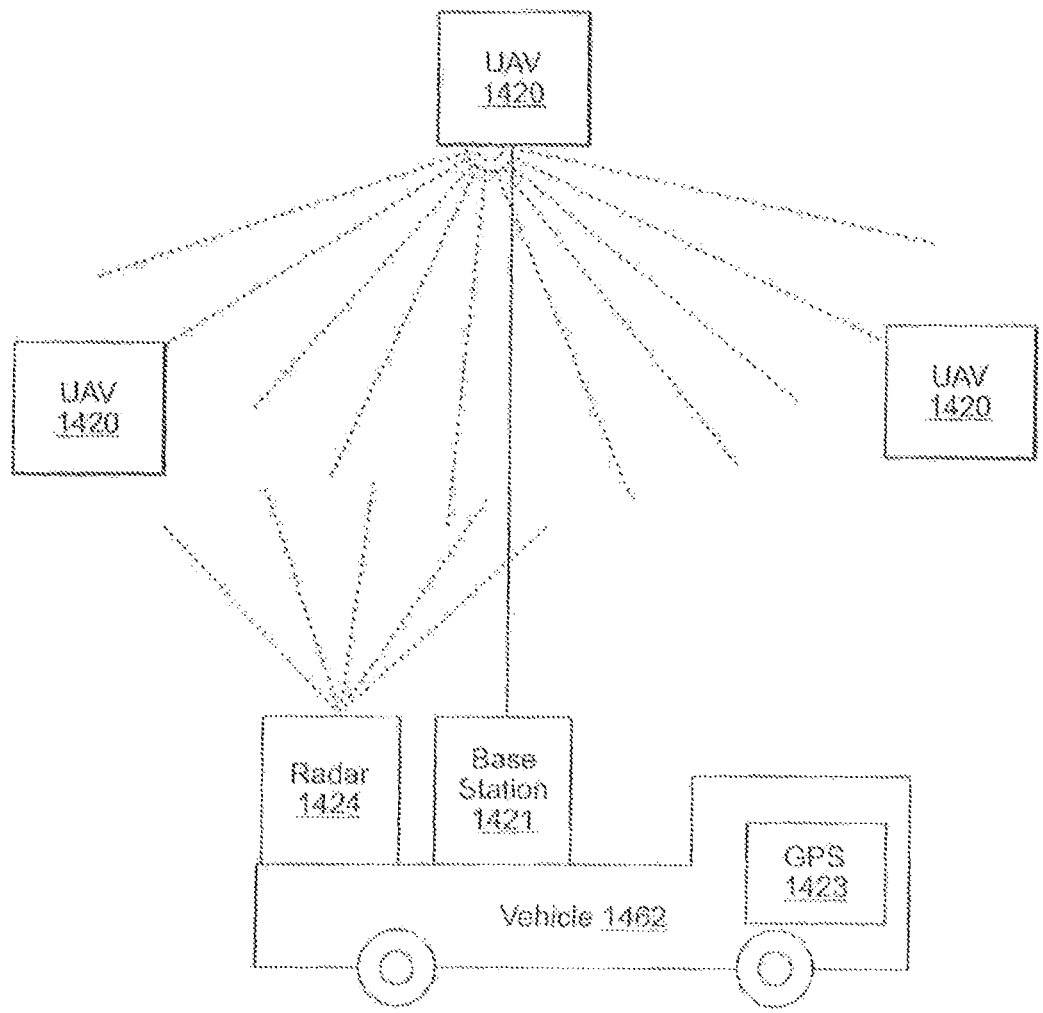

FIG. 14C depicts an exemplary embodiment with a UAV equipped with radar that is communicatively coupled to other UAVs 1422 and 1424 that appear in its radar acquisition field. In the case of a GPS-denied situation affecting UAV 1420 but not UAVs 1422 and 1424, UAVs 1422 and 1424 may provide their GPS location data to UAV 1420 which indicates their respective positions and UAV 1420 may cross-reference the provided GPS data with radar data it has acquired that indicates the location of the other UAVs with respect to its current position in order to calculate its own location. The GPS data from UAVs 1422 and 1424 may be provided to UAV 1420 directly (e.g.: via wireless communication) or may be transmitted first to base stations (not shown) for UAVs 1422 and 1424 and then forwarded to UAV 1420 via base station 1421 (e.g. over an optical tether connecting base station 1421 and UAV 1420).

In one embodiment, the base station 1421 to which the UAV 1420 is coupled may also provide location data to the UAV to use in place of the denied GPS data. For example, base station 1421 may be located on and be transported by a vehicle 1462 and the vehicle 1462 may be equipped with a GPS device 1423. The GPS data from the GPS device 1423 that indicates the location of the vehicle 1462 may be provided to UAV 1420 over an optical tether and be utilized by the UAV 1420 in determining its position. In another embodiment, the vehicle 1462 transporting the base station 1421 may also be equipped with its own radar 1425 in addition to, or in place of, GPS device 1423. Radar 1425 may track UAV 1420 in its radar acquisition field and may supply the acquired data to UAV 1420 over an optical tether (via base station 1421), wirelessly or in some other manner. It should be appreciated that in an alternate implementation, radar 1425 may not be physically located on vehicle 1462 but instead may be close enough in the vicinity to both track UAV 1420 and communicate the radar data to the base station 1421 for forwarding to UAV 1420. In an alternate embodiment, radar 1425 may communicate the radar data indicating the position of UAV 1420 directly to the UAV without first transmitting the radar data to base station 1421.

Figure 14D:
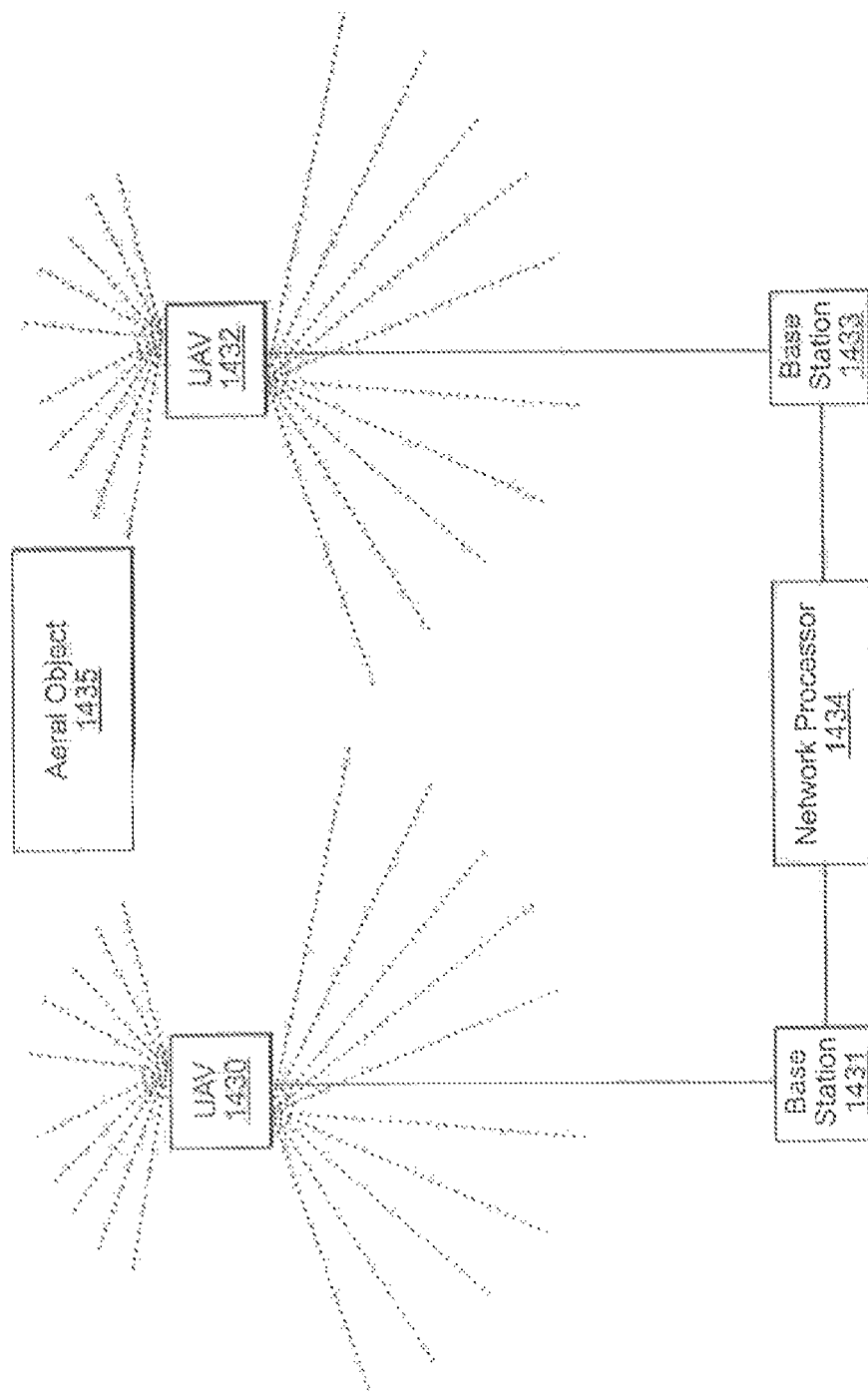

FIG. 14D depicts an exemplary embodiment with UAV 1430 equipped with radar that is communicatively coupled to base station 1431. In the case of a GPS-denied situation affecting UAV 1430, base station 1431 may provide its own location, derived via GPS or otherwise, to UAV 1430. UAV 1430 may cross-reference the location data of base station 1431 with radar data it acquires indicating its position with respect to the base station to calculate its own location. UAV 1430 may also utilize additional known information such as the current deployed length of a tether connecting UAV 1430 to base station 1431 to determine its position.

In one embodiment, another UAV 1432, may be within a radar acquisition field of UAV 1430 and be coupled to base station 1433. UAV 1432 may provide its location, derived from its own GPS signal or otherwise determined, to its base station. Base station 1433 may be connected in a wired or wireless manner to a network processor 1434 that is also in communication with base station 1431. It should be appreciated that network processor 1434 may be integrated with a base station or may be located in a separate computing device. Base station 1431 may receive the location data indicating the position of UAV 1432 that was provided to base station 1433 from network processor 1434 and may communicate that location data to UAV 1430 over an optical tether or in another manner. UAV 1430 may combine that location data with radar data it has acquired that indicates the position of UAV 1432 to determine its own position.

In another embodiment, network processor may receive radar data from UAV 1430 (via base station 1431) and GPS and/or radar data from UAV 1432 (via base station 1433) and may perform calculations to determine the location of UAV 1430 using the received data. The calculated position may be forwarded to UAV 1430 via base station 1431 to be used by UAV 1430 for navigation and/or data acquisition purposes.

In one embodiment, UAV 1430 and UAV 1432 may both be tracking aerial object 1435 via onboard radar or other sensors such as acoustic transducers or imaging devices that can be used to identify and track moving objects. For example, aerial object 1435 may be a plane, helicopter, balloon, missile or other airborne object being jointly tracked by UAV 1430 and UAV 1432. UAV 1432 may communicate its radar data regarding aerial object 1435 to UAV 1430 via base station 1433, network processor 1434 and base station 1431. UAV 1430 may combine the radar data received from UAV 1432, with its own acquired radar data relating to aerial object 1435 and other determined location data for UAV 1432 (e.g. a radar determined location or GPS provided location from UAV 1432) to determine its own position. In an alternate embodiment, UAV 1432 may transmit its acquired radar data relating to aerial objet 1435 and/or its GPS data directly to UAV 1430 rather than transmitting the information via base station 1433, network processor 1434 and base station 1431. In one embodiment, UAV 1430 and UAV 1432 may provide radar data from tracking aerial object 1435 to network processor 1434 in order for network processor to calculate a current position of UAV 1430.

Figure 14E:
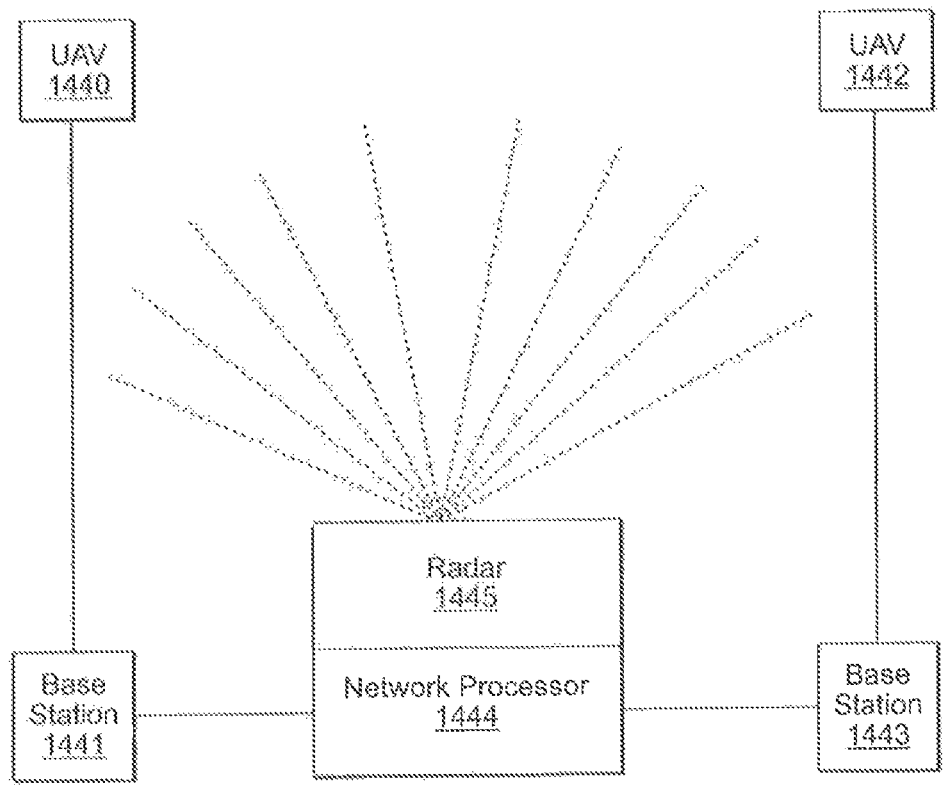

FIG. 14E depicts a UAV 1440 that is coupled to base station 1441. Base station 1441 is in communication with network processor 1444 and radar device 1445. Similarly, UAV 1442 is coupled to base station 1443. Base station 1443 is also in communication with network processor 1444 and radar device 1445. UAV 1442 may provide its own GPS derived location to network processor. Radar device 1445 is able to acquire UAV 1440 and UAV 1442 in its radar acquisition field and may provide radar data to network processor 1444. Radar device 1445 may also provide its own location, derived via GPS or otherwise, to network processor 1444 to cross-reference with the radar data (and optionally GPS data obtained from UAV 1442) to calculate a position for UAV 1440 which may be returned to UAV 1440 for navigational and/or data acquisition purposes.

It will be appreciated that the above-examples of calculating a substitute location for a UAV when the UAV loses a GPS signal are illustrative rather than exhaustive and that other approaches are also possible within the scope of the current invention. For example various forms of radar, lidar and other sensing technologies may be used without departing from the scope of the present invention.

In one embodiment, when a GPS signal is denied to the UAV the UAV may determine its altitude, location and/or orientation with the assistance of one or more IR LED emitter arrays or solid state laser arrays (hereafter "emitter arrays") provided in one or more small ground-based modules. In an embodiment, the modules may be circular in shape and 3-5 inches in diameter. FIG. 14F depicts an exemplary emitter array 1450 in an embodiment. An optical sensor deployed on the UAV may detect the signal projected from the emitter array(s) and determine the altitude, orientation and/or location of the UAV based on detected signal strength from a single or multiple emitter arrays and/or by triangulating signals received from multiple emitter arrays. In one embodiment, a signal emitted from the emitter arrays may be detected by the UAV at least at a distance of 150-200 meters.

Figure 14G:
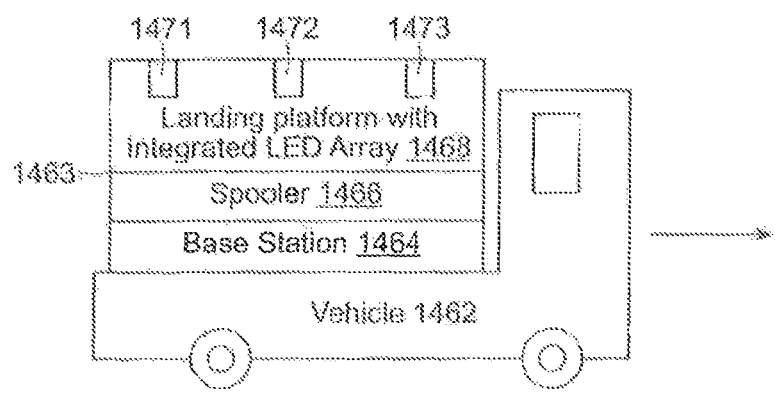
Figure 14H:
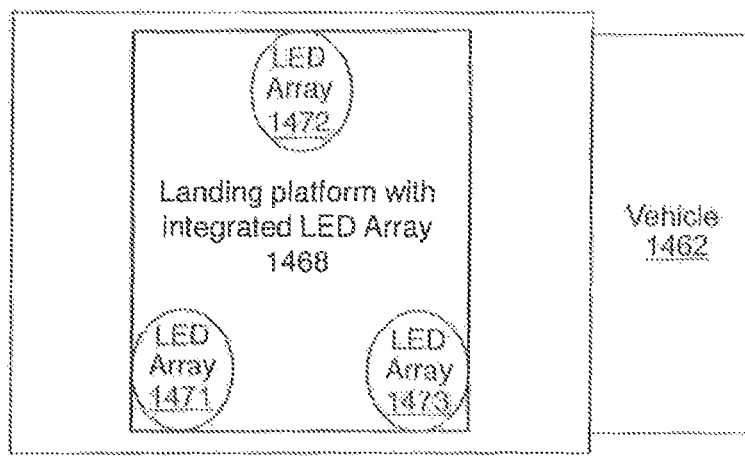
Figure 141:
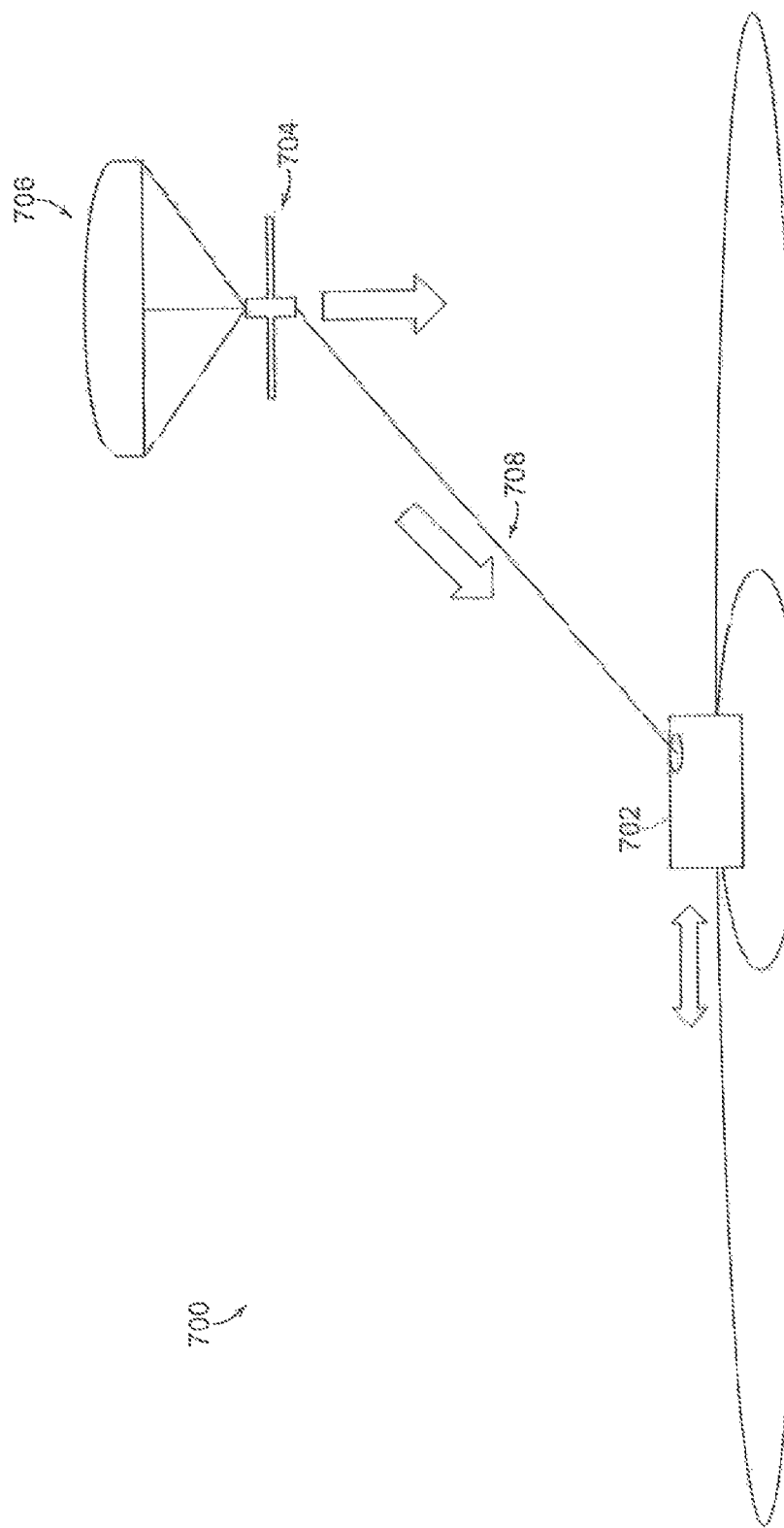

The one or more emitter arrays may be deployed in a number of different locations. For example, in one embodiment, depicted in FIG. 14G, one or more emitter arrays 1471, 1472 and 1473 may be integrated into a mobile landing platform 1468 that is coupled to a housing 1463 that encompasses a base station 1464 and spooler 1466 connected to UAV 1460. The housing 1463 is supported (and transported) by a vehicle 1462. In some embodiments, the spooler 1466 may be a passive spooler or a spooler controlling tension on the optical tether via a torsion spring. FIG. 14H depicts a top view of the mobile landing platform 1468 with integrated emitter arrays 1471, 1472 and 1473 and vehicle 1462. An optical sensor on UAV 1460 may utilize the signals propagated by emitter arrays 1471, 1472 and 1473 to determine its position, orientation and/or to land on the mobile landing platform. For example, in an application where a UAV must follow a moving vehicle, boat, or towed landing platform, the signals from the emitter arrays in the mobile landing platform will allow for precision takeoff/landing using a local X-Y position reference frame and altitude/orientation computation.

The one or more emitter arrays may also be deployed in a number of alternative locations instead of being integrated into a mobile landing platform. In one embodiment, an emitter array is attached to a spooler providing the optical tether to the UAV 1460. In another embodiment, a landing zone may be surrounded by multiple emitter arrays. Alternatively multiple ground-based emitter arrays may be deployed but not mark a landing zone. In one embodiment, a vehicle transporting a base station and spooler may also be equipped with one or more emitter arrays. Similarly, a stationary base station may also include one or more emitter arrays. It should be appreciated that the above examples of emitter array locations are for illustration and other emitter array locations are also within the scope of the present invention.

The optical sensor onboard the UAV may be coupled to a dedicated processor for processing image data. For example, in one non-limiting example, the optical sensor may be a CMUcam5 Pixy™. The optical sensor may use a standard 5MP imager, decimated down to a 300×200 image size and standard small M12 lenses with 2 additional filters between the lens and sensor chip. One filter may be a 950 nm+/−5 nm IR narrow bandpass filter, while the other filter may be a wide pass filter only used for frequencies above 800 nm. The lens may be slightly defocused to allow a greater diameter defocused "blob" to be imaged, e.g. when detected at long distances, even a 100 mm emitter array can appear as a point source. Defocusing is needed if the optical sensor requires a contiguous 2×6 pixel area to be detected. It should be appreciated however that other readout methods can be employed, as well as linear X-Y PSD sensing diodes in lieu of a CCD/CMOS imager array.

In one embodiment, the optical sensor samples and decimates at 50 hz and an embedded ST processor reads this result into RAM for analysis. At 200 imager rows, this is 100 microsecond per row readout. Therefore, in one embodiment, the emitters in the emitter array may be configured to flash at 100 microsecond, or 10 khz. The clocks at the emitters and optical sensor drift and are not exact phase or frequency aligned which causes a low frequency aliasing or beat frequency to occur in the image frame. To counteract this occurrence, the frequency may be dithered every frame, or every 20 ms, to remove long term frame to frame aliasing. The system is very intolerant of specific dithering, and can be randomized.

The UAV may use the data acquired via the optical sensor to track its position, height and/or orientation in place of the missing/denied GPS data. Altitude can be roughly estimated by the received pixel "blob" intensity since the "blob" gets smaller and less intense with distance. This distance measurement range is 10-100× that achievable with SONAR techniques, for example. Even at distances where the baseline emitter arrays cannot be resolved to compute a distance, each emitter array can be alternately "strobed" at below 50 hz, so that an exact sub-pixel "blob" centroid can be computed. This results in 1030X improvement in resolution capabilities. Since the optical sensor is programed to see a small (<5%) intensity change between successive frames on the same "blob", modulating the LED emitters to meet this criteria results in zero false positives. Thus, sunlight, and reflections from water/moving autos, snow, etc. have limited effect.

The UAV may be provided with one or more optical sensors in one or more configurations. For example, in one embodiment, the UAV may be deployed with a single gimbaled optical sensor with a 12 mm focal length lens that reduces baseline requirements to about 1 meter. With the gimbaled 12 mm focal length lens, ground coverage at 125 m is 11.1 deg×7.6 deg and 30 m×17 m. With a shorter gimbaled optical sensor with a 2.8 mm focal length lens ground field coverage of 71 deg×47 deg and 181 m×100 m at 125 meters is provided. Alternatively, the UAV may be deployed with 2 optical sensors (which weigh less than 1 gimbaled optical sensor) with differing focal lengths to cover both low and high altitude with similar absolute position error.

In an embodiment the emitter array provides greater than 40 W of optical power. Additional optics may be used over a wide angle LED to collimate a beam resulting in an increase in optical flux.

In addition to enabling a UAV to determine its location, orientation and/or altitude, the emitter array is also able to act as an optical telemetry emergency system for RF communications loss thereby providing an additional way to communicate with the UAV from the ground. While jamming usually takes out all RF communications, including WIFI, ISM frequencies and navigation frequencies, optical modulation can be transmitted at a 10 kHz rate in the event emergency instructions are needed to reach the vehicle.

The exact configuration and deployment of the light emitter arrays may vary depending upon the UAV's flight mode. For example, a wide beam array (with no reflectors) may be used for gusty or on the move landings. A main high power beam may be used for high altitude operation using collimated reflectors. Less optical power may be used at a low altitude such as when the UAV is landing. During gusty conditions, pitch/yaw extremes can cause jitter with narrow (10 degree) optics and so divergence is increased to +/−20 degrees. In an embodiment, optical power from the emitter arrays can be programmed by a user depending on flight modes, conditions and the performance required. For example, the emitter array may accept RS232 commands and data streams from a controller and may allow a 20:1 change in output power on each of 3 individually addressable LED channels. In one embodiment, the emitter arrays are communicatively coupled with the OCU (e.g., OCU 50 in FIG. 1) which may provide a user interface to adjust the emitter array settings. Since LED's can be easily damaged by overcurrenting, a circuit may be provided to limit the safe LED current. The LED's can be safely overpowered when in low duty cycle operation (up to 5× the optical power over DC conditions). Heat may be removed by a low thermal resistance aluminum or copper core PCB which is fan cooled. LED power and temperature as well as error/warning messages may be passed to the controller from the emitter array.

In an embodiment, the LED power may be modulated to requirements of the unsynchronized emitter arrays and the receiving optical sensor capabilities. In an exemplary emitter array, a "HI" signal with a programmable fixed period may be used to drive a Mosfet ON and cause current to flow. The longer the ON time, the higher the emitted power from the array and longer the range of the emitted signal. The low time (when the HI signal is not being provided) is modulated. All 3 channels can be active simultaneously since all start HI at the same time. This approach maximizes the total optical power over wide and narrow beams. Individual arrays/elements can be strobed. The optical sensor can track several simultaneous objects as long as there is modulation present. Thus two or more ground beacons separated at a given baseline allow for triangulation of height, and/or vehicle orientation.

It will be appreciated that the above-examples of IR LED or solid state laser emitter arrays are illustrative rather than exhaustive and that other approaches are also possible within the scope of the current invention.

A power management system on board each UAV can be used to allocate power most efficiently to the systems being utilized at any given time. One or more onboard processors can be used to monitor and allocate power. If additional power is needed, for example, the system allocates power to enable use of the radar system to track a particular target and also operate other on board sensors, such as a CCD, CMOS or infrared imaging device to generate images of one or more detected objects within the scan area. Thus, an onboard power management processor can be programmed to employ a software module that is configured to instruct a power management controller to allocate power based on a prioritized ranking of tasks to be performed. A more power consuming radar scanning protocol, for example, can cause the controller to limit power to other UAV operations without impacting flight control. The system user can be alerted to circumstances in which power thresholds are exceeded and necessitate power limiting operations. Under certain circumstances, the tethered system can be flown in autonomous mode, for example. In these circumstances, power utilization and control will operate based on different criteria than in powered tether mode. In other circumstances, when operating based on power supplied by the tether, the system can be configured to also utilize onboard battery power that is available to supplement the tethered power level.

The system can also include systems and methods for data fusion of data generated by one or more of the UAVs in the array. In a preferred embodiment, radar generated data such as velocity data associated with an object being detected and/or tracked by a first UAV mounted radar assembly can be processed with radar generated data including velocity data associated with the same detected object by a second UAV mounted radar assembly. Due to the speed, trajectory, elevation and distance of a detectable object from each element in the UAV radar array, each unit in the array can generate a different velocity value for the object at each point in time. It is desirable to generate more accurate velocity and position information regarding the detected object by altering the scan parameters of one or more of the UAV radar assemblies in subsequent scan intervals. It can be desirable for example, to select a subset of the available UAV radar units to which have its scan parameters revised in subsequent scan intervals to select a given object for tracking.

A critical aspect for operation of a UAV launched radar assembly is relative and absolute geographic location of the UAV. Unlike traditional ground based radar systems, where the position of each radar station is fixed, UAV based radar assemblies can alter position, including during each scan interval. This change in position can be continuous or periodic for example. The global positioning system (GPS) coordinates of the UAV are frequently updated and transmitted with the acquired radar data so that system users can accurately identify the location and velocity of identified objects at each scan interval. Thus, each UAV has a GPS device mounted thereon to establish the UAVs position. Each UAV can also have one or more motion sensors that can be used to provide estimated position data that is periodically updated if current GPS coordinates are not available. One or more onboard cameras or imaging devices can also be used to transmit region that can be used for identifying UAV position. Additionally, other ground or UAV based radar assemblies can also determine a UAV's position.

Further embodiments can be used to enable use of additional UAVs that are not radar equipped to be launched or instructed to move to a position in closer proximity to an object identified by the radar network to track the object or obtain images of the object, such as a UAV, that is crossing the scanned airspace.

Radar assemblies that can be used to a single radar node or multimode UAV system are available from Echodyne, Inc. Such devices and methods are described in U.S. Pat. No. 9,268,016, the entire contents of which is incorporated herein by reference. The radar panels can be flat or shaped to provide control over steering a high gain beam. The emitter panel comprises a two or three dimensional array of elements that are switched or on off in a controlled pattern. The emitter array can comprise a printed circuit board emitting in a range of 5 GHz to 33 GHz, for example.

The UAV radar network can utilize multipath reflections from buildings, for example, to scan spaces between buildings that extend beyond a direct line of sight (LOS) detection path. Thus, non-LOS methods can be employed to detect objects. A classification protocol can be employed in which one or more attributes of a detected object is used to characterize and/or identify a detected object within a networked UAV sensor system field of view. Objects within the field of view of a UAV node that are known can include a reflector device that reflects the UAV node radar signal. This operates to simplify classification of known objects, such as other UAVs within the network. Pattern recognition algorithms can be used to assist in the classification process.

FIG. 14I illustrates a ground station 702 reeling in an UAV 704 with a deployed parachute 706. The ground station 702 pulls the UAV 704 into the ground station 702 while the UAV 704 is descending after a parachute or motor out descent.

During a system flight there may be a time when the parachute 706 may be deployed, or the UAV 704 will experience a motor out event. In this situation, the UAV 704 is in a parachute or motor out descent. The ground station 702 then begins reeling in filament 708 and pulling the UAV 704 mass toward a filament intake of the ground station 702 while the UAV 704 descends. This controls a location where the UAV 704 touches down, mitigating risks of the uncontrolled descent.

Figure 14J:
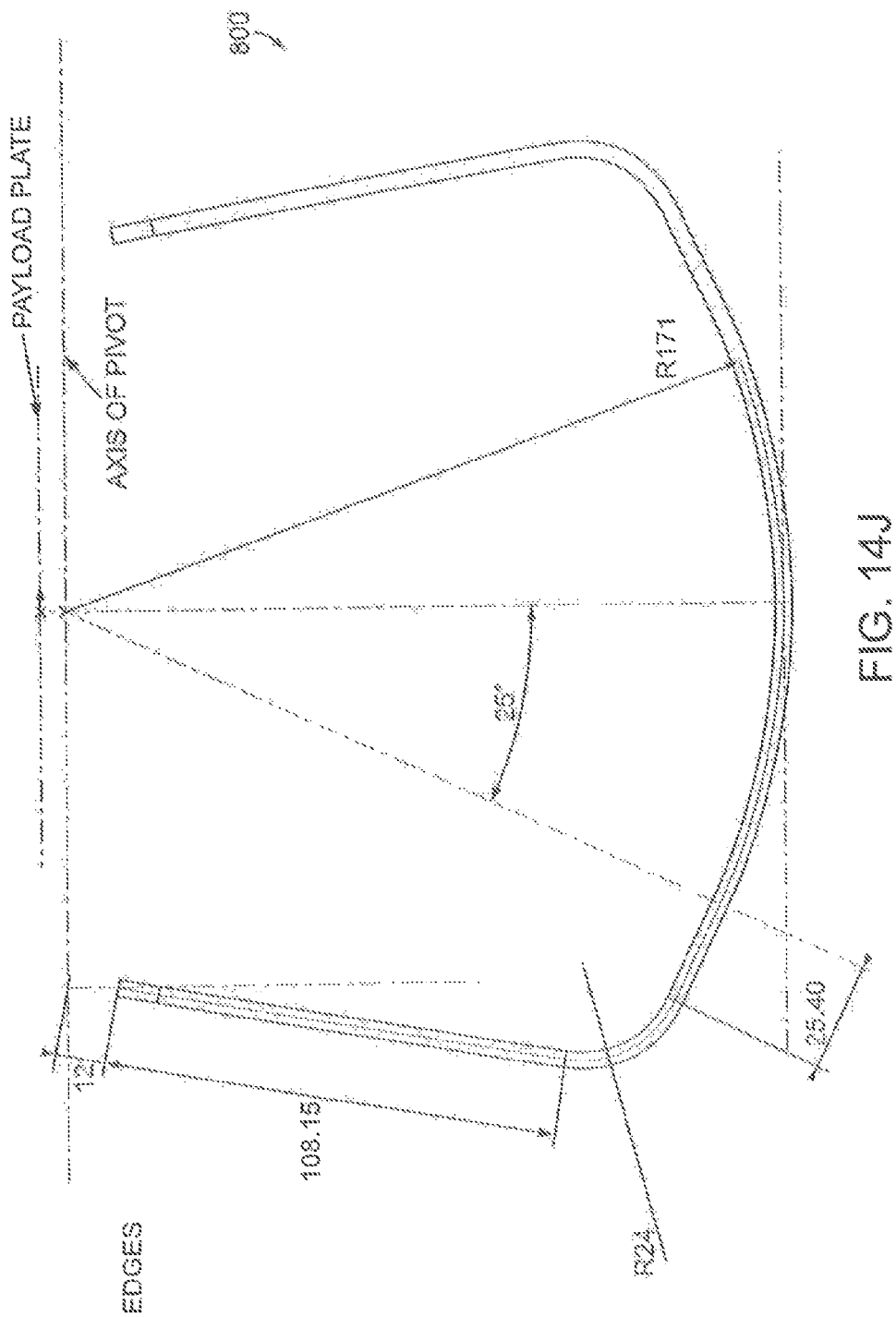

FIG. 14J illustrates a pivoting tether hoop 800 attached to an UAV, in accordance with an exemplary embodiment. The hoop 800 is configured to swing on one axis and includes a movable attachment for the tether. In some embodiments, the hoop 800 has straight arms; in other embodiments, the arm may be curved. In an exemplary embodiment, the angle of the tether to the center of gravity is between 25-30 degrees. The tether vector preferably intersects the center of gravity of the UAV and payload. This ensures that the tether does not apply a moment to the UAV. Because the center of gravity is above the payload plate (approximately in the battery area), the tether vectors are as close as possible. The hoop 800 is designed to have the tether vectors intersect at the highest possible point given the chosen pivoting hardware (i.e., ball joints, McMaster 59935K13, etc.).

Figure 14K:
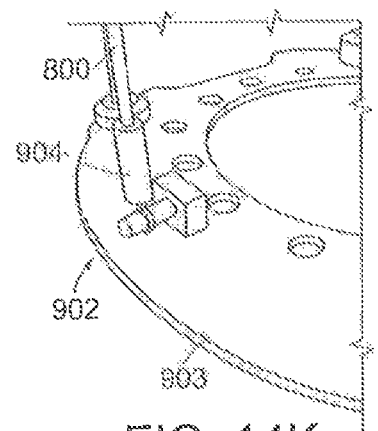
Figure 14L:
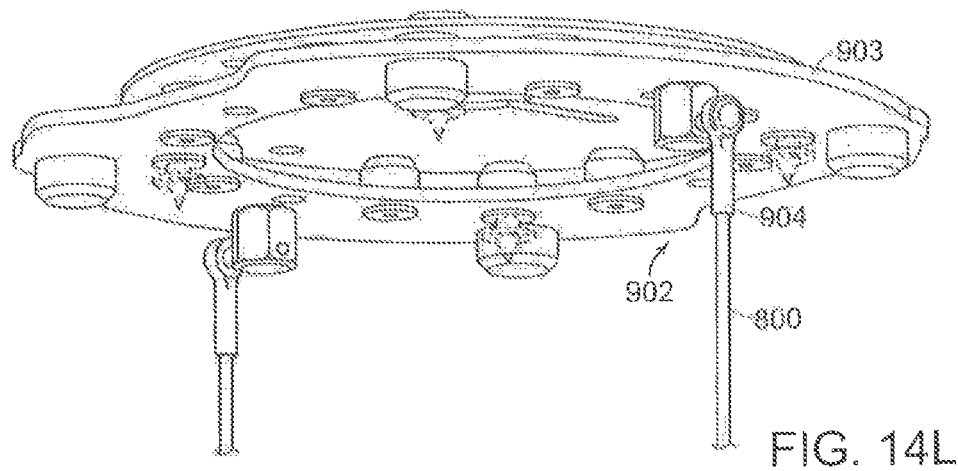
Figure 14M:
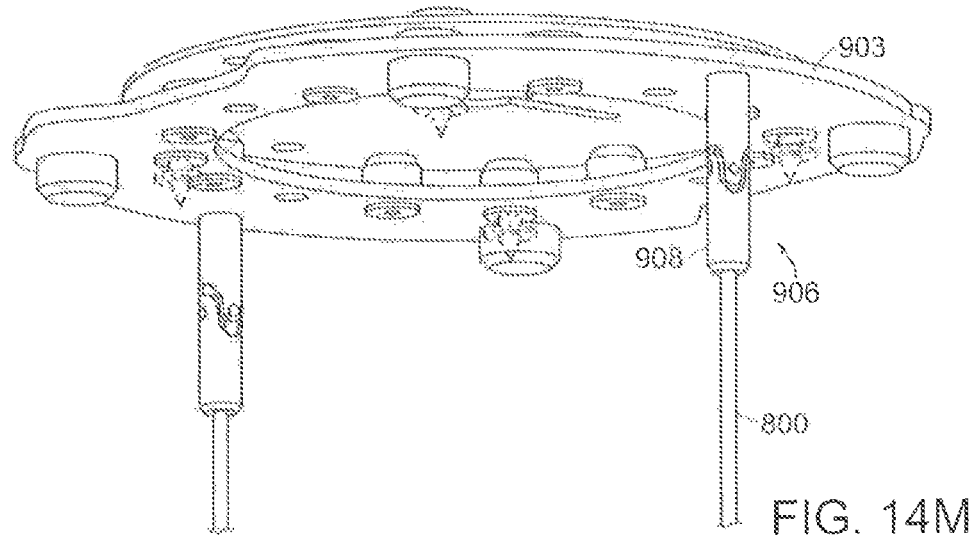

FIGS. 14K-14M illustrate attachments for connecting a pivoting tether hoop 800 to an UAV.

FIG. 14K illustrates an attachment 902 for connecting a pivoting tether hoop 800 to a plate 903 on an UAV using a rod end ball joint 904. The rod end ball joint enables a 180 degree swivel.

FIG. 14L illustrates an alternative view of the attachment 902 for connecting a pivoting tether hoop 800 to a plate 903 on an UAV using a rod end ball joint 904.

FIG. 14M illustrates an attachment 906 for connecting a pivoting tether hoop 800 to a plate 903 on an UAV using a Universal joint 908. The Universal joint 908 axes are inclined to each other, and are used to enable rotary motion in the pivoting tether hoop 800.

Figure 14N:
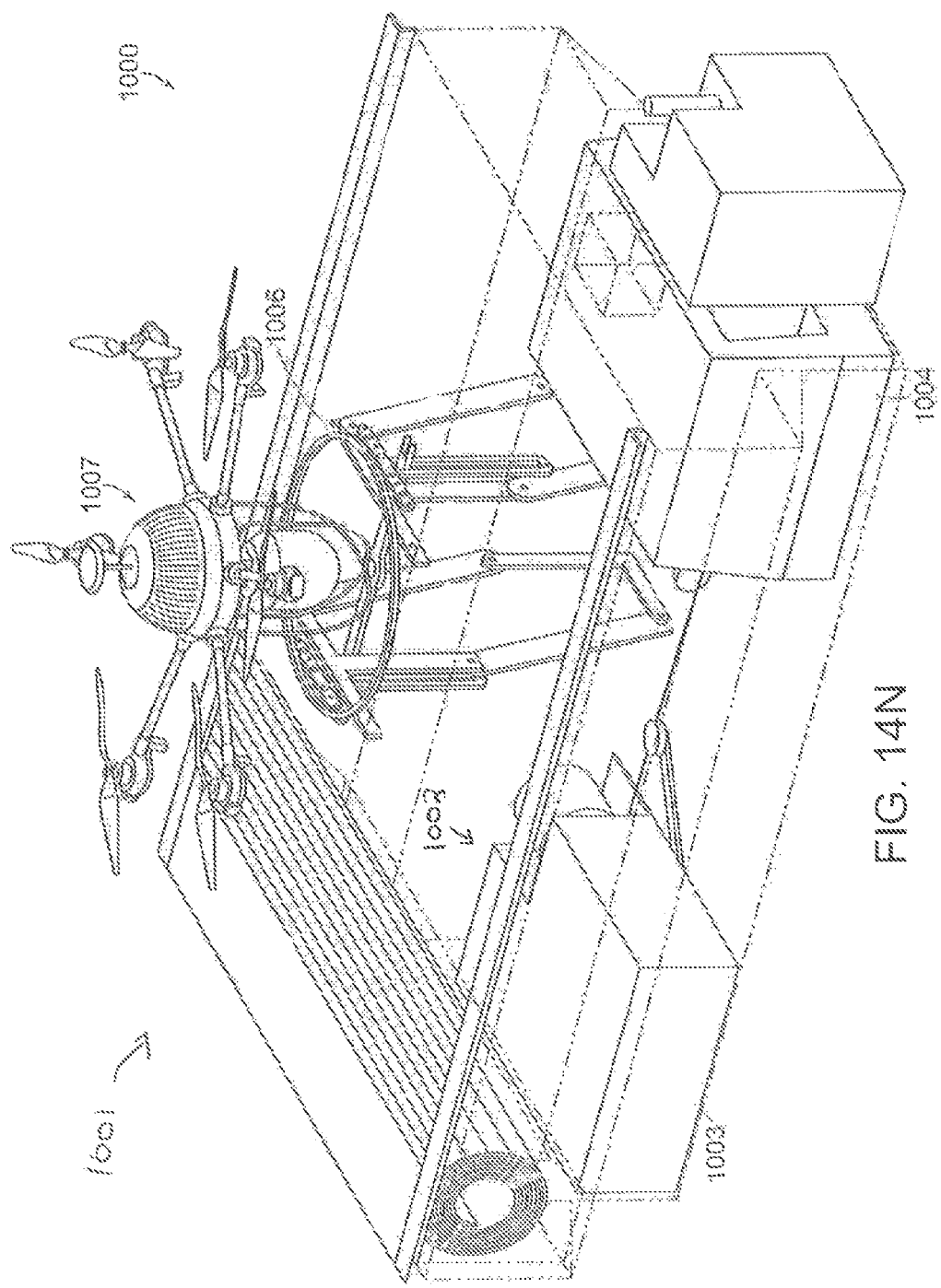

FIG. 14N illustrates an Integrated Delivery Function (IDF) system 1000, according to an exemplary embodiment. The IDF system 1000 includes a portable spooler and base station 1001, as described herein. The station 1001 is a weather-proof, self-contained housing that includes a base station 1002, a spooler 1003, and a power source 1004. The station 1001 further integrates base station electronics within the housing. The station 1001 provides control and spooling of the filament, as well as houses the power and communication to an UAV 1007.

In some embodiments, as illustrated in FIG. 14N, the station 1001 further includes an internal landing platform 1006 and the UAV 1007. The UAV 1007 includes an onboard computer and a tether connected to the base station 1002 that provides data communication and/or power to the UAV 1007. A tether mechanism includes a tether controller that deploys the tether during flight of the UAV 1007. The base station 1002 includes a base controller having at least one processor.

Figure 9:
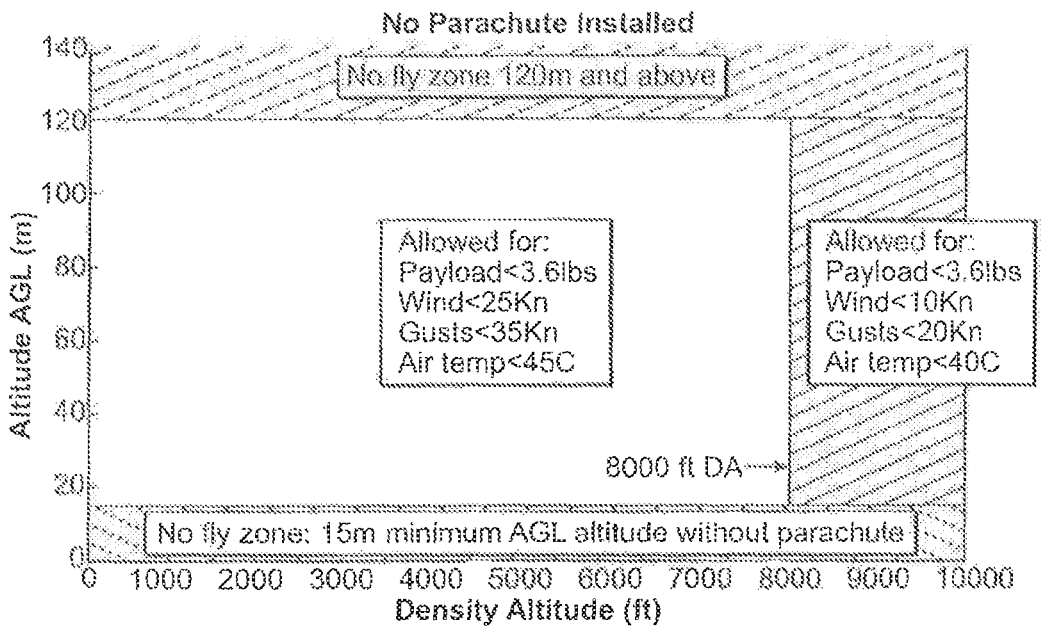
Figure 10:
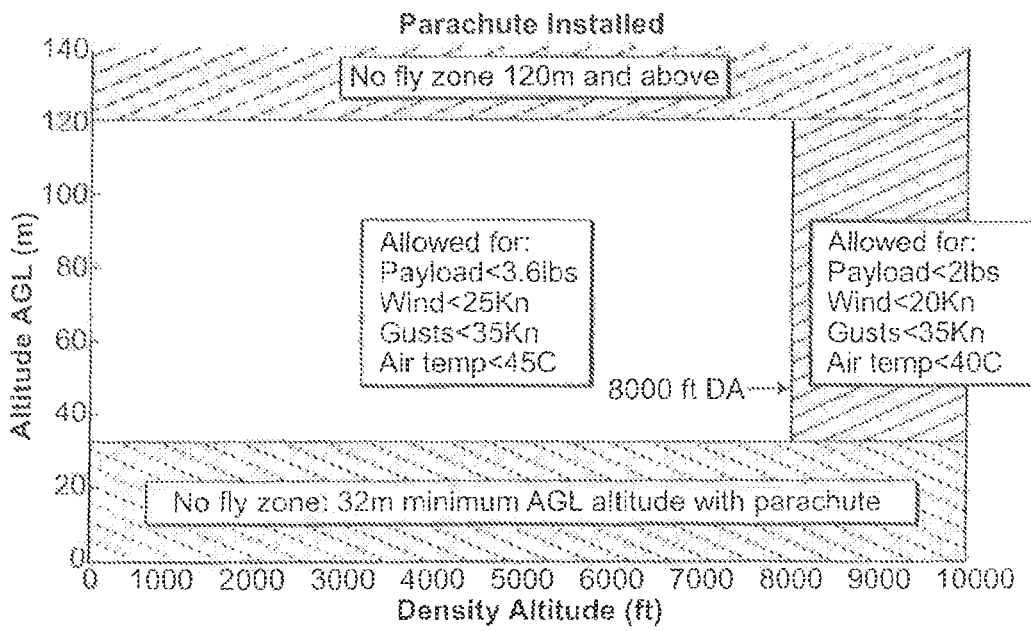

The landing platform 1006 includes an opening 1005 (also known as a tether guide 1005) in a center of the landing platform 1006. The landing platform 1006 (as shown in FIG. 12) is used for the take-off and/or landing of an UAV 1007. A tether runs from the spooler 1003 through a pulley if needed and through the tether guide 1005 in the center of the landing platform 1006 to connect to the UAV 1007. The tether guide 1005 is mounted on a vertically moveable mechanism, which moves within the landing platform, 1006. In FIG. 9, the tether guide is shown mounted to the platform 1006 on a linear rail system. In FIG. 12, the tether guide is shown as a large disk with a hole in it mounted on a linkage system, 1308. The landing platform lift mechanism is separate from the tether guide lift mechanism 1010.

The Landing platform 1006, is lifted by a power mechanism in order to bring the UAV, 1007, above the height of the container, 1001, or other obstructions, to provide clearance for a safe take-off or landing. The tether guide, 1005, has the purpose of controlling the precise position of the UAV as it makes contact with the landing platform and to prevent lateral movement as the UAV takes off. Because the point where the UAV contacts the landing platform may be above the tether attachment point, it may be advantageous to have the tether guide move vertically with relation to the platform. This movement may be by spring force or a controlled power actuator. In some embodiments, the IDF system 1000 system includes a retractable roll top cover 1009 for covering the internal compartment of the station 1001.

In an exemplary embodiment, the landing platform 1006 includes an actuator 1010 (also known as a lifting mechanism) that is spring loaded and extends upward via powered motor. In alternative embodiments, spring pressure is employed.

Before deployment, the UAV 1007 is located on the landing platform 1006 and fully contained inside the station 1001 (a stowed position). The UAV 107 held in place by a taught tether connected to the UAV 1007 through the tether guide 1005. As the UAV 1007 is being prepared for deployment, the landing platform, 1006 and the tether guide, 1005, are raised together to the launch/land position. In an exemplary embodiment, a power actuator will raise the platform, 1006 and guide, 1005 to the launch/land position. In an alternate embodiment, the platform could have a spring to raise it and it may be held in a lower position by the tether tension or the weight of the UAV. The lifting motion could be provided by the UAV propellers or from a reduction in the tether tension from the spooler. During a take-off, the UAV 1007 lifts off of the landing platform 1006 but the tether guide 1005 maintains contact with the UAV, preventing it from any lateral excursion. The Tether guide continues to extend until the lowest portion of the UAV is clear of the landing platform 1006.

During landing, the UAV 1007 is drawn in towards the central axis of the landing platform 1006 by the tension of the retracting tether via the tether guide 1005. Once the UAV 1008 is in contact with the guide, a power actuator or the weight of the UAV 1007 and/or the tension in the tether causes the guide to retract with the UAV 1008 until contact with the landing platform is achieved. Once the UAV 1007 lands on the landing platform 1006, the landing platform 1006 and UAV 1007 are retracted into the station 1001. The tether guide 1005 maintains ideal alignment between the UAV 1007 and the center of the landing platform 1006.

In some embodiments, the IDF system 1000 is integrated into a fixed, transportable, or moving modes of deployment, including but not limited to towed trailers, ground vehicles of all types, and maritime vessels, as well as single-point semi-permanent emplacements. This enables the IDF system 1000 to be transported safely and under protection from the elements, and for the UAV 1007 to take off and land safely and autonomously from/at a precise point. In addition, the IDF system 1000 is also designed for air vehicle deployment while a ground vehicle, a maritime vehicle or watercraft is static and/or in motion, and to maintain optimal tether dynamics while both air vehicle and carrier vehicle are moving together in tandem. This enables the air vehicle to launch and/or land from the moving landing platform 1006 or flight while the carrier vehicle is moving. The thinness and lightness of the tether causes the tether to be less susceptible to wind distortion.

In an exemplary embodiment, the tether and base controller are configured to deliver approximately 1000 volts to the air vehicle. In another embodiment, the tether and base controller are configured to deliver more than 1000 volts to the UAV. One or more high voltage transformers are connected to the portable housing to isolate an electrical charge.

Figure 14O:
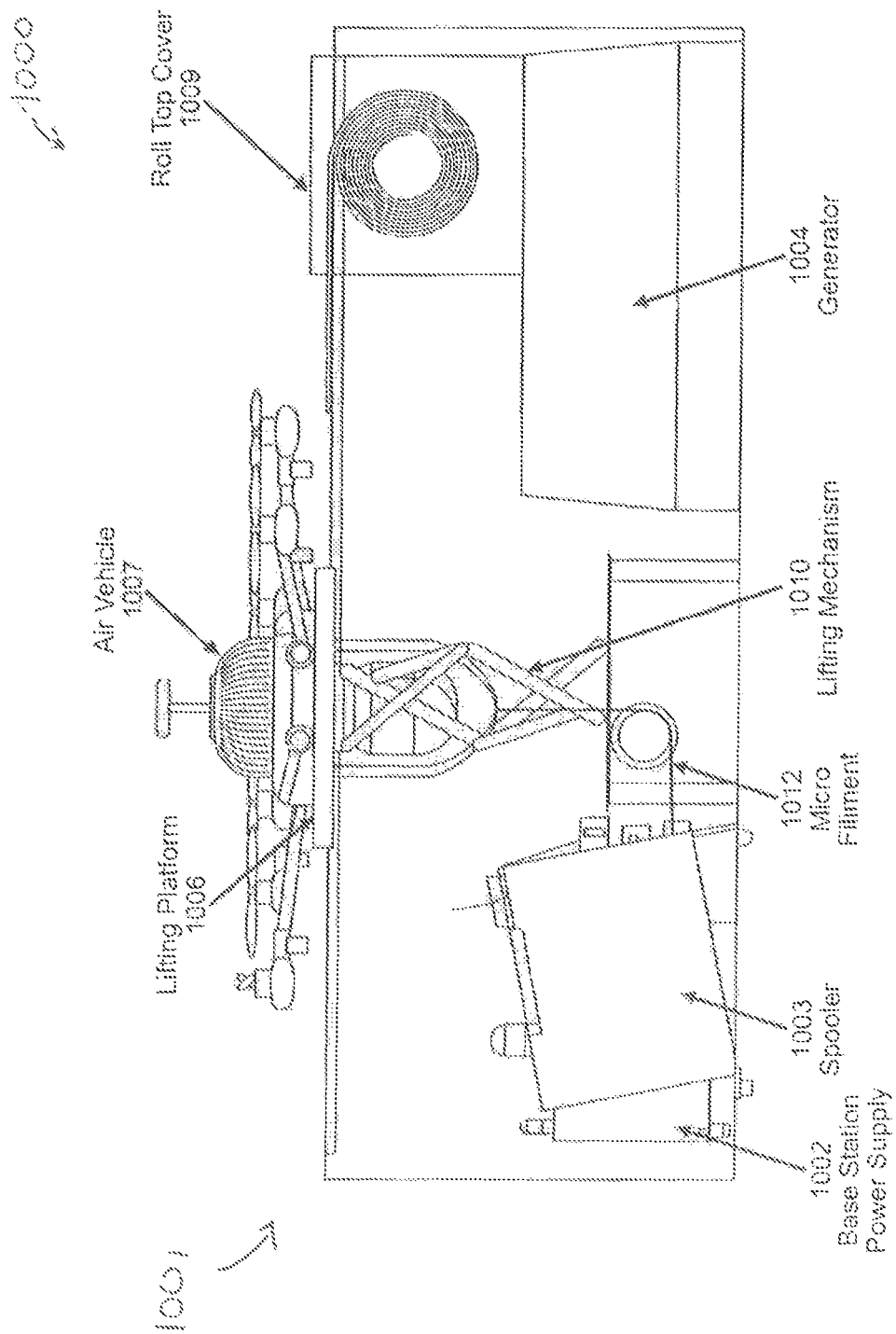

FIG. 14O illustrates a side view of the IDF system 1000 shown in FIG. 14N.

Figure 14P:
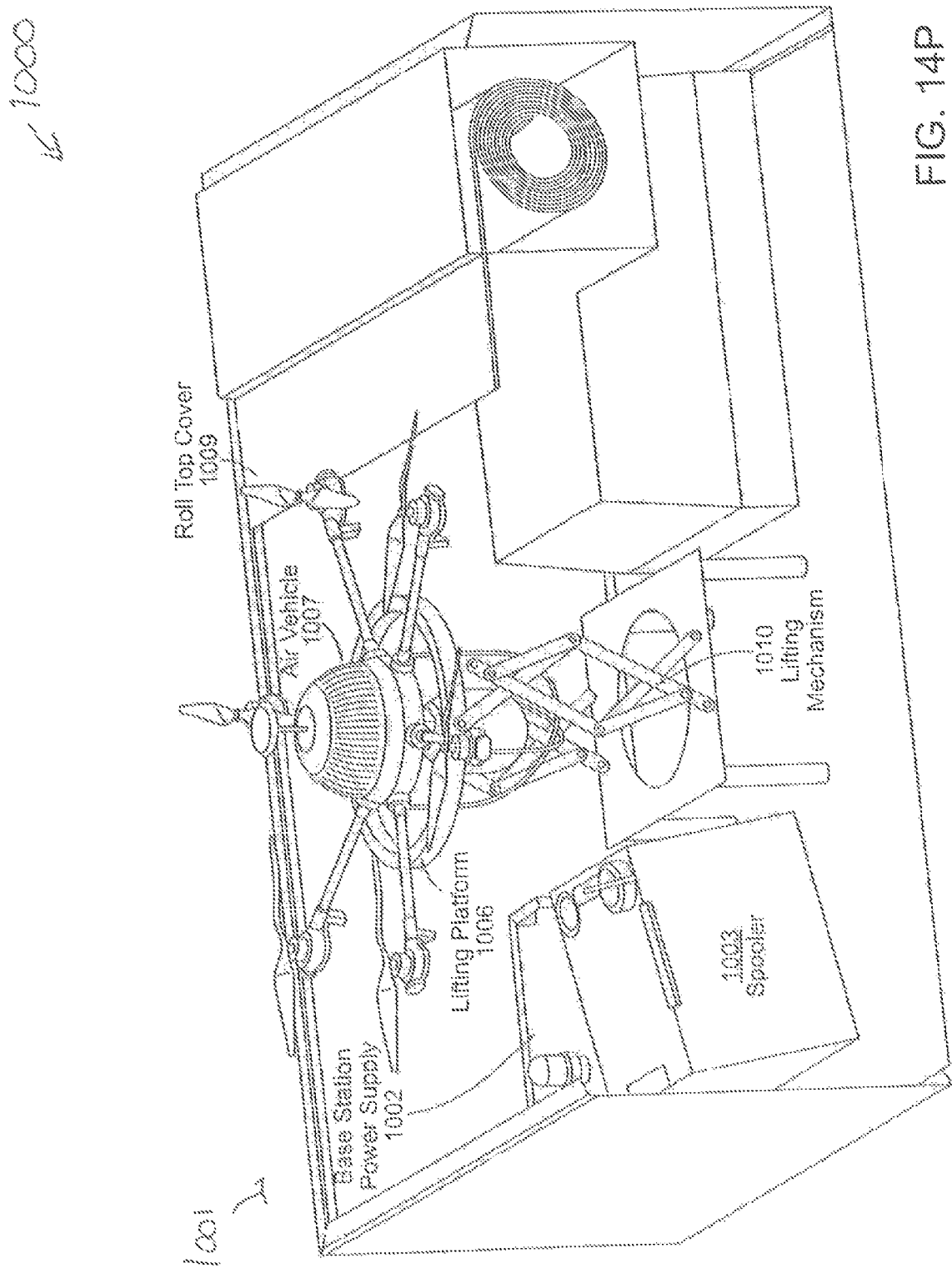

FIG. 14P illustrates an angled view of the IDF system 1000 shown in FIG. 14N.

It should be noted that the locations of the components in the portable spooler and base station 1001, including the spooler 1003, the power source 1004, and the base station 1002, are for illustrative purposes only and may be located in different locations and in different configurations.

Figure 14Q:
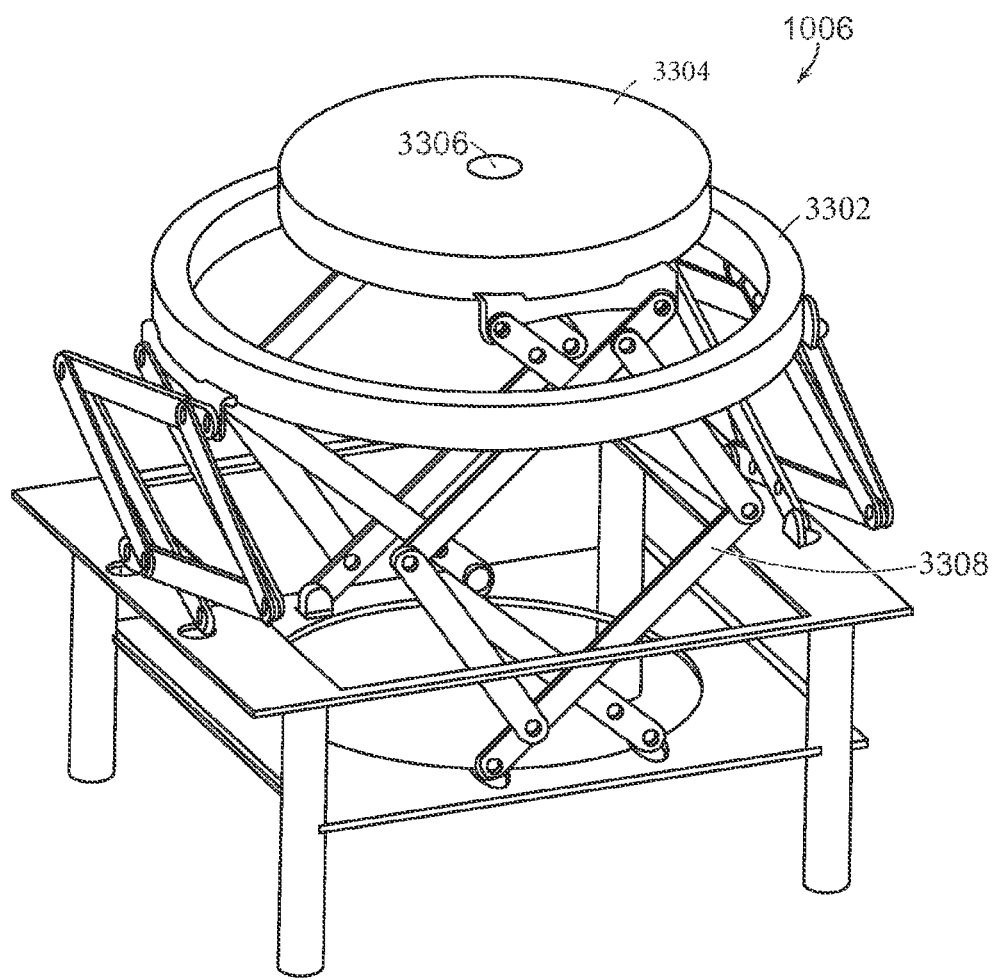

FIG. 14Q illustrates the internal landing platform 1006 of the IDF system 1000, according to an exemplary embodiment. The lifting platform includes an outer ring 3302, an inner ring 3304, and a tether guide 3306. In an exemplary embodiment, the outer ring 3302 of the lifting platform 1006 is actuated by a motor. In other embodiments, the outer ring 3302 may be actuated by hydraulics or pneumatics or other means. The inner ring 3304 moves independent to the outer ring 3302 either by its own actuator or by a spring mounted in a way to push the outer ring 3302 upwards. The inner ring 3304 with the tether guide extends further to be above the height of the outer ring 3302.

Figure 14R:
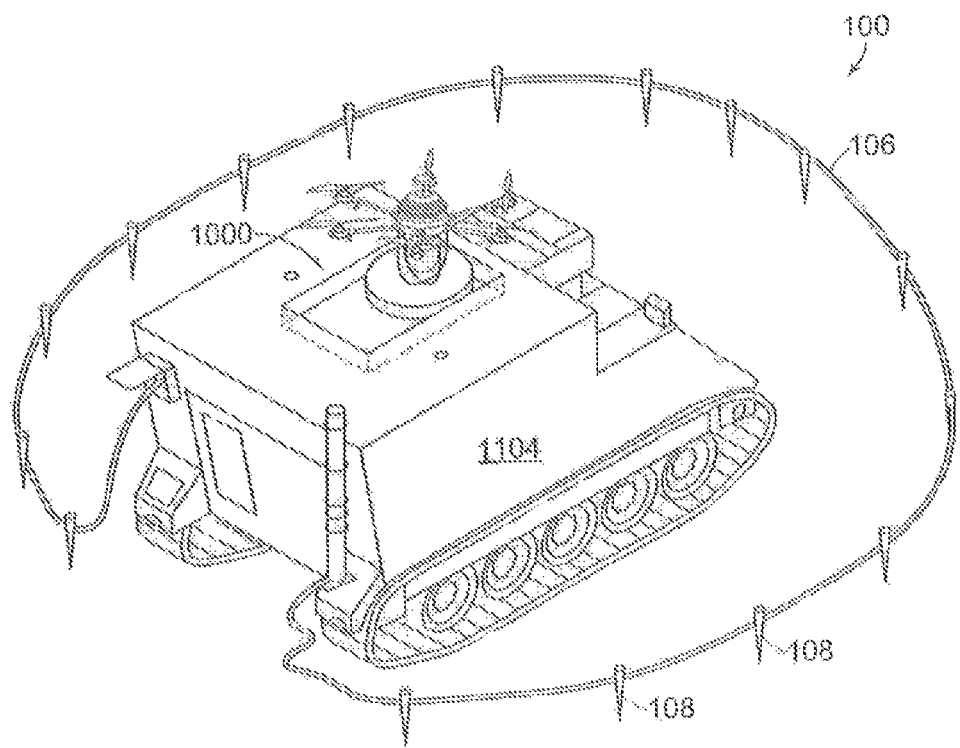

FIG. 14R illustrates a mobile delivery system 100 for an unmanned aerial vehicle (UAV) 102. The mobile delivery system 100 includes the IDF system 1000, described above. In the illustrated embodiment, the IDF system 1000 is mounted on a vehicle 104. In one embodiment, the IDF system 1000 is disposed in a recessed compartment on the vehicle 1104 that includes a retractable top surface over the recessed compartment.

To enable rapid deployment of airborne payloads (sensors, cameras, communications repeaters, or other gear), there is a need for a tethered or non-tethered UAV 1007 that can be transported safely and under protection from the elements, and that can take off and land safely and autonomously from/at a precise point. This capability is typically used with fixed, transportable, or moving modes of deployment, including but not limited to towed trailers, ground vehicles of all types, and maritime vessels, as well as single-point semi-permanent emplacements.

In some embodiments, the mobile delivery system 100 uses a static and ground system. The static and ground system includes a grounding wire 106 attached to stakes 108. The base station for the UAV 102 include one or more grounding lugs 110 connected to an end of the grounding wire 106 and configured to dissipate excess electrical charge. The tether mechanism is grounded via a cable going from the base station to the tether mechanism. In some embodiments, the housing for the tether mechanism includes conductive feet.

In an exemplary embodiment, the stakes 108 form a ring around the vehicle 1104 and/or UAV 102. The mobile delivery system 100 is designed primarily for use with systems requiring high mobility. The stakes 108 are easily emplaced and removed, offering a reasonable option in situations where driving/retracting conventional ground rods would be difficult and/or too time consuming.

In an exemplary embodiment, the stakes 108 have a combined stake surface area approximately 50% greater than a standard 8-foot ground rod. Hence, the mobile delivery system 100 provides a path to the ground with significantly lower resistance. Resistance is further reduced through additional contact area provided by the wire 110 routed between the multiple stakes 108, as shown in FIG. 13.

In one embodiment, the grounding wire 106 is 3/16 galvanized steel cable. The mobile delivery system 100 includes four 2' stakes 108 (or electrodes), each located 5 feet apart, for a total length of 20' of 3/16 galvanized steel cable. The mobile delivery system 100 is a secondary measure when using a generator. The generator's frame is considered a ground, however, using the supplemental stakes 108 improve the ground conditions for static dissipation.

Figure 14S:
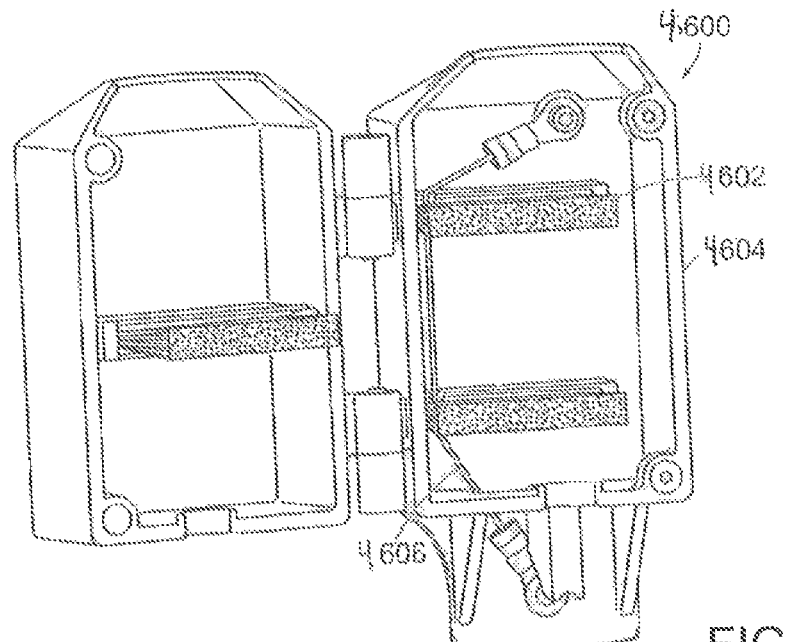
Figure 14T:
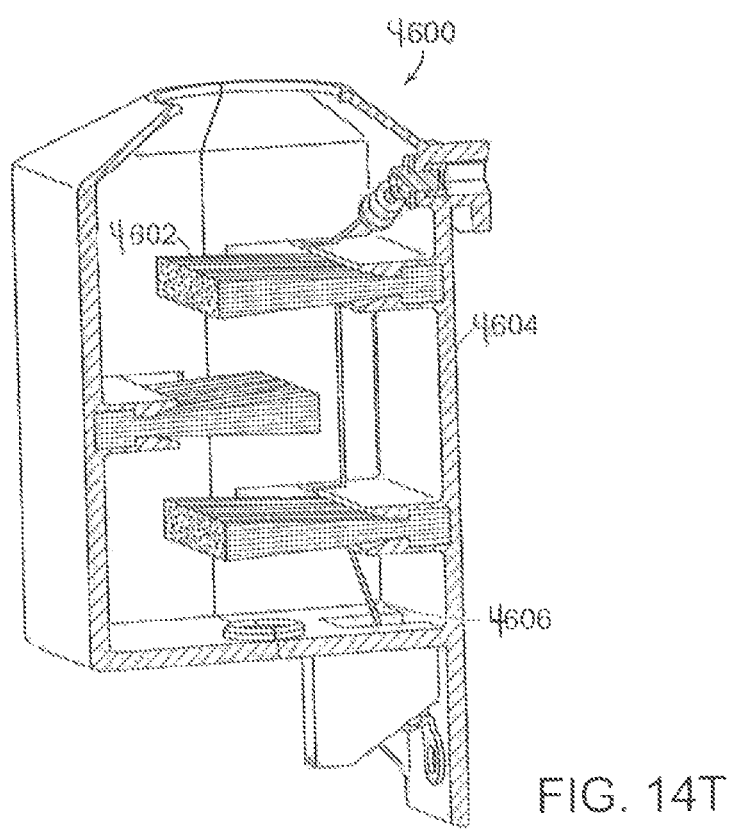

FIG. 14S-14T illustrates views of a brush box 4600 that includes brushes 4602, according to an exemplary embodiment. The brush box 4600 is a compartment on an intake of a spooler designed to slow the tether in the event that it is feeding in from above at a rate higher than the spool mechanism can take up. The brush box 4600 further removes dust and static electricity. The brushes 4602 are conductive and sitting in a plastic (non-conductive) box 4604; thus, a bare wire 4606 is anchored at a top of the brush box 4600 and runs through the bristles and is grounded by a mounting screw at a bottom of the brush box 4600.

Figure 15A:
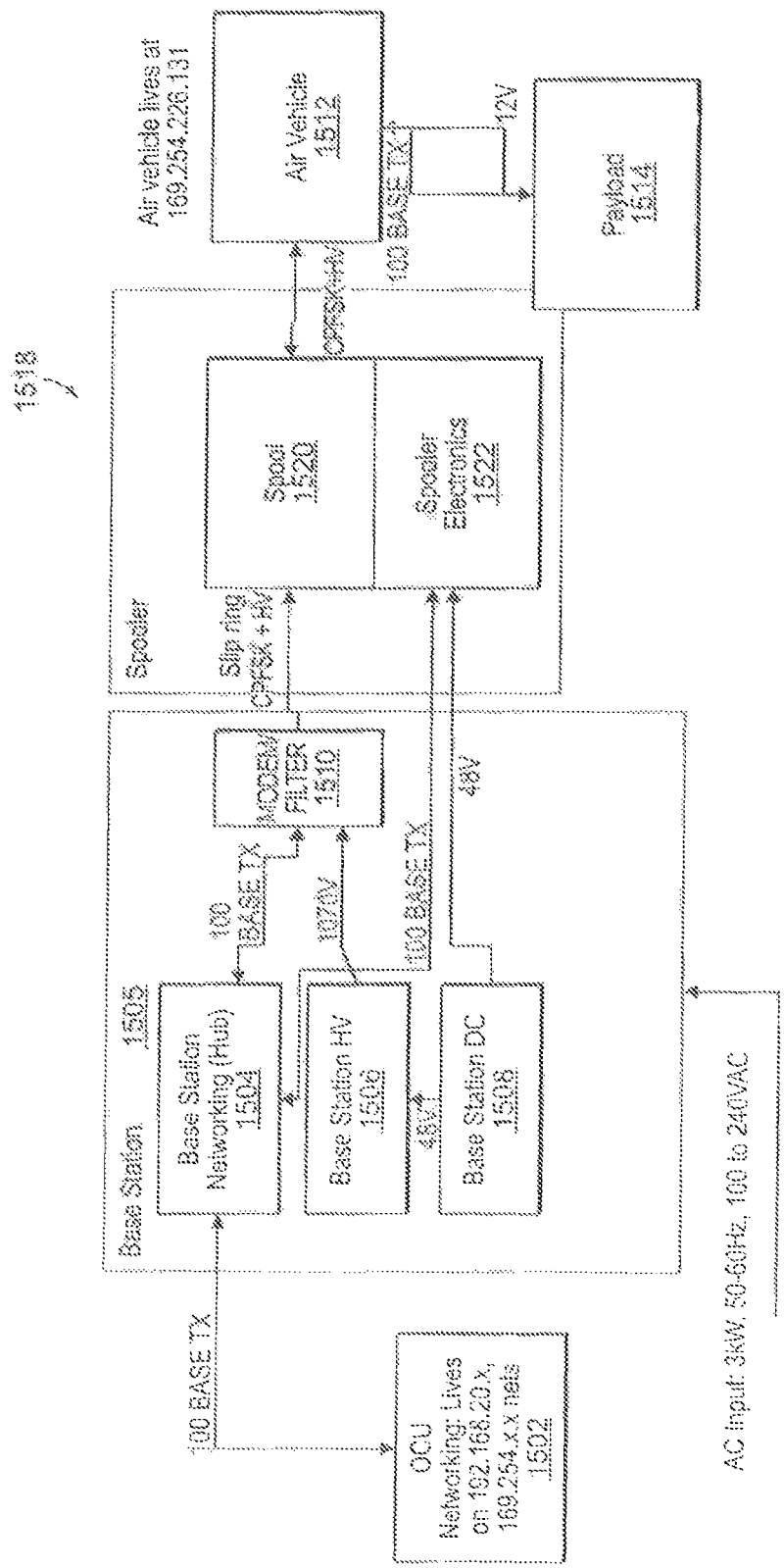
FIGS. 15A-15M depict exemplary PARC systems.
Figure 15B:
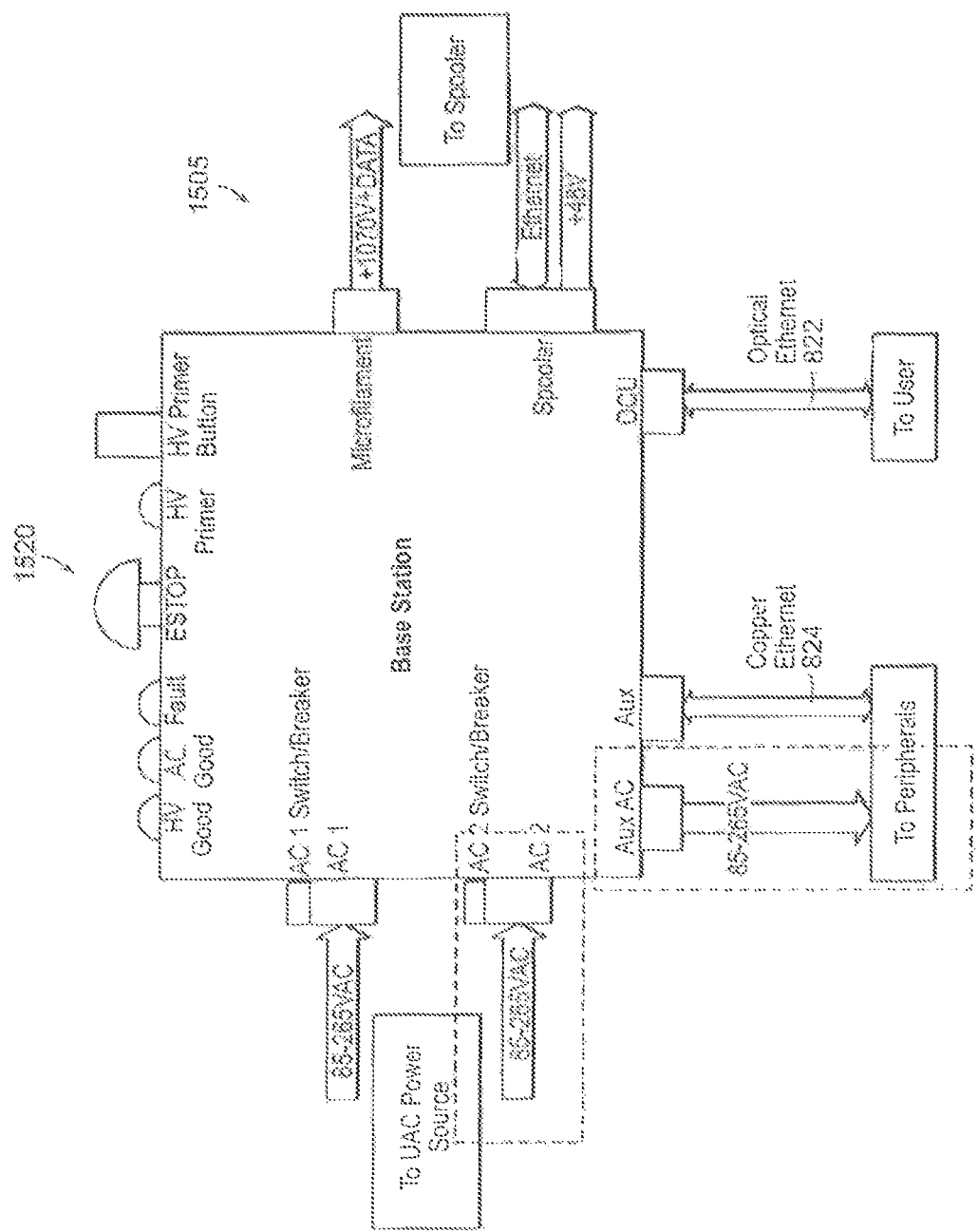
Figure 15C:
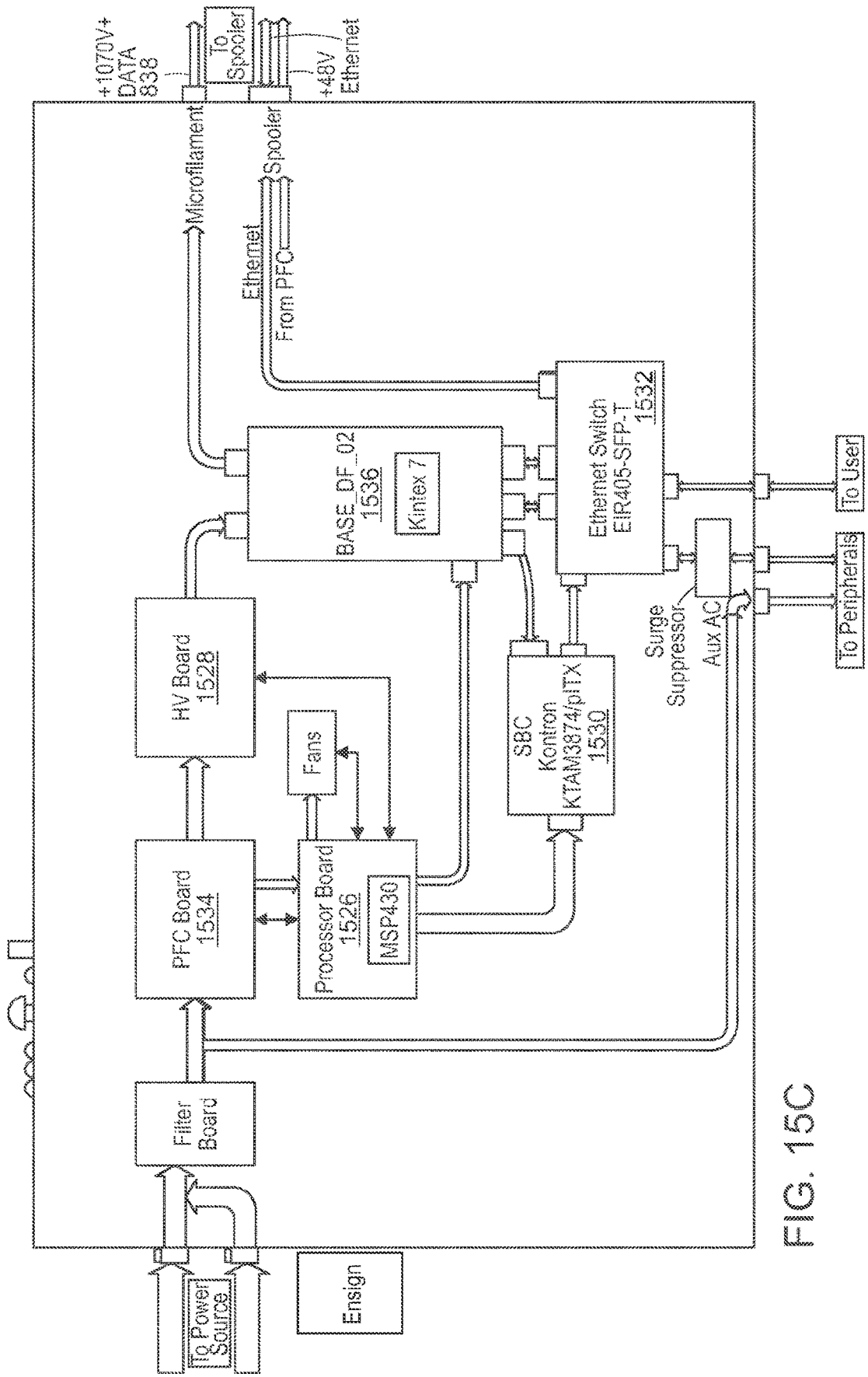

FIGS. 15A-15F depict an exemplary PARC system. Illustrated in FIG. 15A is an exemplary system for operating a tethered aerial vehicle using an operating control unit (OCU) 1502, a control or base station system 1505 that can have three primary components including a networked communication module 1504 that transmits and receives communication signals, a high voltage transmitter 1506 that delivers high voltage electrical power to a tether that is dispensed and retrieved with a tether dispensing unit 1518 such as a spool assembly 1520 that is operated by spooler control system 1522. The spooler controller 1522 receives power from the third base station component, a base station power source 1508. A modem 1510 is used to format electrical signals for transmission to the aerial vehicle 1512 with the tether. A filter 1515 can be used to prevent the transmission or reception of signals outside of operational constraints. The aerial vehicle can carry a payload 1514 such as a camera or other type of sensor or electrical or optoelectronic devices, or combinations thereof. More detailed illustrations of the base station 15051505 are shown in FIGS. 15B and 15C. The station 1505 can have a control panel 1520 that the user can use to operate and monitor the system, Optical 1522 and wired 1524 links can be used interface with the control station. The internal elements include a processor 1526 linked to single board computer 1530 that controls Ethernet switch 1532. Converter 1534 delivers power to the high voltage board 1528. The signal delivered to the filament 1538 is managed by controller 1536 which can include a Xilinx FPGA (Kintex 7 Base) or other integrated circuit design configured to precisely control the high voltage power delivered to the aerial vehicle with the filament 1538.

Figure 15D:
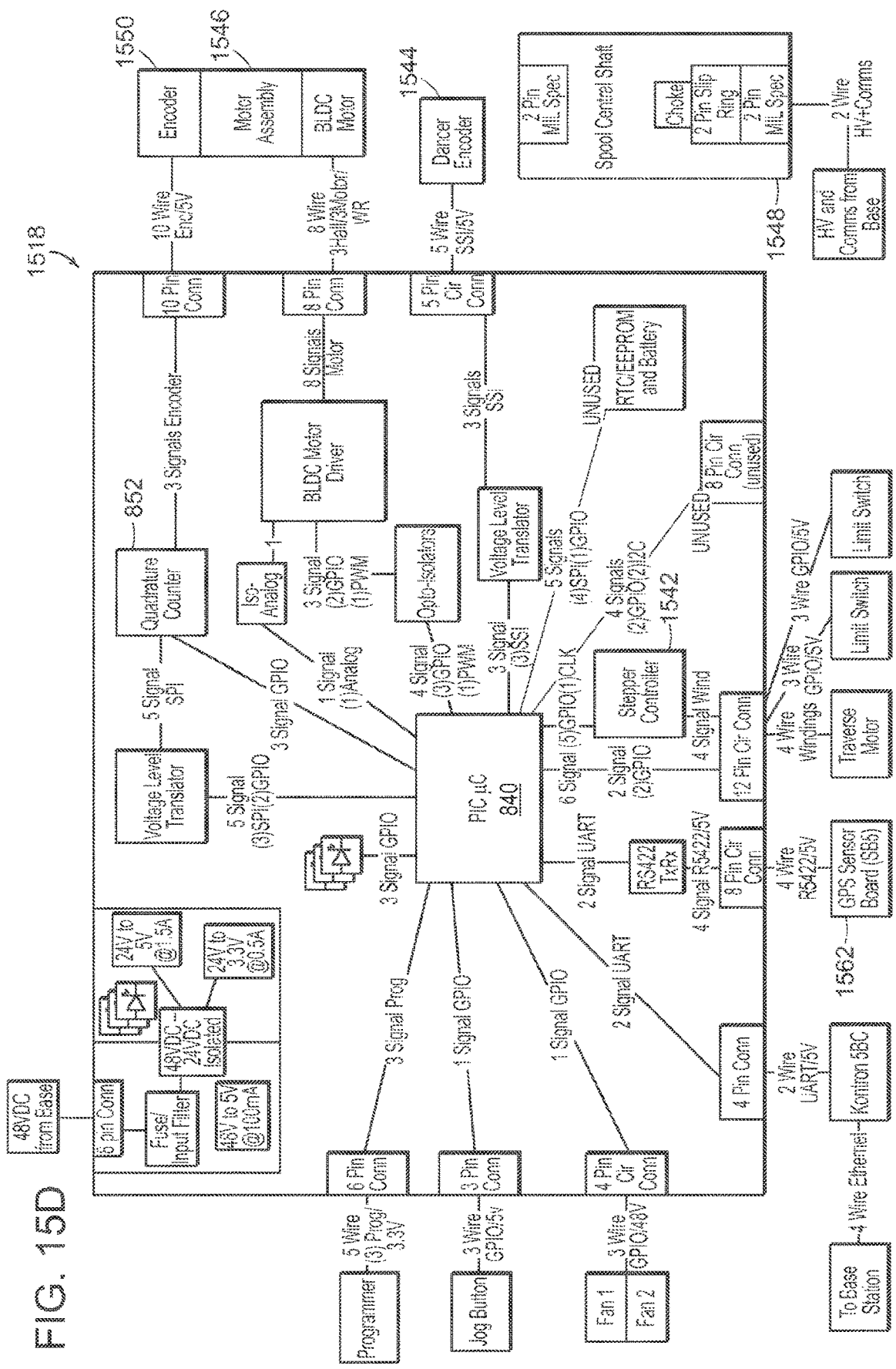
Figure 15E:
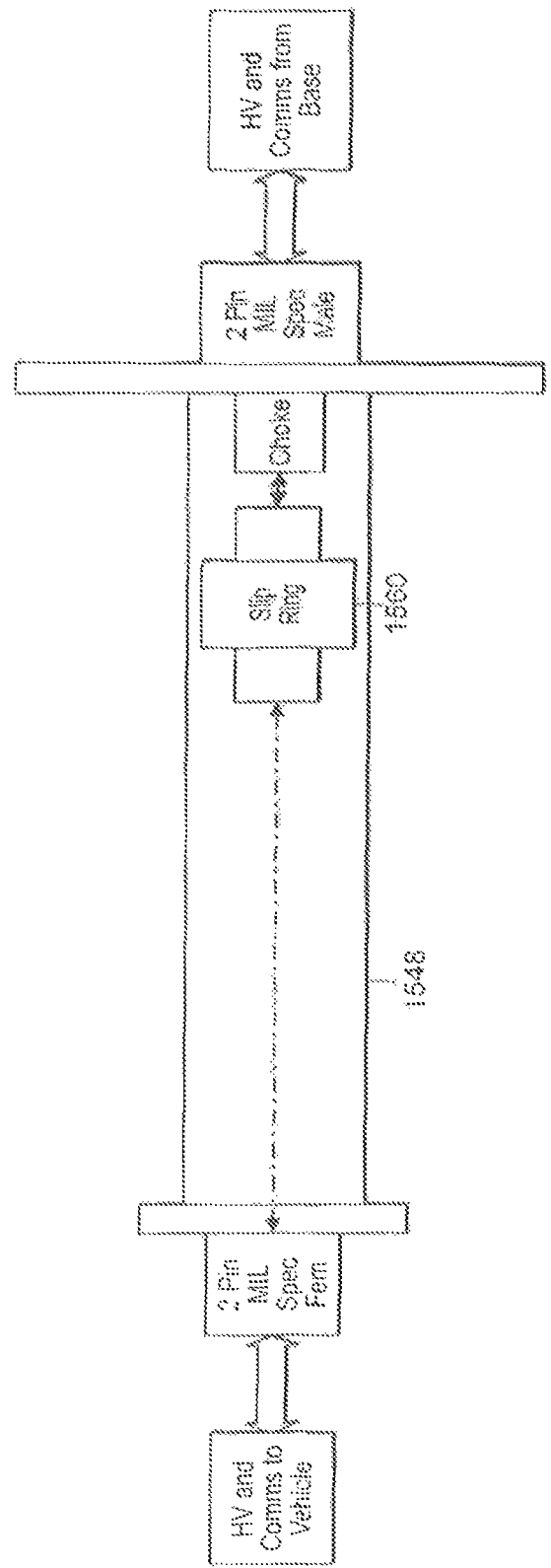

An embodiment of a tether dispensing unit 1518 is illustrated in FIG. 15D. This system includes microcontroller 1540 that operates the motors, steppers and additional control elements. The system rotates a spool 1548 in this embodiment with a motor assembly 1546. The encoder 1550 reports the amount of the filament dispensed with counter 1552. The spool shown in FIG. 15E can employ slip ring 1560 to control placement of the filament onto the spool. The dancer encoder 1544 can be used to sense the tension in the dispensed tether. This tension sensor is operative to precisely regulate the amount of slack in the tether during flight. The location of the spooler can be determined with GPS sensor 1562, for example, which enables the processor to approximate the relative distance between the aerial vehicle (which sends updated geographic position data back through the tether or by wireless link) and the tether management system.

Figure 15F:
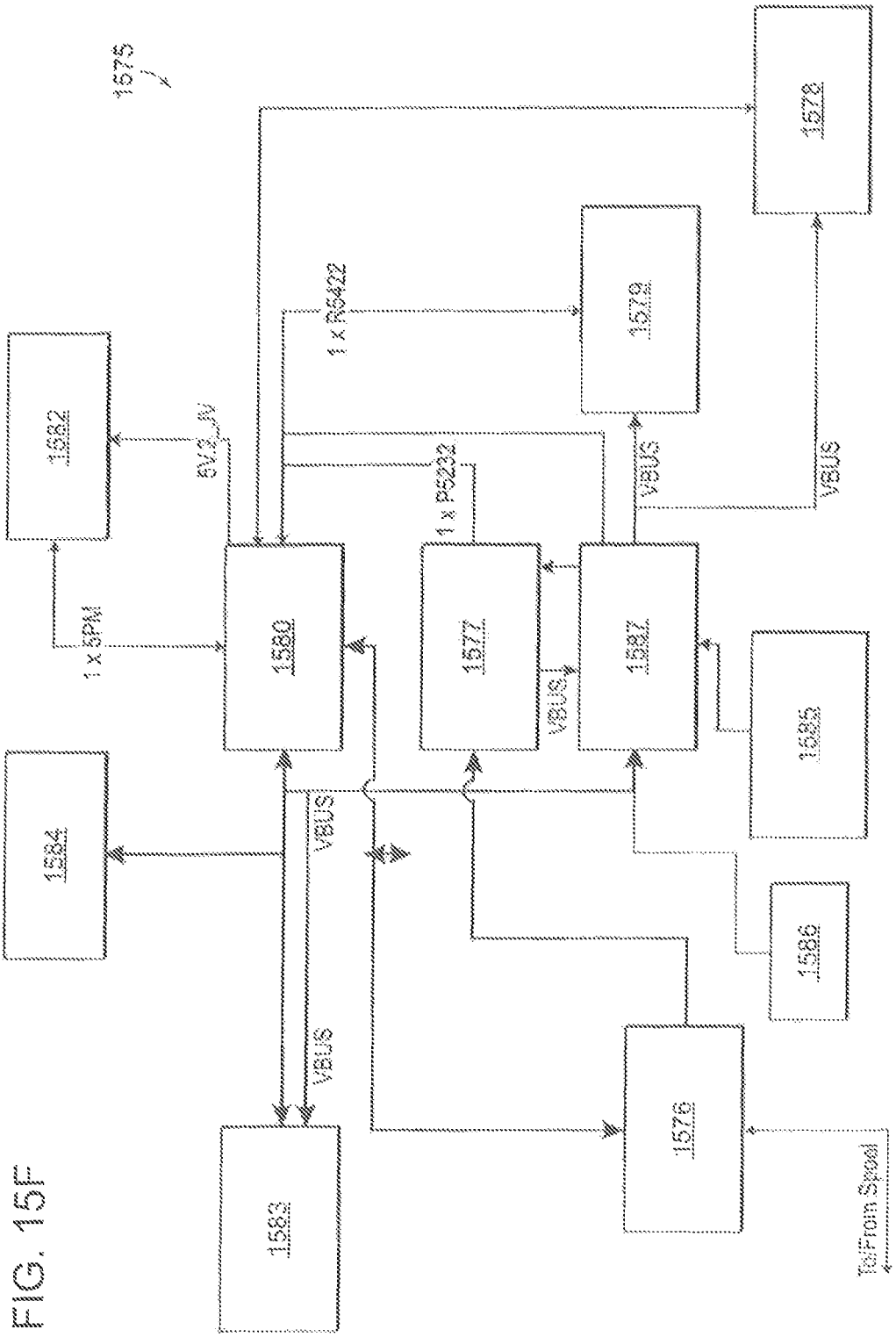

Illustrated in FIG. 15F is a control system 1575 for the aerial vehicle. The tether is used to deliver high voltage DC power to the vehicle control system and also provide AC communications to and from the vehicle. The tether is linked to a triplexer circuit 1576 which routes the high voltage DC signal to the DCDC converter 1577 which regulates power to the payload 1578, the parachute deployment circuit 1579, the system processor 1580, the inertial measurement unit (IMU) 1582, the motor control circuit 1583, and SBS circuit 1584 that provides geographic location data on the position of the vehicle at periodic intervals. The vehicle location circuit 1584 delivers GPS (GNSS) data from a GPS receiver and pressure sensor data indicative of the altitude of the vehicle. The triplexer circuit 1576 also delivers communication signals from the control station to the vehicle to control operation of the vehicle and the payload. The triplexer also routes data from the vehicle to the control station including sensor data, payload data and telemetry from the aerial vehicle to the control station. The processor 1580 includes a memory for storing instructions to control flight operations of the aerial vehicle. A battery 1585 provides power to the system during start-up and during flight when power from the tether is disconnected. The system power switch 1586 actuates PDR circuit 1587 that regulates power from the battery until the high voltage signal from the tether takes over.

In some embodiments, vehicle power management systems can be employed to control flight operated sensing and communication features of the aerial vehicle. These features are preferably used in tethered UAV, that also can operate with one or more batteries.

In one embodiment, an unmanned aerial vehicle draws power from either ground sources (via tether), from on-board batteries, or from both, as required by operator command or by autonomous control. This ability allows, among other features, a ground-powered aerial vehicle to have a power source for safe, controlled landings upon interruption of ground power.

Embodiments may have one or more of the following power management features in which a switching circuit is used to improve power distribution.

The unmanned aerial vehicle may use power mediating strategies. The unmanned aerial vehicle may use a back-up battery to power the vehicle in the event of DC power loss, for safe landing. The unmanned aerial vehicle may use back-up battery power to initiate the start-up sequence prior to vehicle launch, in advance of power flow from a ground source. The unmanned aerial vehicle may use a ground-based power source to supply the vehicle, its payload(s) and associated electronics while in flight, without drawing upon battery resources. The unmanned aerial vehicle may use a ground-based power source to recharge the aerial vehicle's battery during flight, enabling that on-board source to be ready against need. The unmanned aerial vehicle may use battery power to supplement ground-based power, in the event of increased temporary power demand, as commanded by human initiation or autonomous flight control. In some examples, the load demand of the unmanned aerial vehicle may reduce the voltage on DC/DC, causing the battery to automatically connect in parallel (with the filament acting as a balancing resistor).

Need may arise in which it becomes desirable for an aerial vehicle to use more than one power source during operation, or to switch from one power source to another. For example, a tether may be compromised leading to an interruption of ground power, and the vehicle may need to draw upon battery power to enable a controlled, safe descent and landing. In some examples, power interruption is unplanned. For example, a fuel powered generator may run out of fuel causing an unplanned power interruption, the generator may fail, a line connecting the generator to a base station may be compromised, the base station may fail, a filament line may fail, connectors between the filament and the base station, or the filament and the UAS, or those between the cable connecting the base station and spooler may become loose or disconnect entirely, or the cable between the base station and spooler may fail or be compromised.

In some examples, power interruption is planned. For example, the generator may be deliberately powered down to allow for safe refueling, power may be interrupted for debugging purposes, power may be interrupted for battery performance verification, or an operator may press the system emergency switch (E-Stop) if he or she senses threats, including someone unauthorized inside the operational safety perimeter, someone (or something) at risk of contacting the filament, inclement weather, etc.

Aerial vehicles may require additional power capacity to meet surge requirements resulting from manual, pilot-issued or autonomously triggered flight commands. For example, an aerial vehicle may need to accomplish a steep climb requiring power beyond that supplied by its ground power source. To meet this surge demand it may need to augment ground power with additional stored power from its on-board battery reserves.

Aerial vehicles may require ground-based power to replenish batteries while in flight, using a recharger drawing upon ground power to recharge the batteries, while simultaneously using that ground-based power for locomotion, maintaining altitude, communications, sensor/payload operations, or vehicle command and control. The ability to constantly refresh the battery and maintain its charge allows the battery to be of smaller size/weight/capacity than would be a non-replenished battery, and still fulfill its primary mission of providing emergency or surge power.

Therefore, there is need for a small-footprint mechanism capable of use on an aerial vehicle, which can intelligently handle intermediate vehicle power needs, drawing upon multiple sources and routing power from those sources, as required by manual pilot or autonomous control. Designing such a small-footprint mechanism required identification and qualification of circuits capable of high power switching (a few kilowatts), minimal heat generation (losses), minimal weight, minimal size, fast switching (under 10 us), and non-interrupting switching.

Embodiments may relate to the use of power mediating strategies on an unmanned aerial vehicle that employs two power sources, that enables use of one or both sources as needed, and allows switching between those sources as needed.

Embodiments may allow an unmanned aerial vehicle to use a back-up battery to power itself in the event of the loss of its main power source (in one case, DC power provided via tether), for safe landing. In turn, this allows safe, controlled and powered landing in case of an emergency, including but not limited to tether breakage, or failure of the ground source.

Embodiments may allow a tethered vehicle to start-up from battery power prior to recognition of power from a ground source.

Embodiments may allow supplementation of ground power with power from the battery, to meet surge power demand (for example, if rapid climb is requested by human-initiated or autonomous operations)

Embodiments may allow continuous recharging of the aerial vehicle's battery in flight, drawing upon power from the ground source, so that battery capacity is always ready and available when needed.

In one embodiment, ground-based power may be limited based on average power and/or effect on the tether. For example, ground based power may be limited to avoid overloading the tether.

In one embodiment, the aerial vehicle body assembly 301 may house system electronics including on-board circuitry such as power conversion circuitry, vehicle control circuitry, and sensor circuitry in an environmentally sealed enclosure. The system electronics may perform power mediating operations.

Figure 15G:
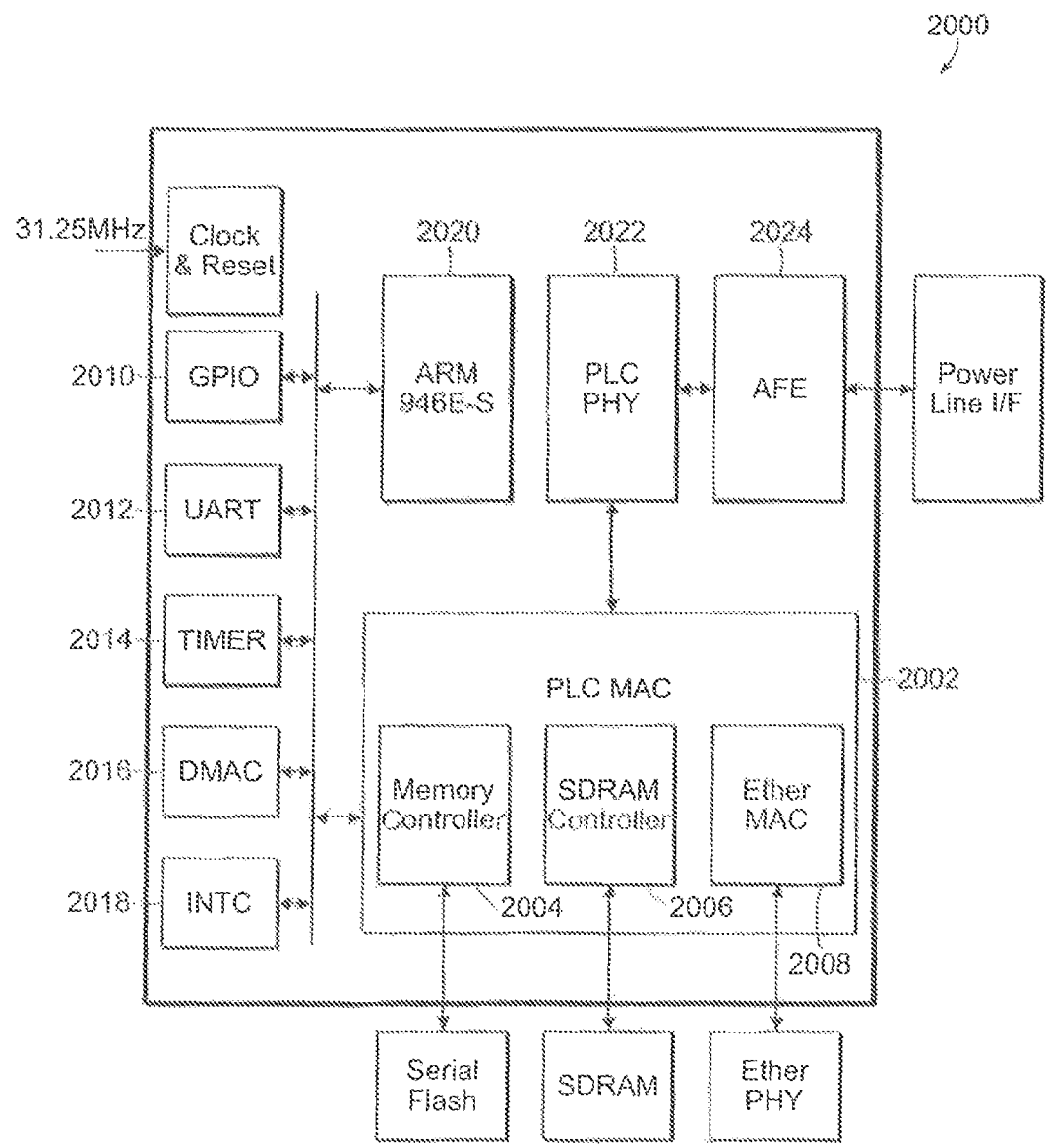

FIG. 15G is an illustration of a control systems chip 2000 for the spooler and base station 1001. In an exemplary embodiment, the chip is a KL5BPLC200WMP single chip IEEE 1901 single chip HD-PLC Powerline Communications (PLC) IC by MegaChips in San Jose, CA The chip provides a small form factor, high performance, low power, robust communications, superb noise immunity, and high quality of service (QoS) over both AC and DC power lines.

The chip 2000 includes a complete implementation of IEEE 1901 and HD-PLC MAC/PHY and a fully integrated Analog Front End (AFE) with high precision A/D, D/A data converters and programmable gain amplifiers (PGA). The chip further provides low power consumption under full operation, and also includes a power save mode. The Power Spectral Density (PSD) is fully programmable to enable the chip to comply with regional requirements.

The chip 2000 includes a PLC media access control (MAC) 2002, that includes a memory controller 2004 coupled to serial flash memory, a SDRAM Controller 2006 coupled to SDRAM, and an Ether MAC 2008 coupled to Ether PHY. The MAC 2002 is communicatively coupled to a GPIO 2010, a UART 2012, a timer 2014, a DMAC 2016, a INTC 2018, an ARM 2020, a physical layer of the OSI model (PHY) 2022, and an AFE 2024.

FIGS. 15H-15K illustrate ground station electrical architecture diagrams associated with the integrated spooler and base station 1001 described in FIG. 9.

Figure 15H:
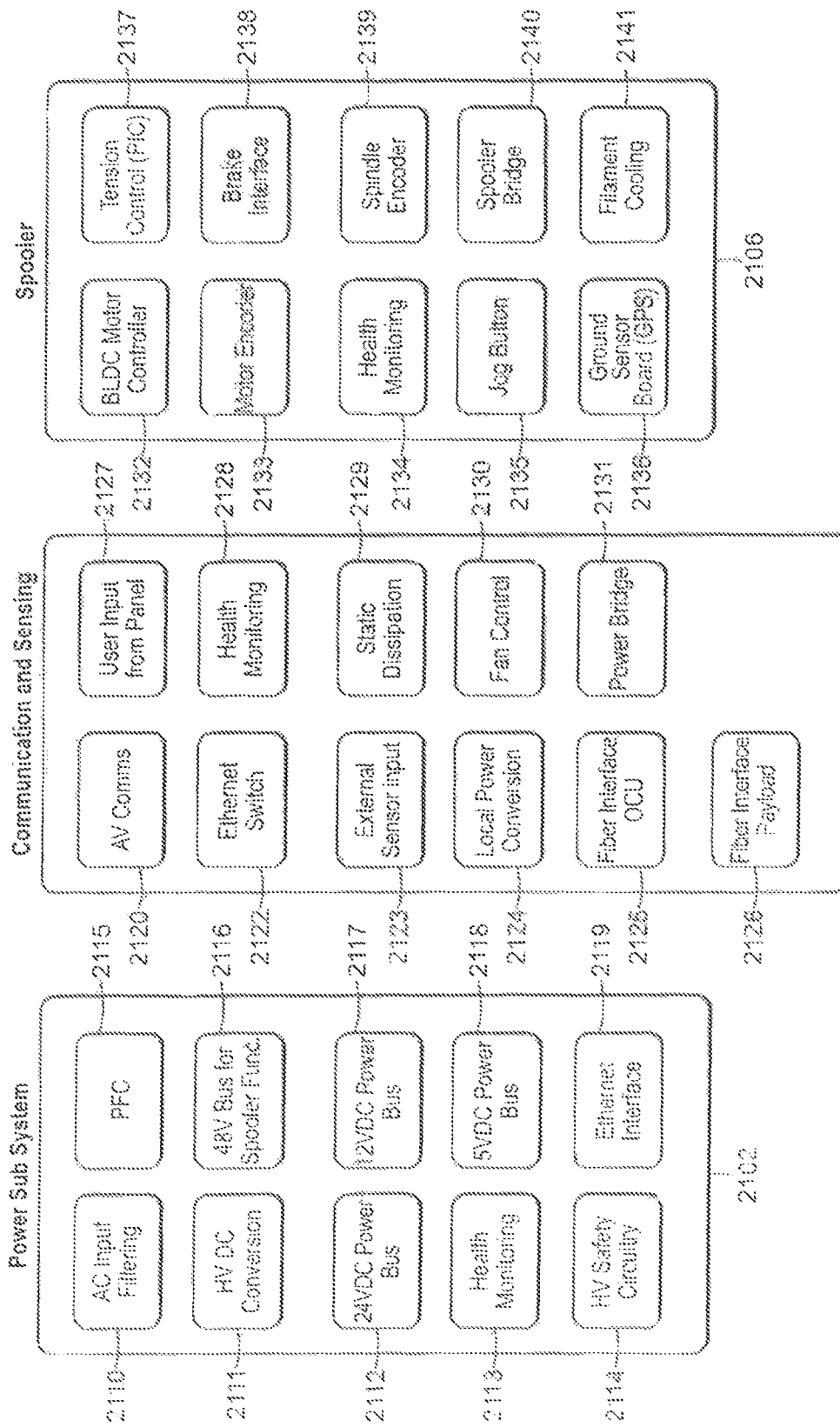

FIG. 15H illustrate electrical functions within the ground station electronics. The electronics are divided into three sub sections: a power subsection 2102, a communication and sensing subsection 2104, and a spooler function subsection 2106.

The power subsection 2102 includes AC input filtering 2110, HV DC conversion 2111, 24 volt DC power bus 2112, health-monitoring 2113, HV safety circuitry 2114, PFC 2115, 48 volt bus for spooler function 2116, 12 volt DC power bus 2117, 5 volt DC power bus 2118, and Ethernet interface 2119.

The communication and sensing subsection 2104 includes AV Communications 2120, user input from panel 2127, Ethernet switch 2122, health monitoring 2128, external sensor input 2123, static dissipation 2129, local power conversion 2124, fan control 2130, fiber interface OCU 2125, power bridge 2131, and fiber interface payload 2126.

The spooler function subsection 2106 includes a BLDC motor controller 2132, tension control 2137, motor encoder 2133, brake interface 2138, heath monitoring 2134, spindle encoder 2139, jog button 2135, spooler bridge 2140, ground sensor board 2136, and filament cooling 2141.

Figure 15I:
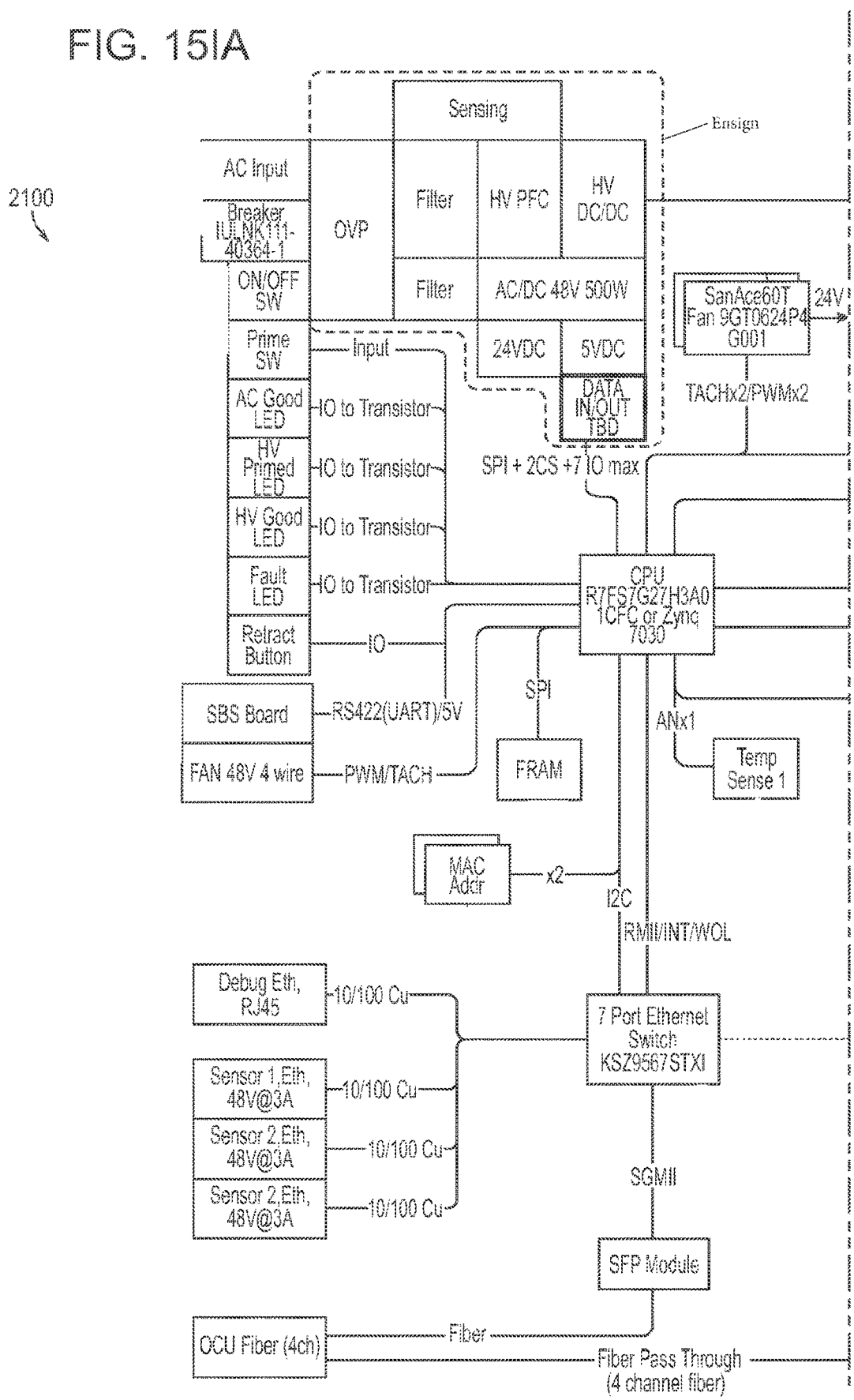
Figure 151B:
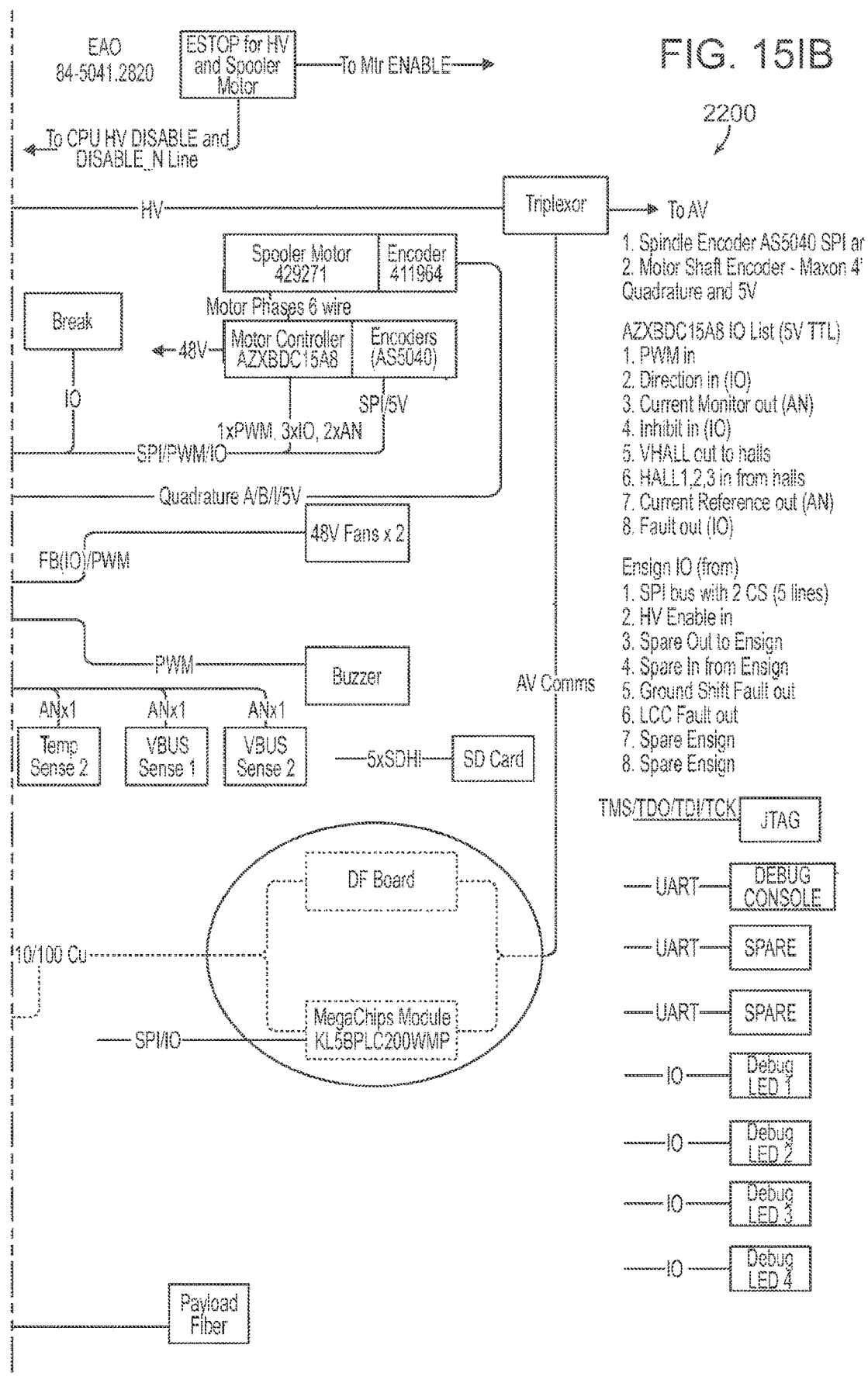

FIG. 15IA illustrates an electrical functional diagram 2100.

FIG. 15IB illustrates an electrical functional diagram 2200 with 10. The electrical configuration of diagram 2200 reduces a footprint, weight and power requirements for the integrated design of the station 1001.

Figure 15J:
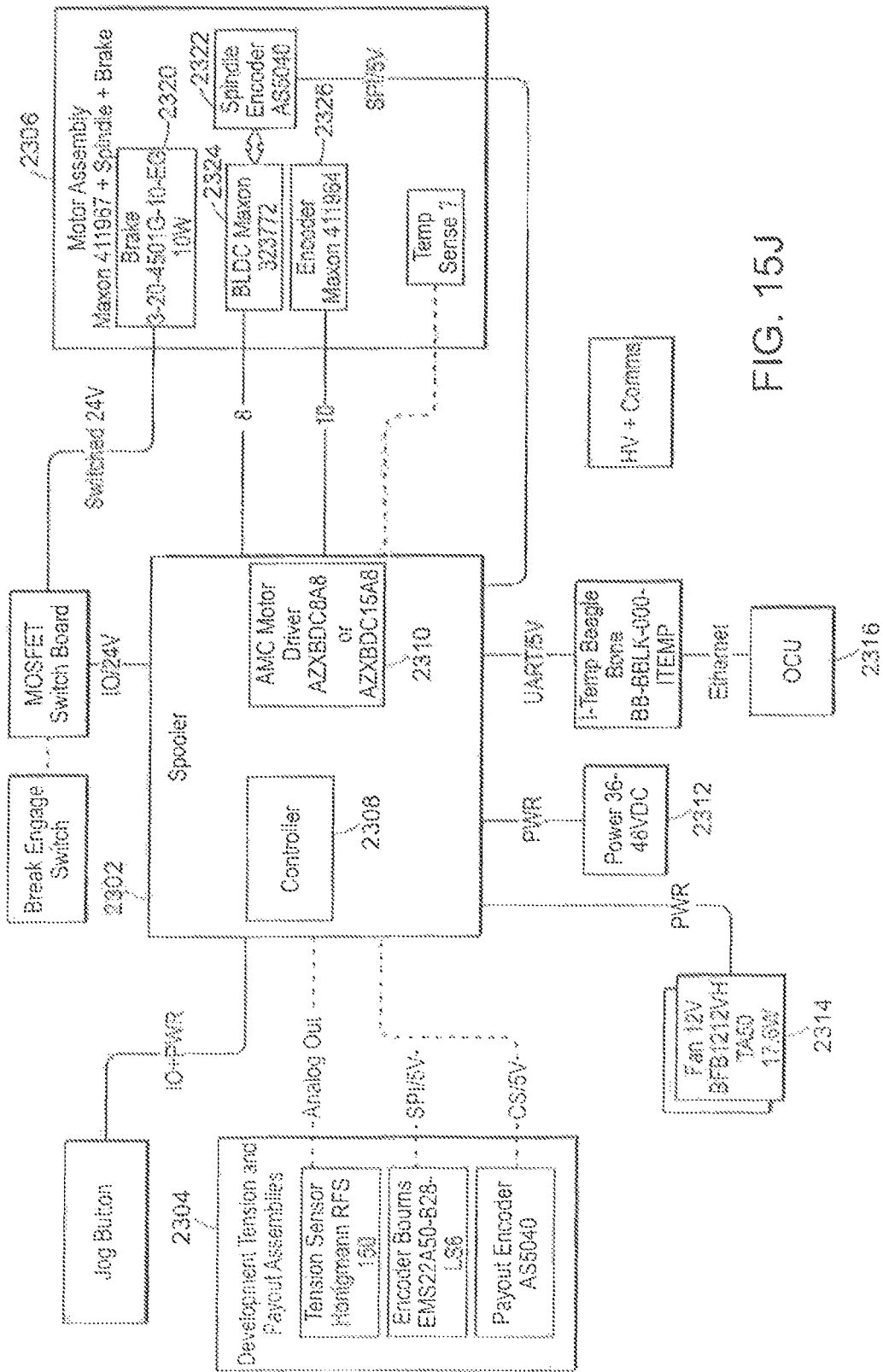

FIG. 15J illustrate a spooler system block diagram. A spooler board 2302 includes a PIC microcontroller 2308 and an AMC motor driver 2310. The spooler board 2302 is communicatively coupled to a development tension and payout assemblies 2604. A spooler board 2302 is further communicatively coupled to a motor assembly 2306 that includes a brake 2320, a spindle encoder 2322, a brushless DC electric motor 2324, and a maxon encoder 2326. The spooler board 2302 is connected to a power source 2312, a fan 2314, and an OCU 2316.

Figure 15K:
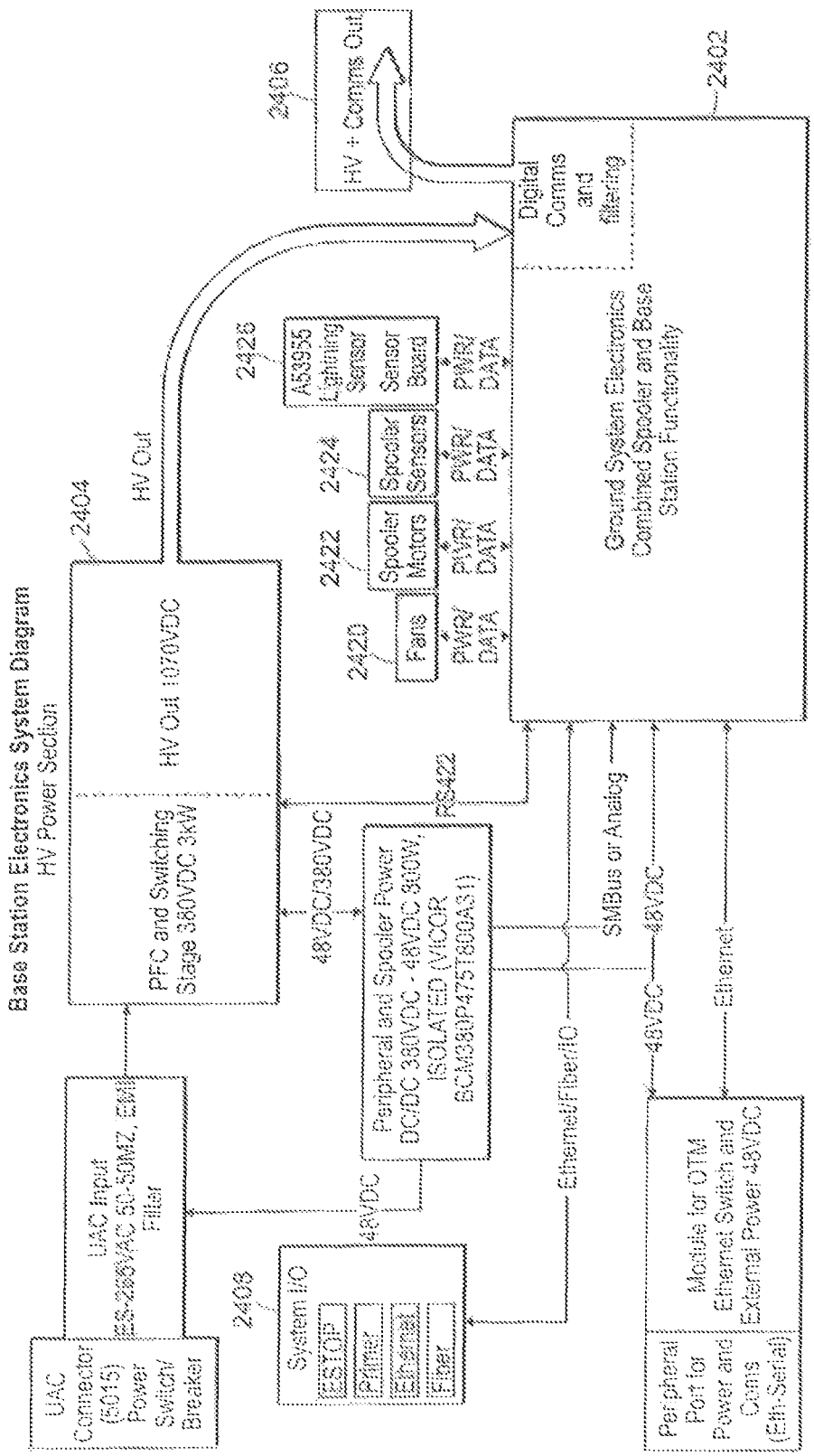

FIG. 15K illustrates an electronics system diagram. The spooler and base station 1001 includes the ground system electronics 2402 with the combined spooler and base station functionality. The ground system electronics 2402 provides power to, and receives data from, fans 2420, spooler motors 2422, spooler sensors 2424, and lighting sensors 2426.

The ground system electronics 2402 receives high voltage from the HV power system 2404. The ground system electronics 2402 provides high voltage and communication 2406 with the UAV. Further system input/output 2408 include Ethernet or fiber communication with a system of the UAV and a stop function and a primer function.

Figure 15L:
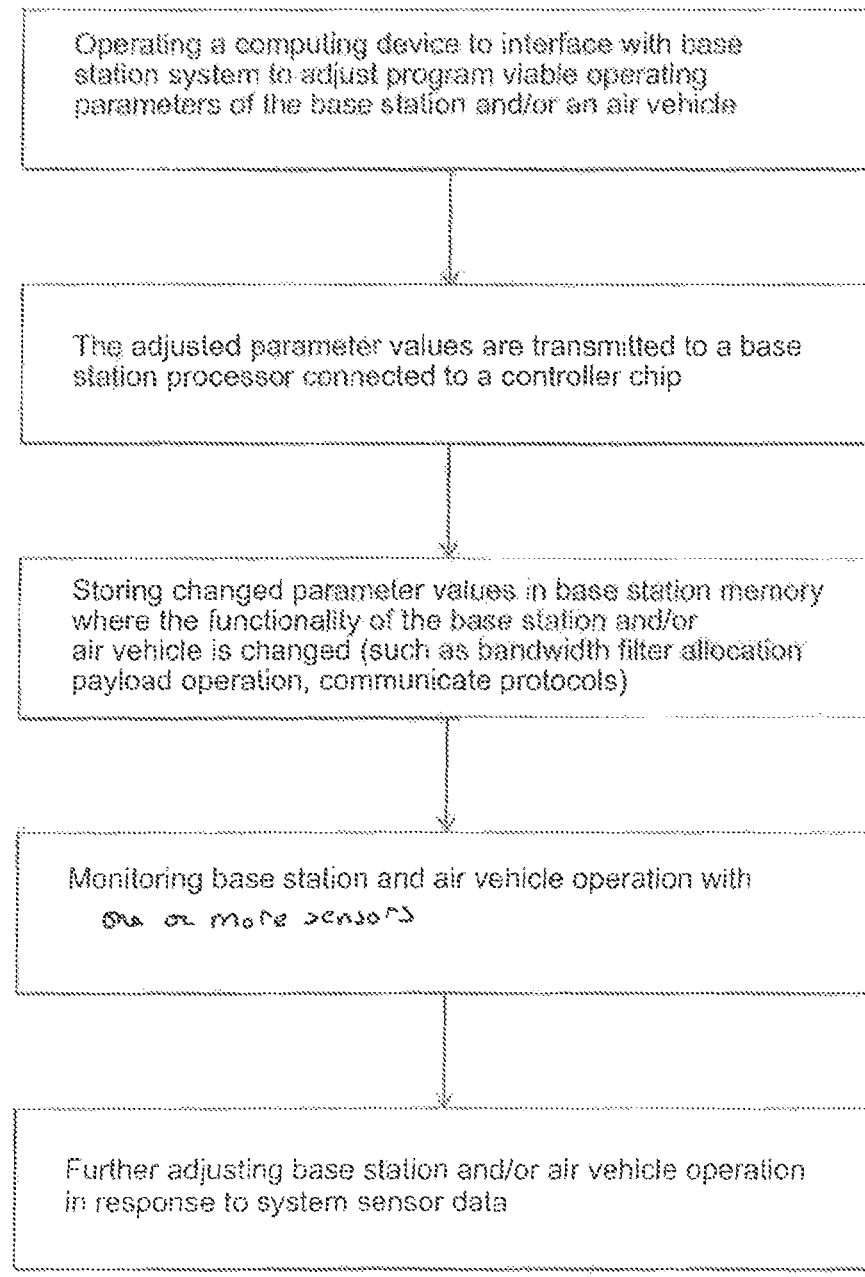

FIG. 15L is a method for externally programming a ground station and/or an air vehicle to adapt the ground station and/or the air vehicle to different applications or functions. A user is able to reset operational functions of the ground station and/or the air vehicle to adept the ground station and/or the air vehicle to different applications. Stored parameter values may be used to configure the ground station and/or the air vehicle. For example, a user may externally reprogram the ground station and/or air vehicle to function as a surveillance vehicle, a cell tower, or another commercial application.

An user uses an OCU (e.g., a computing device) to reprogram the ground station and/or air vehicle. Reprogrammable functions include, but are not limited to, changing a function of the spooler, changing a function of the air vehicle, changing a function of the ground station, changing a bandwidth, changing spooler control loops, ground station memory, resetting communications, switching payloads, and resetting operating bandwidth filters.

In an exemplary embodiment, the OCU is coupled via Ethernet to a microcontroller. The microcontroller is communicatively coupled to a Megachip.

Figure 15M:
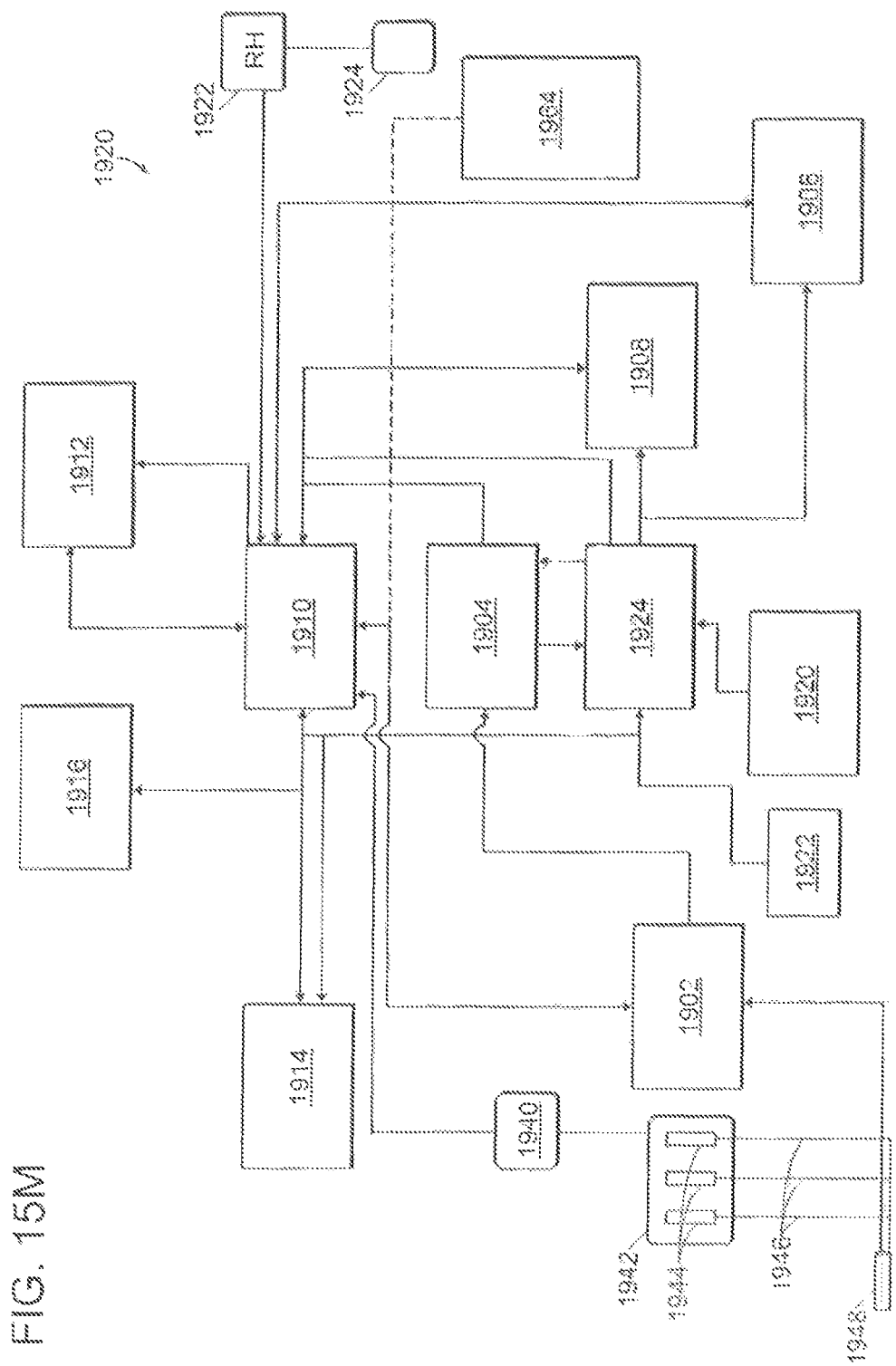

FIG. 15M is an exemplary control system 5920 for a UAV operating as a cell tower. A control system 5940 is for a remote aerial vehicle in which one or more antennas 5924 receives incoming voice, data and/or video from a mobile device such as a cellphone. A remote radio head 5944 configured to receive and transmit cellular communications in accordance with known standards, including the Open Base Station Architecture Initiative (OBSAI), the Common Public Radio Interface (CPRI) standard, the European Telecommunications Standard Institute (ETSI), or any other national, regional or industry based operating standard. In the present embodiment, the remote radio head delivers data to the processor 5946 which can use dedicated memory and processor elements to deliver the data at transfer rates in a range up to 1 gigabyte per second or more. Line encoding at Ethernet transmission rates of 10 Gbps or more can be used. One or more optical transceivers 5948 such as the Datacom XFP optical transceiver available from Finisar Corporation (Sunnyvale, California) can be used for data transmission and reception onboard the aerial vehicle. The transmitter system can use an optional multiplexer device 5949 or other suitable switching circuitry to provide routing of multiple channels of data into the one or more optical fibers 5952 that carry the data to the base station using filament 5954. Optionally the system can use optical fiber to deliver data directly from the antenna to the base station using systems available from Amphenol Aerospace located in Sidney, NY.

In one embodiment, CPRI may be provided on the aerial vehicle between the one or more antennas 5901 and the one or more RRHs 5905. A CPRI interface at the air vehicle enables seamless integration into next generation carrier networks.

CPRI is a synchronous, Constant Bit Rate (CBR) serial protocol that transports sampled radio interface data representing radio waveforms. It has strict latency, delay variation, and loss requirements and is typically transported from RRHs to Baseband Units (BBUs) over synchronous networks via path switching (e.g. over provisioned paths). Paths may be formed using any technology that meets the CPRI requirements (e.g. Sonet/SDH, Optical Transport Network (OTN), Asynchronous Transfer Mode (ATM) Virtual Circuits (VCs) and Virtual Paths (VPs), etc.). In a path switched operational model, multiple CPRI data flows are combined onto paths using Time Division Multiplexing (TDM). Additionally, packet switched networks (e.g. Ethernet) can be used to carry CPRI as long as the CPRI requirements are met. This approach requires mapping and demapping functions at the network edge (e.g. CPRI to Ethernet and Ethernet to CPRI) as well as jitter buffering (i.e. in the Ethernet to CPRI conversion). If multiple traffic classes are carried over Ethernet, strict prioritization of traffic classes at the Ethernet layer is necessary.

Eight CPRI Signals have been defined in the CPRI specification V6.0, each supporting progressively higher bit rates. The signal being transmitted from the aerial vehicle to the base station should meet certain latency and jitter requirements. In one embodiment, one way latency between the antenna and the compute infrastructure (e.g. a BBU Pool) must be less than 100 us and the maximum jitter (delay variation) is 65 ns. Delay variation can be compensated for using jitter buffers (i.e. adding latency) as long as the total one way latency does not exceed 100 us.

The one or more antennas 5901 on an aerial vehicle being used as a cell tower may take a number of forms. For example, the aerial vehicle may include one or more omnidirectional antennas. Omnidirectional antennas have a uniform radiation pattern, transmitting and receiving signals in all directions. Omnidirectional antennas place minimal navigational requirements on an aerial vehicle due to their uniform radiation pattern. Higher altitudes generally increase effective gain whereas parameters such as yaw, pitch, and roll will have relatively little effect on coverage of an omnidirectional antenna. Alternatively, the aerial vehicle may be equipped with one or more sectorized antennas. Sectorized antennas have a directional radiation pattern and are combined to cover an area. For example, the aerial vehicle may deploy three sectorized antennas each covering 120°. Similarly, the aerial vehicle may deploy four sectorized antennas each covering 90° Likewise, the aerial vehicle may deploy six sectorized antennas each covering 60°. Sectorized antennas may require the aerial vehicle to maintain a heading and control altitude, yaw, pitch, and roll or risk reduced service area coverage or creation outages. Higher gain antennas (i.e. those with narrow sectors) have radiation patterns (both horizontal and vertical) that are non-uniform (by definition) and, depending on the payload design and network design, may require sectors to maintain a fixed location.

The aerial vehicle may transmit the communication data received by the antennas 5901 to a carrier network via a tether. As noted the tether may be optical or electrical based. In one embodiment, a CPRI Physical Layer (Layer 1) can be implemented with electrical or optical components but Links must have a Bit Error Rate (BER)<$10^{-12}$. The tether may be linked to a triplexer circuit 5956 which routes the high voltage DC signal to the DCDC converter 5958 which regulates power to the payload 5960, the parachute deployment circuit 5962, and the system processor 5946.

As noted, an optical tether can be composed of single mode or multimode fiber and can contain one or more fibers and/or fiber pairs. Wave division multiplexing may be used over a fiber to increase available bit rates as well as provide bi-directional data flows. To support the use of the CPRI interface, the optical fibers meets the BER, timing/synchronization, delay variation, and latency requirements outlined in CPRI Specification V6.0.

The CPRI Specification V6.0 does not specify the electrical cabling required to support a CPRI interface for electrical-based tethers. Specifically, the cabling is left up to the implementation and thus can be the vehicle tether (as long as BER, timing/synchronization, delay variation, and latency requirements are met, see CPRI Specification V6.0).

In another embodiment, while not a physical tether, a wireless link can be used as the communications medium as long as it meets the BER, timing/synchronization, delay variation, and latency requirements outlined in CPRI Specification V6.0.

Referring to FIG. 16, an aerial vehicle system includes an aerial vehicle 1607, which is connected to ground-based equipment. This equipment includes a robotic spooler 1603, which manages the filament; a base station 1602, which converts AC to DC voltage, and acts as the vehicle's communications hub, and a generator 1601 or line power source. The aerial vehicle 1607 includes a body 1604 with a number of struts 1605 extending therefrom. Each strut 1605 has a thruster (e.g., a propeller coupled to a motor) disposed at its distal end. The body 1604 houses on-board circuitry such as power conversion circuitry, vehicle control circuitry, and sensor circuitry.

The base station 1602 provides power (e.g., DC power) to the aerial vehicle 1607 over the filament 1606 for powering the on-board circuitry and the thrusters.

Figure 17A:
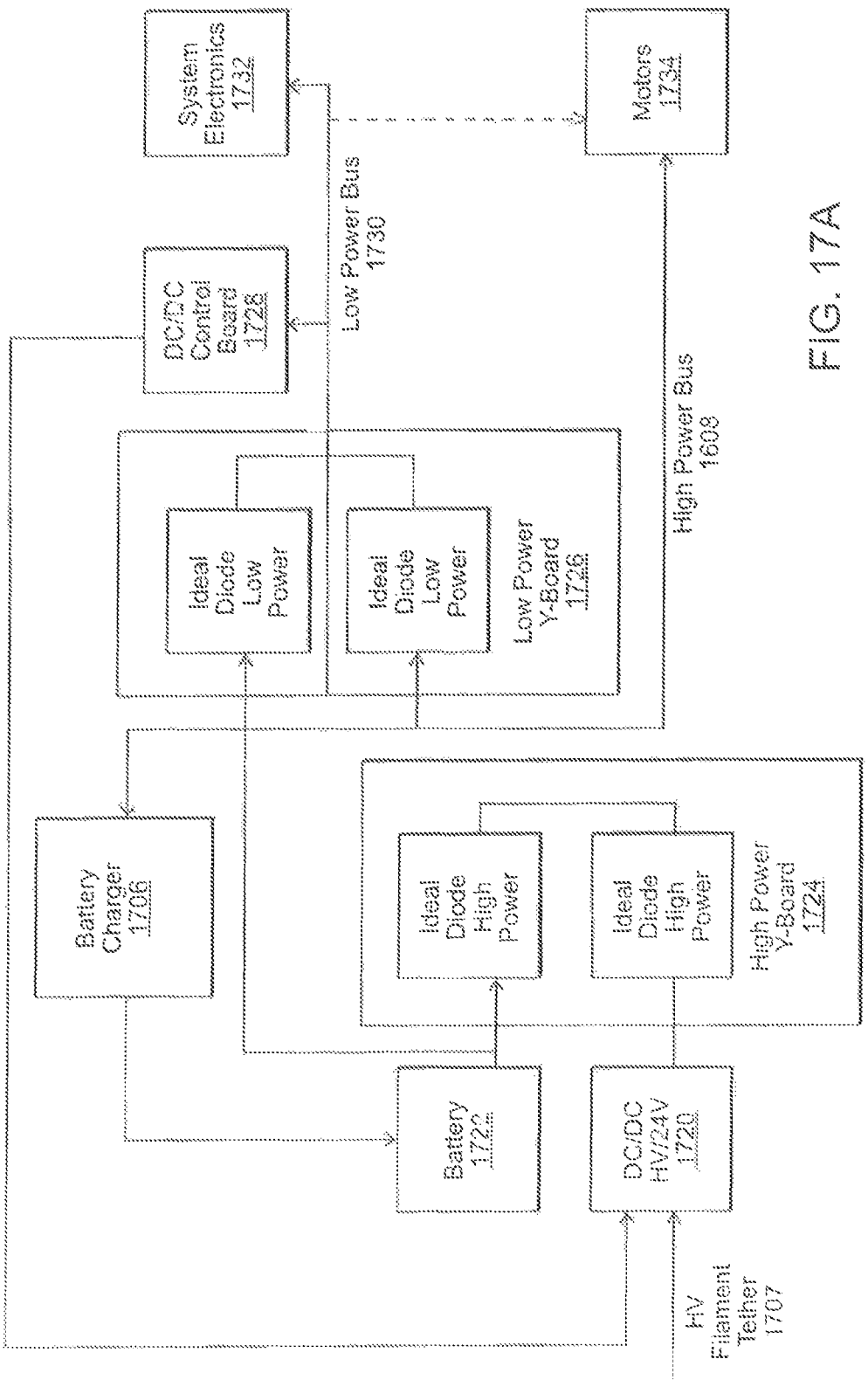
FIG. 17A depicts a schematic diagram of exemplary system circuitry including both high and low power Y-Board buses in an embodiment.

Referring to FIG. 17A, in some vehicle use scenarios, the on-board circuitry includes two power buses (1730 and 1608). The high power Y-Board 1724 handles high voltage, receiving DC power from the DC/DC converter 1720, and ultimately from the high voltage microfilament tether 1707. It provides power to the motors 1734 of an aerial vehicle over the high power bus 1608, if any other vehicle subsystems requires high voltage power, it would supply them, too.

A second, lower voltage power Y-Board 1726 receives voltage from the battery 1722, and passes it over the low power bus 1730 initiating the control 1728, which switches ON the DC/DC converter 1720—effectively powering up the vehicle on commanded start, using power from the battery system.

The lower power Y-Board 1726 via the low power bus 1730 also provides power to the vehicle system electronics sub-systems which have lower power requirements than the motors. Some examples of these sub-systems of the aerial vehicle that receive power from the low power Y-Board 1726 include the vehicle's system electronics 1732 which in turn include both vehicle controls and, on-board sensors.

In addition to its primary mode of operation, outlined above, the high power Y-Board 1724 performs a secondary function—that of supplementing or supplanting battery power to the motors 1734, if DC power from the filament 1707 either is insufficient to meet demand, or fails.

Figure 17B:
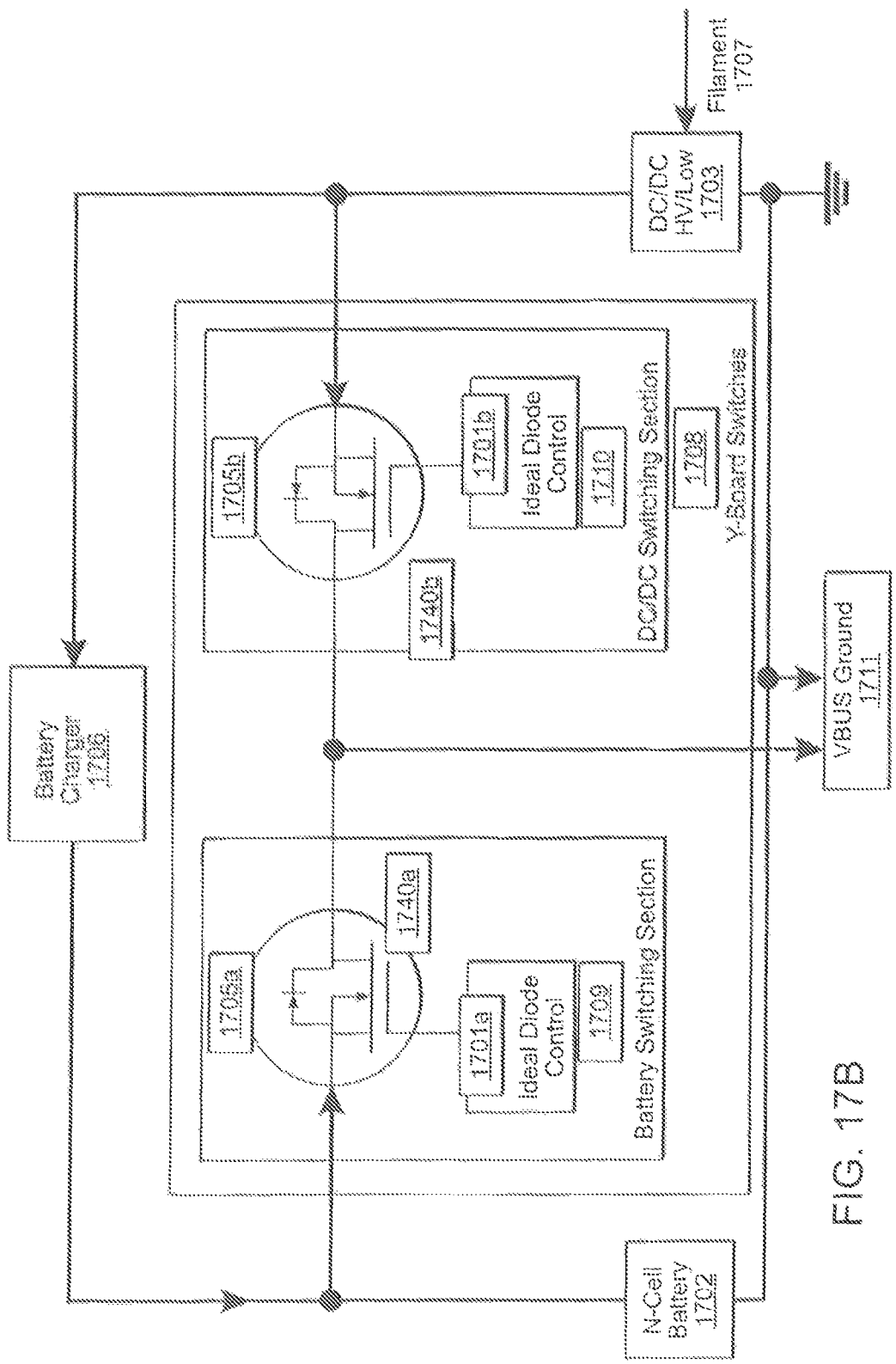
FIG. 17B is a schematic diagram of an exemplary low power Y-Board in an embodiment.

Referring to both FIGS. 17A and 17B, the Y-Boards include switching circuitry 1708. The DC/DC power source (1703 and 1720) receives DC power from the microfilament tether (1707); the DC power being associated with a tether voltage (e.g., 1000 Volts) and converts the DC power to a lower DC voltage (e.g., 24 Volts) for use by the motors 1734. The DC/DC power source 1703 connects to the switching circuitry 1708 which operates in a number of modes to regulate the power provided to the vehicle bus (VBUS, 1711) that powers the motors 1734. In some modes of operation, the switching circuitry 1708 draws power from one or both of the battery 1702 and the DC/DC converter 1703 to provide the drawn power for the motors 1734.

Referring to FIG. 17B, the battery 1702, the DC/DC converter 1703, and the charger 1706 are external to the Y-Board itself. The battery power switching section 1709 includes a battery controller 1701*a*, and parallel configuration of a switch 1740*a* and a forward voltage diode 1705*a*. The DC/DC power switching section 1710 includes a DC/DC power controller 1701*b*, and parallel configuration of a switch 1740*b* and a forward voltage diode 1705*b*. Both the battery power switching section 1709 and the DC power switching section 1710 provide power to the VBUS 1711.

In some examples, current in the circuit is directed using specialized integrated circuit silicon chips, which contain comparators, and gate driving charge pumps. The components are selected and qualified to handle predetermined load and physical requirements, and assembled as shown in the circuit. In general, the Y-Board configuration—especially the high voltage Y-Board 1724 is an uncommon use for these components, which were designed for a different, lower demand, and less complex type of switching.

I. Battery Startup Mode

A first mode of operation, referred to as battery startup mode, occurs when the system electronics 1732 of the aerial vehicle are powered-on, prior to DC power being provided via the filament 1707. In this mode, the battery (1722 and 1702) provides the voltage, and the DC/DC (1707) does not provide a voltage. In this case, the battery charger (1706) is not activated. Power flows from the battery 1722 to the low power Y-Board 1726. On the low power Y-board, a battery controller 1705*a* triggers a switch 1740*a*, powering the low power bus 1730 and in the generic Y-Board diagram, 1711). This is the initial state of the system upon power-on.

II. DC/DC On Mode

A second mode of operation, referred to as DC/DC on mode, occurs when operating in Battery Startup Mode, after the initial power-on of the on-board circuitry 1728 and 1732, and when the DC/DC power source 1720 begins providing voltage. In this mode, DC/DC 1720 provides a voltage to the high power Y-Board 1724, which is provided to the high power bus 1608 to enable the motors 1734. The DC/DC power source 1720 provides power to the charger 1706 via the high power Y-Board 1724. To transition from the battery startup mode to the DC/DC On Mode, the DC/DC power controller 1701*b* triggers switch 1740*b* and the DC/DC power source provides power to the high power bus (1608, and in the generic Y-Board figure, 1711). Once the VBUS (1608 and 1711) is powered, the battery-side switch 1740*a* is opened. In some examples, the diode controllers constantly monitor voltage sources. As soon as it senses that one of the sources is lower than another, the diode controllers switch to connect to the higher voltage source. In some examples, comparators are used to make the determination.

During this time, the charger 1706 may or may not charge the battery 1702 depending on the control and state of the system. In some examples, battery recharging occurs externally to the Y-Board. For example, battery recharging occurs when a dedicated battery processor on the power distribution board detects low battery state. The charger initiates when it senses that Y-Bus can provide voltage higher than 22 V. The maximum battery voltage is 21 V.

In some examples, the Y-board utilizes a standard metal-oxide-semiconductor field-effect transistor (MOSFET) component, by design, which includes a body diode. The time required to make this diode operational is in the order of nanoseconds. In operation, after the controller recognizes the presence of voltage, (in tens of microseconds), it closes the main switch and reduces power dropping over the body diode. This approach reduces the need for heat sinks—another key element with major implications for use in aerial vehicles, which face stringent weight constraints to meet their performance objectives.

III. Battery Power Mode

A third mode of operation of the switching circuitry 1708, referred to as battery power mode, occurs when operating in DC/DC On mode and the DC/DC power source 1703 lowers or stops providing voltage (e.g., the filament is damaged or overloaded). To transition from the DC/DC On mode to the battery power mode, the diode 1705*a* conducts as the voltage of the battery 1702 exceeds VBUS plus the forward voltage of the diode 1705*a*. The controller 1701*b* switches the DC/DC switch 1740*b*, disconnecting the DC/DC 1703 from VBUS. Once VBUS is powered, battery side switch 1740*a* is triggered to conduct by the battery side controller 1701*a*.

IV. DC/DC Power Mode

A fourth mode of operation of the switching circuitry 1708, referred to as the DC/DC power mode, occurs when operating in battery power mode and the battery 1702 stops providing voltage (e.g., the battery is losing power). To transition from the battery power mode to the DC/DC Power Mode, the DC/DC side diode 1705*b* conducts as the voltage of the DC/DC 1702 exceeds VBUS plus the forward voltage of the diode 1705*b*. The battery side controller 1701*a* triggers the switch 1740*a*, disconnecting the battery 1702 from VBUS. Once VBUS 1711 is powered, DC/DC side switch 1740*b* is triggered to conduct by its controller 1701*b*.

In general, the Y-Board is configured to prevent power interruption. If power is present from any of its multiple sources, it mediates that power, distributing it from the highest available source. Therefore, if power is accidentally or deliberately interrupted, the Y-Board will sense the lack, and automatically switch to supply power from the uninterrupted source. If demand is such that power levels dip, the Y-Board will sense the lack and automatically switch to augment the low level with power from the secondary source. Start-up power management is handled in the scenario described above, using two Y-Boards to first draw power to boot the vehicle from the battery in the absence of ground power (the initial state), and then switch over to DC power via the DC/DC converter (and ultimately from the ground source via tether), once the power level from that source is sufficient.

In at least some examples, operation is controlled by a processor executing stored software in the vehicle, a ground-based processor, or both. The software can be stored on a non-transitory machine readable medium and including machine language or higher level language instructions that are processed.

In some examples, the diode based solution described herein is especially effective for use in aerial vehicles since a capacitor-based solution would require a capacitor roughly the same size as the aerial vehicle, which would be impractical for flight.

Figure 18:
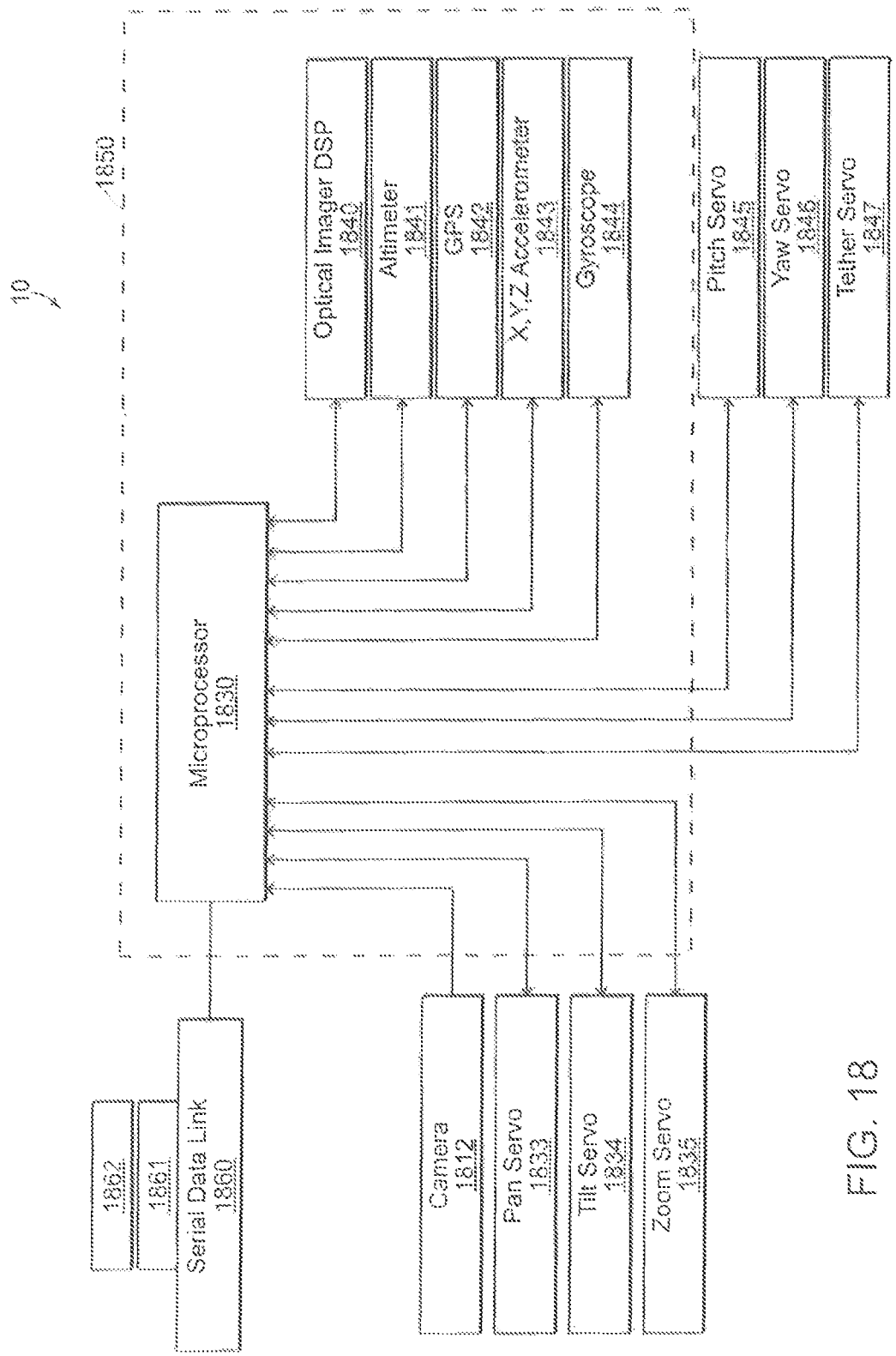
FIG. 18 is a diagram of an electronics and control schematic block diagram in an exemplary aerial vehicle 10 in an embodiment.

FIG. 18 is an electronics and control schematic block diagram in an exemplary aerial vehicle (such as aerial vehicle 10 shown in FIG. 1) in an embodiment. In one embodiment, a microprocessor 1830 manages the collection, scheduling, computation, transmission, and receipt of data. A serial link 1860, which may include a commercially available twisted pair transceiver integrated circuit, is capable of secure transmission and receipt of data placed on the tether.

Voltage isolation may be facilitated by a variety of techniques known to those of ordinary skill in the art having the benefit of this disclosure. In one embodiment, tuned magnetically isolated windings 1861, 1862 reject all noise and frequencies that are not within a desired MBPS (megabits per second) data transmission packet range. In some embodiments, voltage is isolated by capacitive isolation or electro-optical isolation employing optical isolator integrated circuits.

In one embodiment, one or more on-board data sensors may communicate with the microprocessor 1830, as shown in FIG. 18. For example, a gyroscope 1844 may continuously measure and integrate the angular rotation of the aerial vehicle. The gyroscope 1844 may include a micro-machined silicon integrated circuit. The microprocessor 1830 may continuously receive data from the gyroscope 1844 and may compute and direct any correction to one or more of the electric motor controllers. The microprocessor 1830 may also use data from the gyroscope 1844 to correct angular drift by activating pitch servos 1845, yaw servos 1846, or a combination of both. The microprocessor 1830 may also control a tether servo 1847 to wind and unwind the tether from the spool. The microprocessor 1830 and other control components may communicate via wireless signals when the tether is disconnected. Accordingly, in one embodiment, the microprocessor and/or other control components or sensors described herein may include wireless controls or sensors, or a wireless data receiver or transceiver interface.

In an embodiment, an optical imager digital signal processor (DSP) circuit 1840 may utilize built-in optical computational features of an optical mouse data pointing chip. Utilizing a suitable lens combination pointing toward the earth's surface, the optical imager DSP circuit 1840 can update changes in physical position up to 6000 times per second. For example, the optical imager DSP 1840 may be a signal processing engine.

In one embodiment, the aerial vehicle may also include an altimeter 1841. The altimeter 1841 allows the microprocessor to precisely hold altitude, or to ascend or descend in a controlled manner. The altimeter 1841 may facilitate, for example, traversing a stairwell or transitioning between floors of a building.

In an embodiment, the aerial vehicle may have a global positioning system (GPS) module 1842 that can facilitate continuous monitoring of the position of the aerial vehicle. The microprocessor 1830 may act on the positional data provided by the GPS module 1842 to allow the aerial vehicle to traverse particular paths. The GPS module 1842 may also report back an actual GPS position of the aerial vehicle to the base station (such as base station 30 shown in FIG. 1). In one embodiment, the GPS module 1842 includes a miniature GPS receiver.

In one embodiment, an accelerometer 1843 may continuously measure and integrate accelerations in the three orthogonal physical planes of the aerial vehicle.

In an embodiment, the microprocessor 1830 may communicate with an observation device or sensor such as, but not limited to, camera 1812 as well as with a pan servo 1833, a tilt servo 1834 operating servomotors, and a zoom servo 1835. In certain configurations, the microprocessor 1830, the optical imager DSP 1840, the altimeter 1841, the GPS module 1842, the accelerometer 1843, and the gyroscope 1844 reside on a printed circuit assembly 1850.

Figure 19A:
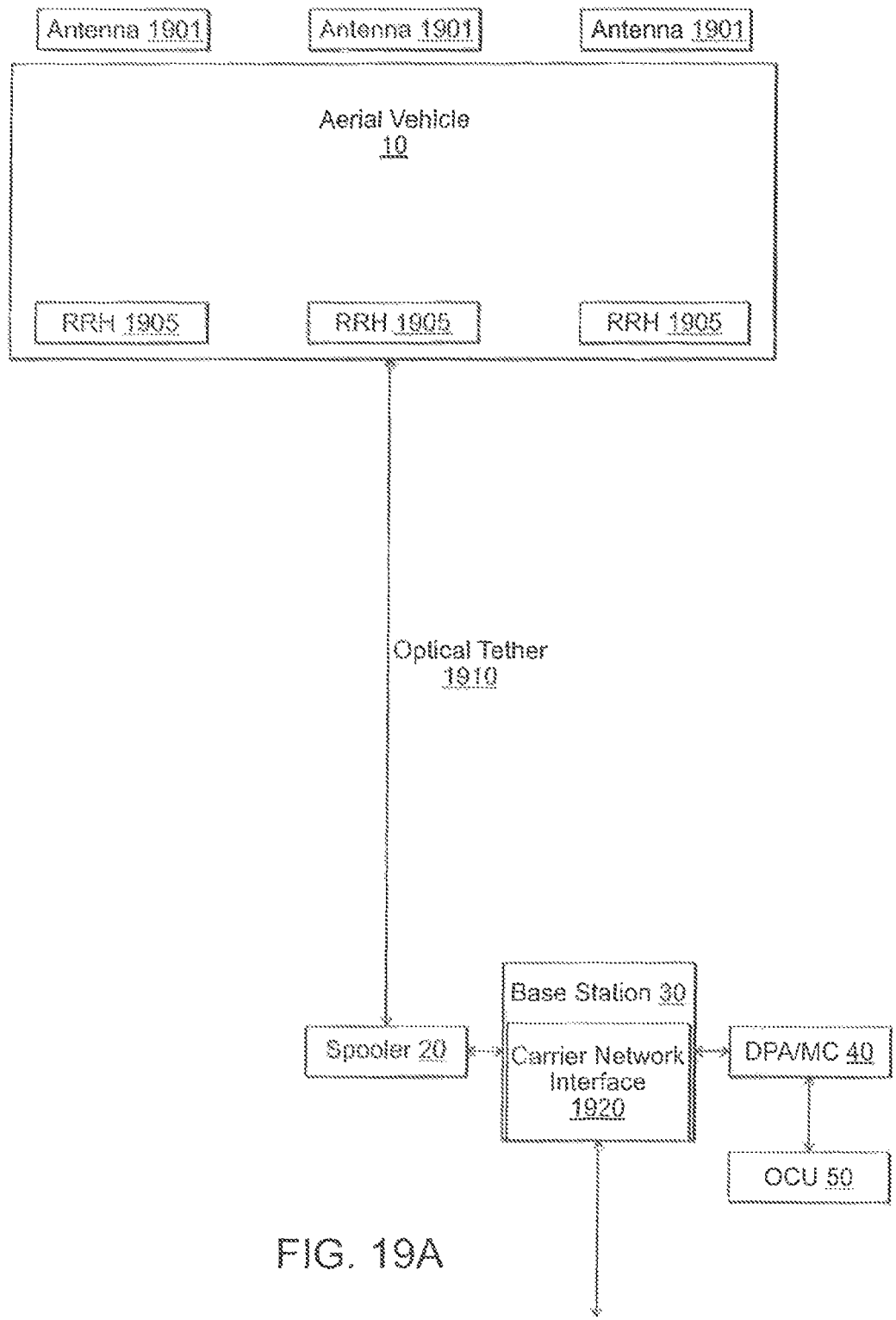
FIG. 19A is an exemplary PARC system deploying a UAV as a cell tower.

In one embodiment, a PARC system as described herein may be deployed to provide a mobile and aerial cell tower. For example, as depicted in FIG. 19A, an aerial vehicle (such as aerial vehicle 10 shown in FIG. 1) may be equipped with one or more radio antennas 1901 and one or more remote radio heads (RRHs) 1905. The antennas may establish communication with an individual's mobile device. In an exemplary embodiment, the aerial vehicle is equipped with three antennas 1901 and three RRHs 1905. In a preferred embodiment, the one or more RRHs 1905 connect to the base station (such as base station 30 shown in FIG. 1 or FIGS. 13A-13U) using an optical tether 1910 formed from a single mode or multi-mode fiber that contains one or more optical fibers and/or fiber pairs. As a non-limiting example, the optical tether 1910 may be an ITU-T Recommendation G.652.D-compliant optical fiber with enhanced low-loss and bend fiber technologies such as a Corning® SMF-28® Ultra Optical Fiber. Wave division multiplexing may be used over a fiber to increase available bit rates as well as provide bi-directional data flows. As previously discussed, the optical tether may connect to spooler such as spooler 20 shown in FIG. 1) which may be communicatively and physically coupled to the base station, a DPA/MC (such as DPA/MC 40 shown in FIG. 1), and an OCU (such as OCU 50 shown in FIG. 1). As discussed further below, an interface, such as a Common Public Radio Interface (CPRI) or other suitable interface may be provided onboard the aerial vehicle for converting data into a suitable format over an optical fiber or other physical layer.

In one embodiment, base station may include carrier interface 1920 for converting data received from the aerial vehicle, such as communication data from a cellular communication established between an individual and one or more of antennas 1901 on the aerial vehicle, into a suitable form for transit on a carrier network. As further discussed herein, the carrier interface 1920 may be a CPRI interface or other suitable interface.

It should be appreciated, that although the discussion herein refers to the preferable use of optical fibers for transmitting communication data from the aerial vehicle over the tether, other mediums may also be used. For example, in one embodiment, the one or more remote radio heads may connect via the tether to the base station using an electrical connection in the tether composed of unshielded twisted pair (UTP) wires. In another embodiment, the communication data may be relayed wirelessly by the RRHs 1905 to the ground for communication to the carrier network.

It should further be appreciated that the configuration depicted in FIG. 19A is exemplary and made for the purpose of illustration and that the embodiments of the present invention are not limited to the specifically illustrated configuration. For example, in one embodiment, instead of the aerial vehicle including the RRHs 1905, the RRHs may be located on the ground and connect to the antennas on the aerial vehicle via an optical tether or other connection. Similarly, different numbers of antennas 1901 and RRHs 1905 may be deployed on the aerial vehicle without departing from the scope of the present invention.

Figure 19B:
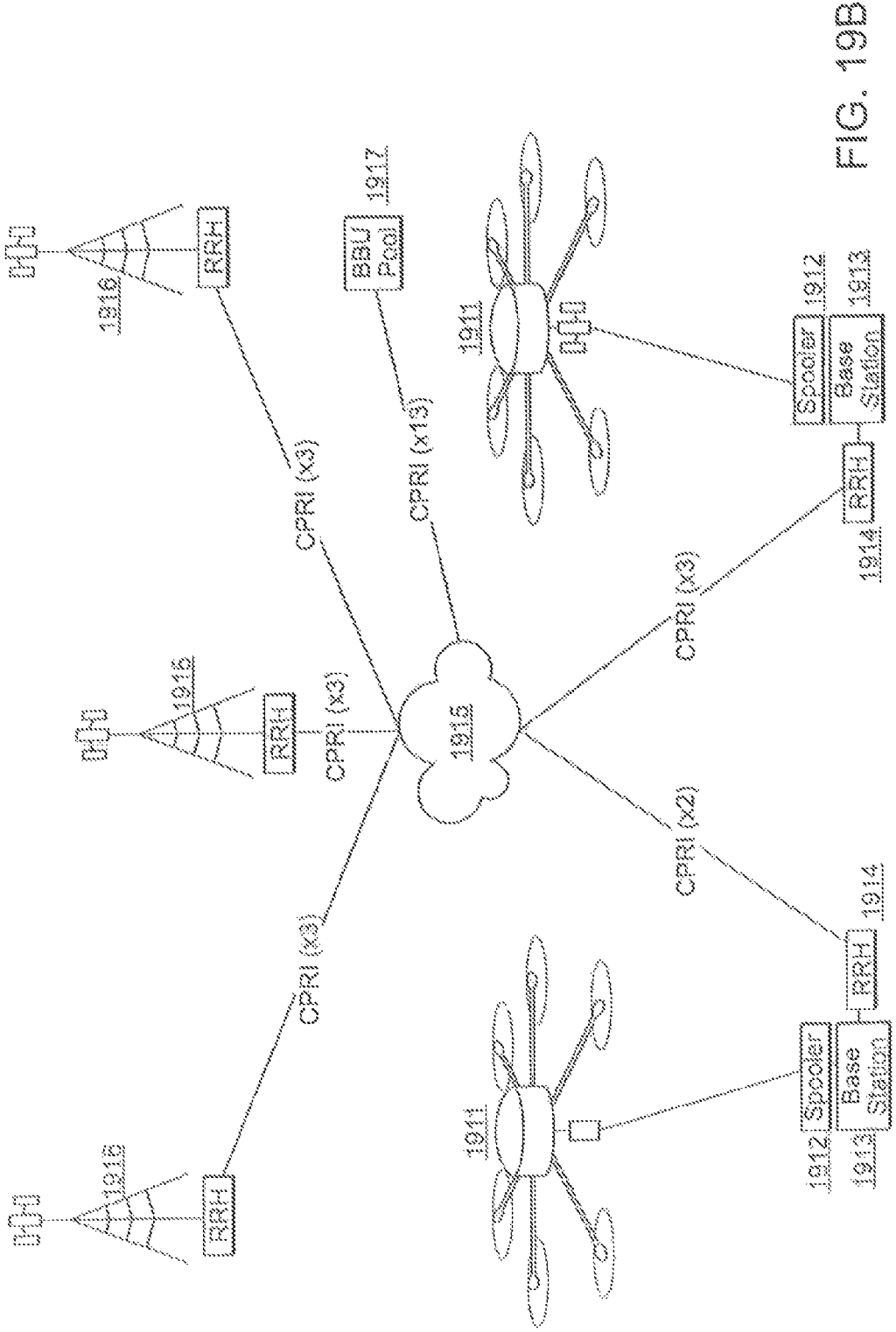
FIG. 19B is an exemplary PARC system deploying multiples UAVs as cell towers in a networked environment.

FIG. 19B is an exemplary PARC system deploying multiples UAVs as cell towers in a networked environment. The multiple UAVs 1911 may utilize an optical tether to communicate data to spoolers 1912 and base station 1913. The base station 1913 may be coupled to RRHs 1914 providing an interface to a carrier network 1915. Conventional cell towers 1916 may also be communicating with carrier network 1915 which may include BBU pool 1917. The UAVs 1911 may acquire partial communication data that is combined on carrier network 1915.

Figure 19C:
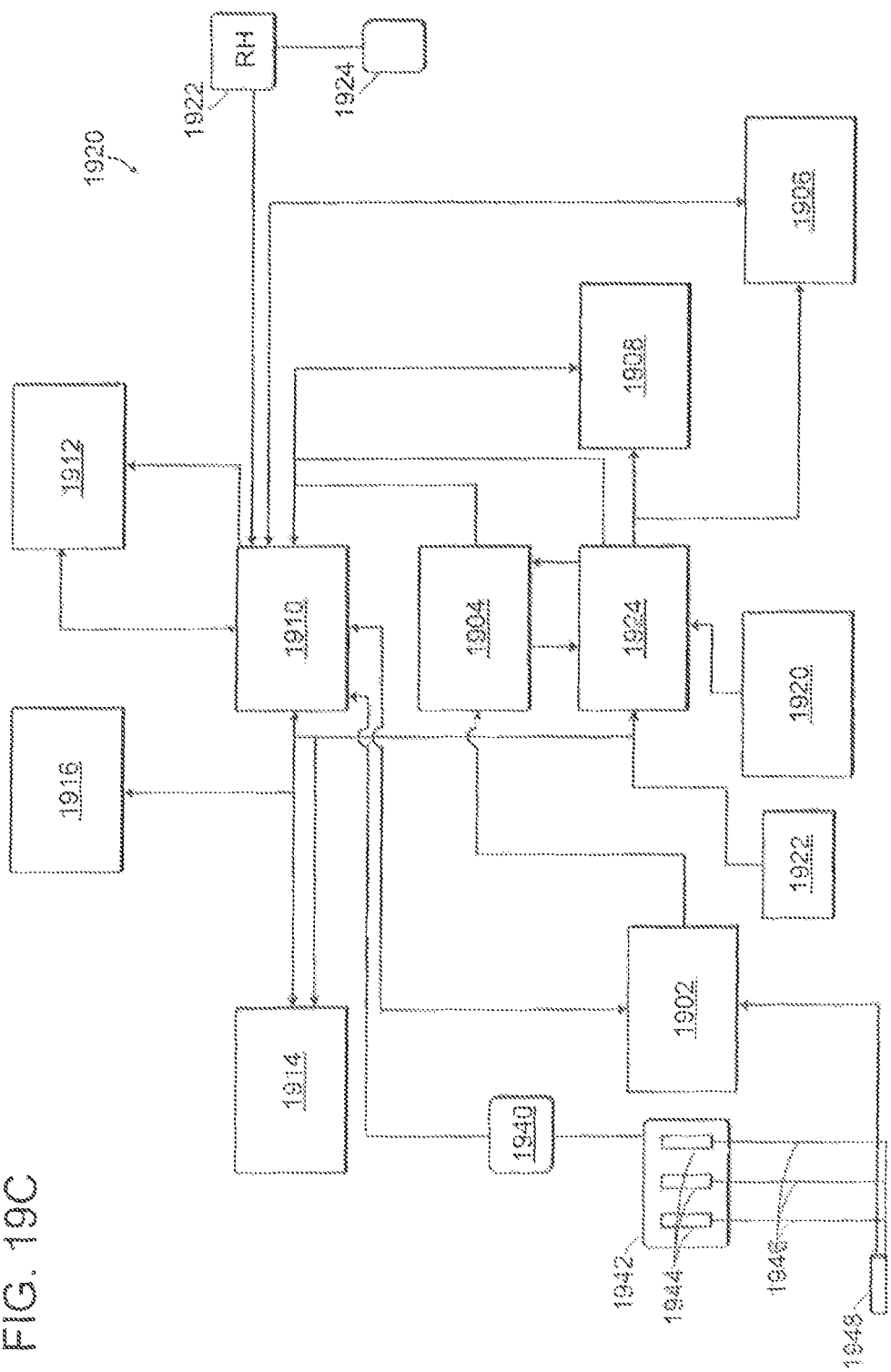
FIG. 19C is an exemplary PARC system deploying multiples UAVs as cell towers in a networked environment.

FIG. 19C is an exemplary control system for a UAV operating as a cell tower. For example, shown in FIG. 19C is a control system 1940 for a remote aerial vehicle in which one or more antennas 1924 receives incoming voice, data and/or video from a mobile device such as a cellphone. A remote radio head 1944 configured to receive and transmit cellular communications in accordance with known standards, including the Open Base Station Architecture Initiative (OBSAI), the Common Public Radio Interface (CPRI) standard, the European Telecommunications Standard Institute (ETSI), or any other national, regional or industry based operating standard. In the present embodiment, the remote radio head delivers data to the processor 1946 which can use dedicated memory and processor elements to deliver the data at transfer rates in a range up to 1 gigabyte per second or more. Line encoding at Ethernet transmission rates of 10 Gbps or more can be used. One or more optical transceivers 1948 such as the Datacom XFP optical transceiver available from Finisar Corporation (Sunnyvale, California) can be used for data transmission and reception onboard the aerial vehicle. The transmitter system can use an optional multiplexer device 1949 or other suitable switching circuitry to provide routing of multiple channels of data into the one or more optical fibers 1952 that carry the data to the base station using filament 1954. Optionally the system can use optical fiber to deliver data directly from the antenna to the base station using systems available from Amphenol Aerospace located in Sidney, NY.

In one embodiment, CPRI may be provided on the aerial vehicle between the one or more antennas 1901 and the one or more RRHs 1905. A CPRI interface at the air vehicle enables seamless integration into next generation carrier networks.

CPRI is a synchronous, Constant Bit Rate (CBR) serial protocol that transports sampled radio interface data representing radio waveforms. It has strict latency, delay variation, and loss requirements and is typically transported from RRHs to Baseband Units (BBUs) over synchronous networks via path switching (e.g. over provisioned paths). Paths may be formed using any technology that meets the CPRI requirements (e.g. Sonet/SDH, Optical Transport Network (OTN), Asynchronous Transfer Mode (ATM) Virtual Circuits (VCs) and Virtual Paths (VPs), etc.). In a path switched operational model, multiple CPRI data flows are combined onto paths using Time Division Multiplexing (TDM). Additionally, packet switched networks (e.g. Ethernet) can be used to carry CPRI as long as the CPRI requirements are met. This approach requires mapping and demapping functions at the network edge (e.g. CPRI to Ethernet and Ethernet to CPRI) as well as jitter buffering (i.e. in the Ethernet to CPRI conversion). If multiple traffic classes are carried over Ethernet, strict prioritization of traffic classes at the Ethernet layer is necessary.

Eight CPRI Signals have been defined in the CPRI specification V6.0, each supporting progressively higher bit rates.

| CPRI Signal | CPRI Rate (Gbit/s) | Standard Line Coding |
|---|---|---|
| CPRI-1 | 0.61440 | 8B/10B line coding (1 × 491.52 × 10/8 Mbit/s) |
| CPRI-2 | 1.22880 | 8B/10B line coding (2 × 491.52 × 10/8 Mbit/s) |
| CPRI-3 | 2.45760 | 8B/10B line coding (4 × 491.52 × 10/8 Mbit/s) |
| CPRI-4 | 3.07200 | 8B/10B line coding (5 × 491.52 × 10/8 Mbit/s) |
| CPRI-5 | 4.91520 | 8B/10B line coding (8 × 491.52 × 10/8 Mbit/s) |
| CPRI-6 | 6.14400 | 8B/10B line coding (10 × 491.52 × 10/8 Mbit/s) |
| CPRI-7 | 9.83040 | 8B/10B line coding (16 × 491.52 × 10/8 Mbit/s) |
| CPRI-8 | 10.13760 | 64B/66B line coding (20× 491.52 × 66/64 Mbit/s) |

The signal being transmitted from the aerial vehicle to the base station should meet certain latency and jitter requirements. In one embodiment, one way latency between the antenna and the compute infrastructure (e.g. a BBU Pool) must be less than 100 us and the maximum jitter (delay variation) is 65 ns. Delay variation can be compensated for using jitter buffers (i.e. adding latency) as long as the total one way latency does not exceed 100 us.

The one or more antennas 1901 on an aerial vehicle being used as a cell tower may take a number of forms. For example, the aerial vehicle may include one or more omnidirectional antennas. Omnidirectional antennas have a uniform radiation pattern, transmitting and receiving signals in all directions. Omnidirectional antennas place minimal navigational requirements on an aerial vehicle due to their uniform radiation pattern. Higher altitudes generally increase effective gain whereas parameters such as yaw, pitch, and roll will have relatively little effect on coverage of an omnidirectional antenna. Alternatively, the aerial vehicle may be equipped with one or more sectorized antennas. Sectorized antennas have a directional radiation pattern and are combined to cover an area. For example, the aerial vehicle may deploy three sectorized antennas each covering 120°. Similarly, the aerial vehicle may deploy four sectorized antennas each covering 90° Likewise, the aerial vehicle may deploy six sectorized antennas each covering 60°. Sectorized antennas may require the aerial vehicle to maintain a heading and control altitude, yaw, pitch, and roll or risk reduced service area coverage or creation outages. Higher gain antennas (i.e. those with narrow sectors) have radiation patterns (both horizontal and vertical) that are non-uniform (by definition) and, depending on the payload design and network design, may require sectors to maintain a fixed location.

The aerial vehicle may transmit the communication data received by the antennas 1901 to a carrier network via a tether. As noted the tether may be optical or electrical based. In one embodiment, a CPRI Physical Layer (Layer 1) can be implemented with electrical or optical components but Links must have a Bit Error Rate (BER)<$10^{-12}$. The tether may be linked to a triplexer circuit 1956 which routes the high voltage DC signal to the DCDC converter 1958 which regulates power to the payload 1960, the parachute deployment circuit 1962, and the system processor 1946.

The following table lists standard CPRI Physical Layer Modes:

| Line bit rate | Electrical | Optical Short range | Optical Long range |
|---|---|---|---|
| 614.4 Mbit/s | E.6 | OS.6 | OL.6 |
| 1228.8 Mbit/s | E.12 | OS.12 | OL.12 |
| 2457.6 Mbit/s | E.24 | OS.24 | OL.24 |
| 3072.0 Mbit/s | E.30 | OS.30 | OL.30 |
| 4915.2 Mbit/s | E.48 | OS.48 | OL.48 |

-continued

| Line bit rate | Electrical | Optical | |
| --- | --- | --- | --- |
| | | Short range | Long range |
| 6144.0 Mbit/s | E.60 | OS.60 | OL.60 |
| 9830.4 Mbit/s | E.96 | OS.96 | OL.96 |
| 10137.6 Mbit/s | E.99 | OS.99 | OL.99 |

As noted, an optical tether can be composed of single mode or multimode fiber and can contain one or more fibers and/or fiber pairs. Wave division multiplexing may be used over a fiber to increase available bit rates as well as provide bi-directional data flows. To support the use of the CPRI interface, the optical fibers meets the BER, timing/synchronization, delay variation, and latency requirements outlined in CPRI Specification V6.0.

The CPRI Specification V6.0 does not specify the electrical cabling required to support a CPRI interface for electrical-based tethers. Specifically, the cabling is left up to the implementation and thus can be the vehicle tether (as long as BER, timing/synchronization, delay variation, and latency requirements are met, see CPRI Specification V6.0).

In another embodiment, while not a physical tether, a wireless link can be used as the communications medium as long as it meets the BER, timing/synchronization, delay variation, and latency requirements outlined in CPRI Specification V6.0.

Figure 19E:
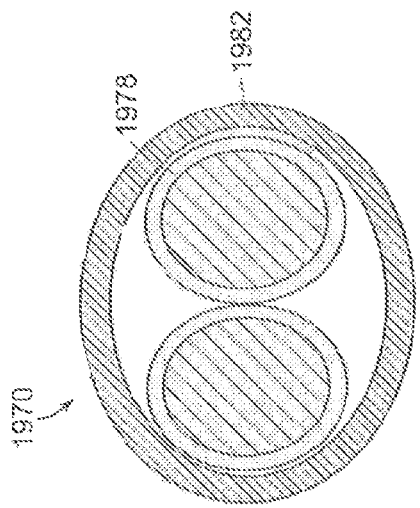
FIG. 19E is a cross sectional view of a wire pair for a tether.
Figure 19D:
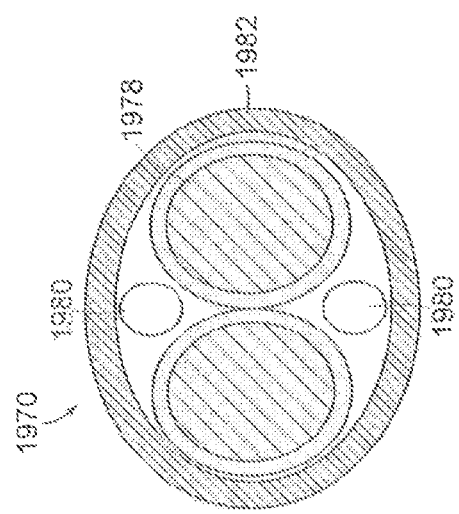
FIG. 19D is a cross-sectional view of a tether, including wire and optical fiber.

FIG. 19D illustrates a filament 1970 comprising copper 1978 and fiber 1980. The filament 1970 may be a fiber and copper twisted or untwisted pair. The filament 1970 includes an outer strength member jacket 1982. In an exemplary embodiment, jacket 1982 is made of the Kevlar element. The copper, dual fiber solution increases data throughput (bandwidth) of the filament, increases reliability of filament communications, decreases cost of the communications system, decreases size and weight of the communications system, and is able to support higher bandwidth payloads (such as 3G/4G and high resolution camera data transmission). In an exemplary embodiment, the filament 1970 is longer than 550 feet and supports greater than 100 Mbps.

In an exemplary embodiment, the filament 1970 cable operates up to 150 degrees Celsius with a maximum current over the filament of 1.7 A-2.8 A. Since resistance in a wire increases linearly with temperature, at some value, signal integrity and control of the UAV will degrade. Therefore, in some embodiments, the filament 1970 temperature is limited to a predefined desired maximum when drawing typical operational amperage. For example, on some embodiments, if the current exceeds a predefined threshold (e.g., 2.5A) for a predefined amount of time (e.g., three seconds) then the base station turns off the high voltage. As seen in FIG. 19E, the filament can comprise a twisted pair within the reinforcing sheath.

Figure 19F:
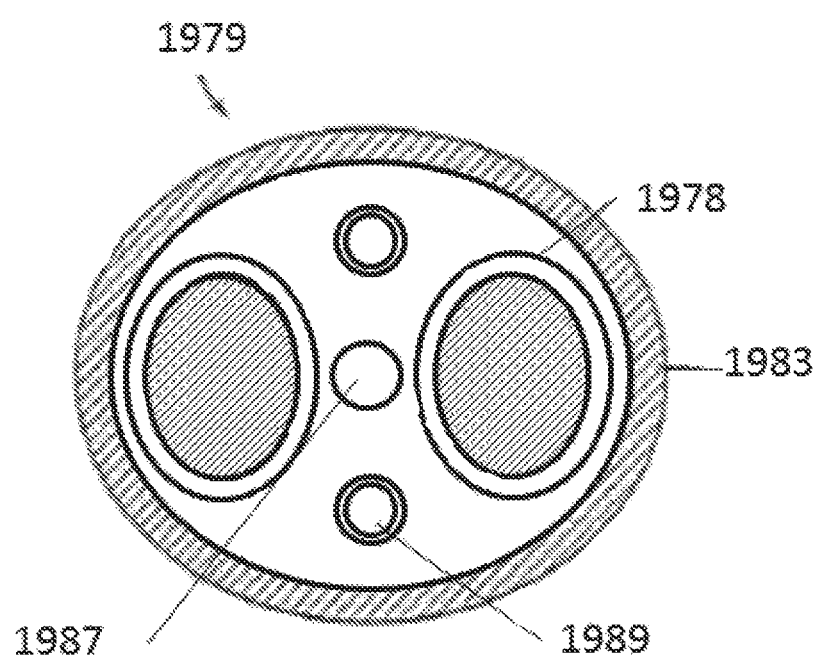
FIG. 19F is a cross sectional view of a wire pair for a tether that includes a strength member.

In some embodiments, one or more additional Aramid strength members are added in the interstitial space to increase filament strength and durability. The synthetic reinforcing fibers or members can also comprise composite materials. Para-aramid fibers, such as Kevlar and/or Twaron, provide the strength to weight ratio required. For spooling of the filament, fatigue, resistance and flexibility are also required. Composite aramid fibers, such as Kevlar 119 and 129 fibers or filaments available from DuPont, Wilmington, DE are suitable for these embodiments. Shown in FIG. 19F, the other sheath of filament 1979 provides insulation against ambient conditions. A single, centrally positioned strength element 1987 can be used to reinforce the filament. Optionally, optical fibers 1989 can also be used for data communication, as described herein.

Figure 20:
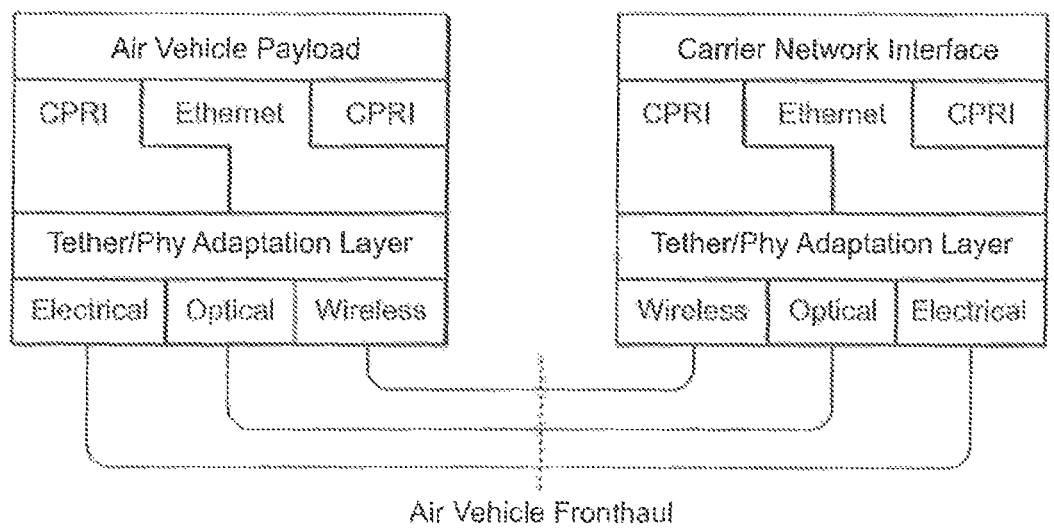
FIG. 20 depicts a block diagram of exemplary interfaces that may be employed by an embodiment.

FIG. 20 depicts a block diagram of exemplary CPRI and Ethernet interfaces that may be employed by an embodiment. The exemplary PARC system deploying a UAV as a cell tower replacement may support a number of payload and network interfaces. Vehicle payloads may be presented with CPRI and Ethernet interfaces and those interfaces are connected (via the tether or wireless links) to CPRI and Ethernet carrier network interfaces. A number of operational modes may be employed by the aerial vehicle to transmit the communication data to and from the antennas. Included among these operational modes are the following four operational modes listed in the table below.

| Mode | Interface Type | Description |
| --- | --- | --- |
| 00 | CPRI | CPRI Direct |
| 01 | CPRI | CPRI over Ethernet |
| 10 | Ethernet | Ethernet Direct |
| 11 | Ethernet | Ethernet over CPRI |

Two of these modes are CPRI Direct (00) and Ethernet over CPRI (11). CPRI direct is the simplest operational mode transporting 8B/10B and 64B/66B encoded serial data over electrical, optical, and wireless media as depicted in FIG. 21. Once CPRI Direct is available, Ethernet (and other Layer 2 protocols) may be implemented over CPRI.

Figure 22:
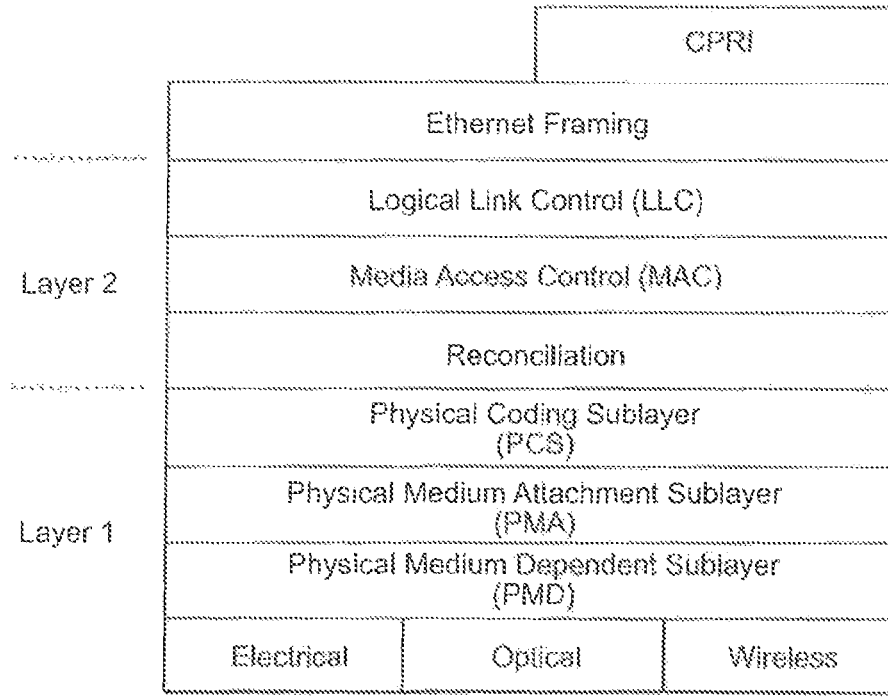
FIG. 22 depicts the use of additional exemplary operation modes that may be employed by an embodiment.

Two other operation modes depicted in FIG. 22 are Ethernet Direct (10) and CPRI over Ethernet (01). Ethernet may be implemented directly over electrical or optical tethers and wireless media.

Once Ethernet Direct is available CPRI may be implemented over Ethernet. In the case of CPRI over Ethernet, strict traffic prioritization and jitter buffering (at the Ethernet layer) should be used to meet the BER, delay variation, and latency requirements outlined by CPRI.

Figure 23:
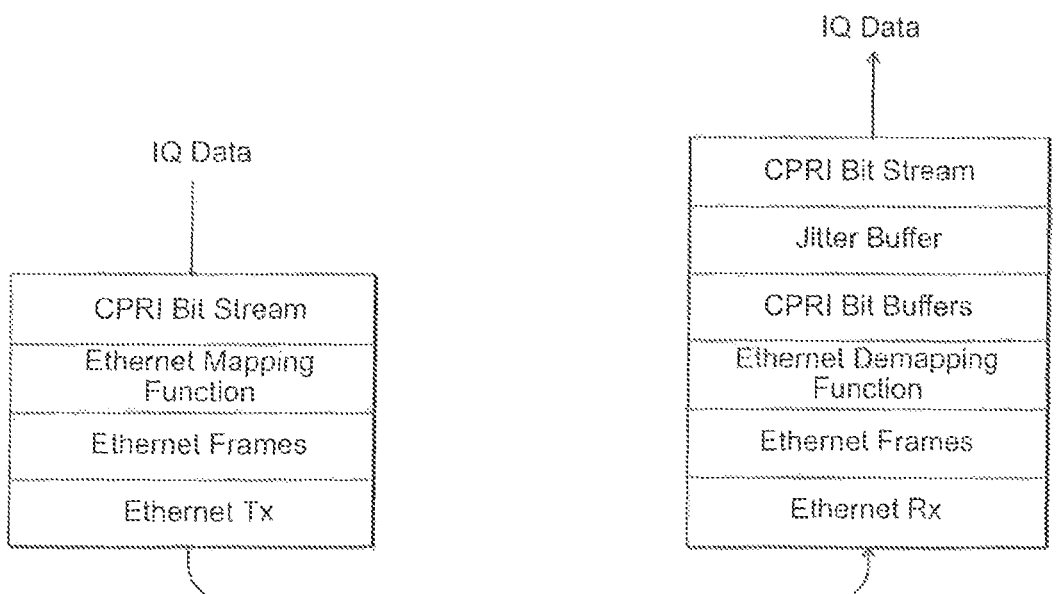
FIG. 23 depicts IQ data being carried in CPRI Bit Streams that are mapped to Ethernet frames via a Mapping Function in an exemplary embodiment.

In one embodiment, IQ data is carried in CPRI Bit Streams that are mapped to Ethernet frames via a Mapping Function as depicted in FIG. 23. This mapping function defines the way the CPRI Bit Stream is placed in the Ethernet frame. Ethernet frames are transmitted over Electrical, Optical, and Wireless media. Upon reception of Ethernet frames those frames are demapped to produce CPRI Bit Buffers (i.e. the CPRI contents of each frame). These bit buffers are placed in a jitter buffer which is played out (with added latency) at the same bit rate as the original CPRI bit stream. Frame slips (i.e. jitter buffer overrun and underrun) conditions are avoided through clock synchronization (i.e. clock frequency synchronization) between the input bit stream and output bit stream.

In an embodiment, a tether/physical adaption layer is utilized. This generalized layer maps logical bit streams and frames to physical media (i.e. Layer 1 sublayers). In CPRI Direct and Ethernet over CPRI it is comprised of the TDM/Circuit Emulation block and the mapping of those time slots/circuits to Electrical, Optical, and Wireless transceivers. In Ethernet Direct and CPRI over Ethernet the Physical Coding Sublayer (PCS), Physical Medium Attachment Sublayer (PMA), and Physical Medium Dependent Sublayer (PMD) comprise the Tether/Phy Adaptation Layer.

In one embodiment, the physical interface layer is comprised of Electrical, Optical, and Wireless interfaces and the modulation schemes used to transmit data.

Figure 24A:
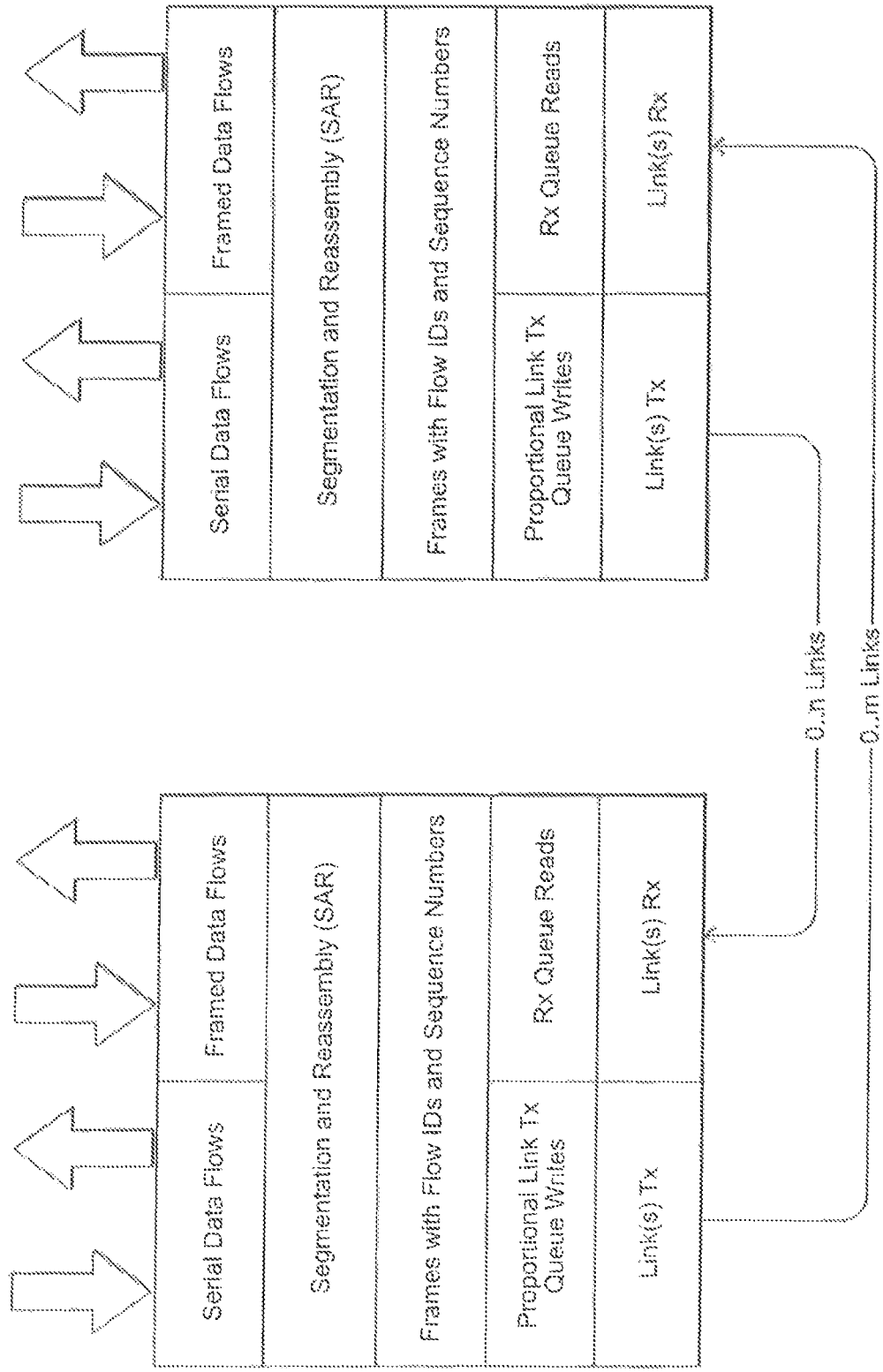
FIG. 24A depicts link bonding in an exemplary embodiment.

In FIG. 24A, as illustrated, a number of physical or logical links can be combined to create larger capacity logical links. This process is called Link Bonding. Combined links may have different capacities/bit rates. When this occurs data is proportionally split between the links upon transmission. Received data is read from multiple links and reassembled before being presented as a single data flow from a single logical link.

In one embodiment, the exemplary PARC system deploying a UAV as a cell tower may provide a communication link that utilizes CPSFK modulation to transport 250 byte packets over twisted pair wiring. These packets may have the following format

| Offset | Data |
| --- | --- |
| 0 | Packet Type/Source Lo |
| 1 | Packet Type/Source Hi |
| 2 | Packet Sequence Number |
| 3 | Packet data size in bytes |
| 4-248 | Payload |
| 249 | CRC Hi |
| 250 | CRC Lo | and may be prefaced by a 36 bit preamble followed by the packet's bits as shown in the table below.

| Preamble-36 bits | Packet Type/Source-16 bits | Packet Sequence Number-8 bits | Payload-1984 bits | CRC-16 bits |
| --- | --- | --- | --- | --- |

Figure 24B:
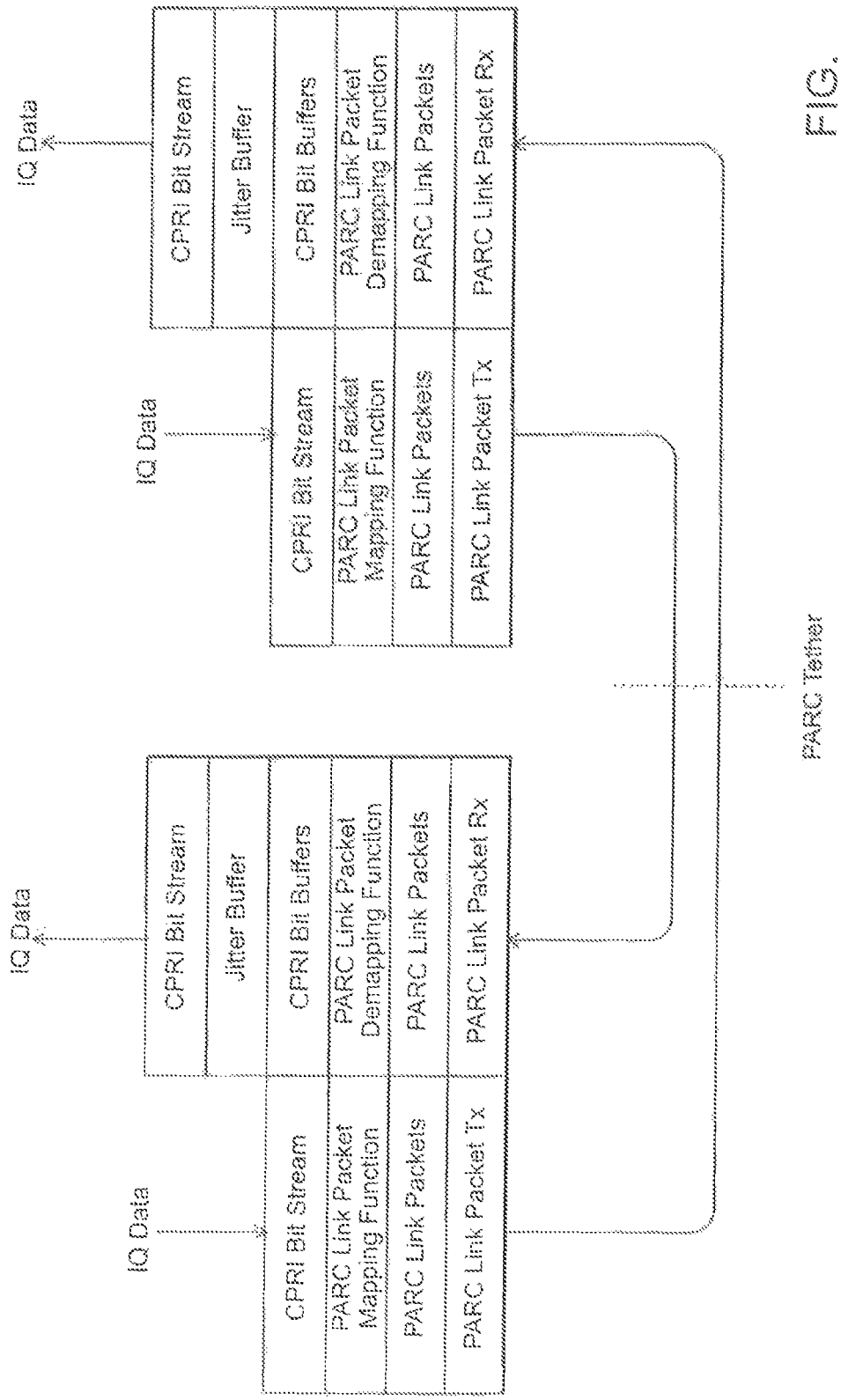
FIG. 24B depicts an exemplary embodiment providing a communication link that utilizes CPSFK modulation.

CPRI data streams can be mapped directly into these packets. When carrying CPRI, the Packet Type/Source is set to the CPRI assigned number, as illustrated in FIG. 24B.

As discussed above, the aerial vehicle operating as cell tower may employ sectorized antennas. In such an embodiment, the ability to maintain a steady position is important to prevent signal degradation. In one embodiment, the aerial vehicle may employ fixed rotor thrust vectoring such as described in a co-pending PCT application entitled "Fixed Rotor Thrust Vectoring", filed Jun. 3, 2015, application number PCT/US2015/033992 filed Jun. 3, 2015, the contents of which are incorporated herein by reference in their entirety. More particularly, as described therein, the aerial vehicle may employ a multi-rotor helicopter control system.

Figure 25A:
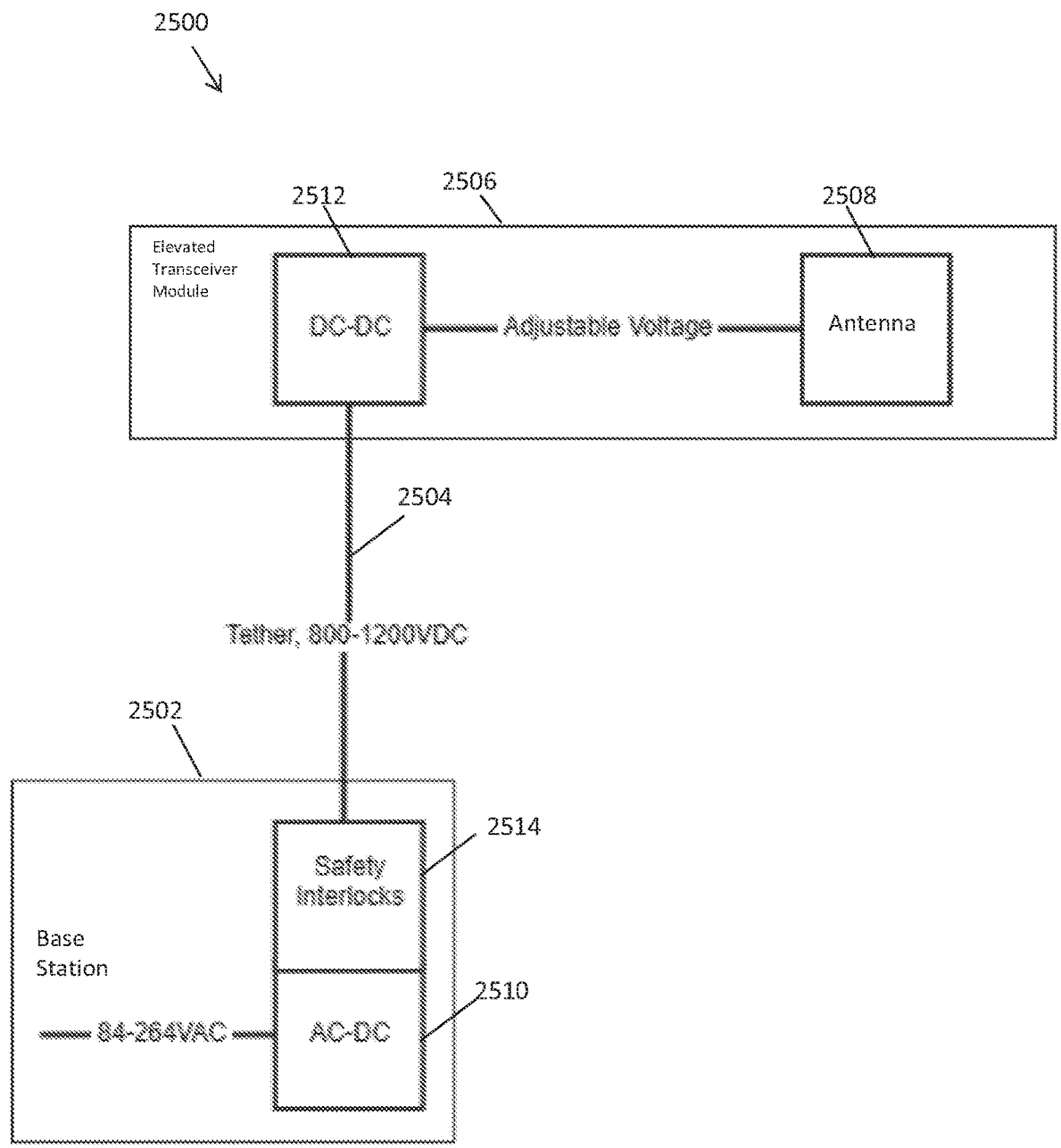
FIG. 25A depicts a system that includes a base station transmitting power, control, and/or communication signals through a tether to an elevated transceiver module.

FIG. 25A depicts a system 2500 that includes a base station 2502 transmitting power, control, and/or communication signals through a tether 2504 to an elevated transceiver module 2506. The ground station includes power management systems and control circuits. In an exemplary embodiment, the elevated transceiver module 2506 may be equipped with antennas 2508, such as radio antennas, and function as a cell tower. The system 2500 may include one or more convertors at the base station 2502 and/or the elevated transceiver module 2506.

In an exemplary embodiment, the tether 2504 is a microfilament, a pair of threadlike wires that transmits power to the elevated transceiver module 2506 while also enabling transmission of bi-directional data and high-definition video. In an exemplary embodiment, the transmitted power is 800 volts-1200 volts direct current (DC). In one embodiment, the micro-filament tether 2504 may be Kevlar-jacketed twisted copper pair with insulation that provides a power link and/or a communication link between the base station 2502 and the elevated transceiver module 2506. As illustrated in FIGS. 25H-25I, multiple tethers 2504 can be housed in a single cable bundle to allow for ease of installation and reliability.

The base station 2502 is connected to the elevated transceiver module 2506 via the tether 2504. The base station 2502 converts power to high-voltage (HV) power and provides HV power to the elevated transceiver module 2506. The base station 2502 includes an assembly that houses an alternating current (AC) power input and high voltage conversion electronics in an environmentally sealed enclosure. In an exemplary embodiment, the base station 2502 receives 84 volts-264 volts AC from an outside power source (e.g., a generator, power station, etc.). The base station 2502 includes an AC-DC convertor 2510 to convert the received AC power to DC power for transmission through the tether 2504. The base station 2502 also includes a high voltage output port to supply high voltage via the tether 2504 to the elevated transceiver module 2506.

The HV power is provided over the microfilament tether 2504 to the elevated transceiver module 2506 for use for energy intensive operations such as telecom. The elevated transceiver module 2506 includes a DC-DC convertor 2512 that converts the received DC power from one voltage level to another before transmitting the power to the antennas 2508 (e.g., radio antennas).

The microfilament may also provide a communication pathway used to communicate with the elevated transceiver module 2506 by an operator of an operator control unit (OCU). The base station 2502 may further include a data platform adapter/media converter (DPA/MC) to serve the function of connecting the OCU to the base station 2502 while also providing electrical shock hazard isolation. The DPA/MC may include an optical port to connect to the base station 2502 via a fiber optic cable and may also include an Ethernet port to connect to the OCU. The OCU may be a ruggedized laptop or other computing device equipped with and able to execute the OCU application described further herein enabling monitoring and/or control of the base station 2502 and/or voltage and/or the elevated transceiver module 2506. The DPA/MC may communicate with the base station 2502 over an optic fiber and communicate with the OCU over an Ethernet connection.

In an embodiment, the elevated transceiver module 2506 may include an imaging device, radar or other sensor used to acquire data.

In some embodiment, the base station 2502 includes safety interlocks 2514 that will immediately auto-shutoff power to the system. The auto shutoff utilizes ground shift detection and no connection detection. The base station 2502 may further include safe-turn on utilizing positive connect detection and a multi-stage lockout (primer). The safety interlocks 2514 are configured to shut down power when any serviceable system component is accessed.

In one embodiment, the system as described herein may be deployed to provide a cell tower. For example, the elevated transceiver module 2506 may include and/or be equipped with one or more radio antennas 2508 and one or more remote radio heads (RRHs). The antennas 2508 may establish communication with an individual's mobile device. In a preferred embodiment, the one or more RRHs connect to the base station 2502 using an optical tether 2504 formed from a single mode or multi-mode fiber that contains one or more optical fibers and/or fiber pairs. As a non-limiting example, the optical tether 2504 may be an ITU-T Recommendation G.652.D-compliant optical fiber with enhanced low-loss and bend fiber technologies such as a Corning® SMF-28® Ultra Optical Fiber. Wave division multiplexing may be used over a fiber to increase available bit rates as well as provide bi-directional data flows. An interface, such as a Common Public Radio Interface (CPRI) or other suitable interface may be provided for converting data into a suitable format over an optical fiber or other physical layer.

It should further be appreciated that the configuration depicted in FIG. 25A is exemplary and made for the purpose of illustration and that the embodiments of the present invention are not limited to the specifically illustrated configuration. For example, in one embodiment, the RRHs may be located on the ground and connect to the antennas 2508 on the transceiver via an optical tether 2504 or other connection. Similarly, different numbers of antennas 2508 and RRHs may be deployed without departing from the scope of the present invention.

In one embodiment, there may be multiple apparatuses as cell towers in a networked environment. The multiple apparatuses may utilize an optical tether 2504 to communicate data to one or more base stations 2502. The base station 2502 may be coupled to RRHs providing an interface to a carrier network. Conventional cell towers may also be communicating with carrier network which may include BBU pool. The apparatuses may acquire partial communication data that is combined across carrier network.

In some embodiments, the ground station may utilized a voltage-controlled duty cycle to correct a drop in voltage. The tether can generally transmit voltage of 300 volts or greater, and preferably in the range of 500-1200 volts.

Figure 25C:
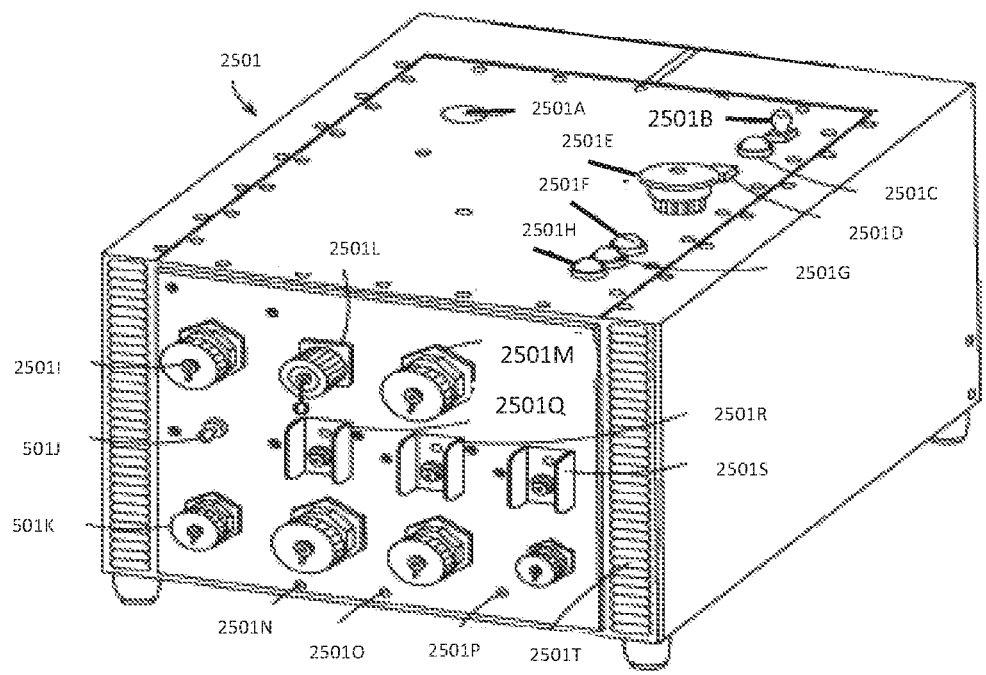
FIGS. 25B-25C depicts an embodiment of an exemplary base station.
Figure 25B:
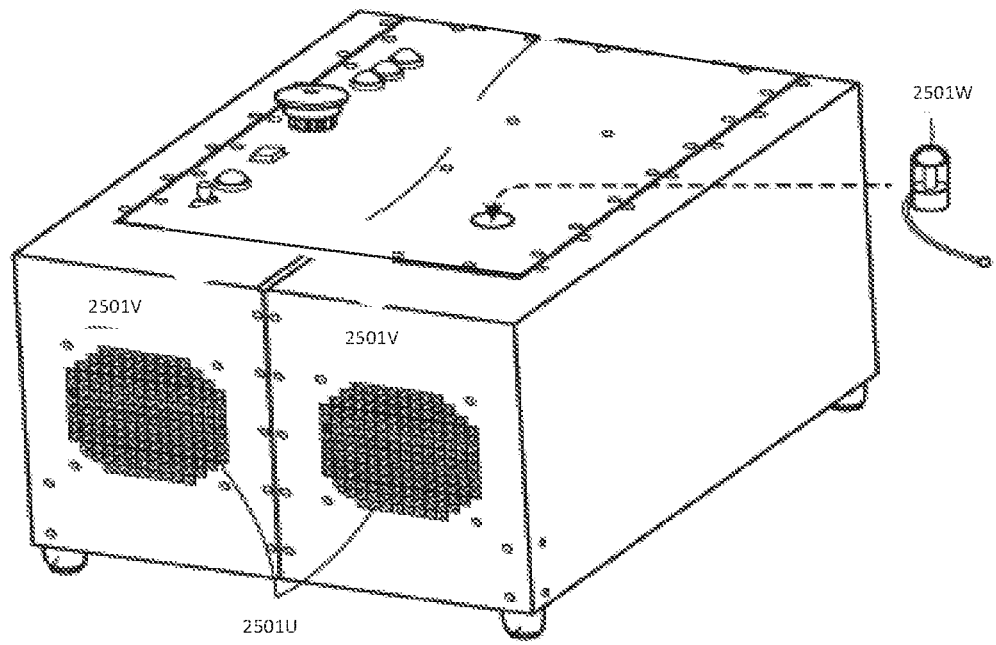

FIGS. 25B-25C illustrates a front and back view of a base station that includes a number of components and features. For example, the base station may include a base station enclosure assembly 2501. The base station enclosure assembly 2501 may house an AC power input and high voltage conversion electronics in an environmentally sealed enclosure. Power and communications connection ports, and AC input switches may be located in the rear panel. High voltage enable/disable controls and status indicators may be located in the top panel. A magnetic mount 2501A may be used by the base station to provide a magnetic feature for securing an optional beacon assembly to the base station. A beacon I/O port 2501B may provide a connector interface to the optional high voltage beacon assembly. In one embodiment, a rubber sealing cap may be provided for the port when the beacon is not present The base station may be equipped with an HV primer indicator LED 2501C and an HV primer button 2501D. The HV primer indicator LED 2501C may be a colored LED such as a red LED that indicates that high voltage is primed. The HV primer button 2501D may be provided to enable/disable the high voltage output from the base station to the transceiver. As a non-limiting example, the HV primer button 2501D may be configured so that a user pressing the button for >4 seconds enables or disables OCU control of the high voltage. An emergency ESTOP switch 2501E may be provided that will immediately terminate power to the system if depressed (pressed down) during operation. This button may also serve an arming function (i.e., it enables activation of the HV primer button) during the start-up sequence. In one embodiment, if the ESTOP switch is depressed upon initial power up of base station, the base station will not power up. The ESTOP switch 2501D may be provided in different forms including as a two position red mushroom shaped button.

A number of LED indicators may be provided in the base station such as a High Voltage good indicator LED 2501F, an AC good indicator LED 2501G and a fault indicator LED 2501H. The High Voltage good indicator LED may indicate the status of high voltage output (e.g. if not illuminated the high voltage is not activated). The AC good indicator LED may indicate the status of primary and/or secondary AC input from a grid/generator source (e.g.: if the LED is not illuminated, AC input is not activated). The fault indicator LED may indicate a system power fault condition (e.g.: if the LED is illuminated, high voltage is automatically disabled).

The base station may also include a number of ports, terminals and switches. These may include an HV output port 2501I, a GND lug/terminal 2501J, an interface port 2501K, an Ethernet I/O port 2501L, an Optical Ethernet I/O port 2501M, a primary AC input port 2501N, a secondary AC input port 2501O, an aux ac out output port 2501P, a primary AC switch 2501Q, a secondary AC switch 2501R, and an Aux AC out switch 2501S. The HV output port may supply high voltage (via the base station) to the elevated transceiver module 2506. The GND lug/terminal may provide an attachment point for system electrical grounding. The interface port may supply power (low voltage to the elevated transceiver module 2506) and communication (via the base station to the elevated transceiver module 2506) to the elevated transceiver module 2506. The Ethernet I/O port may provide a connector interface to the OCU or router/switch and may be used for debug or lab operations. The Ethernet I/O port may include MIL-rated connector plugs attached via lanyard. The base station may also include an Optical Ethernet I/O port that provides a connector interface to Ethernet-fiber converter. This port may be used for connection during normal operation. Optical Ethernet I/O port may include MIL-rated connector plugs attached via lanyard. The primary AC input port that provides a connector interface to a primary AC input source. The primary AC input port may include rated connector plugs attached via lanyard. The secondary AC input port may provide a connector interface to a secondary AC input source. The secondary AC input port may include rated connector plugs attached via lanyard. The aux AC out output port may provide a connector interface to power peripheral device (i.e., OCU). This port may include MIL rated connector plugs attached via lanyard. It should be noted that voltage available from AUX AC may be the same as voltage on the Primary AC/Secondary AC. A primary AC switch may be provided as a two position toggle switch that turns AC input on and off. The secondary AC switch may also be provided that turns AC input on and off. Similarly the Aux AC out switch may be provided in the base station as a two position toggle switch that turns aux AC output on and off.

The base station may also include heat sinks and/or fins 2501T and cooling fans 2501U. The heat sinks and fins may provide passive cooling of internal electronics and the cooling fans may provide cooling and directed airflow for the internal electronics. An exemplary base station may also include a side plate assembly 2501V to house the cooling fans and heat sink fins that are integral to the base station enclosure.

The base station may include a high voltage beacon assembly 2501W configured to provide a visual Indication (e.g.: flashing light) that is illuminated when high voltage is activated. The beacon usage is optional and may be used at the discretion of the operator depending on light discipline considerations. The beacon may incorporate a cable/plug that interfaces with a beacon port on the base station enclosure. The beacon may be retained on the base station enclosure via an integral magnet.

In one embodiment, the base station may be configured to utilize a number of different types of cables including but not limited to a primary AC input cable, a secondary AC input cable, an Ethernet cable and an auxiliary AC output cable. As non-limiting examples, the primary AC input cable may be a 3 meter (10 feet) sealed, shielded cable with an MIL-rated circular connector that interfaces with a grid or generator power source. The secondary AC input cable may be a 3 meter (10 feet) sealed, shielded cable with a MIL-rated circular connector. The secondary AC input cable is optional and interfaces with a grid or generator power source. The connector termination may be customer-specific. The Ethernet cable is an optional 3 meter (10 feet) Ethernet cable with RJ-45. The Ethernet cable provides a connection from a base station Ethernet port to an Ethernet port on a peripheral device (e.g: OCU or router/switch). An optional auxiliary AC output cable may be utilized which is a 3 meter (10 feet) sealed, shielded cable with a MIL-rated circular connector. This cable may be used to provide power to a peripheral device (e.g., OCU).

The DPA/MC may include a number of components and features. For example, the DPA/MC may include a DPA/MC enclosure assembly that houses electrical and optical components in an environmentally sealed enclosure. The DPA/MC may also include an A/C power input that includes power cable connects to an A/C source and a power indicator such as an LED that is illuminated when A/C power is supplied. The DPA/MC may further include an optical port to connect the DPA/MC to the base station with a fiber optic cable. A first OCU port may be utilized by the DPA/MC to connect the DPA/MC to the OCU via an RJ-45 standard connector. A second OCU port may include an optional RJ-45 connection to control the payload on the transceiver. Additionally, the DPA/MC may include a data platform (WAN) port used to optionally connect the DPA/MC to a DHCP external network via an RJ-45 connection. An Ethernet cable may be provided to connect the DPA to the OCU. In one embodiment, the Ethernet cable is 3 meters long (10 feet). When present, the DPA/MC provides electrical protection between an operator using the operator control unit (OCU) and the Base Station. The Media Converter converts the fiber optic signal to copper Ethernet for the OCU. The fiber optic connection provides electrical isolation between the Base Station and the OCU. In an alternate embodiment, the OCU is directly connected to the base station and in such an embodiment, the electrical protection provided by the DPA/MC is absent.

The OCU may be a ruggedized laptop or other computing device configured to execute an OCU application providing operation information and status/warning indications required for the system operation. Control functions can include but are not limited to enable/disable vehicle LEDs and enable/disable high voltage. OCU application controls (visible in the UI) may include, without limitation, buttons, sliders, or pull-down menus that may be accessed using the computer keyboard, touchscreen (if equipped), or mouse.

In one embodiment, the base station includes a microprocessor to manage the transmission of power and/or the collection, scheduling, computation, transmission, and receipt of data. A serial link, which may include a commercially available twisted pair elevated transceiver module integrated circuit, is capable of secure transmission and receipt of data placed on the tether.

Voltage isolation may be facilitated by a variety of techniques known to those of ordinary skill in the art having the benefit of this disclosure. In one embodiment, tuned magnetically isolated windings reject all noise and frequencies that are not within a desired MBPS (megabits per second) data transmission packet range. In some embodiments, voltage is isolated by capacitive isolation or electro-optical isolation employing optical isolator integrated circuits.

In one embodiment, base station may include carrier interface for converting data received from the elevated transceiver module 2506, such as communication data from a cellular communication established between an individual and one or more of antennas 2508, into a suitable form for transit on a carrier network. As further discussed herein, the carrier interface may be a CPRI interface or other suitable interface.

It should be appreciated, that although the discussion herein refers to the preferable use of optical fibers for transmitting communication data from the receiver over the tether, other mediums may also be used. For example, in one embodiment, the one or more remote radio heads may connect via the tether to the base station using an electrical connection in the tether composed of unshielded twisted pair (UTP) wires. In another embodiment, the communication data may be relayed wirelessly by the RRHs to the ground for communication to the carrier network.

Figure 25D:
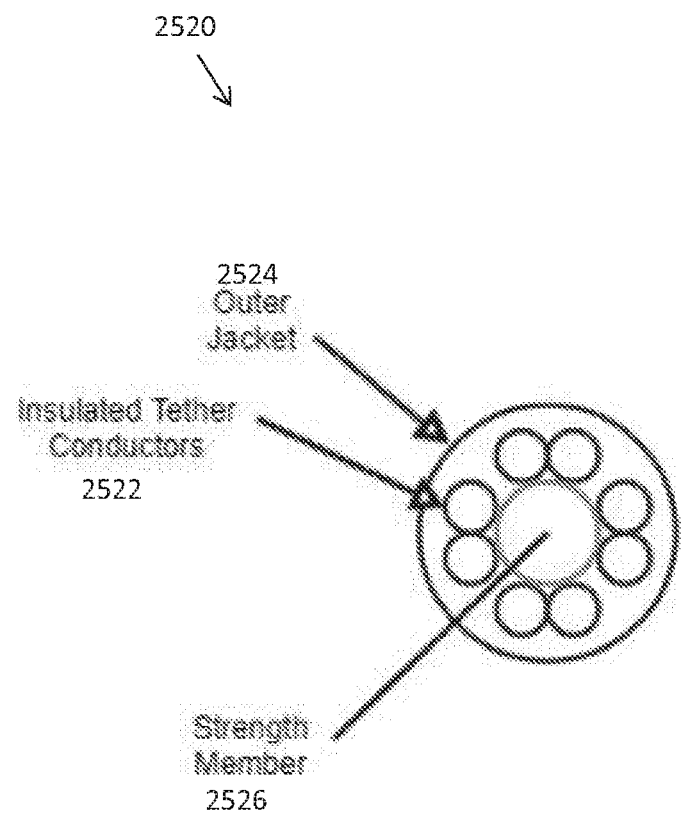
FIG. 25D is an embodiment of an exemplary circular cable bundle.

FIG. 25D is an embodiment of an exemplary circular cable 2520. The cable 2520 includes two or more tether conductors 2522 housed within the cable 2520 to allow for ease of installation and reliability. In an exemplary embodiment, each tether conductor 2522 is a microfilament, a pair of threadlike wires that may transmit over a kilowatt of power to the elevated transceiver module 2506 while also enabling transmission of bi-directional data and high-definition video. In one embodiment, the cable 2520 may include an outer Kevlar-jacket 2524, and the tether conductor 2522 may include a twisted copper pair with insulation that provides a power link and/or a communication link between the base station 2502 and the elevated transceiver module 2506. The cable 2520 may include a strength member 2526, such as synthetic fibers, to maintain axial stiffness and break strength.

Figure 25E:
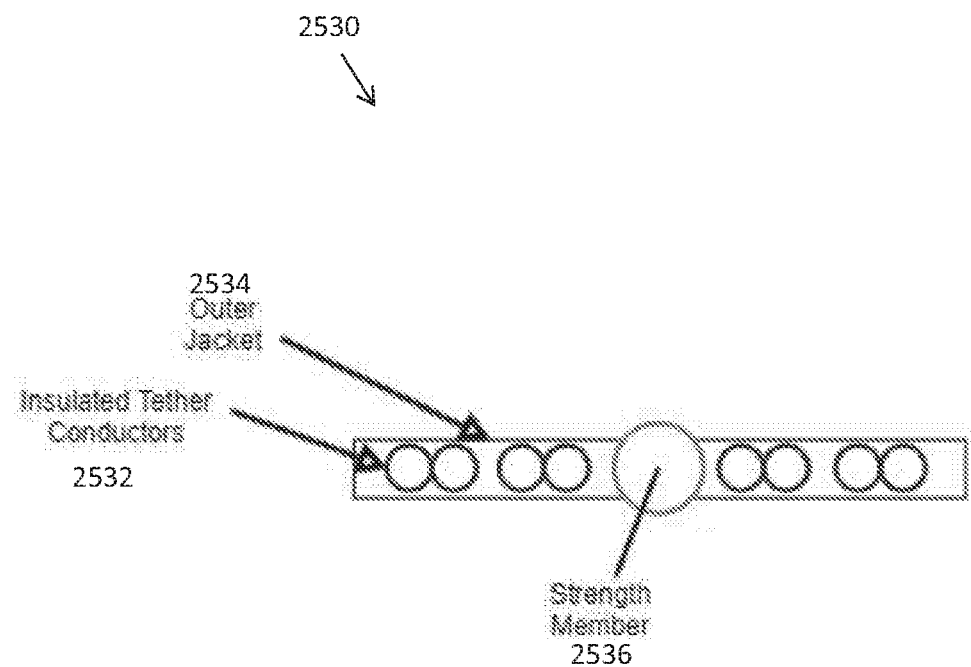
FIG. 25E is an embodiment of an exemplary flat cable bundle.

FIG. 25E is an embodiment of an exemplary flat cable 2530. The cable 2530 includes two or more tether conductors 2532 housed within the cable 2530 to allow for ease of installation and reliability. In an exemplary embodiment, each tether conductor 2532 is a microfilament, a pair of threadlike wires that may transmit over a kilowatt of power to the elevated transceiver module 2506 while also enabling transmission of bi-directional data and high-definition video. In one embodiment, the cable 2530 may include an outer Kevlar-jacket 2534, and the tether conductor 2532 may include a twisted copper pair with insulation that provides a power link and/or a communication link between the base station 2502 and the elevated transceiver module 2506. The cable 2530 may include a strength member 2536, such as synthetic fibers, to maintain axial stiffness and break strength.

Figure 25F:
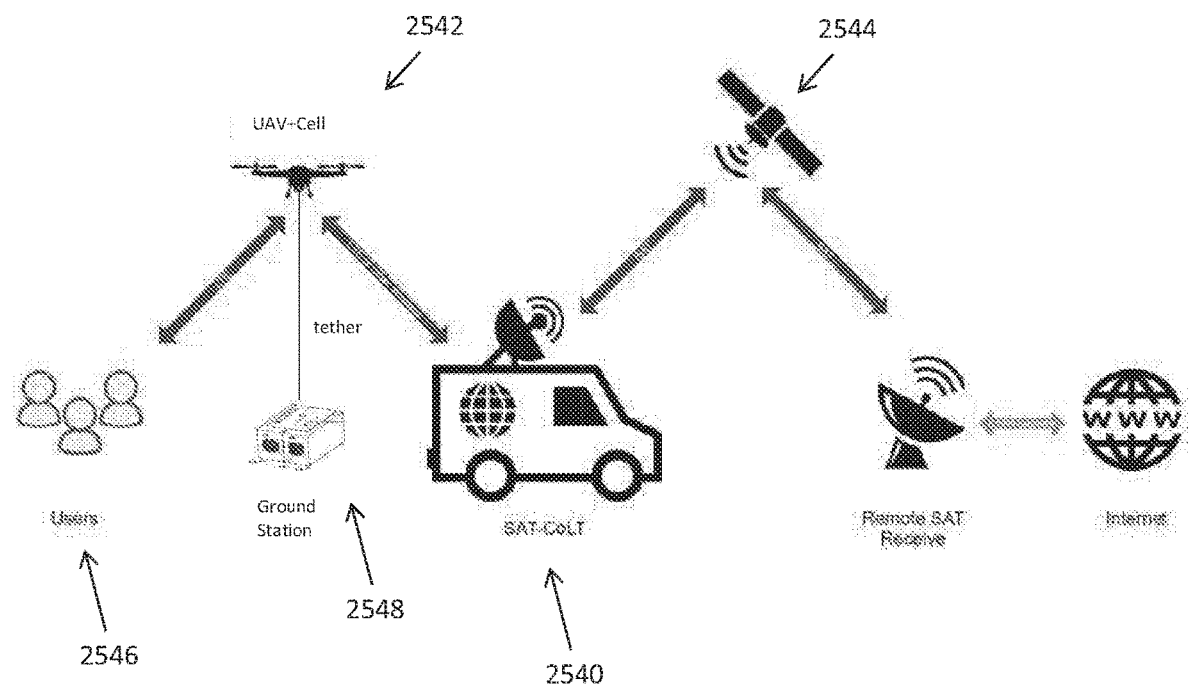
FIGS. 25F-25H are embodiments of a system for enabling a UAV for radio transmission and reception of cellular communication or as an internet portal.
Figure 25G:
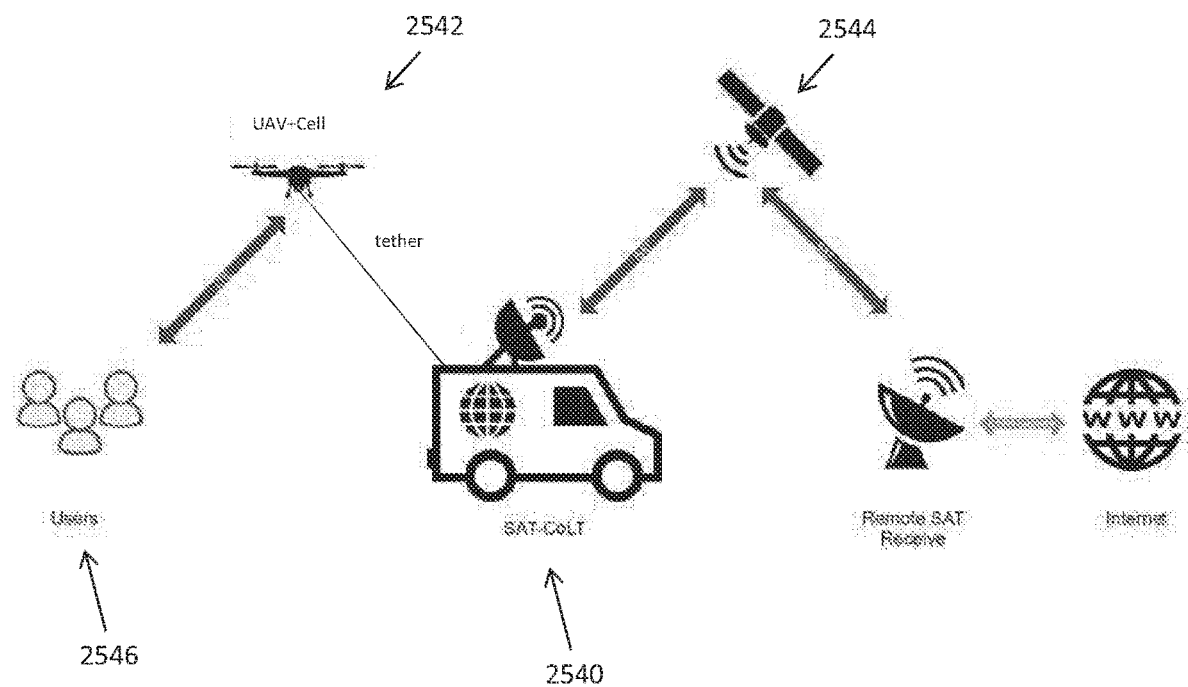
Figure 25H:
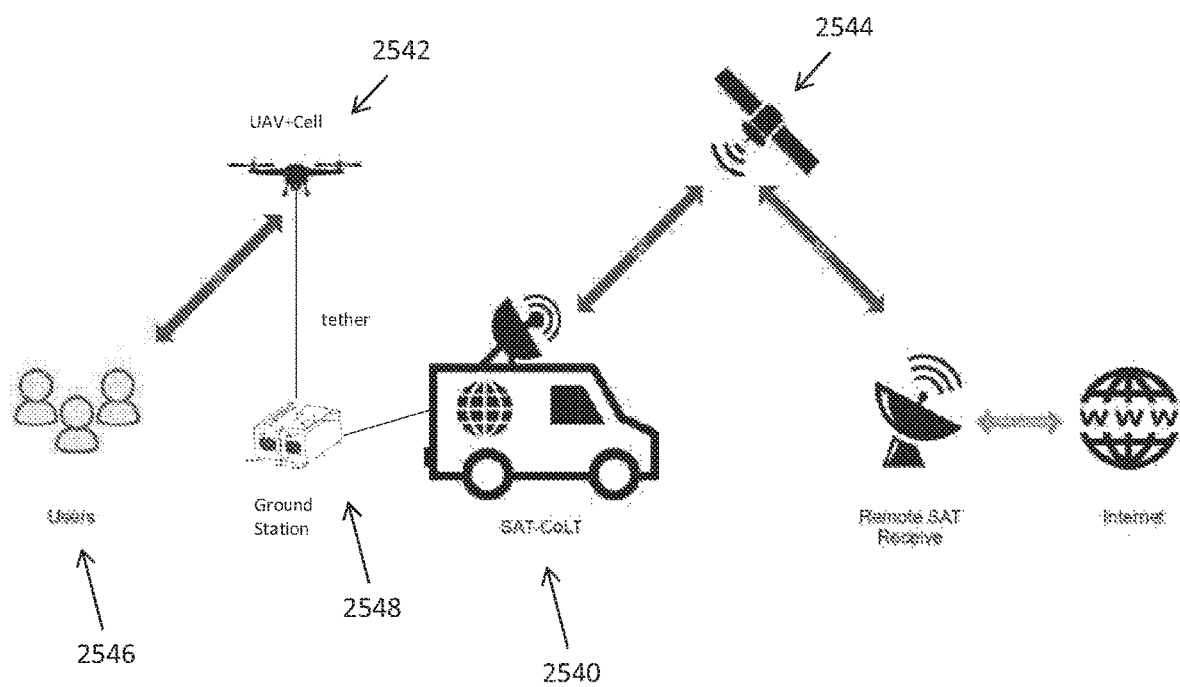
Figure 25I:
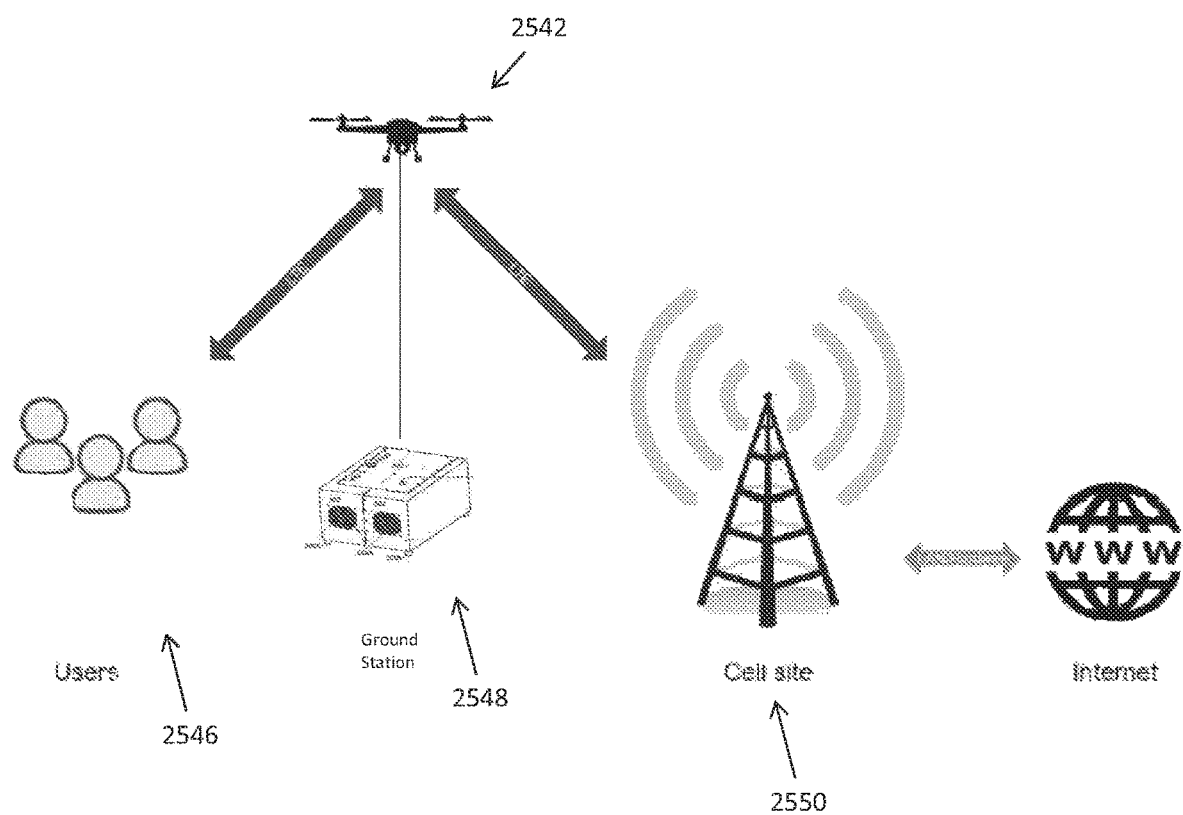
FIG. 25I is an alternate embodiment of a system for enabling a UAV for radio transmission and reception of cellular communication or as an internet portal.

FIGS. 25F-25H are embodiments of a system for enabling a UAV for radio transmission and reception of cellular communication or as an internet portal. Traditional satellite cell on light trucks (SAT-CoLTs) 2540 are deployed, although coverage may be limited due to obstructions (terrain, buildings, flora). An UAV 2542 with CELL connectivity is deployed along with local SAT backhaul kits installed near a ground system, or the UAV 2542 with CELL connectivity can be connected to another means of local backhaul. The UAV 2542 includes an user equipment (UE) relay and an eNodeB. The UE relay (i.e., the fronthaul side) connects to cell towers or other backhaul mediums, and the eNodeB (i.e., the access side) provides cellular access. The UAV can include a payload having a wireless antenna relay to relay cellular traffic to a call tower or truck. The SAT- CoLTs 2540 is communicatively coupled to a satellite 2544 to received data associated with, for example, the internet.

The UAV 2542 is deployed to an ideal altitude, based on environmental and regulatory constraints, to provide the maximum coverage omni-directionally, extending a bubble of coverage below and around the UAV 2542 with CELL connectivity. The CELL connects to the local SAT backhaul, according to one or more of the embodiments shown in FIGS. 25F-25H, to bridge between the newly covered mobile users 2546 and the cell network. The UAV 2542 with CELL connectivity remains on site as long as required (as permitted by regulatory and environmental constraints). For example, during an emergency, local users 2546 (residents, aid workers, etc.) may enter the network bubble to communicate with colleagues, family members, emergency services, etc.

This system provides an area where users can enter to gain cell connectivity. For example, for large events that are relatively temporary, UAV with CELL connectivity may be deployed to add coverage and capacity to a specific area such as a concert venue, sporting event, parade, etc.

In many cases, CoLTs are deployed to these events. The CoLTs will backhaul via terrestrial microwave, SAT link, or ground wired connection. The UAV with CELL connectivity would be deployed in conjunction with the CoLTs, using them as a backhaul link.

In FIG. 25F, the UAV 2542 is tethered to a ground station 2548 and connects to the local SAT backhaul (i.e., the STAT CoLT 2540) using a wireless connection.

In FIG. 25G, the UAV 2542 is tethered to (and may be deployed from) a SAT-CoLT 2540.

In FIG. 25H, the UAV 2542 is tethered to a ground station 2548, where the ground station 2548 is backhauled through a hardline through the SAT-CoLT 2540.

FIG. 25I is an alternate embodiment of a system for enabling a UAV for radio transmission and reception of cellular communication or as an Internet portal. The UAV 2542 with CELL connectivity may use existing infrastructure such as macrocells, instead of using SAT-CoLTs 2540 or the like. In this variant, the UAV 2542 with CELL connectivity uses cell towers 2550 as the backhaul connection while continuing to distribute the local LTE bubble. The UAV 2542 may connect to the cell towers 2550 via wireless communicate (e.g., LTE). As described above, the UAV 2542 includes an UE relay to connect to the cell tower 2550 or other backhaul mediums and an eNodeB to provides cellular access to, for example, cellular phones of the users 2546.

Exemplary usage scenario for FIGS. 25F-25I are as follows: set up the system with proper perimeter and safety/regulatory precautions observed, install payload, plug in payload connector, install payload and plate, adjust antennas (if needed), launch the UAV 2542, yaw the UAV 2542 to orient, payload (if needed for backhaul), observe system performance parameters from remote status/engineering access to CELL payload (remote access may be through tether, local wireless, or cell network), adjust the UAV 2542 or CELL parameters as needed to achieve desired system performance, and land the UAV 2542 when mission is complete.

Figure 25J:
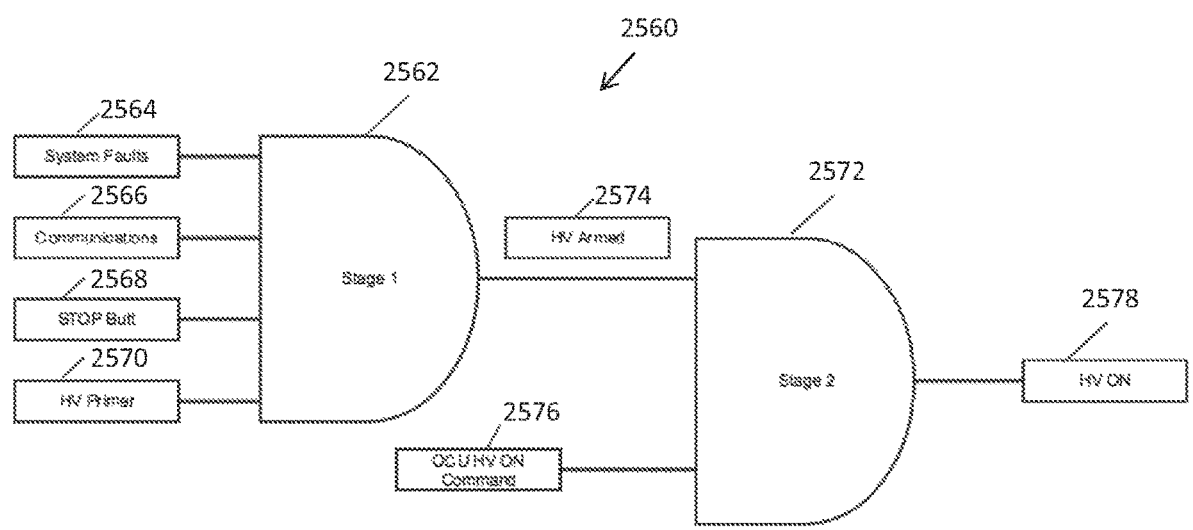
FIG. 25J illustrates safety interlocks configured to shut down power under predefined conditions.

FIG. 25J illustrates a safety interlock system 2560 configured to shut down power to the tether under predefined conditions. In an exemplary embodiment, a ground station includes a set of safety interlocks that can prevent circumstances where a user may be exposed to high voltage. There are physical, electronic, and software interlocks required for HV to be applied to the UAV.

Starting from Stage One 2562, all the following must be true to allow the HV to be armed and ready to be turned on and applied: there are no system faults or errors 2564, communication between the Ground Station, OCU, and AV is made 2566, the stop button is not in the depressed state 2568, and the HV ARM switch is in the ARMED position 2570. Once these interlocks are true the HV will be ARMED, which is an input for Stage Two 2572.

For HV to be applied to the UAV, Stage Two 2572 requires: the HV Armed state to be ARMED 2574, and a user to apply the HV ON command from the OCU 2576. These interlocks will cause HV to be ON 2578 and energize the UAV via the tether.

The ground station may include additional safety mechanisms to render the system safe upon emergency state activation. One or more safety mechanisms are activated upon, for example, a software shutdown command, an E-STOP activation, or an error state detection. Safety mechanisms may include an output crowbar (a short circuit across the HV lines in order to bring the voltage down to safe levels as fast as possible), output relays (in-line switches that open in case of emergency, disconnecting base station electronics from the outside world), and E-STOP sensors. The interlock mechanism may activate safety mechanism when an access panel is opened/removed when an operator is performing maintenance.

The ground station may include error state detection mechanisms, such as sensors that activate the safety mechanisms. Error state detection mechanisms may include a ground shift detection sensor that detects a voltage shift in the ground level with regards to earth ground. This enables detection of a ground fault: when the HV lines is inadvertently connected to earth ground. Error state detection mechanisms may further include overvoltage and overcurrent detection sensor, and zero-current detection that indicates when the microfilament has been broken or disconnected so as to prevent exposed high voltage. Error state detection mechanisms may also include air vehicle communications detection where the air vehicle and the base station communicate upon power up as a link in the chain to allow safe turn on (communications present indicate successful filament connection)

Figure 26A:
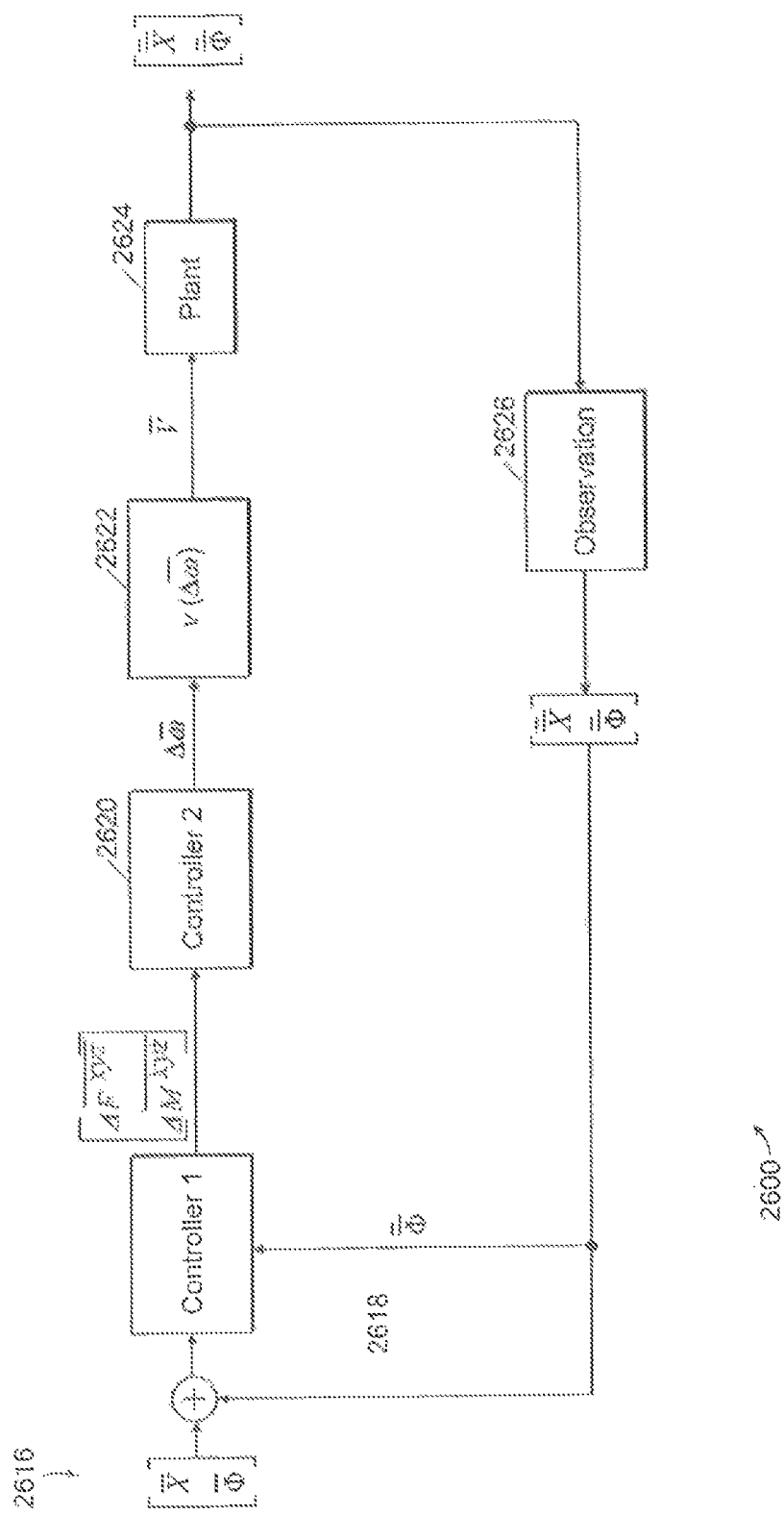
FIGS. 26A and 26B depicts block diagrams of an exemplary control system.

FIG. 26A is an exemplary approach to controlling an aerial vehicle. A multi-rotor helicopter control system 2600 receives a control signal 2616 including a desired position, $\overline{X}$ in the inertial frame of reference (specified as an n, w, h (i.e., North, West, height) coordinate system, where the terms "inertial frame of reference" and n, w, h coordinate system are used interchangeably) and a desired rotational orientation, $\overline{\Phi}$ in the inertial frame of reference (specified as a roll (R), pitch (P), and yaw (Y) in the inertial frame of reference) and generates a vector of voltages $\overline{V}$ which are used to drive the thrusters of the multi-rotor helicopter (such as multi-rotor helicopter 2710 shown in FIG. 27) to move the multi-rotor helicopter to the desired position in space and the desired rotational orientation.

The control system 2600 includes a first controller module 2618, a second controller module 2620, an angular speed to voltage mapping function 2622, a plant 2624 (i.e., the multi-rotor helicopter), and an observation module 2626. The control signal 2616, which is specified in the inertial frame of reference is provided to the first controller 2618 which processes the control signal 2616 to determine a differential thrust force vector, $\Delta \overline{F^{xyz}}$ and a differential moment vector, $\Delta \overline{M^{xyz}}$, each specified in the frame of reference of the multi-rotor helicopter (i.e., the x, y, z coordinate system). In some examples, differential vectors can be viewed as a scaling of a desired thrust vector. For example, the gain values for the control system 2600 may be found using empiric tuning procedures and therefore encapsulates a scaling factor. For this reason, in at least some embodiments, the scaling factor does not need to be explicitly determined by the control system 2600. In some examples, the differential vectors can be used to linearize the multi-rotor helicopter system around a localized operating point.

In some examples, the first controller 2618 maintains an estimate of the current force vector and uses the estimate to determine the differential force vector in the inertial frame of reference, $\Delta \overline{F^{inertial}}$ as a difference in the force vector required to achieve the desired position in the inertial frame of reference. Similarly, the first controller 2618 maintains an estimate of the current moment vector in the inertial frame of reference and uses the estimate to determine the differential moment vector in the inertial frame of reference, $\Delta \overline{M^{inertial}}$ as a difference in the moment vector required to achieve the desired rotational orientation in the inertial frame of reference. The first controller then applies a rotation matrix to the differential force vector in the inertial frame $\Delta \overline{F^{inertial}}$ to determine its representation in the x, y, z coordinate system of the multi-rotor helicopter, $\Delta \overline{F^{xyz}}$. Similarly, the first controller 2618 applies the rotation matrix to the differential moment vector in the inertial frame of reference, $\Delta \overline{M^{inertial}}$ to determine its representation in the x, y, z coordinate system of the multi-rotor helicopter, $\Delta \overline{M^{xyz}}$.

The representation of the differential force vector in the x, y, z coordinate system, $\Delta \overline{F^{xyz}}$ and the representation of the differential moment vector in the x, y, z coordinate system, $\Delta \overline{M^{xyz}}$ are provided to the second controller 2620 which determines a vector of differential angular motor speeds:

$$\Delta \vec{\omega} = \begin{bmatrix} \Delta \omega_1 \\ \Delta \omega_2 \\ \vdots \\ \Delta \omega_n \end{bmatrix}$$

As can be seen above, the vector of differential angular motor speeds, $\Delta \vec{\omega}$ includes a single differential angular motor speed for each of the n thrusters of the multi-rotor helicopter. Taken together, the differential angular motor speeds represent the change in angular speed of the motors required to achieve the desired position and rotational orientation of the multi-rotor helicopter in the inertial frame of reference.

In some examples, the second controller 2620 maintains a vector of the current state of the angular motor speeds and uses the vector of the current state of the angular motor speeds to determine the difference in the angular motor speeds required to achieve the desired position and rotational orientation of the multi-rotor helicopter in the inertial frame of reference.

The vector of differential angular motor speeds, $\Delta \vec{\omega}$ is provided to the angular speed to voltage mapping function 2622 which determines a vector of driving voltages:

$$\vec{V} = \begin{bmatrix} V_1 \\ V_2 \\ \vdots \\ V_n \end{bmatrix}$$

As can be seen above, the vector of driving voltages, $\vec{V}$ includes a driving voltage for each motor of the n thrusters. The driving voltages cause the motors to rotate at the angular speeds required to achieve the desired position and rotational orientation of the multi-rotor helicopter in the inertial frame of reference.

In some examples, the angular speed to voltage mapping function 2622 maintains a vector of present driving voltages, the vector including the present driving voltage for each motor. To determine the vector of driving voltages, $\vec{V}$, the angular speed to voltage mapping function 2622 maps the differential angular speed $\Delta \omega_i$ for each motor to a differential voltage. The differential voltage for each motor is applied to the present driving voltage for the motor, resulting in the updated driving voltage for the motor, $V_i$. The vector of driving voltages, $\vec{V}$ includes the updated driving voltages for each motor of the i thrusters The vector of driving voltages, $\vec{V}$ is provided to the plant 2624 where the voltages are used to drive the motors of the i thrusters, resulting in the multi-rotor helicopter translating and rotating to a new estimate of position and orientation.

$$\begin{bmatrix} \overline{X} \\ \overline{\Phi} \end{bmatrix}$$

The observation module or sensor 2626 detects the new position and orientation and feeds it back to a combination node 2628 as an error signal. The control system 2600 repeats this process, achieving and maintaining the multi-rotor helicopter as close as possible to the desired position and rotational orientation in the inertial frame of reference. The IMU can provide the updated sensor data or a processor receiving data from one or more antennas can compute a signal to rotate the vehicle into an orientation that improves signal reception and transmission back to one or more mobile devices.

Figure 26B:
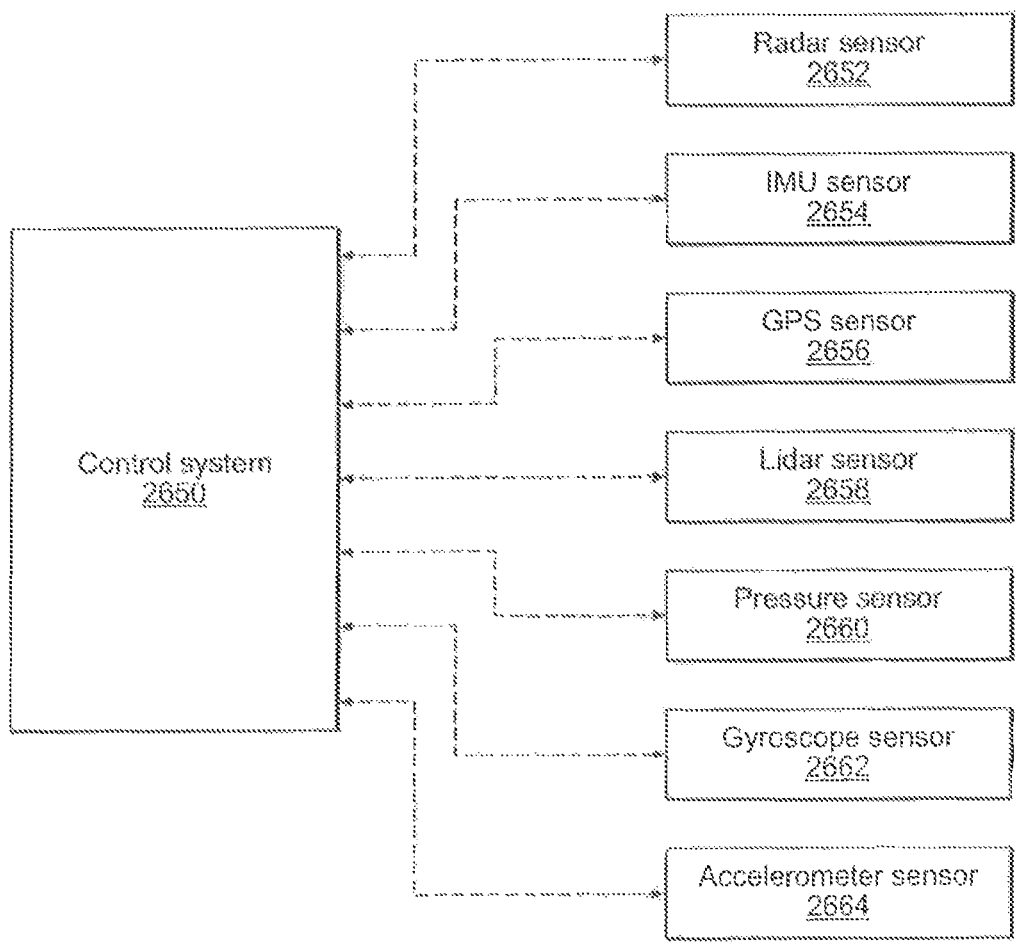

FIG. 26B is an schematic block diagram of at least one sensor used in a multi-rotor helicopter control system 2650 for controlling a UAV. The at least one sensor includes one or more of a radar sensor 2652, an inertial measurement unit (IMU) sensor 2654, a GPS sensor 2656, a Lidar sensor 2658, a pressure sensor 2660, a gyroscope sensor 2662, and an accelerometer sensor 2664.

The data collected from the IMU sensor 2654 enables the control system 2650 to track the UAV's position, i.e., using, for example, dead reckoning, or to adjust for wind, The pressure sensor 2660 measures atmospheric pressure. Data provided by the pressure sensor 2660 enabling the control system 2650 to adjust other parameters (i.e., rotor speed, tilting angle, etc.) based on the atmospheric pressure.

The radar sensor 2662 provide detection of objects, reliable distance measurement, collision avoidance and driver assistance. Data provided by the radar sensor 2662 is used by the control system 2650 to compute updated rotor speed to avoid collisions.

The GPS sensor 2656 provides accurate position and velocity information. Data provided by the GPS sensor 2656 is used by the control system 2560 to compute updated location and velocity information, The Lidar sensor 2658, which measures distance to a target by illuminating that target with a laser light, provide detection of objects, reliable distance measurement, collision avoidance and driver assistance. Data provided by the Lidar sensor 2658 is used by the control system 2560 to compute updated rotor speed to avoid collisions, The gyroscope sensor 2662 measures the angular rotational velocity, and assists with orientation and stability in navigation. The accelerometer sensor 2664 measures linear acceleration of movement. Data provided by the gyroscope sensor 2662 and accelerometer sensor 2664 is used by the control system 2560 to compute updated linear and rotation velocity.

Figure 27:
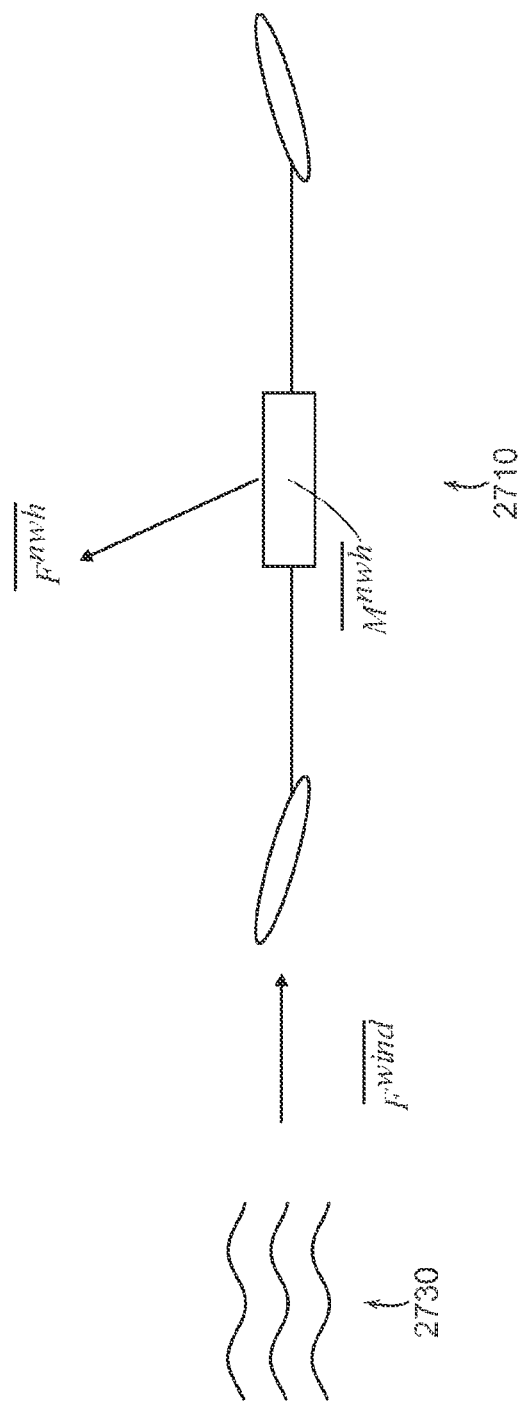
FIG. 27 depicts a block diagram of an exemplary a multi-rotor helicopter operating in the presence of a prevailing wind.

Referring to FIG. 27, in some examples, a multi-rotor helicopter 2710 is tasked to hover at a given position $\overline{X}$ and orientation in the inertial frame of reference in the presence a prevailing wind 2730. The wind causes exertion of a horizontal force, $\overline{F}_{wind}$ on the multi-rotor helicopter 2710, tending to displace the multi-rotor helicopter in the horizontal direction. Conventional multi-rotor helicopters may have to tilt their frames into the wind and adjust the thrust generated by their thrusters to counter the horizontal force of the wind, thereby avoiding displacement. However, tilting the frame of a multi-rotor helicopter into wind increases the profile of the multi-rotor helicopter that is exposed to the wind. The increased profile results in an increase in the horizontal force applied to the multi-rotor helicopter due to the wind. The multi-rotor helicopter must then further tilt into the wind and further adjust the thrust generated by its thrusters to counter the increased wind force. Of course, further tilting into the wind further increases the profile of the multi-rotor helicopter that is exposed to the wind. It should be apparent to the reader that tilting a multi-rotor helicopter into the wind results in a vicious cycle that wastes energy.

The approaches described above address this issue by enabling motion of the multi-rotor helicopter 2710 horizontally into the wind without tilting the frame of the multi-rotor helicopter 2710 into the wind. To do so, the control system described above causes the multi-rotor helicopter 2710 to vector its net thrust such that a force vector $\overline{F^{nwh}}$ is applied to the multi-rotor helicopter 2710. The force vector $\overline{F^{nwh}}$ has a first component that extends upward along the h axis of the inertial frame with a magnitude equal to the gravitational constant, g exerted on the multi-rotor helicopter 2710. The first component of the force vector $\overline{F^{nwh}}$ maintains the altitude of the multi-rotor helicopter 2710 at the altitude associated with the given position. The force vector $\overline{F^{nwh}}$ has a second component extending in a direction opposite (i.e., into) the force exerted by the wind and having a magnitude equal to the magnitude of the force, $\overline{F^{wind}}$ exerted by the wind. The second component of the force vector maintains the position of the multi-rotor helicopter 2710 in the n, w plane of the inertial frame of reference.

To maintain its horizontal orientation $\overline{\Phi}$ in the inertial frame of reference, the control system described above causes the multi-rotor helicopter 2710 to maintain the magnitude of its moment vector $\overline{M^{nwh}}$ at or around zero. In doing so, any rotation about the center of mass of the multi-rotor helicopter 2710 is prevented as the multi-rotor helicopter 2710 vectors its thrust to oppose the wind.

In this way the force vector $\overline{F^{nwh}}$ and the moment vector $\overline{M^{nwh}}$ maintained by the multi-rotor helicopter's control system enable the multi-rotor helicopter 2710 to compensate for wind forces applied thereto without rotating and increasing the profile that the helicopter 10 presents to the wind.

Figure 28:
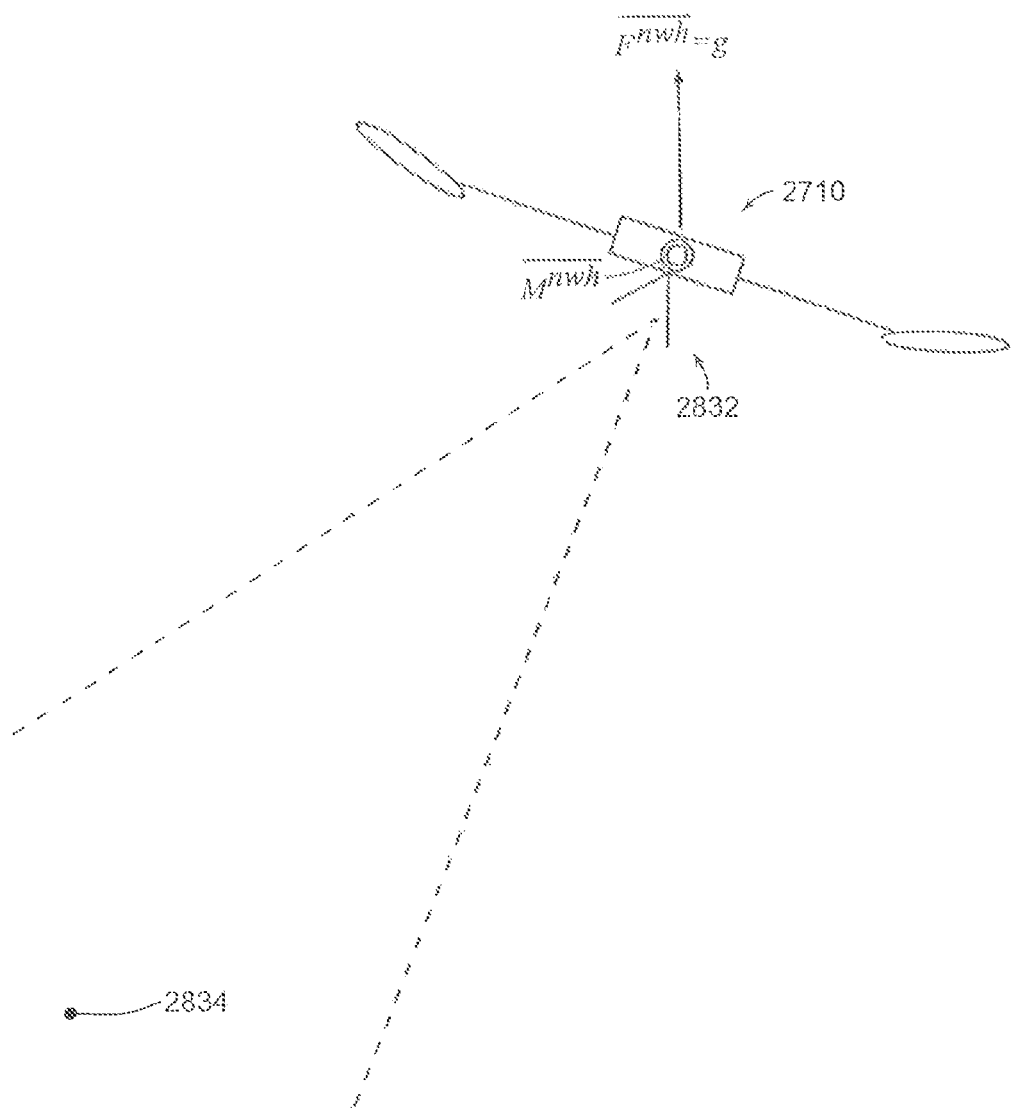
FIG. 28 depicts an exemplary multi-rotor helicopter rotating without changing its position.

Referring to FIG. 28, an antenna 2832 such as a sectorized antenna is attached to the multi-rotor helicopter 2710 for the purpose of capturing data from a point of interest 2834 on the ground beneath the multi-rotor helicopter 2710. In general, it is often desirable to have the multi-rotor helicopter 2710 hover in one place while the antenna 2832 captures data. Conventional multi-rotor helicopters are unable to orient the antenna 2832 without tilting their frames (and causing horizontal movement) and therefore require expensive and heavy gimbals for orienting their imaging sensors.

The approaches described above obviate the need for such gimbals by allowing the multi-rotor helicopter 2710 to rotate its frame in the inertial plane while maintaining its position in the inertial plane. In this way, the imaging sensor 2832 can be statically attached to the frame of the multi-rotor helicopter 2710 and the helicopter can tilt its frame to orient the imaging sensor 2832 without causing horizontal movement of the helicopter. To do so, upon receiving a control signal characterizing a desired imaging sensor orientation, $\overline{\Phi}$ the control system described above causes the moment vector, $\overline{M^{nwh}}$ of the multi-rotor helicopter 2710 to extend in a direction along the horizontal (n, w) plane in the inertial frame of reference, with a magnitude corresponding to the desired amount of rotation. To maintain the position, $\overline{X}$ of the multi-rotor helicopter 2710 in the inertial frame of reference, the control system causes the multi-rotor helicopter 2710 to vector its net thrust such that a force vector $\overline{F^{nwh}}$ is applied to the multi-rotor helicopter 2710. The force vector $\overline{F^{nwh}}$ extends only along the h-axis of the inertial frame of reference and has a magnitude equal to the gravitational constant, g. By independently setting the force vector $\overline{F^{nwh}}$ and the moment vector $\overline{M^{nwh}}$, the multi-rotor helicopter 2710 can rotate about its center while hovering in one place.

As is noted above, conventional multi-rotor helicopters are controlled in roll, pitch, yaw, and net thrust. Such helicopters can become unstable (e.g., an oscillation in the orientation of the helicopter) when hovering in place. Some such helicopters include gimbaled imaging sensors. When a conventional helicopter hovers in place, its unstable behavior can require that constant maintenance of the orientation of gimbaled imaging sensor to compensate for the helicopter's instability.

Figure 29:
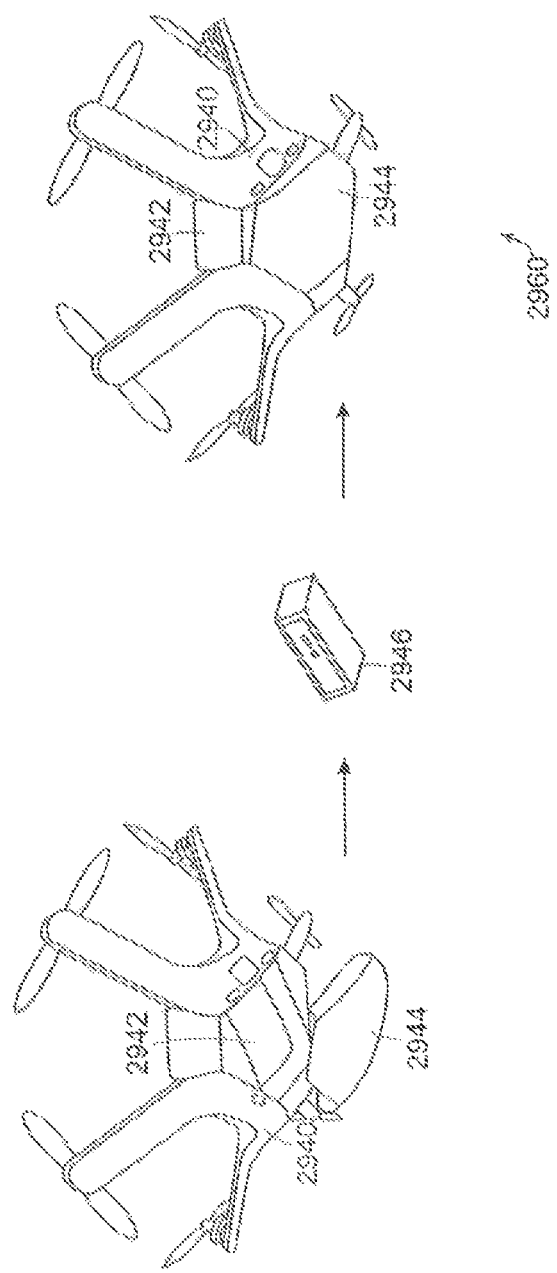
FIG. 29 illustrates a modular system for tetherless flight operation.

Referring to FIG. 29 and FIG. 30, a modular aerial vehicle system allows for simple, modular switching between a number of different configurations, including a free-flying, battery powered configuration and a tethered configuration.

In some aspects, an aerial vehicle (e.g., the aerial vehicle described in PCT/US2015/033992, "FIXED ROTOR THRUST VECTORING" which is incorporated herein by reference) includes a receptacle or "module bay" in its fuselage for receiving modules for configuring the aerial vehicle. One example of a module that can be received by the module bay is a battery power configuration module for configuring the aerial vehicle into a battery operated mode. In some examples, the battery power configuration module includes a battery (e.g., a lithium ion battery) and circuitry associated with battery power management. In some examples, the battery power configuration module includes terminals that correspond to terminals located in the module bay such that, when the battery power configuration module is inserted into the module bay, the terminals of the battery power configuration module are in contact with the terminals in the module bay (e.g., for power transfer).

Another example of a module that can be received in the module bay is a tethered configuration module. The tethered configuration module includes or is attachable to a lightweight tether for connection to a ground station, data linkage connectors which enable use of the tether as both the power conduit, and conveyance mechanism for command and control communications and telemetry return, for vehicles equipped to enable hardwired interface with their ground-based operator. In some examples, the tethered configuration module supplies power information to the user via established vehicle health monitoring strategies, such that continuous feed of power from the ground is properly reported, and any battery life-related behaviors (like land on low power) are precluded.

In some examples, the tether is spooled (e.g., deployed from and/or re-wound into) in a body of the tethered configuration module. In other examples, spooling of the tether occurs at a ground station.

In some examples, the tethered configuration module includes terminals that correspond to terminals located in the module bay such that, when the tethered configuration module is inserted into the module bay, the terminals of the tethered configuration module are in contact with the terminals in the module bay (e.g., for power transfer, command and control information transfer, sensor information transfer, etc.).

In some examples, a multi-use module is a hybrid tethered configuration module and battery power configuration module (i.e., a module including both tether hardware and a battery). When in use as a free flying vehicle, the tether is disconnected from the multi-use module (leaving the tether management hardware intact), and a battery unit installed in the multi-use module. When being used in a tethered configuration, the battery unit is removed from the multi-use module, and the tether is attached. In some examples, the multi-use module is used with both the battery unit installed and the tether attached. In such examples, circuitry for intelligently switching between battery power and tether-based power is included in the multi-use module.

In some examples, the aerial vehicle includes minimal or no power conversion, telemetry, vehicle command and control, sensor, or communications circuitry. That is, the aerial vehicle includes only a fuselage, including spars with thrust generators disposed at their ends and terminals for connecting the thrust generators to an electronics module in the module bay. The electronics module may include a computing circuitry (e.g., a processor, memory) and/or discrete circuitry for power conversion, telemetry, vehicle command and control, and communications. The electronics module can be swapped in and out of one or more aerial vehicles.

In some examples, different modules can include different sensor suites and/or different functions to adapt the aerial vehicle to its mission. For example, the unmanned aerial vehicle may include a sensor module within the module bay for configuring the unmanned aerial vehicle to receive sensor data. In other embodiments, the unmanned aerial vehicle may include a radio communications module within the module bay for configuring the unmanned aerial vehicle to receive radio communications. In still other embodiments, the unmanned aerial vehicle may include a multi-use module that includes one or more of the tethered configuration module, the battery power configuration module, the sensor module, the radio communications module, and the electronics module.

In general, all of the modules that can be received by the module bay, including the tethered configuration module, the battery power module, the sensor module, the radio communications module, and the electronics module have the same form factor, and fit without additional modification, into the module bay of the aerial vehicle. The module bay can be located on a top or a bottom of the fuselage of the aerial vehicle.

In some examples, modules can be designed to retrofit pre-existing aerial vehicles. For example, a tethered configuration module may be configured to fit into a bay or attach to standard attachment points of a pre-existing aerial vehicle and to provide tethered power to the aerial vehicle. In some examples, such a tethered configuration module includes an RF transponder for receiving command and control information from a ground station via the tether and transmitting RF command and control information to the pre-existing aerial vehicle. The tethered configuration module may also include power conversion and conditioning circuitry for converting and conditioning the power received over the tether into a form that is usable by the aerial vehicle.

In some examples, the modular aerial vehicle system includes a ground station including one or more of a generator for generating power, a base station for conversion of the power from the generator for transmission over the tether and for communicating over the tether, and a spooler for managing an amount of deployed tether. One example of such a ground station is described in U.S. Pat. No. 9,290,269, "SPOOLER FOR UNMANNED AERIAL VEHICLE SYSTEM" which is incorporated herein by reference.

In some examples, one or more elements of the ground station is attached to a moving vehicle such as a commercial vehicle, construction equipment, military equipment and vehicles, boats and personal vehicles.

Aspects may include one or more of the following advantages.

Switching between battery powered operation and tethered operation is a simple modular switching operation. System flexibility is increased. Functionality and data capture capabilities are increased. Both the advantages of tethered systems (e.g., persistent, secure communications, flight duration unconstrained by on-board battery energy capacity) and free flying systems (e.g., wide range of motion, unconstrained by tether length) are achieved in a single system.

Other features and advantages of the invention are apparent from the following description. FIG. 29 shows installation of a battery powered configuration module into the modular aerial vehicle system. A modular aerial vehicle 2940 includes a module bay 2942 configured to receive a module 2944. The module 2944 is a battery power configuration module and includes a battery 2946. When the battery power configuration module 2944 is received in the module bay 2942, the modular aerial vehicle 2940 is configured in a battery powered, 'free-flight' mode 2960.

FIG. 30 shows installation of a tethered configuration module into the modular aerial vehicle system. The modular aerial vehicle 2940 receives a tethered configuration module 2948 including a tether 2950 in its module bay 2942 to configure the modular aerial vehicle in a tethered, ground powered mode 2952.

Figure 31A:
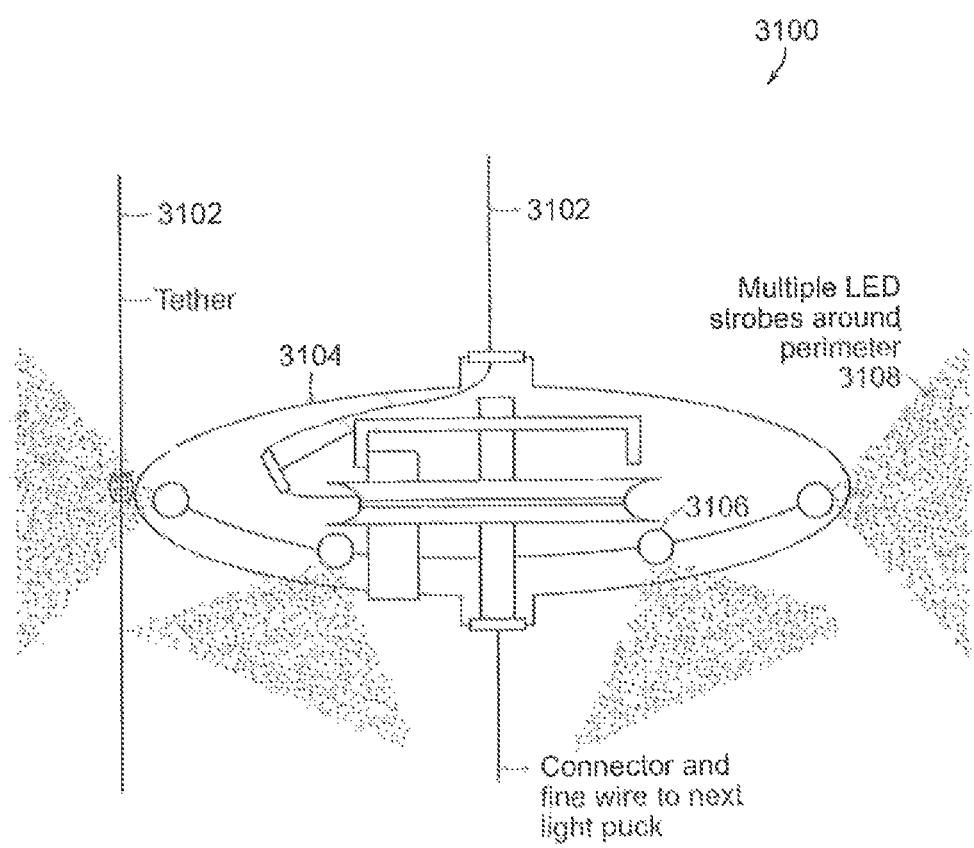
FIG. 31A-31C illustrates a tether strobe beacon for a UAV.

Referring to FIG. 31 A tethered system can employ operating lights to increase visibility and can also be used to determine vehicle location. The tether 3102 can have a disc 3104 statically mounted at a fixed location relative to the vehicle where spaced light emitters 3106 such as LEDs can be strobed around the perimeter to emit light 3108. The light emitted by system 3100 can also be detected by detector mounted on a ground station, for example, that provide position data to the vehicle to update the vehicle position.

Figure 31B:
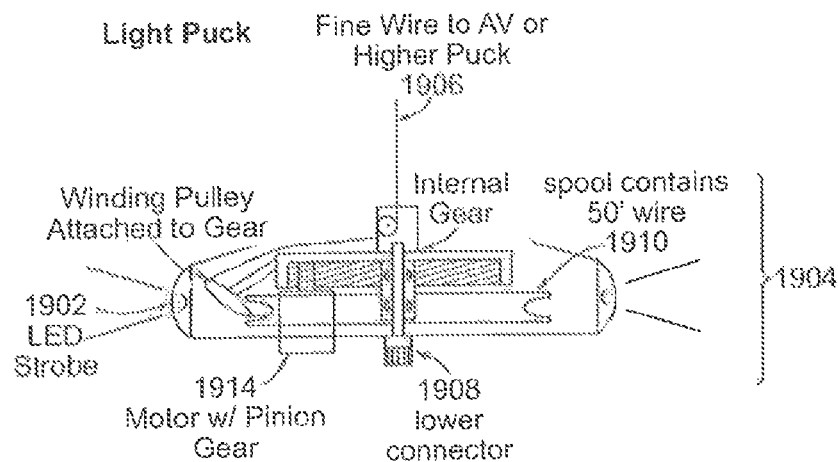

FIG. 31B illustrates tether markers for an air vehicle, according to an exemplary embodiment. In an exemplary embodiment, the tether markers are an array of LED strobe lights 1902, as shown in FIG. 19*a*. The array of LED strobe lights 1902 are hung at intervals (i.e., 50 foot intervals) on the tether. The LED array may contain multi-lit color lights as well as IR. In this case, the LED arrays could get their power from a battery or from the air vehicle.

In still further embodiments, the LED array may be made into a small, lightweight and aerodynamic package. The package may contain a retractable leash 1906 such that the arrays may be arraigned together to form a "puck," as shown in FIG. 19*b*. The leash 1906 have a connector on an end that mates with the air vehicle providing it with power for the lights and a signal for the light pattern. The puck 1904 may have a receptacle or connector 1908 on the underside to accept the leash 1906 of a lower puck. The pucks 1904 can be linked together with their leashes 1906 retracted on the ground and when the air vehicle takes off, it will pick up the first puck 1904 by its leash 1906. As the air vehicle goes higher, the second puck 1904 is lifted by the first, and so forth. The retracting leash 1906 system of each puck 1904 will prevent any tangling during launching and landing.

The puck 1904 includes an array of strobe lights 1902 facing outward on a toroid resembling a donut; control and power electronics to drive the strobe lights 1902; a leash 1906 to provide structural support for the puck 1904 and power/signal for the strobes; a retraction mechanism for the leash 1906, which could take the form of a passive dog leash 1906 or be powered like in the spooler; receptacle on the bottom for the lower puck 1904 to connect; a tether attachment point on the side of the puck; and aerodynamic faring.

Figure 31C:
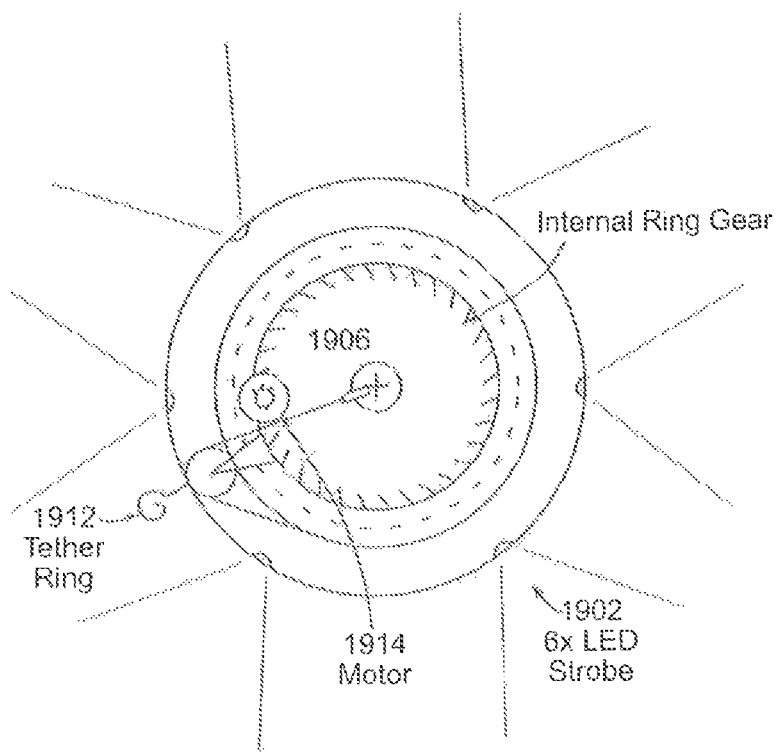

FIG. 31C shows the strobe lights 1902 positioned in increments around the perimeter of the puck, with a lens to provide a beam angle suitable to allow them to overlap so that the puck 1904 is visible from any angle. A retraction mechanism is mounted in the center of the puck. The retraction mechanism includes a large diameter spool to hold the 50 feet of leash 1906. A rotating arm with a pulley on the end that travels around the spool, and either a motor or a spring to rotate the arm. The motor drives the retraction.

On the side of the puck 1904 is a loop to run the air vehicle tether through. By attaching the puck 1904 to the tether, the puck 1904 should remain downwind of the tether and the entanglement of the leash 1906 and tether is minimized.

The operation of using the pucks 1904 is as follows: A stack of pucks 1904 (number required for the mission) are positioned on the spooler where they are each plugged into the one above and the upper most is plugged into a payload or other connector on the air vehicle. The air vehicle takes off and begins to ascend. As is does so, the leash 1906 is pulled from the first puck, either winding up a spring, or backdriving the unpowered motor. When the end of the leash 1906 is reached, the puck 1904 is lifted into the air. At this point, the second puck 1904 begins to unwind its leash 1906 until it too is lifted into the air. When the air vehicle is at final altitude, all of the pucks 1904 is suspended by their leashes 1906. The tether markers are visible from distance, for example, one mile in daylight.

When landing, the last puck 1904 to leave the ground is the first to reach the ground. During a landing phase of flight, power is provided to the pucks 1904 motors (if equipped) such that they retract the tether. The motor may not need be strong enough to lift the puck, but only to wind the leash 1906 back in after the puck 1904 reaches the ground. As the leash 1906 is coming down, the motor will wind it back up. If a spring is used, it will need to be strong enough to overcome friction and draw in the leash 1906. When the air vehicle has landed, all of the pucks 1904 is on the ground with the leash 1906 retracted.

In other embodiments, the tether markers includes one or more lights configured to emit light continuously or at predetermined times. In another embodiment, the tether markers are flags or pennants located on a tether at predefined locations, for example, every 50 feet above 150 feet above ground level (AGL).

In additional embodiments, electroluminescent (EL) wire may be integrated into the tether. The EL wire may be powered and/or controlled from the air vehicle. The EL wire may be bright enough for nighttime use. In some embodiments, the EL wire may produce IR light for night vision systems.

Figure 32:
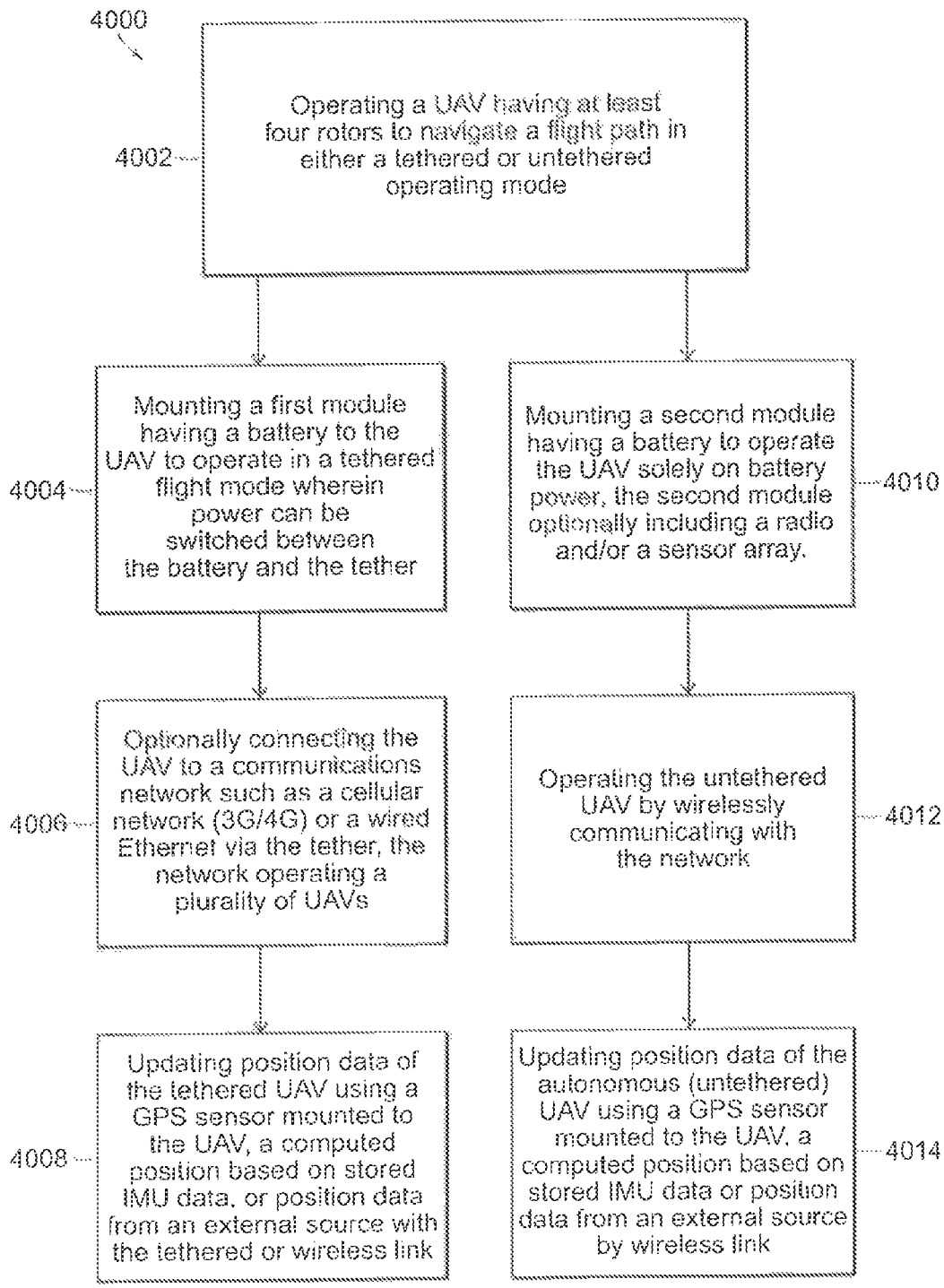
FIG. 32 illustrates a process flow diagram of a networked system using both tethered and untethered UAVs.

Referring to FIG. 32 illustrates a process flow diagram 4000 of a networked system using both tethered and untethered UAVs. The UAVs can be separate types of vehicles, or they can be of a modular design as described generally in the present application. In the embodiment of FIG. 32, the method include operating 4002 one or more UAVs having at least four rotors to navigate a flight path in either a tethered or untethered operating mode in response to an onboard flight plan or in response to commands distributed by a network controller.

A first UAV can be launched after mounting 4004 a first module having a battery to the first UAV to operate in a tethered flight mode wherein power can be switched between the battery and the tether. The tether can be operated using embodiments of the tether management system as described previously herein.

The first UAV can be operated from its separate control station, or optionally, by connecting 4006 the first UAV to a communications network such as a cellular network (3G/4G) or a wired Ethernet via the tether, the network operating one or a plurality of UAVs.

For many applications it is critical to have updated accurate position data for each UAV to perform flight or payload operations such as vehicle tracking as described previously herein. Updating position data 4008 of the tethered UAV can using a GPS sensor mounted to the UAV, a computed position based on stored IMU data, or position data from an external source delivered to the UAV with the tether or by wireless link.

The networked system can also employ untethered UAVs. These can be smaller UAVs, such as those shown in FIG. 29, for example, where a second module having a battery to operate the UAV solely on battery power can be mounted 4010 to the UAV. The second module optionally includes a radio and/or a sensor array. The sensor array can further enable autonomous operation by utilizing software modules that can identify and monitor objects on the ground or in the flight operating space and provide anti-collision flight control algorithms. The untethered UAV can be operated in a fully autonomous mode, under pilot control from a ground station or by wirelessly communicating 4012 with the network. It is also critical for untethered vehicles to have correct position data for flight control and payload operations, particularly in GPS denied environments as described herein. The position data of the autonomous (untethered) UAV can be adjusted 4014 by using a GPS sensor mounted to the UAV, a computed position based on stored IMU data or position data from an external source by wireless link from the network or by optical or radio communications from other nodes in the network such as control stations on the ground, on vehicles, or from other UAVs as described previously herein.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above

We claim:

1. An unmanned aerial vehicle (UAV), comprising:
    a direct current (DC)/DC converter configured to receive high voltage DC over a tether connected to the UAV and provide converted high voltage DC to a high power bus on the UAV, wherein the high power bus is configured to provide the converted high voltage DC to one or more motors on the UAV, and wherein the one or more motors are configured to drive a plurality of rotors to control flight of the UAV;
    a radio configured to provide cellular communications;
    a battery configured to provide a lower voltage DC to a low power bus, the lower voltage DC having a voltage lower than the converted high voltage DC; and
    a power management circuit configured to:
        monitor power available from the DC/DC converter and the battery; and
        selectively draw power from the battery based on the monitoring,
    wherein the UAV is configured to initialize UAV operation using only power drawn from the battery prior to a receipt of the high voltage DC over the tether.

2. An unmanned aerial vehicle (UAV) system for cellular communication comprising the UAV of claim 1, the system further comprising:
    a base station; and
    the tether configured to communicatively connect the base station to the radio, wherein the tether is configured to transmit cellular data to a cellular network, and wherein the radio comprises an antenna configured to provide cellular communication.

3. The system of claim 2, further comprising:
    a base controller comprising a voltage source and an Ethernet link, wherein the radio comprises a remote radio head coupled to the tether; and
    a tether management system having a tether controller and a moveable element, wherein the moveable element is configured to deploy the tether during flight of the UAV, wherein the tether management system and the base controller are mounted in a portable housing.

4. The system of claim 2, further comprising:
    a base controller having at least one processor and a voltage source that are mounted in a control station housing; and
    a tether controller configured to control winding of the tether to maintain tension of the tether at a desired tension value, wherein the UAV is configured to be launched from a platform and/or landed on the platform with the tether coupled to the UAV or without the tether coupled to the UAV.

5. The system of claim 2, wherein:
    the power management circuit is further configured to allocate power between a tether power source and/or the battery on the UAV;
    the tether comprises a wire and an optical fiber; and
    the UAV further comprises:
        a radio transceiver;
        an optical transceiver coupled to the optical fiber;
        a processor; and
        an inertial measurement unit.

6. The system of claim 2, further comprising:
    a tension sensor configured to measure tension of a deployed portion of the tether;
    a positioning system sensor configured to receive wireless signals and generate position data for the UAV; and
    a computer onboard the UAV, wherein the plurality of rotors comprise at least four rotors, and wherein the computer is configured to generate flight control signals to adjust a rotor speed of one or more rotors of the at least four rotors mounted on the UAV.

7. The system of claim 2, further comprising a networked system of a plurality of unmanned aerial vehicles, wherein each of the plurality of unmanned aerial vehicles of the networked system is configured to be connected to a communication network with a respective tether and/or by a respective wireless link to the base station, wherein the communication network comprises at least one server connected to the internet and/or to the cellular network, wherein one or more of the plurality of unmanned aerial vehicles comprises a node of the communication network, and wherein each node has a communication identifier that is unique.

8. The system of claim 7, wherein:
    at least two nodes of the communication network are configured to directly communicate with a secure communication link comprising an encrypted wireless radio communication by light signal transmission and/or acoustic signal transmission;

at least one node comprises a ground vehicle or a water craft, wherein an aerial vehicle is configured to be launched from the ground vehicle or the water craft;

each node of a first set of nodes is configured to securely communicate with one or more other nodes directly using a direct wireless link and/or with the communication network using one or more control stations; and/or each node of a second set of nodes is configured to be oriented relative to an object sensed by one or more sensors on each node of the second set such that the communication network collects sensed data associated with the object from the second set of nodes.

9. The system of claim 2, further comprising:
a launch vehicle on which a tether management system is mounted such that the UAV can be launched from the launch vehicle; and
one or more light sensing or imaging devices, wherein the tether is configured to transmit a voltage between about 500 volts DC and about 1200 volts DC to the UAV, and wherein the tether comprises a jacket, a central strength member within the jacket, and a plurality of wire conductors within the jacket.

10. The UAV of claim 1, wherein the power management circuit is further configured to detect a loss of power received from the tether and draw power from the battery to power controls to perform a landing of the UAV.

11. The UAV of claim 1, further comprising:
a battery charger, wherein the power management circuit is further configured to direct a portion of the converted high voltage DC to the battery charger to charge the battery during flight operations, wherein the power management circuit comprises one or more diodes configured to monitor voltage sources, and wherein the tether is configured to be deployed from a ground-based tension-controlled spool assembly.

12. A method of operating the UAV of claim 1, the method comprising:
programming a computer on the UAV to operate in a tethered flight mode or an untethered flight mode, wherein the radio is configured to transmit and receive voice and cellular data; and
operating the UAV in a flight mode, wherein the UAV is communicatively connected to a cellular communication network, wherein the UAV comprises the plurality of rotors that provide thrust for the UAV, and wherein the UAV initializes UAV operation using only power drawn from the battery prior to the receipt of the high voltage DC over the tether.

13. The method of claim 12, further comprising:
operating a tether management system having a tether controller and a moveable element, wherein the moveable element deploys the tether from a tether retainer during flight of the UAV, and wherein the moveable element rotates around an axis;
operating a base controller, wherein the base controller comprises a voltage source and an Ethernet link, and wherein the tether management system and the base controller are mounted in a portable housing;
operating a multi-directional antenna on the UAV;
actuating, by one or more sensors, a voltage shutoff of the tether;
communicating with a satellite through a satellite transceiver mounted to a ground vehicle;
operating a UAV control station housing that comprises a platform to launch and land the UAV; and
launching from the platform and/or landing on the platform the UAV with the tether coupled to the UAV or without the tether coupled to the UAV.

14. The method of claim 12, further comprising:
mounting a launch vehicle on a tether management system such that the UAV can be launched from the launch vehicle;
mounting a base controller having at least one processor and a voltage source in a control station housing, wherein the control station housing comprises a hand carried portable system weighing less than 28 kg or less than 25 kg or less than 22 kg, wherein the UAV further comprises a processor, an inertial measurement unit, a remote radio head, and an optical transceiver coupled to an optical fiber.

15. The method of claim 12, wherein the plurality of rotors comprises at least four rotors, the method further comprising:
measuring, by a tension sensor, tension of a deployed portion of the tether;
receiving, by a positioning system sensor, wireless signals;
generating, by the positioning system sensor, position data for the UAV; and
processing, by the computer, the position data to generate flight control signals to adjust a rotor speed of one or more rotors of the at least four rotors mounted on the UAV.

16. The method of claim 12, further comprising: operating a networked system of a plurality of unmanned aerial vehicles including at least one unmanned aerial vehicle having a relay antenna, wherein each of the plurality of unmanned aerial vehicles of the networked system is connected to the cellular communication network with a respective tether and/or by a respective wireless link to a control station, wherein one or more of the plurality of unmanned aerial vehicles comprises a node of the cellular communication network, wherein each node has a communication identifier that is unique;
directly communicating, by at least two nodes, with a secure communication link comprising an encrypted wireless radio communication; and
launching, by at least one node, an aerial vehicle, wherein the at least one node comprises a ground vehicle or a water craft.

17. An unmanned aerial vehicle (UAV) system for delivering power to a cellular radio system, the UAV system comprising the UAV of claim 1 and the system further comprising:
an insulated cable configured to extend from a ground station to a radio antenna positioned at a location above the ground station, wherein the ground station comprises a first converter configured to generate a DC voltage for transmission through the insulated cable; and
a voltage shutoff configured to control power transmission with the insulated cable.

18. The system of claim 17, further comprising a cell tower and a radio transmitter mounted to the cell tower, wherein:
the radio antenna is located on the cell tower and the first converter is located at a base of the cell tower,
the voltage shutoff comprises a sensor circuit,
the DC voltage is at least 300 volts and the insulated cable is at least 50 feet long, the insulated cable comprises:
a conductive wire;

a strengthening element comprising an aramid material or Kevlar®; and one or more optical fibers configured to transmit Ethernet data.

19. The system of claim 17, wherein:

the insulated cable is configured to provide power to a power amplifier;

the insulated cable comprises:

a central strengthening element or fiber, and a plurality of conductive circuits configured to connect to a plurality of antennas.

20. The system of claim 17, wherein the insulated cable comprises a linear or circular array of conductive wires, wherein the radio comprises the radio antenna, wherein the radio antenna is mounted to the UAV, wherein the insulated cable is configured to connect to a plurality of radio transceivers on a cell tower, a mobile satellite receiver, or the UAV.

* * * * *

UNITED STATES PATENT AND TRADEMARK OFFICE
CERTIFICATE OF CORRECTION

PATENT NO. : 12,030,629 B2
APPLICATION NO. : 16/349146
DATED : July 9, 2024
INVENTOR(S) : Samir S. Mistry et al.

It is certified that error appears in the above-identified patent and that said Letters Patent is hereby corrected as shown below:

In the Specification

Column 43, Lines 48-49, change "electrical functional diagram 2200 with 10" to -- electrical functional diagram 2200 with IO --.

Column 63, Line 55, change "each of the n thrusters" to -- each of the $n$ thrusters --.

Column 64, Lines 14-15, change "each motor of the n thrusters." to -- each motor of the $n$ thrusters. --.

Signed and Sealed this
Twenty-fourth Day of September, 2024

*Katherine Kelly Vidal*

Katherine Kelly Vidal
*Director of the United States Patent and Trademark Office*